US012219117B2

(12) United States Patent
Peeters et al.

(10) Patent No.: US 12,219,117 B2
(45) Date of Patent: **\*Feb. 4, 2025**

(54) AUTOMATED SAMPLE WEIGHT MEASUREMENT VIA OPTICAL INSPECTION

(71) Applicant: Qcify Inc., San Mateo, CA (US)

(72) Inventors: Raf Peeters, San Mateo, CA (US); Antoon De Cleen, Diest (BE); Pieter Ieven, Genk (BE); Ruben Praets, Leopoldsburg (BE)

(73) Assignee: Qcify Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,145

(22) Filed: May 11, 2023

(65) Prior Publication Data
US 2023/0283755 A1 Sep. 7, 2023

Related U.S. Application Data

(63) Continuation of application No. 18/118,319, filed on Mar. 7, 2023, which is a continuation-in-part of application No. 18/106,211, filed on Feb. 6, 2023, which is a continuation-in-part of application No. 17/985,747, filed on Nov. 11, 2022, which is a continuation-in-part of application No. 17/979,618, filed on Nov. 2, 2022, which is a continuation-in-part of application No. 17/967,621, filed on Oct. 17, 2022, (Continued)

(51) Int. Cl.
*H04N 13/243* (2018.01)
*G06T 7/00* (2017.01)
*H04N 23/56* (2023.01)
*H04N 23/66* (2023.01)
*H04N 13/254* (2018.01)

(52) U.S. Cl.
CPC ........ *H04N 13/243* (2018.05); *G06T 7/0004* (2013.01); *G06T 7/0008* (2013.01); *H04N 23/56* (2023.01); *H04N 23/66* (2023.01); *G06T 2207/10021* (2013.01); *G06T 2207/30128* (2013.01); *H04N 13/254* (2018.05)

(58) Field of Classification Search
None
See application file for complete search history.

(56) References Cited

U.S. PATENT DOCUMENTS

| 10,778,961 | B2 * | 9/2020 | Peeters | H04N 23/66 |
| 2005/0226489 | A1 * | 10/2005 | Beach | G01N 21/8851 |
| | | | | 382/141 |

(Continued)

*Primary Examiner* — Eileen M Adams
(74) *Attorney, Agent, or Firm* — Imperium Patent Works LLP; Mark D. Marrello

(57) ABSTRACT

A method includes the steps collecting measurement data of a sample utilizing an adaptable inspection unit or while the sample is in-flight, determining a volume or area of the sample based at least in part on the measurement data, and calculating a weight of the sample based at least in part on the volume or area of the sample. The measurement data includes a captured image that includes a plurality of pixels. The determining of the volume of the sample includes determining the number of pixels in the captured image that display a portion of the sample, or determining the maximum number of consecutive pixels that display a portion of the sample in two or three dimensions.

18 Claims, 101 Drawing Sheets

IN-FLIGHT 3D INSPECTOR FRONT PERSPECTIVE VIEW

Related U.S. Application Data which is a continuation-in-part of application No. 17/735,263, filed on May 3, 2022, now Pat. No. 11,632,534, which is a continuation of application No. 17/132,500, filed on Dec. 23, 2020, now Pat. No. 11,451,761, which is a continuation-in-part of application No. 16/861,156, filed on Apr. 28, 2020, now Pat. No. 11,202,057, which is a continuation-in-part of application No. 16/257,056, filed on Jan. 24, 2019, now Pat. No. 10,778,961, which is a continuation-in-part of application No. 16/031,956, filed on Jul. 10, 2018, now Pat. No. 10,257,496, which is a continuation-in-part of application No. 15/995,126, filed on Jun. 1, 2018, now Pat. No. 10,298,909, which is a continuation of application No. 15/817,240, filed on Nov. 19, 2017, now Pat. No. 10,021,370, which is a continuation-in-part of application No. 15/219,870, filed on Jul. 26, 2016, now Pat. No. 10,021,369.

(56) References Cited

U.S. PATENT DOCUMENTS

| | | | |
|---|---|---|---|
| 2013/0188012 A1* | 7/2013 | Bellis | H04N 23/51 348/42 |
| 2017/0054950 A1* | 2/2017 | Yeo | G01S 13/88 |

\* cited by examiner

IN-FLIGHT 3D INSPECTOR FRONT PERSPECTIVE VIEW

IN-FLIGHT 3D INSPECTOR REAR PERSPECTIVE VIEW

IN-FLIGHT 3D INSPECTOR RIGHT SIDE VIEW

IN-FLIGHT 3D INSPECTOR LEFT SIDE VIEW

SAMPLE TRAVEL PATH THROUGH IN-FLIGHT 3D INSPECTOR

DOUBLE STEREO CAMERA SYSTEM CONFIGURATION

IMAGE OF SAMPLE CAPTURED BY THE FIRST CAMERA

IMAGE OF SAMPLE CAPTURED BY THE SECOND CAMERA

IMAGE OF SAMPLE CAPTURED BY THE THIRD CAMERA

IMAGE OF SAMPLE CAPTURED BY THE FOURTH CAMERA

IN-FLIGHT 3D INSPECTOR WITH DEFECT PROCESSING FLOWCHART

INSPECTION DEVICE

INSPECTION DATA COMMUNICATION SYSTEM

COMMAND COMMUNICATION SYSTEM

INSPECTION DATA CONTROL SYSTEM
USING A REMOTE COMPUTING DEVICE

| SAMPLE | QUALITY CHARACTERISTIC | REQUIREMENT | PASS/FAIL? |
|---|---|---|---|
| 1 | NUMBER OF PITS | < 3 | PASS |
| 2 | NUMBER OF PITS | < 3 | PASS |
| 3 | NUMBER OF PITS | < 3 | FAIL |
| 4 | NUMBER OF PITS | < 3 | PASS |
| 5 | NUMBER OF PITS | < 3 | PASS |
| 6 | NUMBER OF PITS | < 3 | FAIL |
| 7 | NUMBER OF PITS | < 3 | PASS |
| 8 | NUMBER OF PITS | < 3 | PASS |
| 9 | NUMBER OF PITS | < 3 | FAIL |
| 10 | NUMBER OF PITS | < 3 | PASS |

*PASS PERCENTAGE = 70%*   *FAIL PERCENTAGE = 30%*
*NUMBER OF PASSING SAMPLES = 7*   *NUMBER OF FAILING SAMPLES = 3*

INSPECTION DATA

FIG. 18

| SAMPLE | QUALITY CHARACTERISTIC | REQUIREMENT | PASS/FAIL? |
|---|---|---|---|
| 1 | TYPE OF OBJECT | ALMOND | FAIL |
| 2 | TYPE OF OBJECT | ALMOND | PASS |
| 3 | TYPE OF OBJECT | ALMOND | FAIL |
| 4 | TYPE OF OBJECT | ALMOND | PASS |
| 5 | TYPE OF OBJECT | ALMOND | PASS |
| 6 | TYPE OF OBJECT | ALMOND | FAIL |
| 7 | TYPE OF OBJECT | ALMOND | PASS |
| 8 | TYPE OF OBJECT | ALMOND | PASS |
| 9 | TYPE OF OBJECT | ALMOND | FAIL |
| 10 | TYPE OF OBJECT | ALMOND | PASS |

*PASS PERCENTAGE = 60%*   *FAIL PERCENTAGE = 40%*
*NUMBER OF PASSING SAMPLES = 6*   *NUMBER OF FAILING SAMPLES = 4*

INSPECTION DATA

FIG. 19

| SAMPLE | QUALITY CHARACTERISTIC | REQUIREMENT | PASS/FAIL? |
|---|---|---|---|
| 1 | NUMBER OF HOLES | < 1 | PASS |
| 2 | NUMBER OF HOLES | < 1 | PASS |
| 3 | NUMBER OF HOLES | < 1 | FAIL |
| 4 | NUMBER OF HOLES | < 1 | PASS |
| 5 | NUMBER OF HOLES | < 1 | PASS |
| 6 | NUMBER OF HOLES | < 1 | FAIL |
| 7 | NUMBER OF HOLES | < 1 | PASS |
| 8 | NUMBER OF HOLES | < 1 | PASS |
| 9 | NUMBER OF HOLES | < 1 | FAIL |
| 10 | NUMBER OF HOLES | < 1 | PASS |

*PASS PERCENTAGE = 70%*  *FAIL PERCENTAGE = 30%*
*NUMBER OF PASSING SAMPLES = 7*  *NUMBER OF FAILING SAMPLES = 3*

INSPECTION DATA

FIG. 20

COMMAND BASED ON INSPECTION DATA

COMMAND BASED ON INSPECTION DATA

COMMAND BASED ON INSPECTION DATA

INSPECTION DATA COMMUNICATION SYSTEM FLOWCHART

COMMAND COMMUNICATION SYSTEM FLOWCHART

QUALITY INSPECTION DATA
DISTRIBUTED LEDGER FLOWCHART

| Data | |
|---|---|
| Inspection Entitiy | Food Source, Inc. |
| Inspection Location | Stockton, CA |
| Sensor Identification number | QIS-0112025 |
| Lot # | K00259-2683 |
| Total lot weight | 44,000 lbs |
| Analysis timestamp | 6/21/2018 8:17 |
| Amount of product analyzed | 1,000 gram |
| Moisture content | 4.55% |
| Kernel size | 24.38 |
| Uniformity ratio | 1.31 |
| Good | 87.50% |
| Dissimilar | 0.00% |
| Doubles | 1.50% |
| Chip & Scratch | 8.50% |
| Other Defects | 2.00% |
| Serious Damage | 0.50% |
| USDA grade | US Extra #1 |
| Hashes | |
| Present Block Hash | 0000000000000000000301fcfeb141088a93b77dc0d52571a1185b425256ae2fb |
| Previous Block Hash | 00000000000000000004b1ef0105dc1275b3adfd067aed63a43324929bed64fd7 |
| Next Block Hash | 000000000000000000282ac9977c3d103a3c6bd873b1f7744e8d42b83239baa6 |
| Merkle Root | a89769d0487a29c73057e14d89a |

QUALITY INSPECTION DATA BLOCK IN A
QUALITY INSPECTION DISTRIBUTED LEDGER

FIG. 29

CONVEYOR FOR MANUAL INSPECTION OR SORTING

CONVEYOR WITH ADAPTABLE INSPECTION UNIT

CONVEYOR WITH ADAPTABLE SORTER UNIT

CONVEYOR WITH ADAPTABLE INSPECTION UNIT

CONVEYOR WITH ADAPTABLE SORTER UNIT

CONVEYOR WITH ADAPTABLE INSPECTION UNIT

CONVEYOR WITH ADAPTABLE SORTER UNIT

ALTERNATIVE ATTACHMENT MECHANISMS

CONVEYOR WITH ADAPTABLE INSPECTION UNIT AND ADAPTABLE SORTER UNIT

ADAPTABLE INSPECTION UNIT

ADAPTABLE SORTING UNIT

ADAPTABLE INSPECTION UNIT

ADAPTABLE SORTER UNIT

CONVEYOR WITH ADAPTABLE INSPECTION UNIT AND VACUUM ADAPTABLE SORTER UNIT THAT UTILIZES PRESSURIZED AIR
(SIDE VIEW)

VACUUM ADAPTABLE SORTER UNIT
THAT UTILIZES PRESSURIZED AIR
(SIDE VIEW)

VENTURI VACUUM

CONVEYOR WITH ADAPTABLE INSPECTION UNIT AND VACUUM
ADAPTABLE SORTER UNIT UTILIZING PRESSURIZED AIR
WITH X-Y-Z LOCATION ADJUSTMENT
(FRONT VIEW)

CONVEYOR WITH ADAPTABLE INSPECTION UNIT AND VACUUM
ADAPTABLE SORTER UNIT UTILIZING PRESSURIZED AIR
WITH X-Y-Z LOCATION ADJUSTMENT
(TOP-DOWN VIEW)

CONVEYOR WITH ADAPTABLE INSPECTION UNIT AND ARRAY OF
FIXED LOCATION VACUUM ADAPTABLE SORTER UNITS
UTILIZING PRESSURIZED AIR
(FRONT VIEW)

CONVEYOR WITH ADAPTABLE INSPECTION UNIT AND ARRAY OF FIXED LOCATION VACUUM ADAPTABLE SORTER UNITS UTILIZING PRESSURIZED AIR
(TOP-DOWN VIEW)

CONVEYOR WITH ADAPTABLE INSPECTION UNIT AND ARRAY OF
FIXED LOCATION VACUUM ADAPTABLE SORTER UNITS
UTILIZING PRESSURIZED AIR
(PERSPECTIVE VIEW)

FLOWCHART OF VACUUM ADAPTABLE SORTER UNIT
THAT UTILIZES PRESSURIZED AIR

SUB STREAM INSPECTION SYSTEM

FLOWCHART OF SUB STREAM INSPECTION SYSTEM

SUB STREAM INSPECTION AND WEIGHING SYSTEM

FLOWCHART OF SUB STREAM INSPECTION AND WEIGHING SYSTEM

SUB STREAM WEIGHING AND INSPECTION SYSTEM

FLOWCHART OF SUB STREAM WEIGHING AND INSPECTION SYSTEM

SUB STREAM INSPECTION AND COLLECTION SYSTEM

FLOWCHART OF SUB STREAM INSPECTION AND COLLECTION SYSTEM

SUB STREAM INSPECTION, WEIGHING AND COLLECTION SYSTEM

FLOWCHART OF SUB STREAM INSPECTION, WEIGHING AND COLLECTION SYSTEM

SUB STREAM WEIGHING, INSPECTION AND COLLECTION SYSTEM

FLOWCHART OF SUB STREAM WEIGHING, INSPECTION AND COLLECTION SYSTEM

PRODUCT TARGET QUALITY CONTROL SYSTEM

FIG. 66 PRODUCT TARGET QUALITY CONTROL SYSTEM

FIG. 67 PRODUCT TARGET QUALITY CONTROL SYSTEM

PRODUCT TARGET QUALITY CONTROL SYSTEM

FLOWCHART OF PRODUCT TARGET QUALITY CONTROL SYSTEM

FLOWCHART OF PRODUCT TARGET QUALITY CONTROL SYSTEM

IMPROVED PRODUCT TARGET QUALITY CONTROL SYSTEM

PRODUCT TARGET QUALITY CONTROL SYSTEM WITH INTELLIGENT INSPECTION AND SORTING

PRODUCT TARGET QUALITY CONTROL SYSTEM WITH INTELLIGENT INSPECTION AND SORTING

PRODUCT TARGET QUALITY CONTROL SYSTEM WITH INTELLIGENT INSPECTION AND SORTING

PRODUCT TARGET QUALITY CONTROL SYSTEM WITH INTELLIGENT INSPECTION AND SORTING

FLOWCHART OF PRODUCT TARGET QUALITY CONTROL SYSTEM
WITH INTELLIGENT INSPECTION AND SORTING

FLOWCHART OF PRODUCT TARGET QUALITY CONTROL SYSTEM
WITH INTELLIGENT INSPECTION AND SORTING

FLOWCHART OF PRODUCT TARGET QUALITY CONTROL SYSTEM
WITH INTELLIGENT INSPECTION AND SORTING

PRODUCT TARGET QUALITY CONTROL SYSTEM WITH INTELLIGENT INSPECTION AND SORTING

PRODUCT TARGET QUALITY CONTROL SYSTEM WITH INTELLIGENT INSPECTION AND SORTING

FLOWCHART OF PRODUCT TARGET QUALITY CONTROL SYSTEM WITH INTELLIGENT INSPECTION AND SORTING

CONVEYOR WITH ADAPTABLE INSPECTION AND SORTING UNIT

CONVEYOR WITH ADAPTABLE INSPECTION AND SORTING UNIT

CONVEYOR WITH ADAPTABLE INSPECTION AND SORTING UNIT

CONVEYOR WITH ADAPTABLE INSPECTION AND SORTING UNIT

CONVEYOR WITH ADAPTABLE INSPECTION AND SORTING UNIT

ALTERNATIVE ATTACHMENT MECHANISMS

ADAPTABLE INSPECTION AN SORTING UNIT

ADAPTABLE INSPECTION AND SORTING UNIT

AUTOMATED INSPECTION DATA COLLECTION
FOR MACHINE LEARNING APPLICATIONS

AUTOMATED INSPECTION DATA COLLECTION
FOR MACHINE LEARNING APPLICATIONS

METHOD OF DETERMINING A CONFIDENCE VALUE THRESHOLD FOR
AUTOMATED INSPECTION DATA COLLECTION
FOR MACHINE LEARNING APPLICATIONS

METHOD OF DETERMINING A CONFIDENCE VALUE THRESHOLD FOR AUTOMATED INSPECTION DATA COLLECTION FOR MACHINE LEARNING APPLICATIONS

DISTRIBUTED SYSTEM PERFORMING AUTOMATED INSPECTION
DATA COLLECTION FOR MACHINE LEARNING APPLICATIONS

STAND ALONE INSPECTOR PERFORMING AUTOMATED INSPECTION
DATA COLLECTION FOR MACHINE LEARNING APPLICATIONS

SAMPLE AREA MEASUREMENT
BY PIXEL COUNTING

SAMPLE AREA MEASUREMENT
BY BOUNDING BOX

SAMPLE AREA MEASUREMENT
BY PIXEL COUNTING

SAMPLE AREA MEASUREMENT
BY BOUNDING BOX

AUTOMATED SAMPLE AREA MEASUREMENT

AUTOMATED SAMPLE AREA MEASUREMENT

AUTOMATED SAMPLE AREA MEASUREMENT

AUTOMATED SAMPLE VOLUME MEASUREMENT

AUTOMATED SAMPLE WEIGHT MEASUREMENT

AUTOMATED SAMPLE WEIGHT MEASUREMENT VIA OPTICAL INSPECTION

CROSS REFERENCE TO RELATED APPLICATIONS

This application is a continuation of and claims priority under 35 U.S.C. 120 from nonprovisional U.S. patent application Ser. No. 18/118,319, entitled "AUTOMATED SAMPLE WEIGHT MEASUREMENT VIA OPTICAL INSPECTION", filed on Mar. 7, 2023, the subject matter of which is incorporated by reference. Application Ser. No. 18/118,319 is in turn a continuation-in-part and claims priority under 35 U.S.C. 120 from nonprovisional U.S. patent application Ser. No. 18/106,211, entitled "AUTOMATED INSPECTION DATA COLLECTION FOR MACHINE LEARNING APPLICATIONS", filed on Feb. 6, 2023, the subject matter of which is incorporated by reference. Application Ser. No. 18/106,211 is in turn a continuation-in-part and claims priority under 35 U.S.C. 120 from nonprovisional U.S. patent application Ser. No. 17/985,747, entitled "ADAPTABLE INSPECTION AND SORTING UNIT", filed on Nov. 11, 2022, the subject matter of which is incorporated by reference. Application Ser. No. 17/985,747 is in turn a continuation-in-part and claims priority under 35 U.S.C. 120 from nonprovisional U.S. patent application Ser. No. 17/979,618, entitled "PRODUCT TARGET QUALITY CONTROL SYSTEM WITH INTELLIGENT SORTING", filed on Nov. 2, 2022, the subject matter of which is incorporated by reference. Application Ser. No. 17/979,618 is in turn a continuation-in-part and claims priority under 35 U.S.C. 120 from nonprovisional U.S. patent application Ser. No. 17/967,621, entitled "PRODUCT TARGET QUALITY CONTROL SYSTEM", filed on Oct. 17, 2022, the subject matter of which is incorporated by reference. Application Ser. No. 17/967,621 is in turn a continuation-in-part and claims priority under 35 U.S.C. 120 from nonprovisional U.S. patent application Ser. No. 17/735,263, entitled "SUB STREAM AUTO SAMPLING", filed on May 3, 2022, the subject matter of which is incorporated by reference. Application Ser. No. 17/735,263, is in turn a continuation and claims priority under 35 U.S.C. 120 from nonprovisional U.S. patent application Ser. No. 17/132,500, entitled "SUB STREAM AUTO SAMPLING", filed on Dec. 23, 2020, the subject matter of which is incorporated by reference. Application Ser. No. 17/132,500, is in turn a continuation-in-part and claims priority under 35 U.S.C. 120 from nonprovisional U.S. patent application Ser. No. 16/861,156, entitled "VACUUM ADAPTABLE SORTER UNIT FOR EXISTING PROCESSING LINES", filed on Apr. 28, 2020, the subject matter of which is incorporated by reference. Application Ser. No. 16/861,156, is in turn a continuation-in-part and claims priority under 35 U.S.C. 120 from nonprovisional U.S. patent application Ser. No. 16/257,056, entitled "ADAPTABLE SORTER UNIT FOR EXISTING PROCESSING LINES", filed on Jan. 24, 2019, the subject matter of which is incorporated by reference. Application Ser. No. 16/257,056, is in turn a continuation-in-part and claims priority under 35 U.S.C. 120 from nonprovisional U.S. patent application Ser. No. 16/031,956, entitled "QUALITY INSPECTION DATA DISTRIBUTED LEDGER", filed on Jul. 10, 2018, the subject matter of which is incorporated by reference. Application Ser. No. 16/031,956, is in turn a continuation-in-part and claims priority under 35 U.S.C. 120 from nonprovisional U.S. patent application Ser. No. 15/995,126, entitled "INSPECTION DEVICE CONTROLLED PROCESSING LINE SYSTEM", filed on Jun. 1, 2018, the subject matter of which is incorporated by reference. Application Ser. No. 15/995,126, in turn is a continuation and claims priority under 35 U.S.C. § 120 from nonprovisional U.S. patent application Ser. No. 15/817,240, entitled "INSPECTION DEVICE CONTROLLED PROCESSING LINE SYSTEM," filed on Nov. 19, 2017, the subject matter of which is incorporated herein by reference. Application Ser. No. 15/817,240, in turn, is a continuation-in-part and claims priority under 35 U.S.C. 120 from nonprovisional U.S. patent application Ser. No. 15/219,870, entitled "IN-FLIGHT 3D INSPECTOR", filed on Jul. 26, 2016, the subject matter of which is incorporated by reference.

TECHNICAL FIELD

The present invention generally relates to systems and methods for measuring sample weight via optical inspection.

BACKGROUND INFORMATION

In the field of product inspection, measuring the quality and quantity of the product is very valuable. In addition to measuring the quantity in sheer numbers of units, it would also be valuable to measure the quantity in terms of weight, both per unit and overall total weight of all the product. For example, in the field of almond inspection, it would be valuable to measure the maximum, minimum, average weight of a group of almonds, and the total sum weight of all almonds in the group. This type of data coupled with the quality data can provide great insight into the final value of the group of inspected almonds. This holds true with respect to inspection of other foods and products. A method for automatically measuring sample weight via optical inspection is provided below.

SUMMARY

In a first novel aspect, a method includes the steps of collecting measurement data of a sample utilizing an adaptable inspection unit or while the sample is in-flight, determining a volume of the sample based at least in part on the measurement data, and calculating a weight of the sample based at least in part on the volume. The measurement data includes a captured image that includes a plurality of pixels. The determining of the volume of the sample includes determining the number of pixels in the captured image that display a portion of the sample or determining the maximum number of consecutive pixels that display a portion of the sample in two or three dimensions.

In a second novel aspect, a method includes the steps of collecting measurement data of a sample utilizing an adaptable inspection unit or while the sample is in-flight, determining an area of the sample based at least in part on the measurement data, and calculating a weight of the sample based at least in part on the area. The measurement data includes a captured image that includes a plurality of pixels. The determining of the area of the sample includes determining the number of pixels in the captured image that display a portion of the sample or determining the maximum number of consecutive pixels that display a portion of the sample in two dimensions.

In one example, the measurement data includes a captured image.

In another example, the measurement data is measured by an optical inspector.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 18 is a diagram of a first example of inspection data.

FIG. 19 is a diagram of a second example of inspection data.

FIG. 20 is a diagram of a third example of inspection data.

FIG. 29 is a diagram of a quality inspection data block in a quality inspection distributed ledger.

DETAILED DESCRIPTION

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

Due to the drawbacks of human visual inspection, an automated inspector is needed to quickly, inexpensively, and accurately detect defects present in objects such as tree nuts, tablets, screws and many other types of objects. Some of the most important features of such an automatic inspector include: cost, number of objects inspected per minute, accuracy of defect detection, reliability of defect detection and ease of use with minimal user training.

Figure 1:
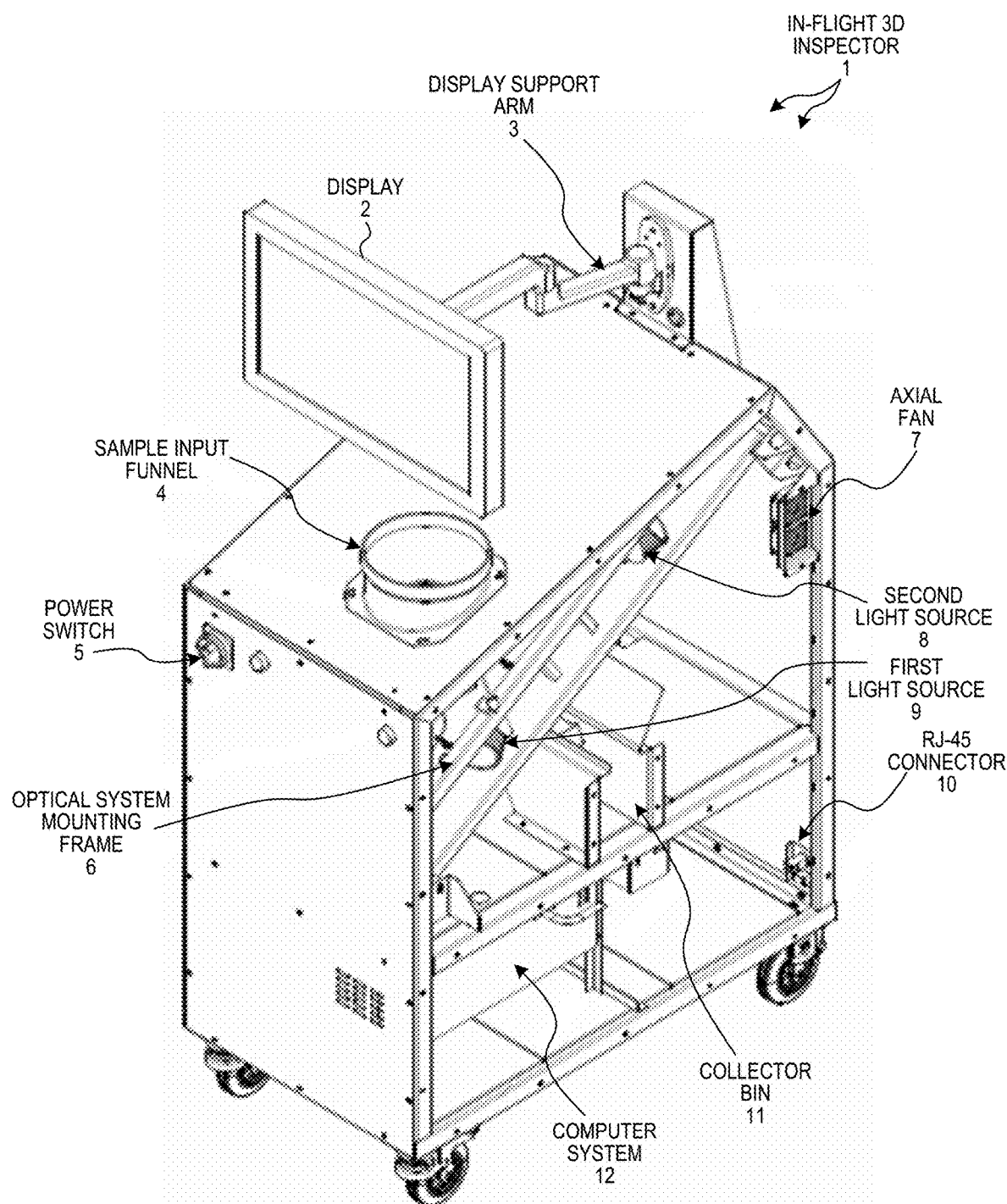
FIG. 1 is a first diagram of the in-flight 3D inspector 1 view from a first perspective.

FIG. 1 is a first diagram of the in-flight 3D inspector 1 view from a first perspective. The in-flight 3D inspector 1 includes a display 2, a display support arm 3, a sample input funnel 4, a power switch 5, an optical system mounting frame 6, an axial fan 7, a first light source 9, a second light source 8, an RJ-45 connector 10, a collector bin 11, and a computer system 12. The display 2 outputs information from the computer system 12 to a human user looking at the display. The display support arm 3 attaches the display 2 to the in-flight 3D inspector 1. In one example, the display support arm is adjustable with two hinges as shown in FIG. 1. In another example, the display support arm 3 is adjustable in additional dimensions (not shown in FIG. 1). The sample input funnel 4 is where samples are input to the in-flight 3D inspector. Power switch 5 is used by a human user to turn on (or off) the in-flight 3D inspector. The light sources are mounted to the optical system mounting frame 6. The axial fan 7 is used to create positive pressure in a camera enclosure (not shown in FIG. 1). In one example, the axial fan 7 is coupled to a first hose that directs air flow to a first camera enclosure and is coupled to a second hose that directs air flow to a second camera enclosure (not shown). The hoses can be fixed or flexible hoses made of various materials including various plastics, fiberglass and metal materials. In this fashion, positive pressure in each camera enclosure is created. The positive pressure prevents debris from entering the camera enclosures and settling on any of the cameras. RJ-45 connector 10 is configured to receive an RJ-45 cable connected to a local network and electrically connect the RJ-45 cable to a network input port included on the computer system 12. The RJ-45 cable may be an Ethernet cable (not shown). Via the RJ-45 connector 10 and a RJ-45 Ethernet cable, the computer system 12 can connect to a local network or the public internet. The computer system 12 may also include a wireless networking card (not shown) that allows computer system 12 to wirelessly communicate (i.e. WiFi or cellular connection) with a network without the need for a wired connection. The collector bin 11 is configured to collect samples that have completed their path through the in-flight 3D inspector.

Figure 2:
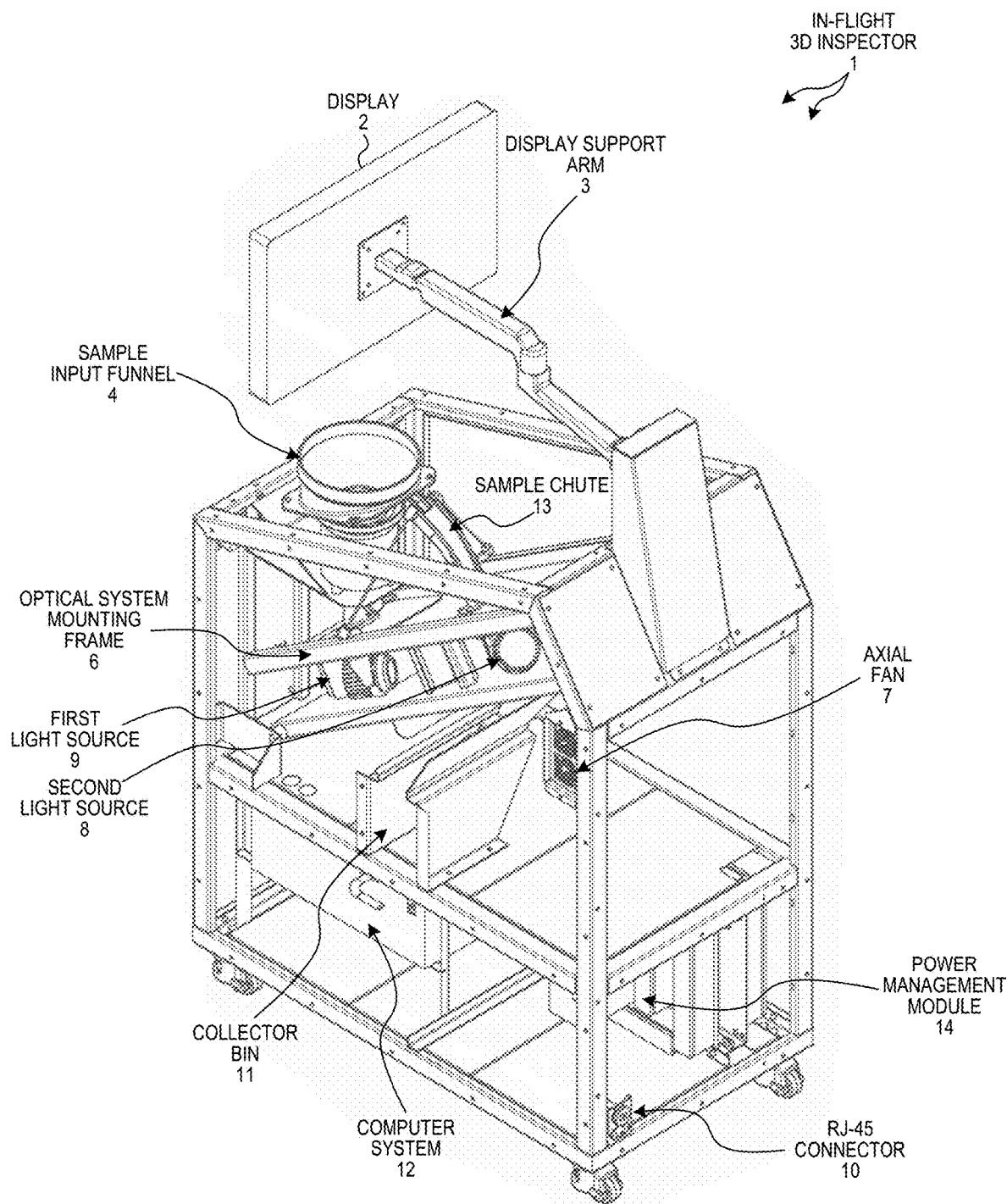
FIG. 2 is a second diagram of the in-flight 3D inspector 1 view from a second perspective.
Figure 14:
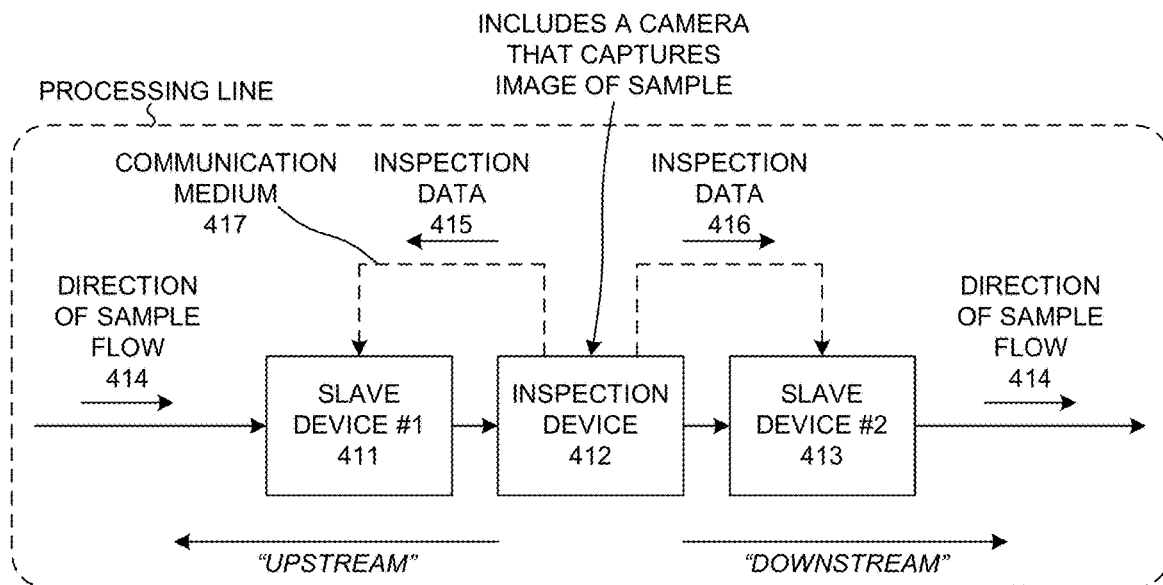
FIG. 14 is a diagram of an inspection data communication system.

FIG. 2 is a second diagram of the in-flight 3D inspector 1 view from a second perspective. FIG. 2 illustrates a sample chute 13 that is configured to guide a sample from the sample input funnel 4. The location of a power management module 14 is also shown in FIG. 14. The power management module 14 receives input power from the local power grid and generates power signals for the various electrical components operating within the in-flight 3D inspector 1. For example, the power management module 14 generates a power signal that is used to power the various light sources, the various cameras (not shown), the axial fan, the display and the computer system. In one example, the power management module 14 includes a battery which can be used to operate the in-flight 3D inspector when power from the local power grid is lost.

Figure 3:
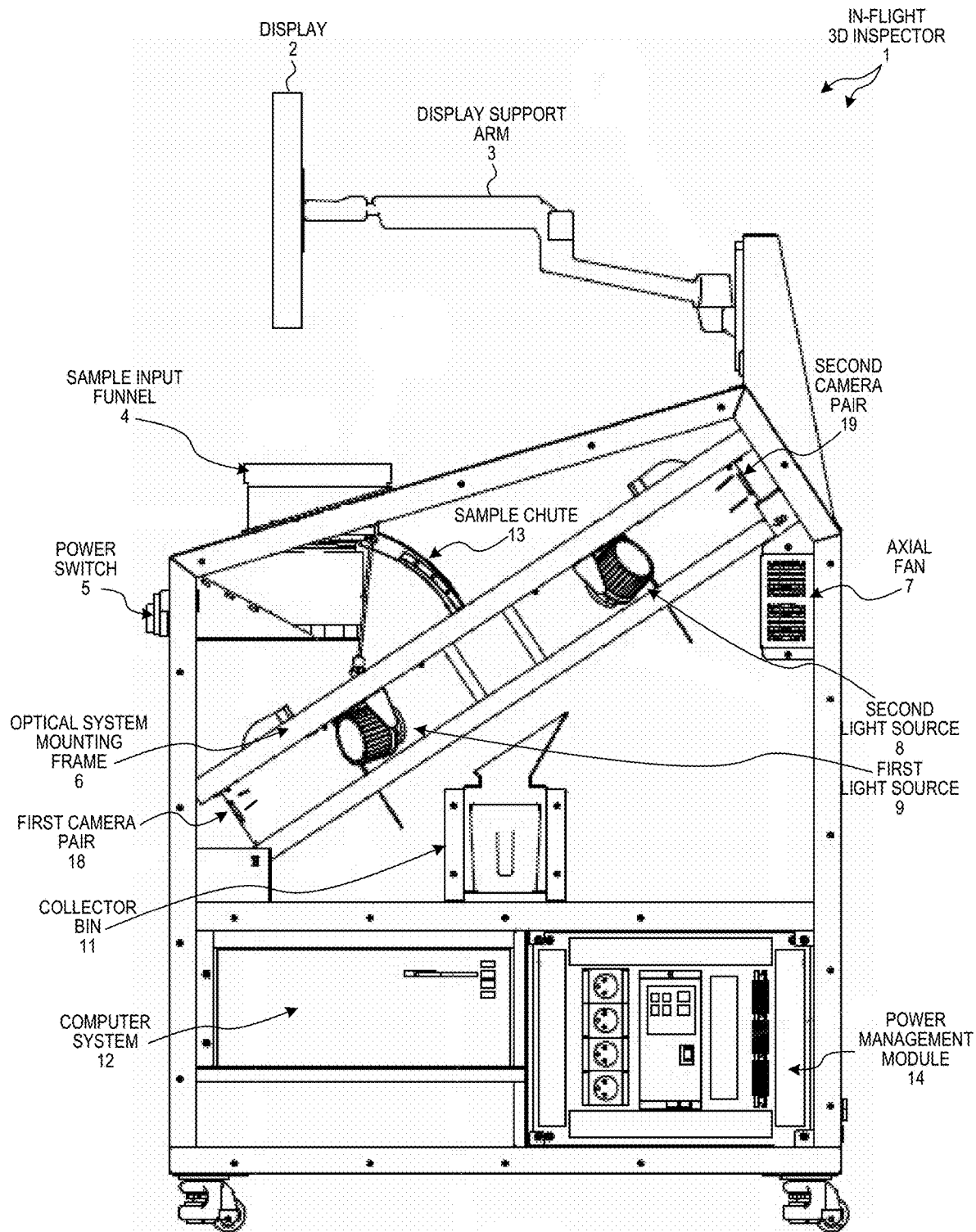
FIG. 3 is a third diagram of the in-flight 3D inspector 1 view from a right side view.
Figure 6:
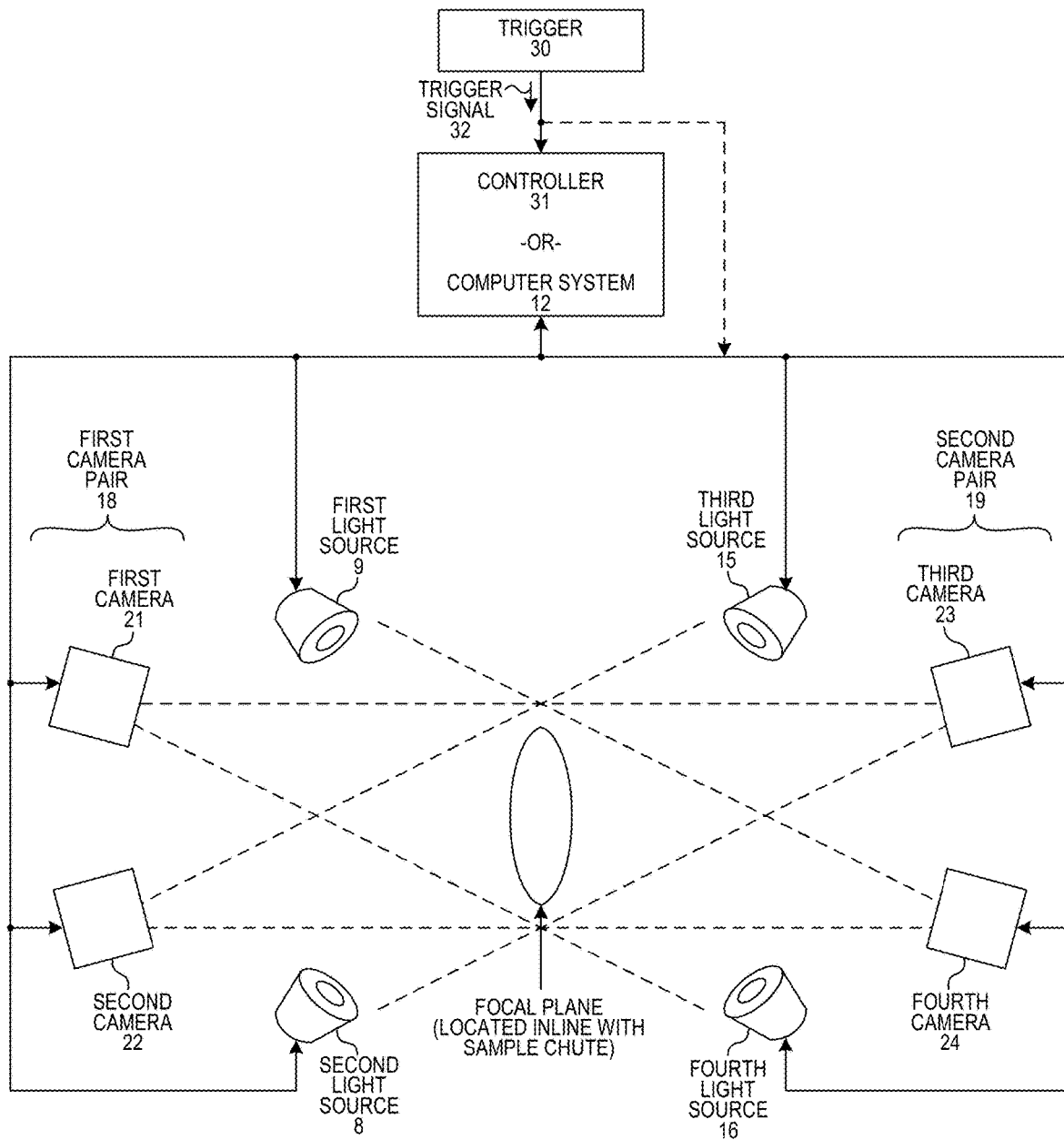
FIG. 6 is a diagram of a double stereo camera system configuration with triggering.

FIG. 3 is a third diagram of the in-flight 3D inspector 1 view from a right side view. FIG. 3 shows a first camera pair 18 and a second camera pair 19. FIG. 3 also illustrates that sample chute 13 is aligned with the midpoint between the first camera pair 18 and the second camera pair 19. The physical arrangement of the first camera pair 18 and the second camera pair 19 is illustrated in FIG. 6. FIG. 6 illustrates that the first camera pair 18 includes a first camera 21 and a second camera 22. The second camera pair 19 includes a third camera 23 and a fourth camera 24. All four cameras are focused on the same focal plane. The focal plane is located at the midpoint between the first camera pair 18 and the second camera pair 19. As discussed above regarding FIG. 3, the chute is also aligned with the midpoint between the first camera pair 18 and the second camera pair 19.

Camera Positioning

The four cameras are positioned such that each camera is focused on the focal plane. Each camera utilizes a lens to focus on the focal plane. In one example, wide angle lenses are used by each camera. One example of a wide angle lens is FL-BC1618-9M Ricoh lens. This wide angle lens has a format size of 1" format, a focal length of sixteen millimeters, a maximum aperture ratio of 1:1.8, an iris range of 1.8 to 16, and a resolution of nine mega-pixels. Other types of lenses may be used to achieve the necessary focus of each camera on the focal plane.

Figure 4:
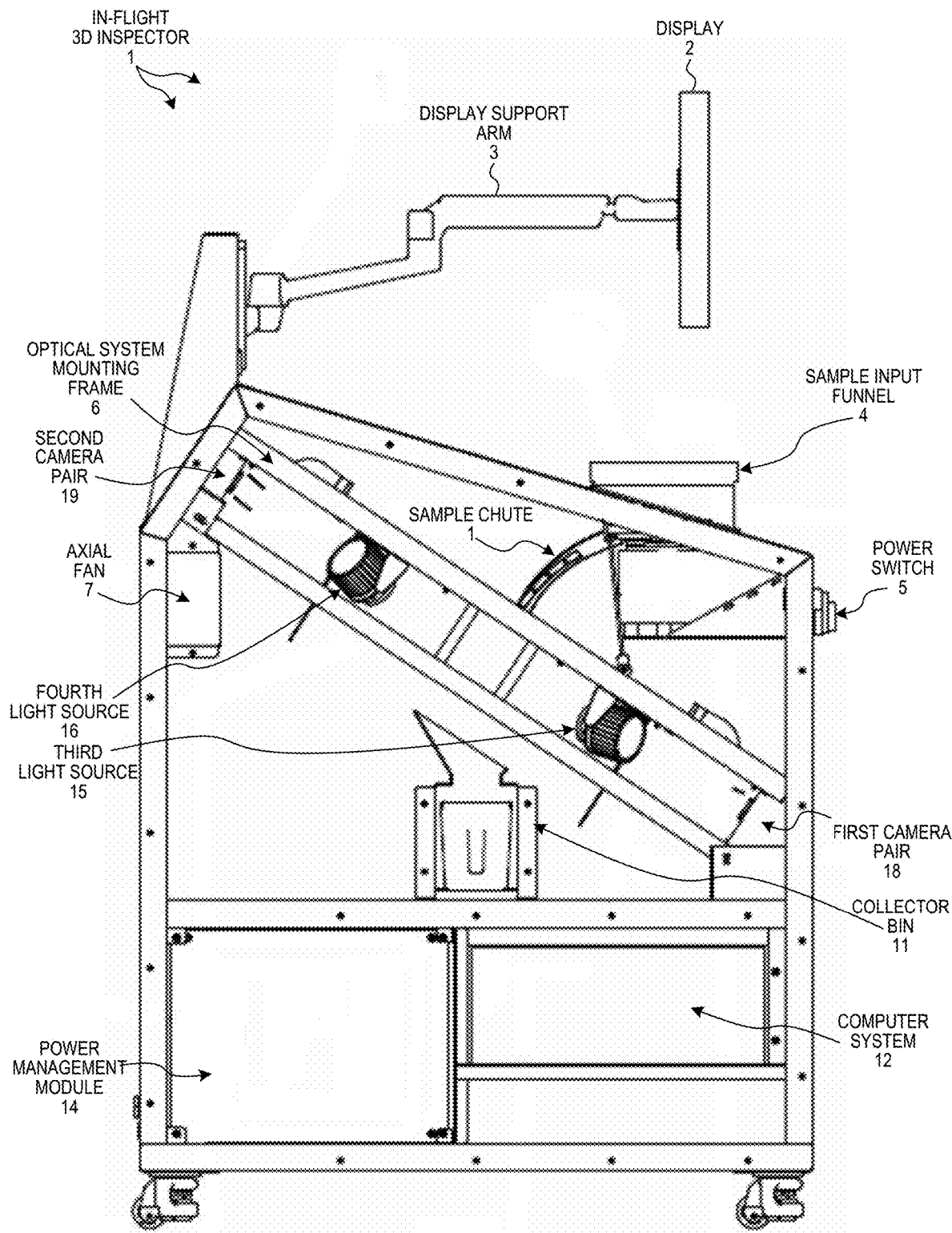
FIG. 4 is a fourth diagram of the in-flight 3D inspector 1 view from a left side view.

FIG. 4 is a fourth diagram of the in-flight 3D inspector 1 view from a left side view. FIG. 4 illustrates that a third light source 15 and a fourth light source 16 are also included in the in-flight 3D inspector 1. In one example, the first, second, third and fourth light sources are mounted to the optical system mounting frame 6. In another example, the light sources are mounted directly to outer frame of the in-flight 3D inspector 1 (not shown). After reading of the present disclosure, one skilled in the art will readily appreciate the various ways that light sources and cameras can be physically mounted within the in-flight 3D inspector 1.

Figure 5:
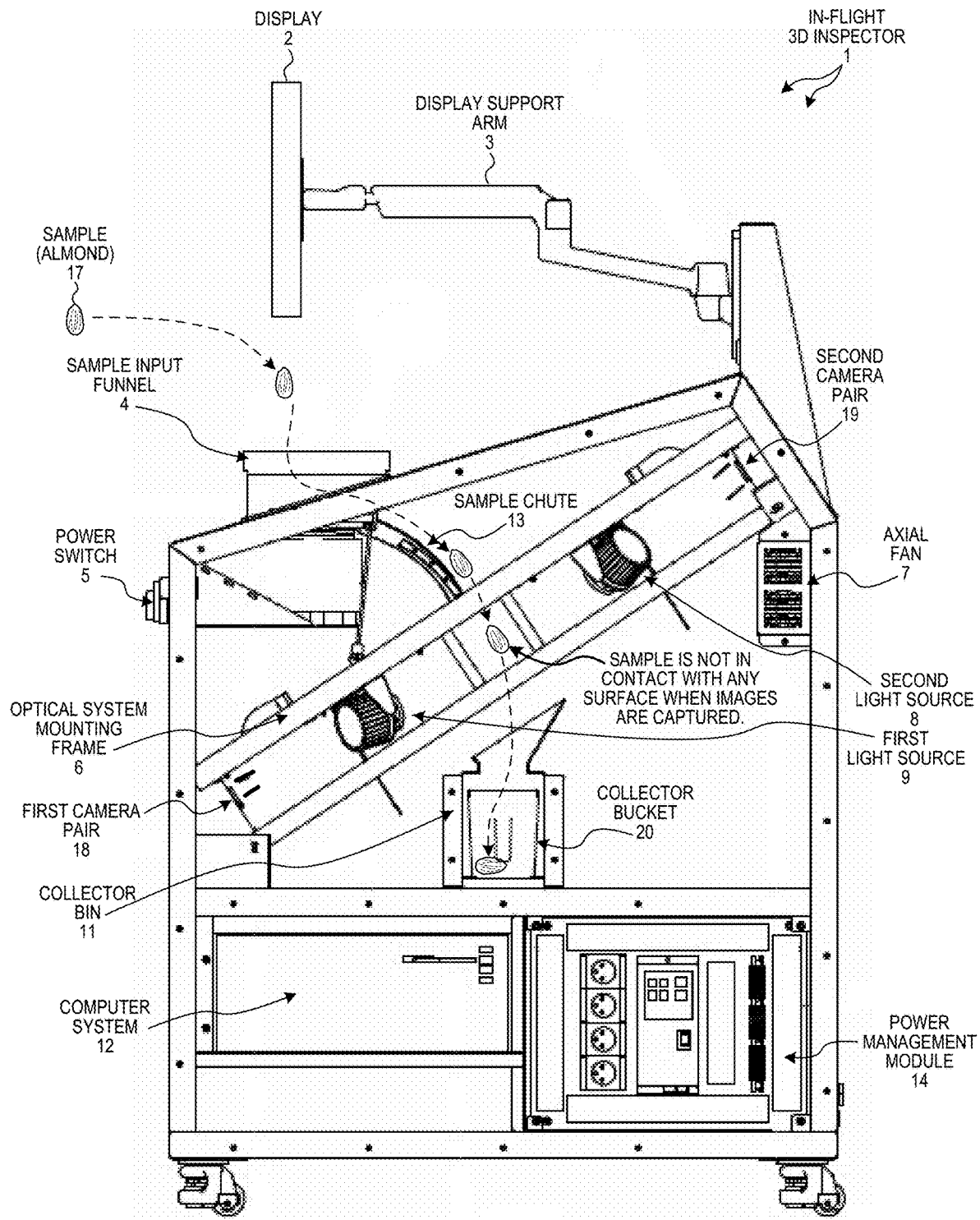
FIG. 5 is a diagram of the in-flight 3D inspector 1 illustrating the path a sample travels through the in-flight 3D inspector 1.

FIG. 5 is a diagram of the in-flight 3D inspector 1 illustrating the path a sample travels through the in-flight 3D inspector 1. First, a sample 17 is placed into the sample input funnel 4. The sample input funnel 4 directs the sample 17 to sample chute 13. In one example, the sample input funnel 4 is configured to vibrate such that sample 17 is directed toward sample chute 13. Sample chute 13 directs the sample 17 to a focal plane where the first camera pair 18 and the second camera pair 19 are both focused. In-flight 3D inspector 1 may be used to generate images of various types of samples, such as tree nuts, a peanuts, tablets, screws, and washers.

Triggering System

Before the sample 17 reaches the focal plane, a trigger senses the presence of the sample 17 near the sample chute 13 and generates a trigger signal. In one example, the trigger is attached to the sample chute 13 and includes an optical transmitter and an optical receiver. In operation, the sample 17 interferes with the light traveling between the optical transmitter and the optical receiver as sample 17 travels along sample chute 13. This interference in received light is sensed by the optical receiver when the transmitted light does not irradiate the optical receiver. In response to detecting the interference in received light, the trigger generates a trigger signal. The trigger signal can be an electric signal that propagates along a conductor, or the trigger signal can be an electro-magnetic signal that propagates across free space to a receiving terminal. The duration between the time when the trigger signal is generated and the time when the sample 17 intersects the focal plane is based on where the trigger is located relative to the focal plane of the camera pairs. Once the trigger location is selected the duration between the time when the trigger signal is generated and the time when the sample 17 intersects the focal plane can be empirically measured or calculated. Once the duration between when the trigger signal is generated and the time when the sample 17 intersects the focal plane has been determined, the trigger signal can be used to determine the future time when the sample 17 will intersect the focal plane. This timing information can be used to properly control the various light sources and cameras in the in-flight 3D inspector.

The trigger is not shown in FIG. 5. However, a system diagram of the triggering system is illustrated in FIG. 6. FIG. 6 is a diagram of a double stereo camera system configuration with triggering. The triggering system includes trigger 30, controller 31 and/or computer system 12, cameras 21-24 and light sources 8-9 and 15-16. In one example, the trigger signal 32 ($i$) causes light sources 8, 9, 15, and 16 to turn on, and (ii) causes the first camera pair 18 and the camera pair 19 to capture an image when the sample 17 intersects in the focal plane. In another example, light sources 8, 9, 15 and 16 are already on and the trigger signal 32 only causes the first camera pair 18 and the camera pair 19 to capture an image when the sample 17 intersects in the focal plane.

In a first embodiment, the trigger signal is communicated from the trigger 30 to a controller 31 that controls when the first camera pair 18 and the second camera pair 19 capture images. In a second embodiment, the trigger signal 32 is communicated from the trigger 30 directly to the first camera pair 18 and the second camera pair 19 and causes the camera pairs 18 and 19 to capture images. In a third embodiment, the trigger signal 32 is communicated from the trigger 30 to computer system 12 that controls when the first camera pair 18 and the second camera pair 19 capture images.

In a fourth embodiment, the trigger signal is communicated from the trigger 30 to a controller 31 that controls when the light sources 8-9 and 15-16 are turned on. The controller 31 acts as a switch that connects an output power terminal of a power supply included in power management module 14 to a power input terminal of each light source 8-9 and 15-16. The controller switch turns ON the light sources in response to receiving the trigger signal. After the sample has passed though the focal plane, the controller turns OFF the light sources by disconnecting the output power terminal of the power supply from the power input terminal of each light source.

In a fifth embodiment, the trigger signal 32 is communicated from the trigger 30 directly to the light sources 8-9 and 15-16 and causes the light sources 8-9 and 15-16 to turn ON. In this embodiment, each light source 8-9 and 15-16 is configured to receive a power signal and an ON/OFF signal. The ON/OFF signal is controlled by the trigger signal. The light sources may include a timer circuit that is used to turn OFF the light sources after the sample has passed through the focal plane.

In a sixth embodiment, the trigger signal 32 is communicated from the trigger 30 to computer system 12 that controls when the light sources 8-9 and 15-16 are turn on. In this embodiment, each light source 8-9 and 15-16 is configured to receive a power signal and an ON/OFF signal. The ON/OFF signal is output by the computer system 12 in response to receiving the trigger signal from the trigger.

The light sources may be controlled such that the light sources turn on after the camera shutters are opened and turn off before the camera shutters are closed.

Controller 31 may be configured to communicate with computer system 12 via an RS232 communication link, an Ethernet communication link, a Universal Serial Bus (USB) communication link, or any other available data communication links.

Figure 7:
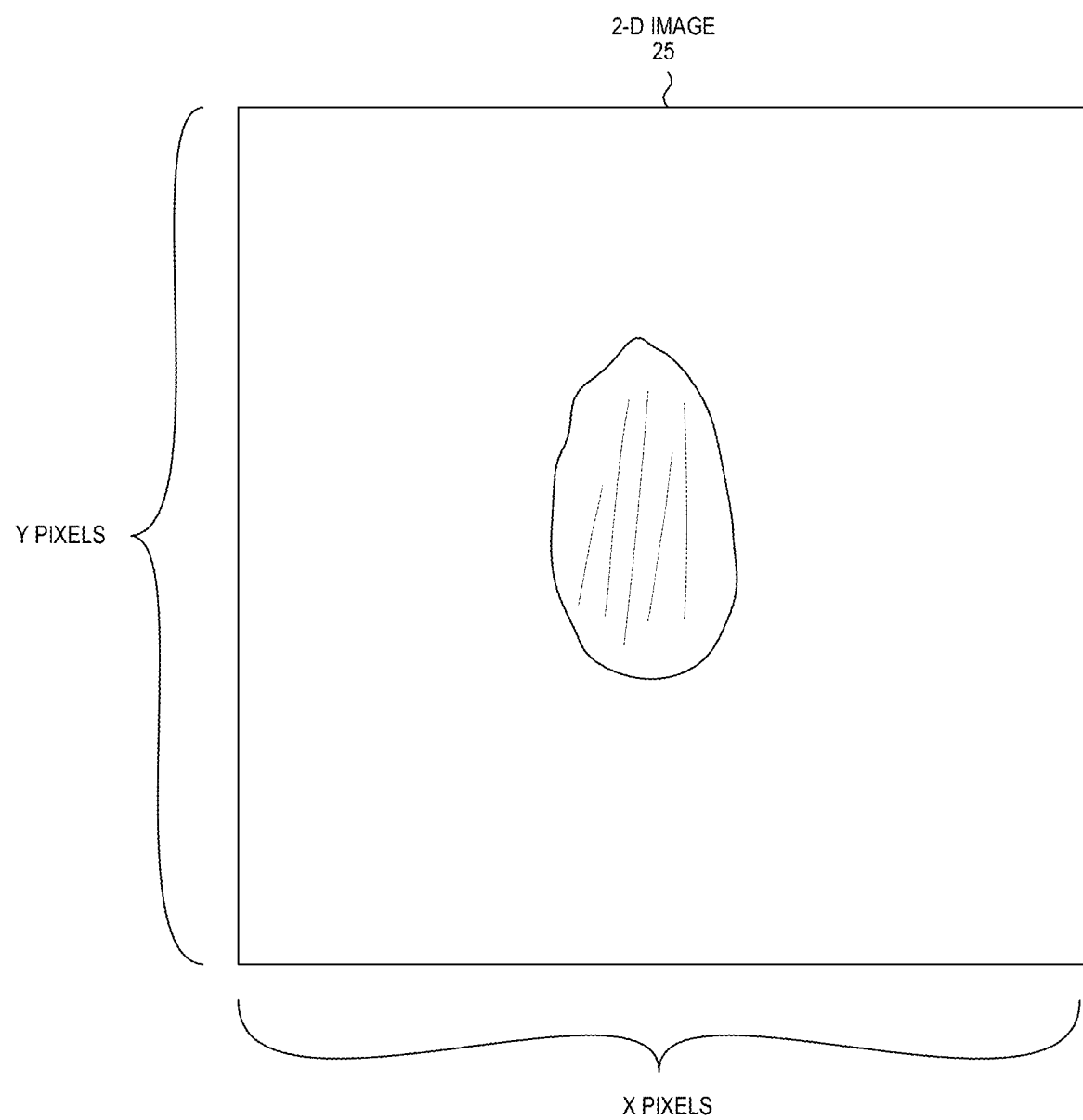
FIG. 7 is an image captured by a first camera of the double stereo camera system.
Figure 8:
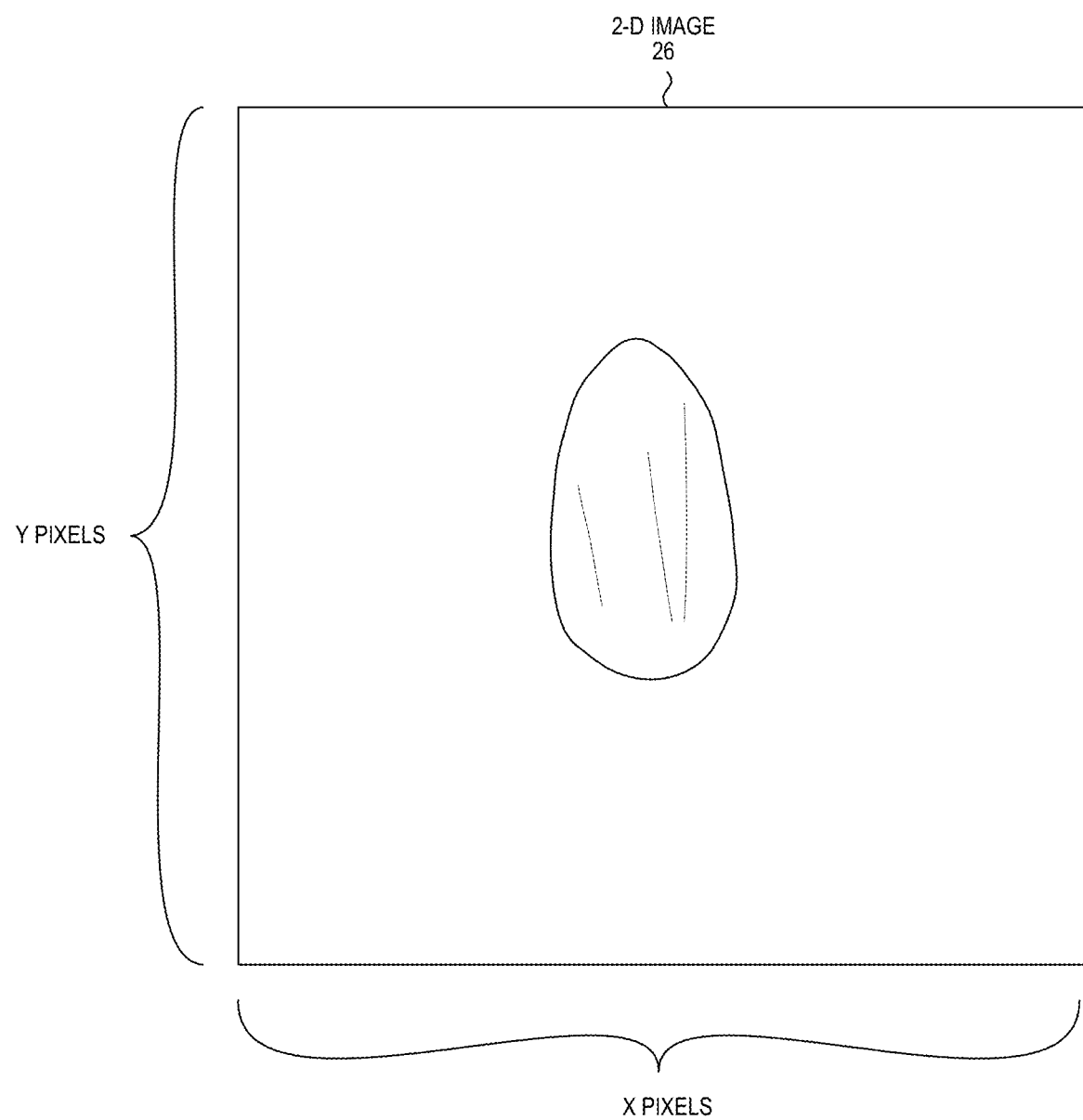
FIG. 8 is an image captured by a second camera of the double stereo camera system.
Figure 9:
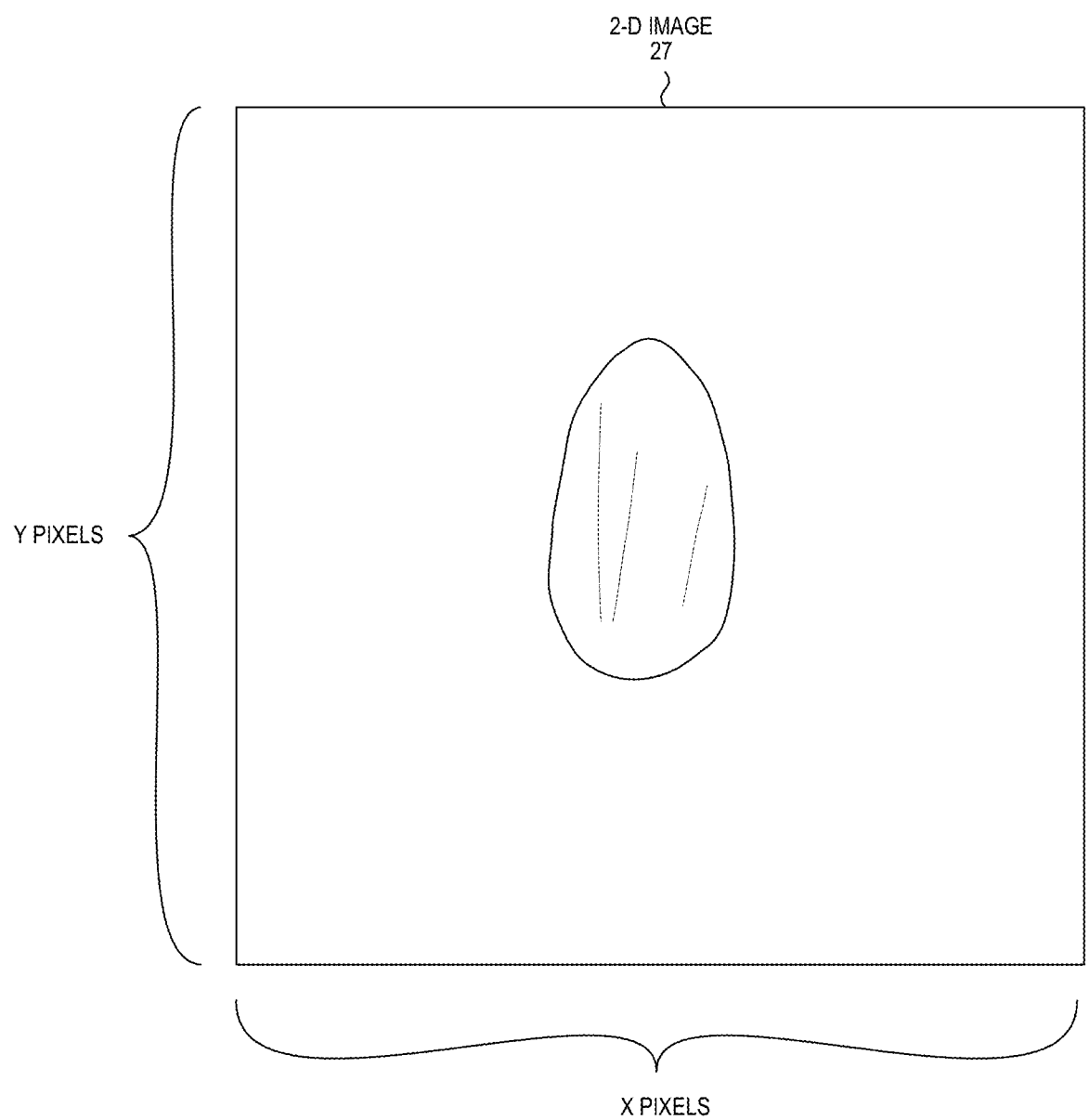
FIG. 9 is an image captured by a third camera of the double stereo camera system.
Figure 10:
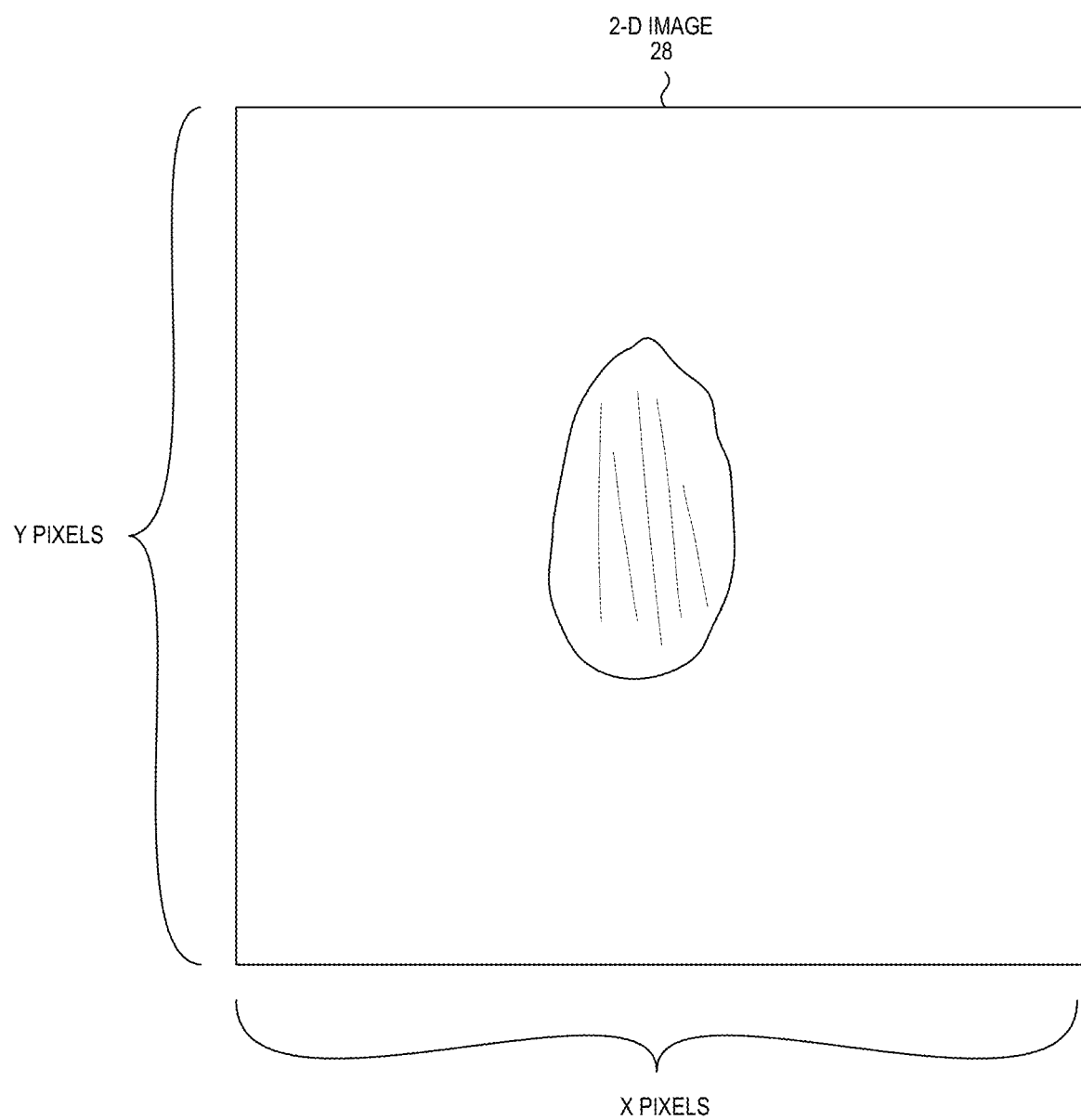
FIG. 10 is an image captured by a fourth camera of the double stereo camera system.

When the sample 17 travels through the focal plane, sample 17 is not contacting any surface. At this point in time, the light sources 8-9 and 15-16 are turned on and the first camera pair 18 and the second camera pair 19 capture at least one image of the sample. Each camera captures an image from a unique angle at the same moment in time as the sample travels through the focal plane. FIG. 7 is an image captured by a first camera of the double stereo camera system. FIG. 8 is an image captured by a second camera of the double stereo camera system. FIG. 9 is an image captured by a third camera of the double stereo camera system. FIG. 10 is an image captured by a fourth camera of the double stereo camera system. Each of these images is stored on a memory device located on the in-flight 3D inspector. On one example, the memory device is located within the computer system 12. It is noted that the captured images may only be temporarily stored on a memory device within the in-flight 3D inspector before being communicated across a network to another storage device located outside of the in-flight 3D inspector. For example, the captured images stored on a storage device within the computer system 12 may be communicated across RJ-45 connector 10 and a local network to another storage device not included in the in-flight 3D inspector. In this fashion, multiple images of the sample 17 are captured from four different angles at the same moment while the sample 17 is traveling through the focal plane while not in contact with any surface.

Capturing of images while the sample is not contacting any surface provides a great benefit. When the sample is not contacting any surface, images of each surface of the sample can be collected at the same moment in time. This is not possible in other image capturing systems. For example, when a sample is moved along a conveyer belt image of only one side of the sample may be captured at any one moment in time. View of the other side of the sample is blocked by the conveyer belt and therefore cannot be captured at the same moment in time. Capturing images of all surfaces of the sample at the same moment in time allows for generation of high quality 3D images of the sample. When images of various surfaces of the sample are taken at different moments in time, proper alignment of images is very difficult, requires additional processing and result in 3D images with lower quality due to introduced error.

The cameras communicate the captured images to the controller 31 or computer system 12 via bus. In one example, the bus is a Universal Serial Bus (USB). In another example, the bus is an IEEE 1394 "FireWire" bus.

In one example, the cameras (also referred to herein as an "image capturing device" or "optical receiver") are Charged Coupled Device (CCD) cameras. In another example, the cameras (also referred to herein as an "image capturing device" or "optical receiver") are Complementary Metal-Oxide Semiconductor (CMOS) cameras. In yet another example, the cameras (also referred to herein as a "image capturing device" or "optical receiver") are Indium Gallium Arsenide (InGaAs) cameras that are capable of measuring Short Wave Infra Red (SWIR) light.

Either line scan cameras or area scan cameras can be used to implement an in-flight 3D inspector. A line scan cameras contain a single row of pixels used to capture data very quickly. As the object moves past the camera, a complete image can be reconstructed in software line by line. Area scan cameras contain a matrix of pixels that capture an image of a given scene. They are more general purpose than line scan cameras and offer easier setup and alignment.

It is noted herein that the light sources may each include a separate power source that drives the light when a control signal is received. Alternatively, each light source may be configured in an always on state where the power input terminal on each light source is coupled to an output terminal of a power supply where the output of the power supply is controlled by a control signal.

It is noted that the sample chute 13 is only one example how the sample can be directed to the focal plane. In a first alternative embodiment, the sample can be directed to the focal plane by use of a conveyer belt. In this first alternative embodiment, the sample would be directed from the sample input funnel to the conveyer belt, which in turn would propel the sample off the edge of the conveyer belt toward the focal plane. In a second alternative embodiment, the sample can be directed to the focal plane by use of an airburst. In this second alternative embodiment, the sample would be directed proximate to an airburst source, which in turn would propel the sample toward the focal plane. One example of an airburst source is a highly pressurized air tank connected to an electronically controlled valve, which outputs an airburst momentarily while the valve is open.

Sample Collection/Sorting

Once the sample 17 passes the focal plane, the sample 17 falls into collector bin 11. In one example, a collector bucket 20 is placed in collector bin 11. In this example, the sample 17 falls into the collector bucket 20. Additional samples placed into sample input funnel 4 make their way through the in-flight 3D inspector and eventually also fall into collector bucket 20. Once all samples have passed through the in-flight 3D inspector, a user can remove all samples by removing the collector bucket 20 from the collector bin 11.

In another example, a collector bucket 20 is not placed in collector bin 11. Rather, collector bin 11 is coupled to a sample sorting machine (not shown). In this example, the samples that pass through the in-flight 3D inspector are routed into different bins. The bin each sample is routed into is based on the images captured of the sample. In the event that the images of the sample indicate that the sample has a first type of defect, then the sample is routed to a first bin. In the event that the images of the sample indicate that the sample has a second type of defect, then the sample is routed into a second bin. Alternatively, in the event that the images of the sample indicate that the sample does not have any defects, then the sample is routed to a third bin. The sorting machine can route the samples using various different methods. A first method of routing includes using a burst of air to redirect the trajectory of a sample as it falls into the collector bin. A second method of routing includes using a mechanically controlled flap to redirect the trajectory of a sample as it falls into the collector bin.

3D Image Generation

Once the images are captured from each of the cameras, a 3D image of the sample can be created. In one example, the 3D image is generated by the computer system 12 included in the in-flight 3D inspector. In another example, the 3D image is generated by another computer system not included in the in-flight 3D inspector after the images are communicated across a network from the in-flight 3D inspector to the computer system not included in the in-flight 3D inspector.

The images captured by the first camera pair 18 are used to create a 3D image of a first side of the sample. The images captured by the second camera pair 19 are used to create a 3D image of the second side of the sample. In one example, data included in the captured 2D images are combined into a new dataset and missing information is added to complete the 3D information of the object: depth (distance). By using triangulation on matching pixels of the multiple 2D images captured by the in-flight 3D inspector, the depth component is derived and added to the dataset. This new dataset describes the object in 3D. This dataset is then used by advanced mathematical algorithms to describe the characteristics of the objects. The 3D images of the first and second sides of the sample are combined to create a 3D image of the entire sample. Once the 3D image of the entire sample is constructed, the 3D image can be analyzed to determine if various types of defects are present on the sample. For example, if the 3D image does not match a predetermined shape within a specified tolerance, then the sample is determined to be defective with respect to shape. In another example, if the 3D image shows a flat surface greater than a specified area, then the sample is determined to be defective with respect to surface contour.

Once the defect information is determined based on the 3D image of the sample, the defect information is stored with the 3D image. The defect information can be displayed on display 2 to a user of the in-flight 3D inspector. The defect information can also be used to generate a report indicating the number of defects detected across a multiple samples that have been inspected. The defect information for each sample can be used by a sorting machine attached to the collector bin 11 of the in-flight 3D inspector to determine how the sample is to be routed. The defect information for multiple samples can be used to generate a quality report indicating the quality grade of the multiple samples.

Various calibrations of the cameras may be performed. An internal calibration may be performed for each camera. Internal calibration includes calibration of principle points, focal lengths, pixel size ratios, and radial parameters. A stereo calibration may be performed as well. A stereo calibration addresses the external 3D rotation and translation between individual cameras of a stereo system. An inter-stereo calibration may also be performed to address the external 3D rotation and translation between the two stereo systems. In an inter-stereo calibration, a transformation is performed that stitches two different side reconstructions into one 3D model.

Capturing Images of Multiple samples in a Single Image

The single sample chute 13 illustrated in FIG. 5 illustrates one embodiment of the present invention. In another embodiment (not shown in FIG. 5) the sample chute may be configured to direct multiple samples through the focal plane at the same moment in time. In this embodiment, the sample chute would cause multiple samples to fall through the focal plane along a single axis at the same time. Aligning the samples along a single axis prevents one sample from blocking a camera's view of another sample. The first and second camera pairs would then capture an image including multiple samples instead of just one. Said another way, a single image would include multiple samples instead of just one. Once the images of the multiple samples are captured, the computer system 12 would (i) determine which portions of each image are of each sample, and (ii) only use the portions of each image that are of the same sample to generate the 3D image of the sample.

This configuration would greatly accelerate the rate at which the in-flight 3D inspector can capture images of multiple samples. For example, if the sample chute directed ten samples through the focal plane as the same time instead of only one sample, then the in-flight 3D inspector would be able to collect images of samples ten times faster. Said another way, the in-flight 3D inspector would only require one-tenth the amount of time to collect images of a set of samples.

Figure 11:
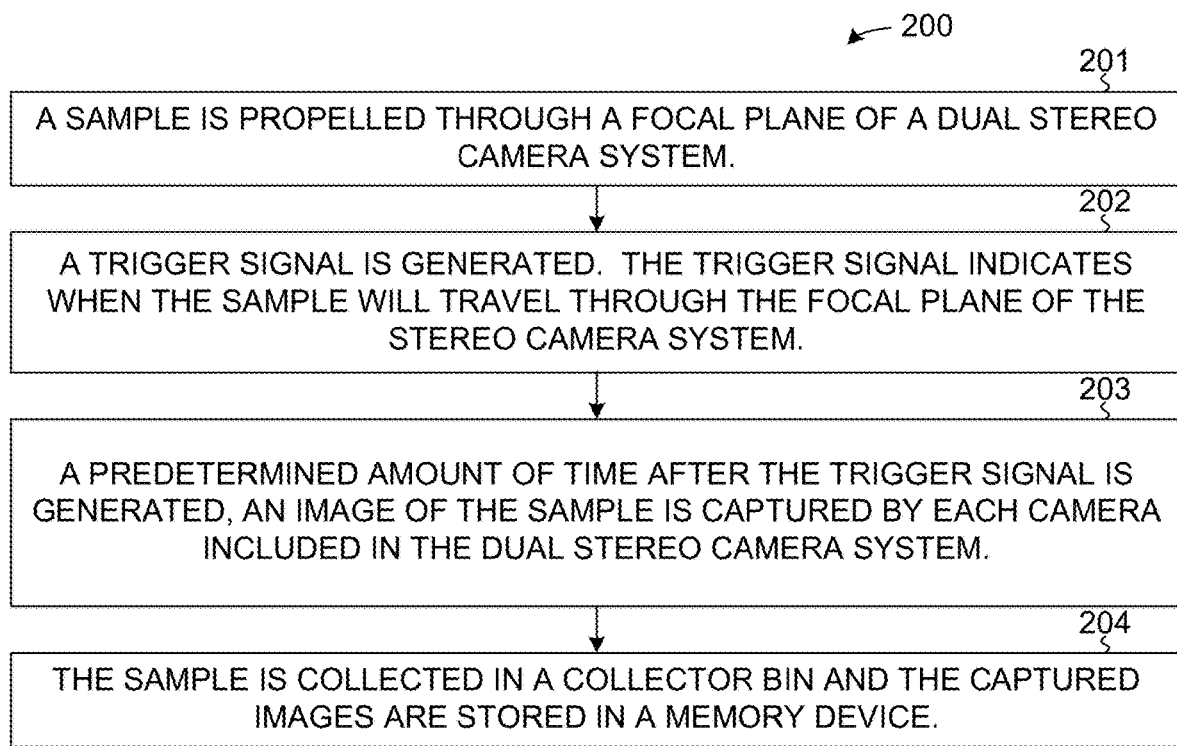
FIG. 11 is a flowchart of an in-flight 3D inspector.

FIG. 11 is a flowchart 200 of an in-flight 3D inspector. In step 201, a sample is propelled through a focal plane of a dual stereo camera system. In step 202, a trigger signal is generated. The trigger signal indicates when the sample will travel through the focal plane of the stereo camera system. In step 203, a predetermined amount of time after the trigger signal is generated, an image of the sample is captured by each camera included in the dual stereo camera system. The sample is illuminated by a light source while the image of the sample is captured. In step 204, the sample is collected in a collector bin and the captured images are stored in a memory device.

Figure 12:
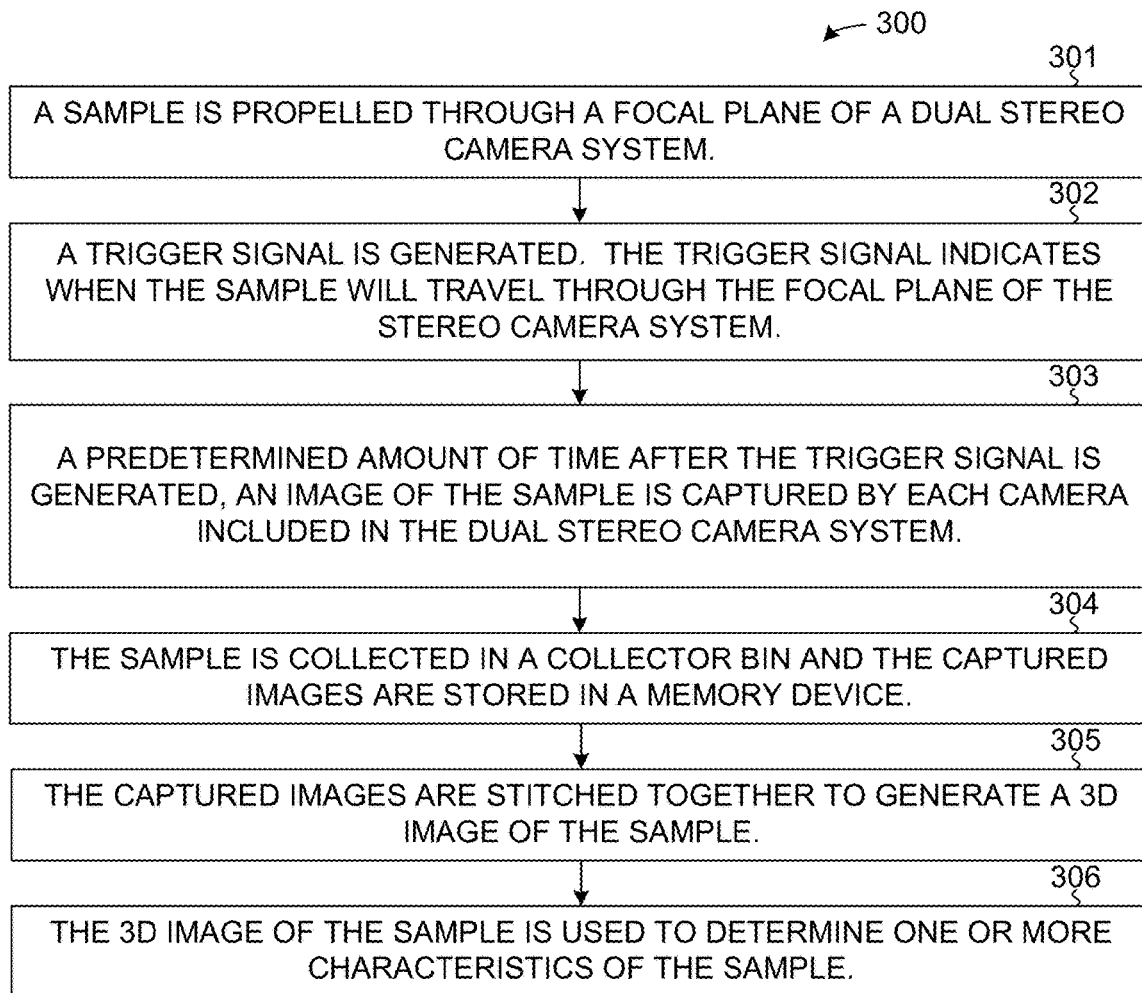
FIG. 12 is a flowchart of an in-flight 3D inspector with defect processing.

FIG. 12 is a flowchart 300 of an in-flight 3D inspector with defect processing. In step 301, a sample is propelled through a focal plane of a dual stereo camera system. In step 302, a trigger signal is generated. The trigger signal indicates when the sample will travel through the focal plane of the stereo camera system. In step 303, a predetermined amount of time after the trigger signal is generated, an image of the sample is captured by each camera included in the dual stereo camera system. The sample is illuminated by a light source while the image of the sample is captured. In step 304, the sample is collected in a collector bin and the captured images are stored in a memory device. In step 305, the captured images are stitched together to generate a 3D image of the sample. In step 306, the 3D image of the sample is used to determine one or more characteristics of the sample.

Various Numbers of Cameras can be Used

The two pairs of cameras 18-19 discussed above are used in a first embodiment of the present invention. In other embodiments, various other numbers of cameras may be used. For example, in another embodiment, the in-flight 3D inspector may include only one pair of stereo cameras that capture two images of the sample, and the images are used to construct a 3D image of the sample from only one point of view. In another embodiment, three pairs of stereo cameras can be used to capture six images of the sample and the images are used to construct a 3D image of the sample from three points of view. After review of this disclosure, the reader will appreciate that additional cameras will provide additional accuracy of the 3D image created by the in-flight 3D inspector.

Inspection Device Controlled Processing Line System

Figure 13:
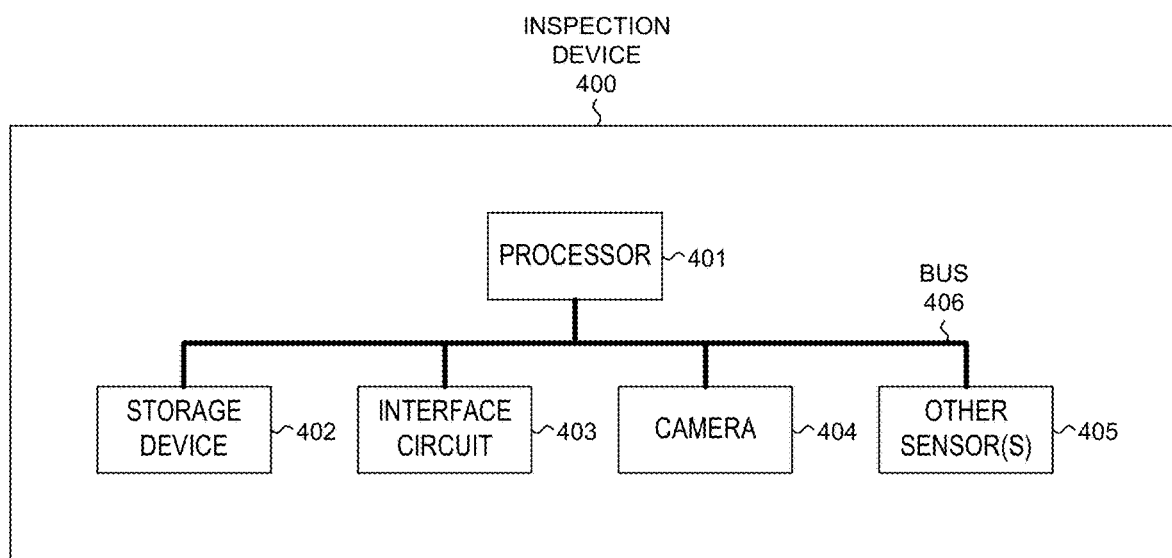
FIG. 13 is a diagram of an inspection device.

FIG. 13 is a diagram of an inspection device 400. Inspection device 400 includes a processor 401, a storage device 402, an interface circuit 403, an optical device 404 and/or other sensors 405. The various parts of inspection device 400 communicate with each other across a bus 406. On skilled in the art will note that various known bus architectures can be used to implement inspection device 400. One example of a bus architecture is Peripheral Component Interconnect Express (PCIe), which provides standardized communication between various device components. However, many other possible options exist, such as: Ethernet for Control Automation Technology (EtherCAT), Ethernet Industrial Protocol (EtherNet/IP), Process Field Net (PROFINET), Ethernet Powerlink, Third Generation of the Sercos Interface (SERCOS III), Control and Communication Link (CC-Link IE), and Modbus/TCP, Modbus, Sinec H1, Process Field Bus (Profibus), Controller Area Network Protocol (CANopen), DeviceNet, and FOUNDATION Fieldbus. One example of a processor is an intel x86 processor. One example of a storage device is a NAND flash based solid state drive. One example of an interface circuit is a Network Interface Card (NIC) that communicates across a physically connected cable to a network switch or router. Another example of an interface circuit is a Wireless Network Interface Controller (WNIC) that communicates across standards such as WiFi (802.11 protocols), Bluetooth and other such protocols. Another example of an interface circuit is a cellular communication device that communicates across cellular networks that use protocols such as GSM, WCDMA, CDMA2000, LTE, etc. All of the above mentioned communication methods may be used to implement a data port. An example of an optical device is a high shutter speed, high resolution digital camera that is controllable by a computer across a standardized data port, such as USB. Other examples of optical devices include, but are not limited to, millimeter wave cameras, Near-Infr-Red (NIR) cameras, hyper-spectral cameras, and x-ray cameras. Other sensors 405 may include audio, electromagnetic, and odor sensors that are controllable by a computer across a standardized bus, such as USB. Other examples of sensors include, but are not limited to weight scale sensors, proximity sensors, temperature sensors, humidity sensors, texture sensors, and moisture sensors.

FIG. 14 illustrates an inspection data communication system. The inspection data communication can be between inspection device 412 and upstream slave device 411 or between inspection device 412 and downstream slave device 413. The term upstream indicates that sample pass through the slave device before passing through the inspection device 412. The term downstream indicates that samples pass through the inspection device 412 before passing through the salve device.

It is noted herein that a slave device is any device located along the sample processing line. Examples of a slave devices includes, but is not limited to: a sorting device, a mixing device, a display device, a sizing device, a blanching device, a feeding device, a cutting, a slicing device, a baking device, a drying device, a freezing device, a coating device, a washing device.

In one scenario, a sample passes through the slave device 411 and then passes through the inspection device 412. Within the inspection device 412, the optical device 404 of the inspection device 400 is triggered by the processor 401 to capture an image. The triggering by the processor 401 is executed when a sample is within the field of view of the optical device 404. The image captured by the optical device 404 is then stored into storage device 402. The processor 401 then processes the captured image and determines one or more quality characteristics of the sample in the captured image. Many different quality characteristics may be determined from the captured image. Some examples of possible quality characteristics includes, but are not limited to: shape quality (based on matching a predetermined shape within a specified tolerance, then the sample is determined to be defective with respect to shape), surface contour quality (when a flat surface is greater than a specified area, then the sample is determined to be defective with respect to surface contour), hole quality (presence of holes in the sample), pest quality (presence of insects in/or on the sample), color quality (irregular color of the sample), size quality (irregular size of the sample), moisture level, oil content, fat content, and mycotoxin content. In one example, a group of quality characteristics are referred to as inspection data 415. FIG. 18, FIG. 19, and FIG. 20 illustrate various examples of inspection data. Communication medium 417 can be a wired medium such as Ethernet or RS-232. Alternatively, communication medium 417 can be wireless medium such as WiFi (802.11) or a cellular link. The inspection data 415 is then communicated to slave device 411. In this fashion, the slave device 411 can then analyze the inspection data and adjust the operation of slave device 411 such that more desirable samples are output from slave device 411. This scenario requires that slave device 411 include some local knowledge and processing capability to analyze the received inspection data and to adjust the operations of the slave device 411 based on the analysis.

It is noted herein, the inspection device 400 illustrated in FIG. 13 is only one example of an inspection device. Another example of an inspection device is the in-flight 3D inspector 1 illustrated in FIGS. 1-5.

It is also noted herein that multiple samples may be within the field of view of the optical device 404 when an image is captured and therefore quality characteristics of multiple samples may be determined using a single captured image.

In another scenario, a sample passes through the inspection device 412 and then passes through the slave device 413. Within the inspection device 412, the optical device 404 of the inspection device 400 is triggered by the processor 401 to capture an image. The triggering by the processor 401 is executed when a sample is within the field of view of the optical device 404. The image captured by the optical device 404 is then stored into storage device 402. The processor 401 then processes the captured image and determines one or more quality characteristics of the sample in the captured image. Many different quality characteristics may be determined from the captured image. In one example, multiple quality characteristics are referred to as inspection data 415. The inspection data 415 is then communicated to slave device 413 via communication medium 417. Communication medium 417 can be a wired medium such as Ethernet or RS-232. Alternatively, communication medium can be wireless medium such as WiFi (802.11) or cellular link In this fashion, the slave device 413 can then analyze the inspection data and adjust the operation of slave device 413 such that more desirable samples are output from slave device 413. This scenario requires that slave device 413 include some local knowledge and processing capability to analyze the received inspection data and to adjust the operations of the slave device 413 based on the analysis.

While the scenario illustrated in FIG. 14 provides the slave devices 411 and 413 with the most control over how they operate, in many instances slave devices 411 and 413 will not have the necessary knowledge and processing power to analyze the inspection data generated by the inspection device 412. This problem is addressed by moving the processing of the inspection data to the inspection device 412. This solution is illustrated in FIG. 15.

Figure 15:
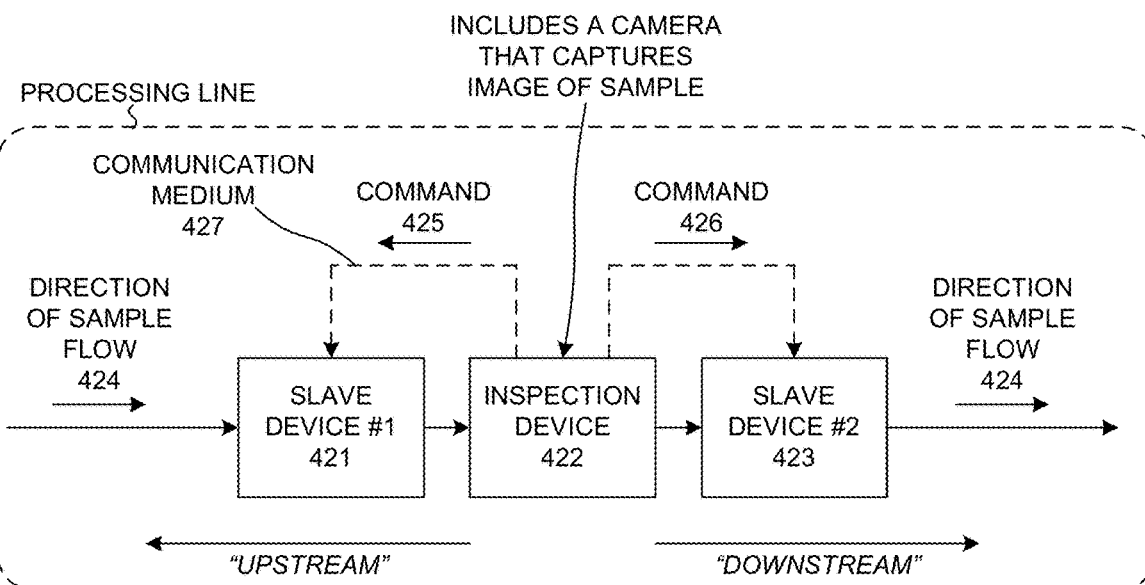
FIG. 15 is a diagram of a command communication system.
Figure 21:
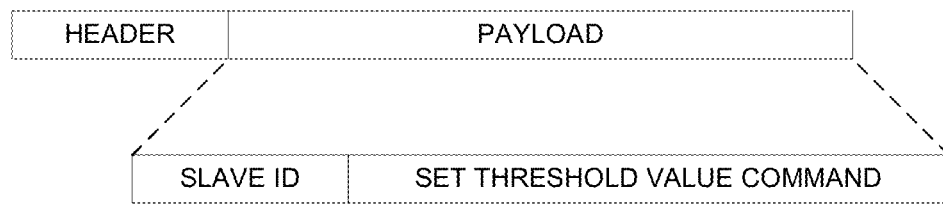
FIG. 21 is a diagram of a first example of a command based on inspection data.
Figure 22:
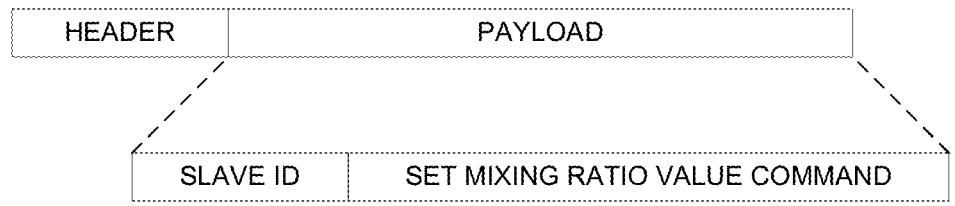
FIG. 22 is a diagram of a second example of a command based on inspection data.
Figure 23:
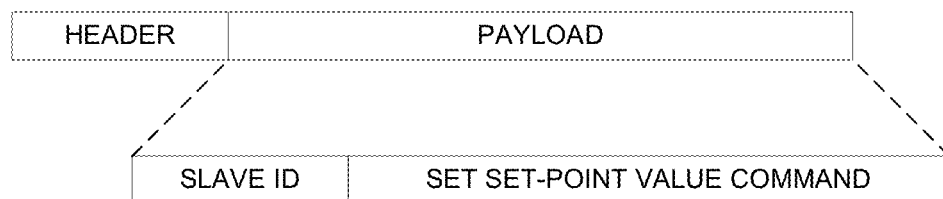
FIG. 23 is a diagram of a third example of a command based on inspection data.

FIG. 15 illustrates a command communication system. The term upstream indicates that sample pass through the slave device before passing through the inspection device 422. The term downstream indicates that samples pass through the inspection device 422 before passing through the slave device. In this system, a sample passes through the slave device 411 and then passes through the inspection device 412. Within the inspection device 412, the optical device 404 of the inspection device 400 is triggered by the processor 401 to capture an image. The triggering by the processor 401 is executed when a sample is within the field of view of the optical device 404. The image captured by the optical device 404 is then stored into storage device 402. The processor 401 then processes the captured image and determines one or more quality characteristics of the sample in the captured image. In one example, multiple quality characteristics are referred to as inspection data. Instead of communicating the raw inspection data to the slave device 421, the inspection device 422 performs the analysis of the inspection data and generates a command 425 to adjust the operation of slave device 421. FIG. 21, FIG. 22, and FIG. 23 illustrate various examples of commands that are generated based on inspection data. For example, a command may be to set a threshold value to be used by a slave device. In another example, a command may be to set a mixing ratio value in a slave device. In yet another example, the command may be to adjust a set-point value in a slave device. The command 425 is then communicated to slave device 421 via communication medium 427. Slave device 421 then adjusts operation as commanded such that more desirable samples are output from slave device 421. This scenario does not require that slave device 421 include some local knowledge and processing capability to analyze inspection data and to adjust the operations of the slave device 421 based on the analysis. Rather, this scenario does not require any local knowledge or processing capability to be present on the slave device 421, because all the necessary analysis is performed by the inspection device 422. Slave device 421 can operate as a "dumb" terminal that simply adjusts operation based on received commands from the inspection device 422. This solution may be very valuable as it reduces the number of devices that are required to have local processing capability and knowledge, which in turn reduces the cost of the overall system.

In another scenario, a sample passes through the inspection device 422 and then passes through the slave device 423. Within the inspection device 412, the optical device 404 of the inspection device 400 is triggered by the processor 401 to capture an image. The triggering by the processor 401 is executed when a sample is within the field of view of the optical device 404. The image captured by the optical device 404 is then stored into storage device 402. The processor 401 then processes the captured image and determines one or more quality characteristics of the sample in the captured image. In one example, multiple quality characteristics are referred to as inspection data. Instead of communicating the raw inspection data to the slave device 423, the inspection device 422 performs the analysis of the inspection data and generates a command 426 to adjust the operation of slave device 423. The command 426 is then communicated to slave device 423 via a communication medium. Slave device 423 then adjusts operation as commanded such that more desirable samples are output from slave device 423. This scenario does not require that slave device 423 include some local knowledge and processing capability to analyze inspection data and to adjust the operations of the slave device 423 based on the analysis. Rather, this scenario does not require any local knowledge or processing capability to be present on the slave device 423, because all the necessary analysis is performed by the inspection device 422. Slave device 423 can operate as a "dumb" terminal that simply adjusts operation based on received commands from the inspection device 422. This solution may be very valuable as it reduces the number of devices that are required to have local processing capability and knowledge, which in turn reduces the cost of the overall system.

Figure 16:
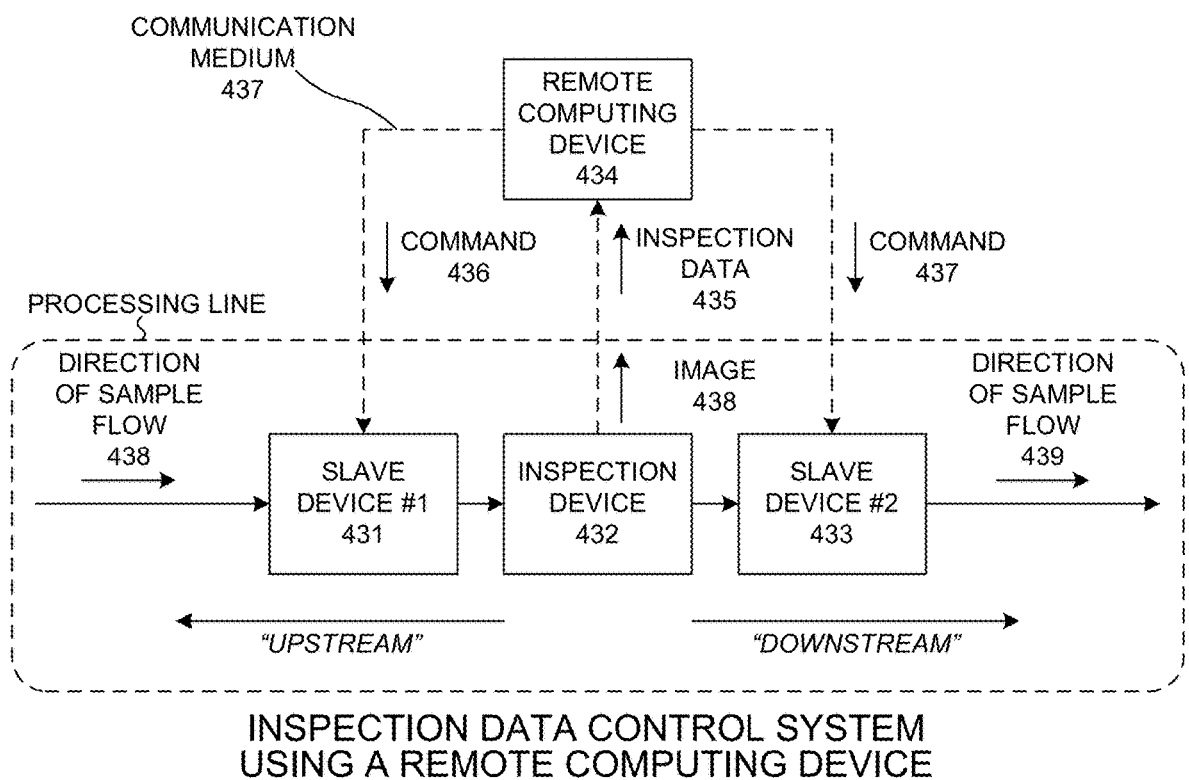
FIG. 16 is a diagram of an inspection data control system using a remote computing device.

While the scenario illustrated in FIG. 15 provides cost saving by only requiring a single device in the system to have the necessary knowledge and processing power, it may be even more advantageous if the none of the devices in the system are required to have local processing capability and knowledge to analyze the captured images. FIG. 16 illustrates an inspection data control system using a remote computing device.

FIG. 16 illustrates an inspection data control system using a remote computing device. The term upstream indicates that sample pass through the slave device before passing through the inspection device 432. The term downstream indicates that samples pass through the inspection device 432 before passing through the salve device. In this system, a sample passes through the slave device 431 and then passes through the inspection device 432. Within the inspection device 432, the optical device 404 of the inspection device 400 is triggered by the processor 401 to capture an image 438. The triggering by the processor 401 is executed when a sample is within the field of view of the optical device 404. The image 438 captured by the optical device 404 is then stored into storage device 402. The processor 401 does not process the captured image 438 to determine one or more quality characteristics of the sample in the captured image 438. Rather, the inspection device 432 communicates the captured image 438 to a remote computing device 434. In one example, remote computing device 434 is a remote computer or server that is not part of any machine through which the sample flows. In response to receiving the captured image 438, the remote computing device 434 performs the analysis of the captured image 438 and generates a command 436 to adjust the operation of slave device 431. The command 436 is then communicated to slave device 431 via communication medium 437. Slave device 431 then adjusts operation as commanded such that more desirable samples are output from slave device 431. This scenario does not require any local knowledge or processing capability to be present on the slave device 431, because all the necessary analysis is performed by the remote computing device 434. Likewise, this scenario does not require any local knowledge or processing capability to be present on the inspection device 432, because all the necessary analysis is performed by the remote computing device 434. Both slave device 431 and inspection device 432 can operate as "dumb" terminals that simply adjust operation based on received commands from the remote computing device 434. This solution may be very valuable as it does not require any devices through which the sample passes to have local processing capability and knowledge, which in turn reduces the cost of the overall system.

In another scenario, a sample passes through the inspection device 432 and then passes through the slave device 433. Within the inspection device 432, the optical device 404 of the inspection device 400 is triggered by the processor 401 to capture an image 438. The triggering by the processor 401 is executed when a sample is within the field of view of the optical device 404. The image 438 captured by the optical device 404 is then stored into storage device 402. The processor 401 does not process the captured image 438 to determine one or more quality characteristics of the sample in the captured image. Rather, the inspection device 432 communicates the captured image 438 to a remote computing device 434. In one example, remote computing device 434 is a remote computer or server that is not part of any machine through which the sample flows. In response to receiving the captured image 438, the remote computing device 434 performs the analysis of the captured image 438 and generates a command 437 to adjust the operation of slave device 433. The command 437 is then communicated to slave device 433 via communication medium. Slave device 433 then adjusts operation as commanded such that more desirable samples are output from slave device 433. This scenario does not require any local knowledge or processing capability to be present on the slave device 433, because all the necessary analysis is performed by the remote computing device 434. Likewise, this scenario does not require any local knowledge or processing capability to be present on the inspection device 432, because all the necessary analysis is performed by the remote computing device 434. Both slave device 433 and inspection device 432 can operate as "dumb" terminals that simply adjust operation based on received commands from the remote computing device 434. This solution may be very valuable as it does not require any devices through which the sample passes to have local processing capability and knowledge, which in turn reduces the cost of the overall system.

In another example, captured image 438 is not communicated from the inspection device 432 to the remote computing device 434, but rather inspection data 435 is communicated from the inspection device 432 to remote computing device 434. In this scenario, the inspection device 432 captures an image of the sample and from the captured image determines quality characteristic(s) of the sample. The inspection data (grouping of quality characteristics) is then communicated to the remote computing device 434. In response to receiving the inspection data, the remote computing device 434 generates one or more commands to adjust one or more slave devices. In this example, the inspection device 432 requires the processing capability to determine the quality characteristics but does not require the capability to determine commands for adjusting slave devices.

While the scenario illustrated in FIG. 16 a great improvement, a remote computing device can be used in an even more beneficial way. This improved use is illustrated in FIG. 17.

Figure 17:
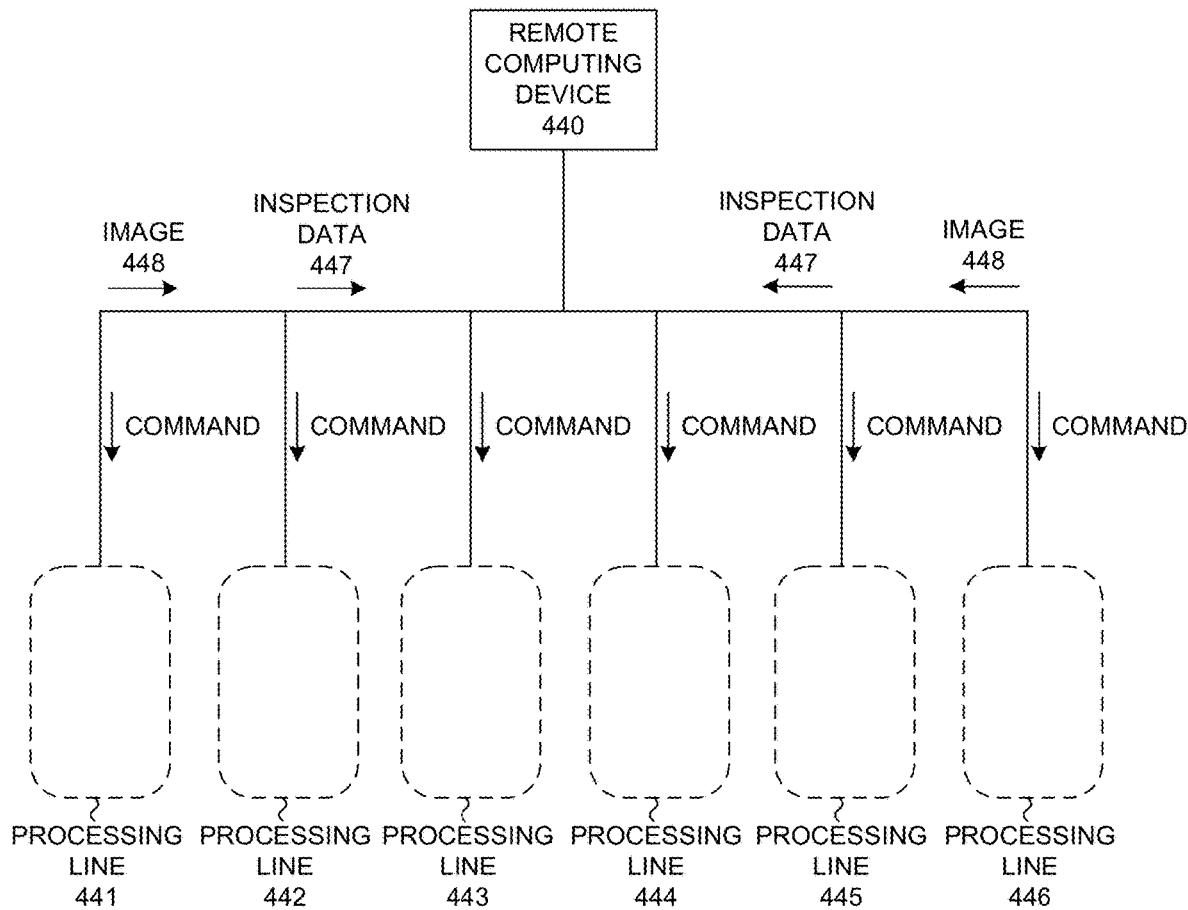
FIG. 17 is a diagram of an inspection data control system of multiple processing lines using a remote computing device.

FIG. 17 illustrates an inspection data control system of multiple processing lines using a remote computing device. Each processing line 441-446 includes at least one inspection device that is capable of capturing an image and sending the capture image and/or inspection data based on the captured image to a remote computing device 440.

The in response to receiving only the captured image data 448, the remote computing device 440 determines quality characteristics and then based on those quality characteristics ("inspection data") the remote computing device 440 generates command(s) to adjust the operation of slave device(s) in the processing line from which the image was captured.

In response to receiving the inspection data 447, the remote computing device 440 generates command(s) to adjust the operation of slave device(s) in the processing line from which the image was captured.

This scenario also reduces the complication of managing multiple sample processing lines. A single remote computing device 440 could receive inspection data from various inspection devices included in various processing lines 441-446. In this fashion, the single remote computing device 440 could monitor and adjust all the various slave devices in processing lines 441-446. This scenario can also provide for advanced learning because all inspection data from all processing lines 441-446 are received by the remote computing device 440, which in turn allows for improved artificial intelligence learning by way of access to larger sets of relevant inspection data.

This scenario also allows for real-time monitoring and adjusting of multiple processing lines located at various locations around the world.

Figure 24:
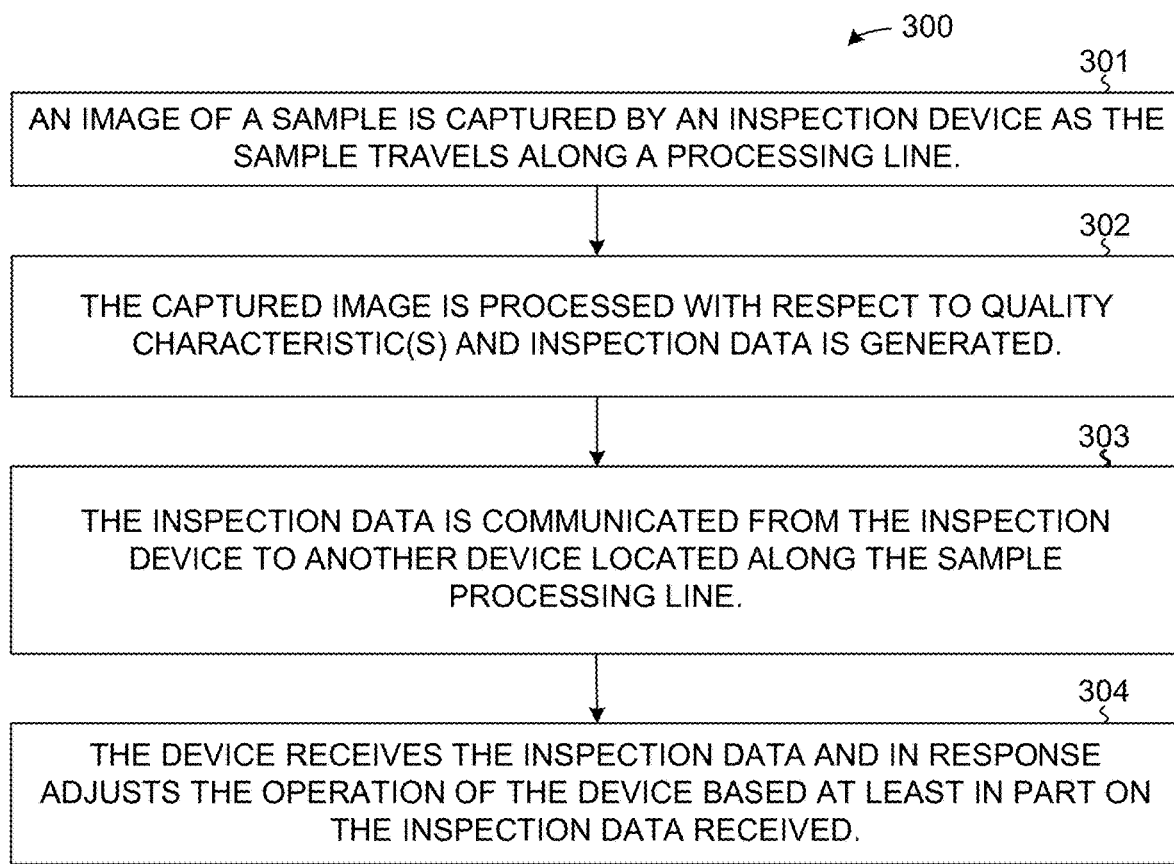
FIG. 24 is a flowchart illustrating the operation of an inspection data communication system.

FIG. 24 is a flowchart 300 of an inspection data communication system. In step 301, an image of a sample is captured by an inspection device as the sample travels along a processing line. In step 302, the captured image is processed with respect to quality characteristic(s) and inspection data is generated. In step 303, the inspection data is communicated from the inspection device to another device located along the sample processing line. In step 304, the device receives the inspection data and in response adjusts the operation of the device based at least in part on the inspection data received.

Figure 25:
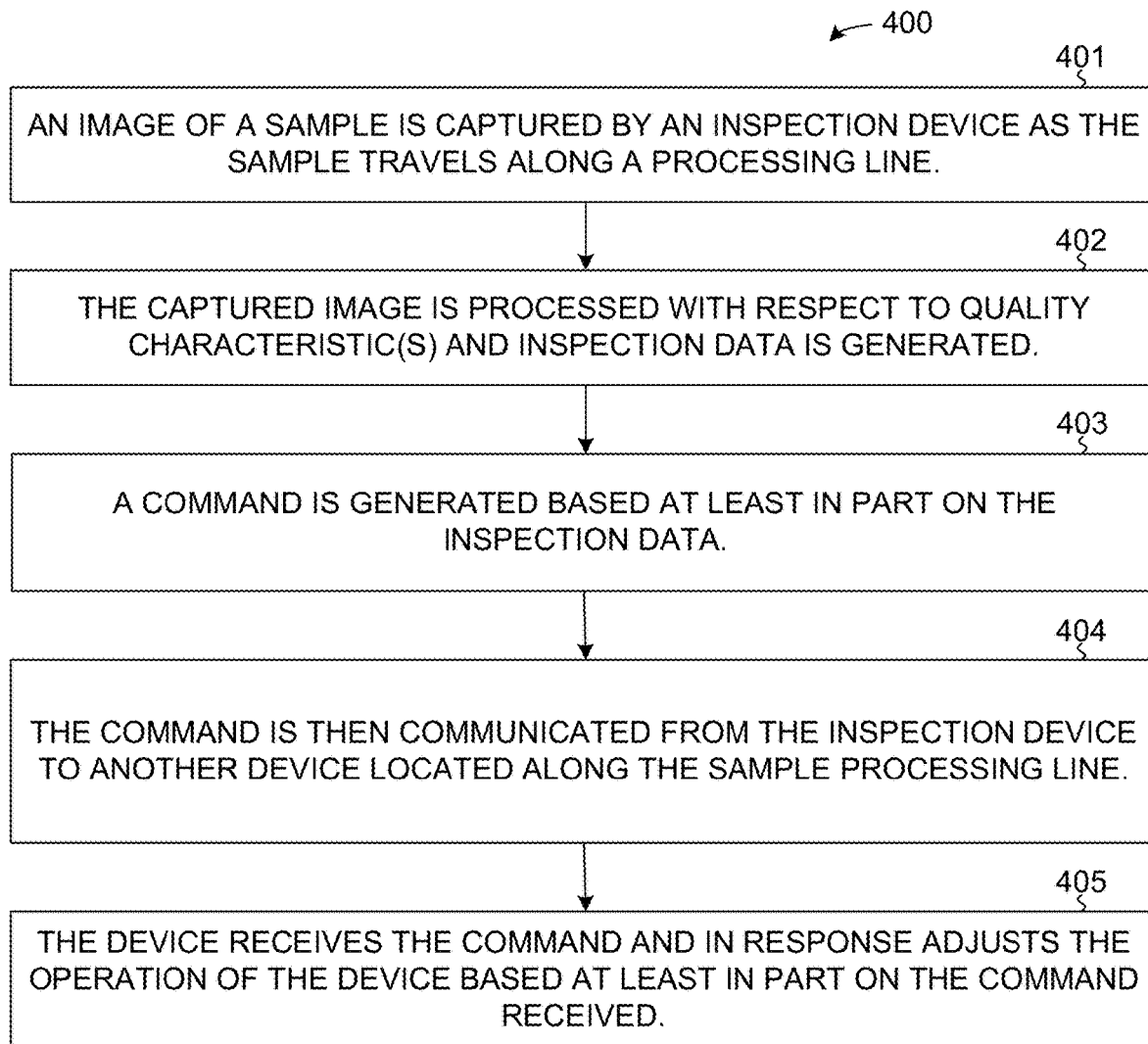
FIG. 25 is a flowchart illustrating the operation of a command communication system.

FIG. 25 is a flowchart 400 of a command communication system. In step 401, an image of a sample is captured by an inspection device as the sample travels along a processing line. In step 402, the captured image is processed with respect to quality characteristic(s) and inspection data is generated. In step 403, a command is generated based at least in part on the inspection data. In step 404, the command is then communicated from the inspection device to another device located along the sample processing line. In step 405, the device receives the command and in response adjusts the operation of the device based at least in part on the command received.

Figure 26:
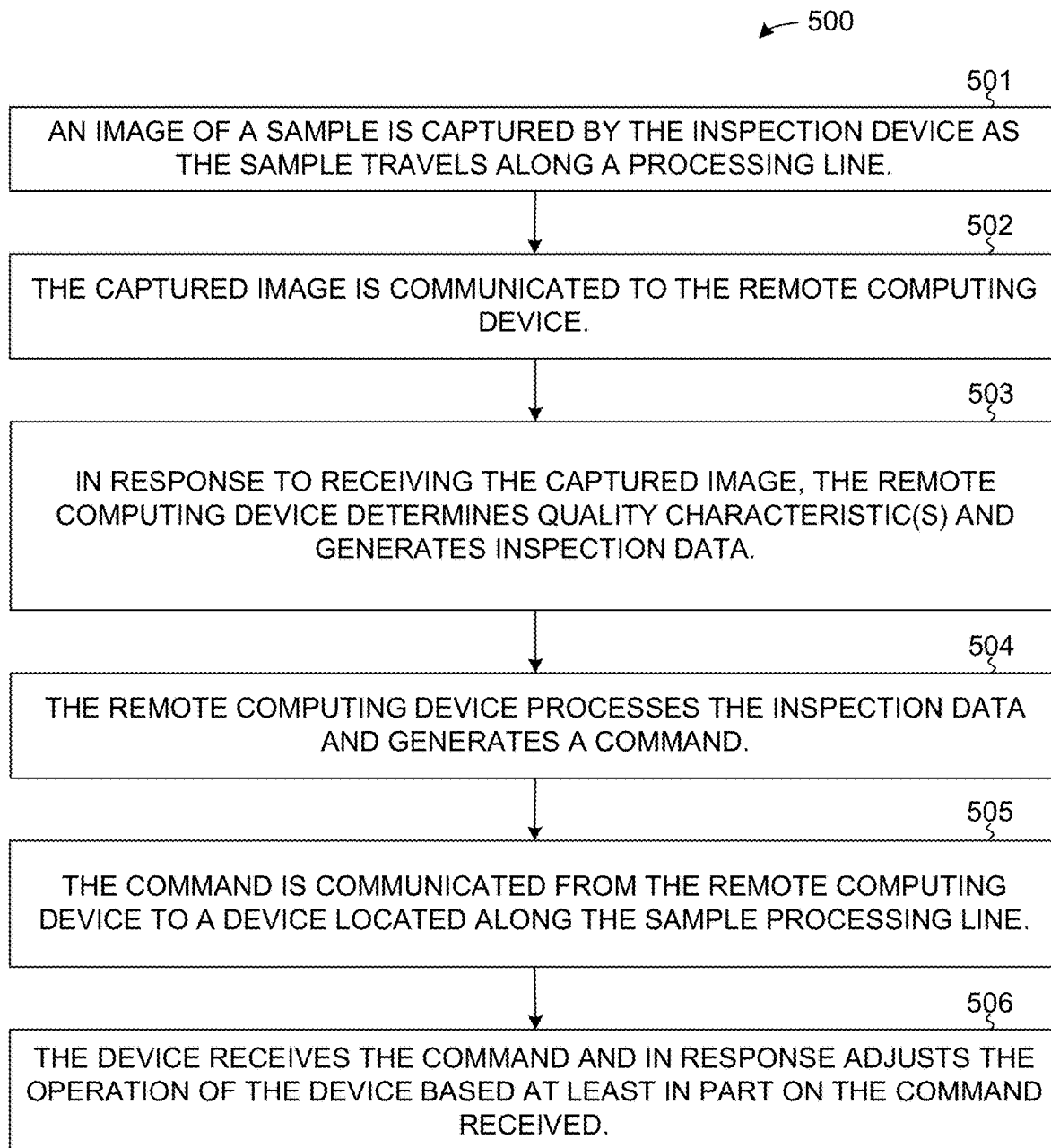
FIG. 26 is a flowchart illustrating a first example of the operation of an inspection data communication system using a remote computing device.

FIG. 26 is a flowchart 500 of an inspection data control system using a remote computing device. In step 501, an image of a sample is captured by the inspection device as the sample travels along a processing line. In step 502, the captured image is communicated to the remote computing device. In step 503, in response to receiving the captured image, the remote computing device determines quality characteristic(s) and generates inspection data. In step 504, the remote computing device processes the inspection data and generates a command. In step 505, the command is communicated from the remote computing device to a device located along the sample processing line. In step 506, the device receives the command and in response adjusts the operation of the device based at least in part on the command received.

Figure 27:
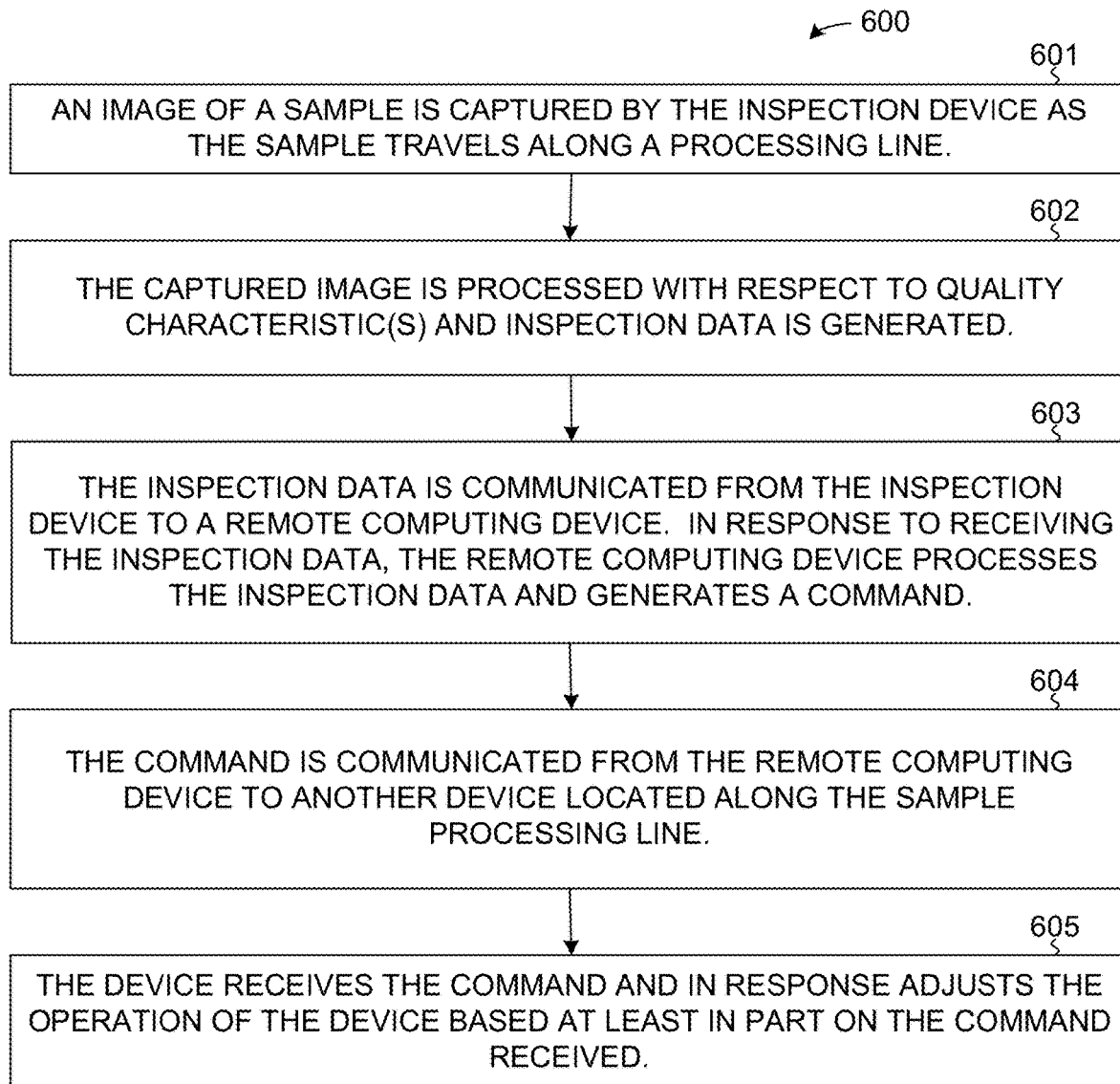
FIG. 27 is a flowchart illustrating a second example of the operation of an inspection data communication system.

FIG. 27 is a flowchart 600 of an inspection data control system using a remote computing device. In step 601, an image of a sample is captured by the inspection device as the sample travels along the processing line. In step 602, the captured image is processed with respect to quality characteristic(s) and inspection data is generated. In step 603, the inspection data is communicated from the inspection device to a remote computing device and in response to receiving the inspection data, the remote computing device processes the inspection data and generates a command. In step 604, the command is communicated from the remote computing device to another device located along the sample processing line. In step 605, the device receives the command and in response adjusts the operation of the device based at least in part on the command received.

Distributed Ledger

A distributed ledger, sometimes referred to as "Blockchain", is a shared public ledger on which a system relies. The distributed ledger has a linked list data structure, with each block containing a hash of the previous block. Each block is formed by a proof-of-work algorithm, through which consensus of this distributed ledger could be obtained via the longest possible chain. The distributed ledger provides the basis for a distributed system that does not require trust between various users and is extendable in many ways through modifications of the parameters of the chain.

A block is an aggregated set of data. Data are collected and processed to fit in a block through a process called mining. Each block could be identified using a cryptographic hash (also known as a digital fingerprint). The formed block will contain a hash of the previous block, so that blocks can form a chain from the first block ever (known as the Genesis Block) to the newly formed block. In this way, all the data could be connected via a linked list structure.

Data are contained inside blocks as well as an arbitrary integer (called nounce) that is necessary for producing the proof-of-work. In the example of Bitcoin, a block contains a header and relevant transaction data. A merkle tree of transactions is created and the hash of the root is included in the header. A merkle tree is a full binary tree of a hash values. At the bottom level of the tree, each transaction has a node containing its hash value. The tree is constructed in a way such that the parent node has a value of the hash of the data contained in its children concatenating together. The merkle tree data structure allows fast validation by constructing a merkle tree path from the bottom level of the tree up to the root node. Since each bitcoin transaction output can be spent only once, as long as the output is spent, it could be erased out of the tree structure using some pruning algorithms. In this way, disk usage is reduced while the validation functions are preserved.

Various blocks in the blockchain are connected to specific other blocks in the blockchain. In one example, each block contains a hash of its previous block. In bitcoin blockchain for example, the block header has a field for previous block hash. Therefore, all blocks will contain a reference of its previous block thereby enabling the chain to be build up to the genesis block.

A fork on the block chain may occur. A fork in the block chain occurs due to two blocks computed at a very short time interval. The subsequent blocks may build upon both blocks and both of the chains remain valid. In subsequent process of mining, one fork would be longer than the other fork, in this case, the longer chain would be accepted by the network and the short would not be used unless its length exceeds the longer chain in the future.

Many distributed ledgers, such as Bitcoin blockchain, use a proof-of-work algorithm for reaching a consensus. The cryptographic hash function of each block must be smaller than a specific value in order to be considered value. A nonce is therefore included in the block for this feature. By using the proof-of-work method, in order to change the data in one block, all successors of that block must be re-written and a huge amount of calculation is necessary. In addition, the longest chain would be accepted by the network whereas the shorter ones would be discarded at the situation of branches of the chain. This makes the data in blocks practically unmodifiable. Further, the more blocks that are built upon the block in which the data is contained, more processing is required to overwrite the data.

However, the blockchain may use other methods of consensus. For example, a blockchain may use Scrypt for proof-of-work algorithm instead of hash functions. In addition, the blockchain could be extended for scientific computation where a correct solution to a certain problem could act a validation method. In this way, the computation power may be used to help solving scientific problems and contribute to scientific research.

In a distributed ledger, each user running a full node on the computer will download a full copy of the whole blockchain, which will include data of all events, such as transactions, recorded on the blockchain. After that, each node can run independently to process any incoming events, such as transactions, and propagate the event further. The node can also contribute to the establishment of the consensus by mining to include event data in a block and then to find a proof-of-work for the block. There is not a central node processing the data and distributing the data, rather every node can run independently and broadcast any work that is proved. This model of distributed computation could be extended to many other services such as Domain Name Server.

Quality Inspection Data Distributed Ledger

While distributed ledgers have been utilized to perform financial transactions, distributed ledgers have not been utilized to perform recordation and distribution of quality inspection data.

Quality inspection data is measured and recorded for many different items around the world, such as pharmaceuticals, mechanical hardware, agricultural foods and many, many more.

One challenge is the acquisition of quality inspection data. For example, some quality inspection data is generated by humans reviewing items manually. This process is prone to large variances depending on the human conducting the inspection as well as the state of the human when the inspection is conducted. In other examples, computer automation is used to help, or entirely, acquire the quality inspection data as disclosed above.

Regardless of the method in which the quality inspection data is acquired, a second challenge is the integrity of the quality data that is reported to interested parties, such as owners, purchasers, manufacturers, etc. For example, in the almond industry many purchasers are weary of the quality data that is alleged by various almond providers. The uncertainty spawns from various sources. First, was the quality inspection data reliable? Second, was the quality inspection data accurately managed and is it accurately aligned with the product being offered? Third, was the quality inspection data intentionally tampered with to increase the market price of the product being sold? Fourth, difficulty to gain access to the data regardless of the three concerns listed above. All of these uncertainties lead to time and cost inefficiencies. A trust worthy, reliable and cost efficient solution is provided herein.

Regarding the reliability of the quality inspection data, as discussed above, an automated system such as the in-flight optical inspector can be used to acquire reliable and consistent quality inspection data.

Regarding the management, possible tampering, and access to the acquired quality inspection data a new quality inspection data distributed ledger is disclosed. This quality inspection data distributed ledger does not perform financial transactions. Rather, the quality inspection data distributed ledger validates the source, timing, product association, and integrity of the quality inspection data.

Figure 28:
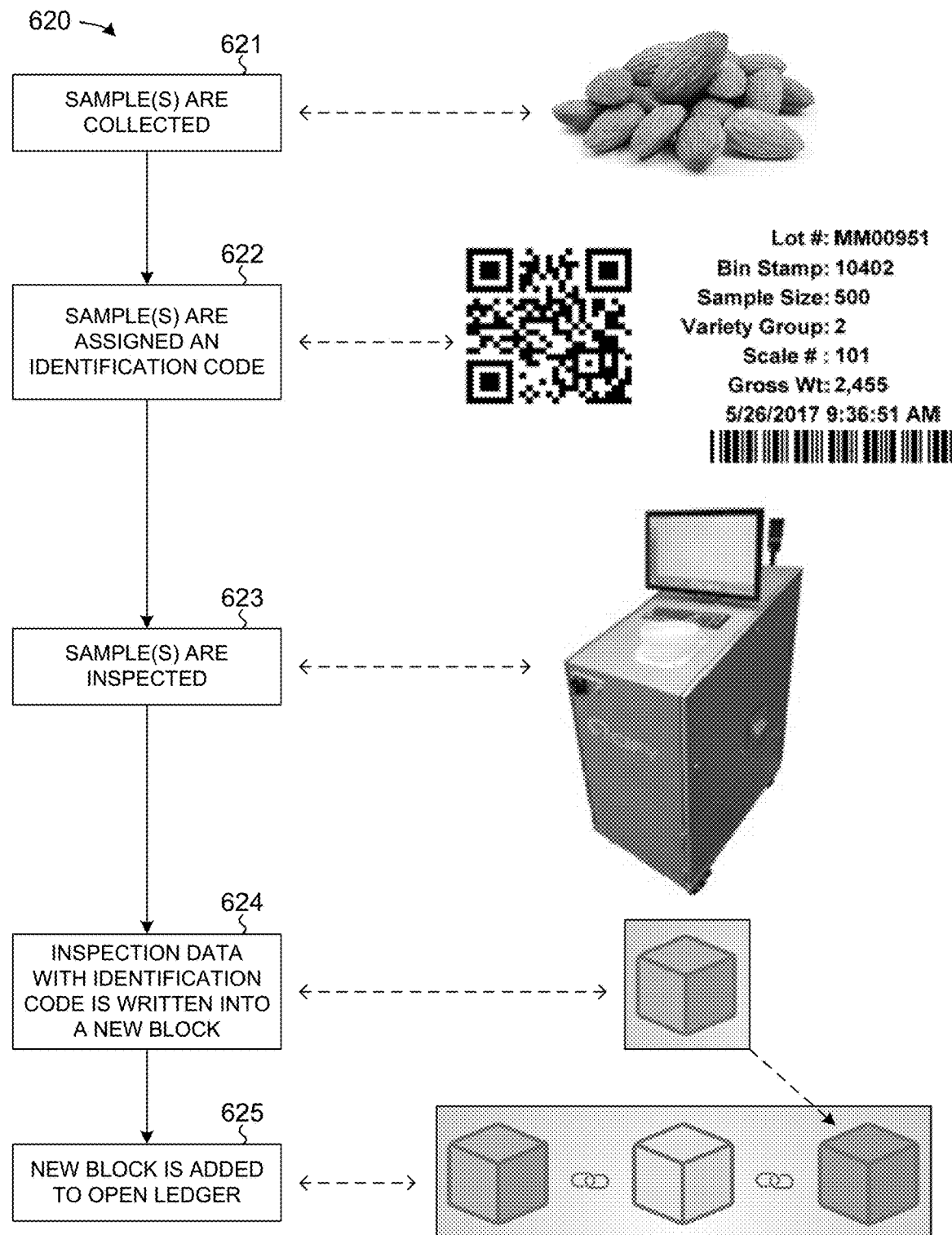
FIG. 28 is a quality inspection data distributed ledger flowchart.

FIG. 28 is a diagram of a quality inspection data distributed ledger flowchart 620. In step 621, one or more samples to be inspected are collected. In step 622, the one or more samples are assigned a unique identification code. In one example, the identification code is affixed to a container containing the one or more samples. In another example, the code is affixed to the one or more samples themselves. The code may be communicated by use of a Quick Response (QR) code, a bar code, printed text, Radio Frequency Identification (RFID) tag, human manual entry, a Near Field Communication (NFC) signal, a token, or any other method of communication known to one of skill in the art.

Once the identification code has been assigned to the one or more samples, the one or more samples are inspected in step 623. This inspection can be performed by any possible method. In one example, the inspection can be performed by human inspection. In another example, the inspection can be performed by an automated inspection. In yet another example, the inspection can be performed by an in-flight 3D inspector as disclosed above.

Upon completion of the inspection of the one or more samples, in step 624 the resulting inspection data and the identification code are written into a new quality inspection data block. An example of a quality inspection data block is illustrated in FIG. 29. The exemplary quality inspection data block of FIG. 29 may include the following data fields: an inspection entity that conducted the inspection, inspection location where the inspection was conducted, the sensor identification number that identifies the sensor or inspection device that performed the inspection, the lot number of the one or more samples, the total weight of the lot of samples, analysis completion timestamp indicating when the inspection was performed or completed, the amount of product analyzed (for example in weight or quantity), the moisture content of the samples, the kernel size of the samples, the uniformity ratio of the samples (average, median, variance, etc.), the percentage or number of "good" samples or samples that pass all required characteristics, the percentage or number of dissimilar samples, the percentage or number of chipped and scratched samples, the percentage or number of samples including another type of defect, the percentage or number of samples that have serious damage, and the quality grade of the one or more samples, such as U.S. Extra #1 grade.

The exemplary quality inspection data block of FIG. 29 may also include the following data fields: a color value, a microtoxin value (milligram/kg, microgram/kg, Parts Per Million, Parts Per Billion . . . ), a temperature value, an acidity (pH) value, a pressure value (kPA, PSI . . . ), a volume per unit time (cubic meters per second), an amount of discolored product (number of percentage), an amount of broken product (number or percentage), an amount of rancid product (number or percentage), an amount of moldy product (number of percentage), an amount of immature product (number or percentage), an amount of unripe product (number or percentage), or an amount of rotten soft product (number or percentage).

The inspection data fields listed above are only provided to be exemplary. One skilled in the art will appreciate that any other characteristic determined during inspection can be included in the quality inspection data block. Likewise, any of the inspection data fields listed can be omitted from the quality inspection data block as well. A list of other possible inspection devices is listed below.

Optical sensors
Moisture sensors
Microtoxin sensors
Thermometer sensors
Acidity (pH) sensors
Microwave sensors
Pressure sensors
Level sensors
Ultrasonic sensors
Flow sensors
Viscosity sensors
Conductance/Impedance sensors
Electronic Nose (sniffing) sensors
X-ray sensors
Multi Spectral (visual/non visual) sensors
Weight sensors
Refractometers sensors
Tenderometer sensors
Firmness sensors
Hardness sensors
Proximity sensor The quality inspection data block may also include hash information. The quality inspection data block may include any of the following hash information: Hash of the quality inspection data block itself, hash of the previous quality inspection data block, hash of the next quality inspection data block, or a Merkle root.

In the example where an inspector with computational capabilities performs the inspection, the inspector may create the quality inspection data block itself upon completion of the inspection process. In the example where the inspector does not have computational capabilities, the data collected by the inspector can be manually entered into computationally capable device to create the quality inspection data block.

In step 625, after the quality inspection data block is created, the quality inspection data block is added to the distributed ledger. In one example, the distributed ledger is referred to as a blockchain. In the example where an inspector includes networking capabilities, the inspector can add the new quality inspection data block to the distributed ledger via a network. Once the quality inspection data block has been added to the distributed ledger, the quality inspection data block is available for viewing by anyone on the network and cannot easily be changed.

This quality inspection data distributed ledger will solve the problems currently facing the consumers of quality inspection data. Consumers of quality inspection data will now have a single source of trustworthy quality inspection data that is easy to access.

Adaptable Inspection Unit & Adaptable Sorter Unit

Processing lines are widely used to inspect and sort large quantities of a specific item. For example, processing lines are used to inspect and sort eatable items such as fruits and nuts. Alternatively, processing lines are used to inspect and sort pharmaceutical pills. A popular example of a simple processing line is a conveyor processing line where items are propelled through the processing line via a conveyor belt that is wound around the conveyor head pulley and tail pulley. Other examples of processing lines include, but are not limited to, a flume, a roller belt, a shaker (conventional and linear motion), a slide, a chute, a conveyor tube, a bucket elevator, and a screw conveyor. To date, basic processing lines, such as conveyors, have not been adaptable to work with any improved processing devices.

Recent improvements in the area of sample inspection and sorting, as are disclosed above in the present application, have provided tremendous improvements in the areas of reliability of quality inspection data, high accuracy quality inspection data, low cost of quality inspection data, as well as intelligent and automatic dynamic control of sorting devices. Currently, owners and operators of legacy simple processing lines, such as conveyors and chutes, cannot attain these improvements without upgrading their entire processing line without suffering large costs, new process planning and time delays. A solution is needed to provide these improved inspection and sorting technologies in a way that can be easily and cost effectively adapted to a legacy simple processing line. A solution to this need is provided herein.

Figure 30:
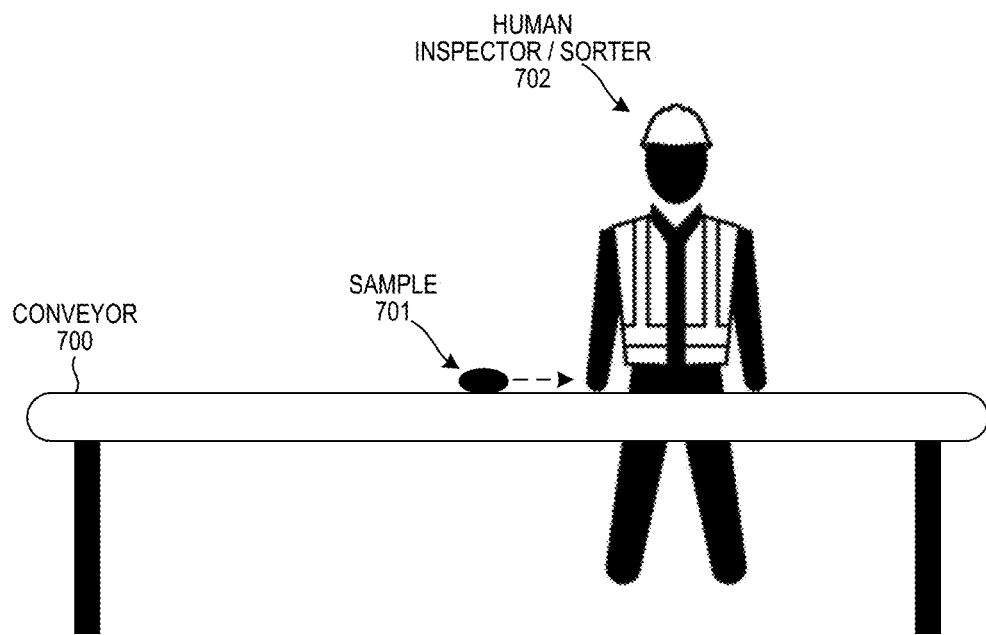
FIG. 30 is a diagram of a conveyor for manual inspection or sorting.

FIG. 30 is a diagram of a conveyor for manual inspection or sorting. This system of using a conveyor for manual inspection and sorting is used widely around the world. In operation, sample 701 is caused to become in contact with conveyor 700. Upon contact, sample 701 is moved via a rotating conveyor belt of conveyor 700. A conveyor belt usually rotates the conveyor belt about two or more pulleys. The friction between the sample and the rotating conveyor belt causes the sample to be move along the direction of the conveyor belt movement. A human is located proximate to the conveyor where the human can see the sample as it travels past the human. In the event that the human needs to more clearly see the sample, the human can pick up and more carefully inspect the sample. The human has the responsibility of determining the quality of the sample. Further, the human has the responsibility to determine how the sample should be sorted based on the determined quality. For example, the human may determine that the sample is of a quality that should be discarded. In which case, the human would manually with the human's hand, or with a tool manually manipulated by the human, cause the sample to be removed from the processing line and sent to a group of discarded samples. In another example, the human may determine that the sample is of a mediocre quality that should not be discarded, but also should not be grouped with top quality samples. In which case, the human would manually cause the sample to be moved to a group of mediocre samples. In yet another example, the human may determine that the sample is of top quality. In which case, the human would not cause the sample to be moved at all but would rather allow the sample to continue through the processing line to be grouped with all other top quality samples. The samples may be fruits, nuts, pills or any other type of item for which quality control is required.

This method requires a large amount of human attention and time. Moreover, this method of manual inspection and sorting is prone to human error, low quality accuracy, and low repeatability (inconsistent results).

Figure 31:
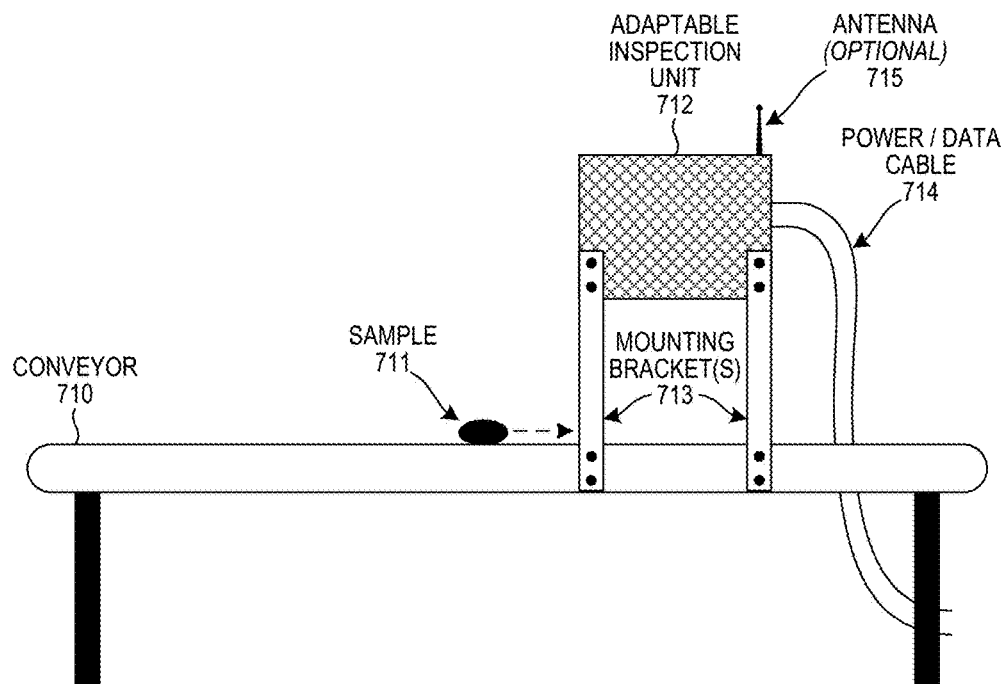
FIG. 31 is a diagram of a conveyor with an adaptable inspection unit attached to the conveyor.

FIG. 31 is a diagram of a conveyor with an adaptable inspection unit attached to the conveyor. Conveyor 710 is the same as conveyor 700, except in that adaptable inspection unit 712 has been physically mounted to conveyor 700. Similar to FIG. 30, in operation, sample 711 is caused to become in contact with conveyor 710. Upon contact, sample 711 is moved via a rotating conveyor belt of conveyor 710. The friction between the sample and the rotating conveyor belt causes the sample to be move along the direction of the conveyor belt movement.

The adaptable inspection unit 712 is attached to the conveyor 710 via one or more mounting brackets 713. One skilled in the art will readily realize that a various number of brackets and various styles of brackets can be used to mount the adaptable inspection unit 712 to conveyor 710. Mounting Bracket 713 can attach to either the adaptable inspection unit 712 or the conveyor 710 using various items, such as bolts, screws, pins, locks, clamps, welds (metals or thermoplastics), adhesive, slots, magnets, rails, gravity or friction.

Figure 39:
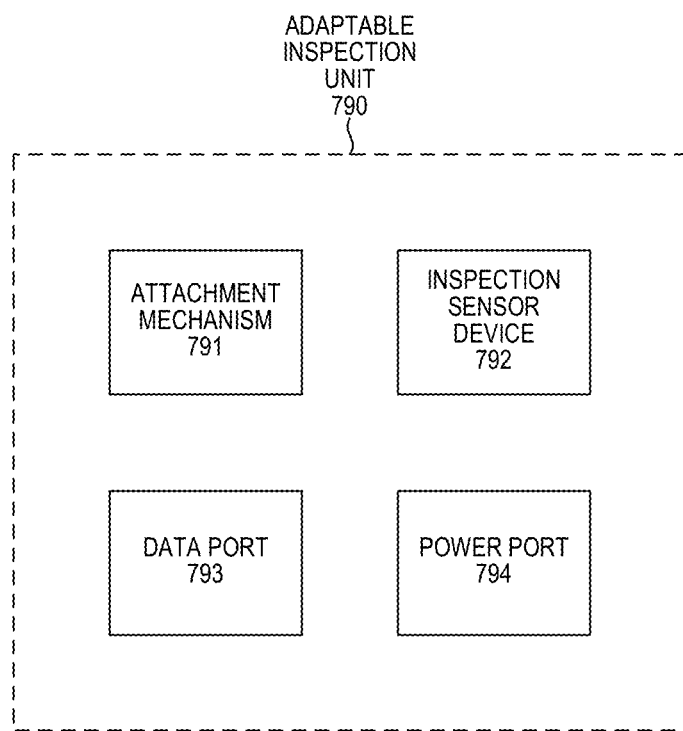
FIG. 39 is a block diagram of an adaptable inspection unit.

The adaptable inspection unit 712 includes an attachment mechanism, an inspection sensor device (optical receiver), a data port and a power port. The data port and the power port may be combined into a single physical port that connects to a single cable 714 that includes both power conductors and data conductors. Alternatively, the adaptable inspection unit 712 may include a data port that is separate from the power port. Further, the adaptable inspection unit 712 may include an antenna connectable data port that connects to an antenna 715 so to allow for wireless communication. FIG. 31 does not illustrate the inspection sensor device. FIG. 39 illustrates a block diagram of an adaptable inspection unit 790 that includes an attachment mechanism 791, an inspection sensor device 792, a data port 793, and a power port 794.

In operation, the conveyor 710 causes the sample 711 to travel under the adaptable inspection unit 712. While the sample is in view of the inspection sensor device that is included in the adaptable inspection unit 712 one or more images of the sample are captured and stored in a memory device. The memory device may be included in the adaptable inspection unit 712 or may be included in a device that communicates with the adaptable inspection unit 712 via the data port (wired or wireless). The captured sensor data (e.g., images) are then processed by a processor executing a quality inspection algorithm. In one example, the adaptable inspection unit 712 includes the 3D inspector described in detail above. In another example, a 3D image of the sample is generated based on the one or more images captured by the adaptable inspection unit 712. In yet another example, the captured 2D image is used to perform the inspection. The 3D or 2D image(s) are used to determine a quality characteristic of the sample. In one example, the quality characteristic is generated by the adaptable inspection unit 712 and output via the data port. In another example, the one or more captured images are output from the adaptable inspection unit 712 to another device that determines the quality characteristics of the sample. Adaptable inspection unit 712 provides improve quality inspection compared to unreliable inspection by human eyes without the cost of replacing an entire processing line. Moreover, adaptable inspection unit 712 is able to inspect many more samples per unit time than could be inspected by a human.

In the example of FIG. 31, all samples are directed toward the same location regardless of measured quality because there is no sorting functionality attached to the conveyor 710.

Figure 32:
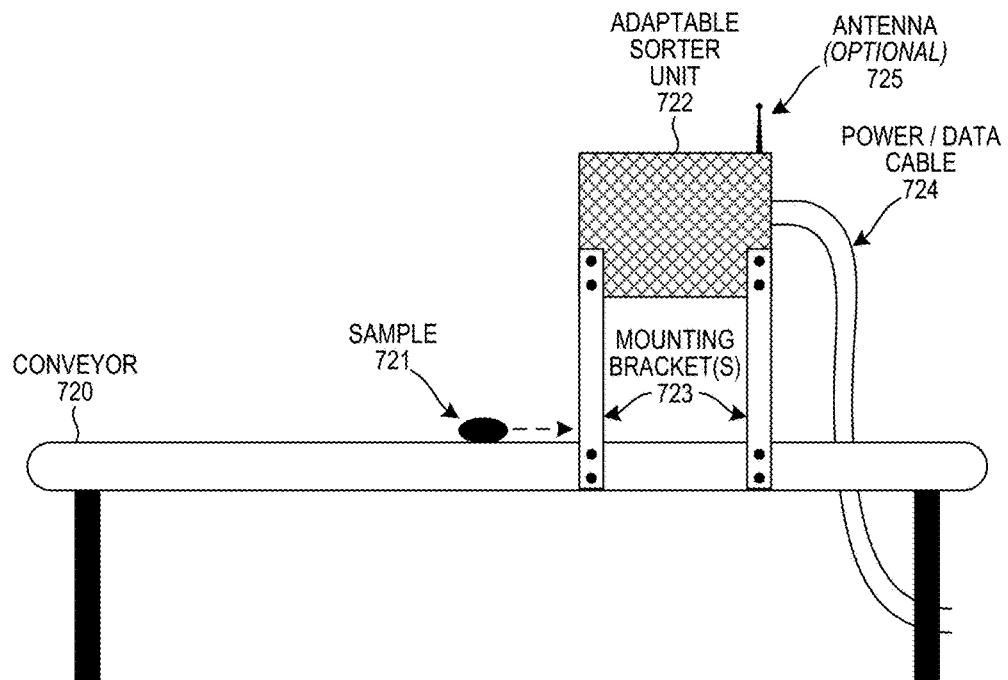
FIG. 32 is a diagram of a conveyor with an adaptable sorting unit attached to the conveyor.

FIG. 32 is a diagram of a conveyor with an adaptable sorting unit attached to the conveyor. Conveyor 720 is the same as conveyor 700, except in that adaptable sorter unit 722 has been physically mounted to conveyor 720. Similar to FIG. 30, in operation, sample 721 is caused to become in contact with conveyor 720. Upon contact, sample 721 is moved via a rotating conveyor belt of conveyor 720. The friction between the sample and the rotating conveyor belt causes the sample to be move along the direction of the conveyor belt movement.

The adaptable sorter unit 722 is attached to the conveyor 720 via one or more mounting brackets 723. One skilled in the art will readily realize that a various number of brackets and various styles of brackets can be used to mount the adaptable sorter unit 722 to conveyor 720. Mounting Bracket 723 can attach to either the adaptable sorter unit 722 or the conveyor 720 using various items, such as bolts, screws, pins, locks, clamps, welds (metals or thermoplastics), adhesive, slots, magnets, rails, gravity, or friction.

Figure 40:
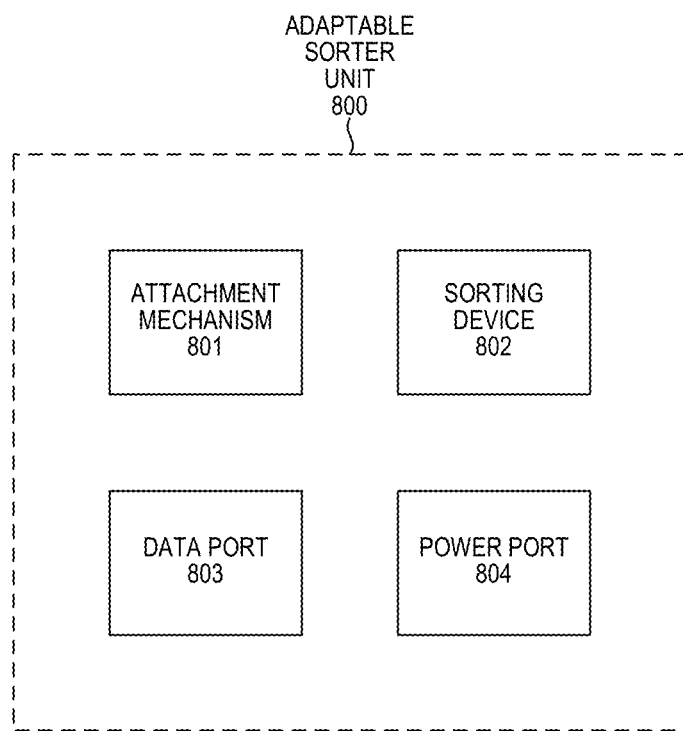
FIG. 40 is a block diagram of an adaptable sorter unit.

The adaptable sorter unit 722 includes an attachment mechanism, a sorting device capable of deflecting a sample, a data port, and a power port. The data port and the power port may be combined into a single physical port that connects to a single cable 724 that includes both power conductors and data conductors. Alternatively, the adaptable sorter unit 722 may include a data port that is separate from the power port. Further, the adaptable sorter unit 722 may include an antenna connectable data port that connects to an antenna 725 so to allow for wireless communication. FIG. 32 does not illustrate the sorting device. FIG. 40 illustrates a block diagram of an adaptable sorter unit 800 that includes an attachment mechanism 801, a sorting device 802, a data port 803, and a power port 804.

In operation, the conveyor 720 causes the sample 721 to travel under the adaptable sorter unit 722. While the sample is in reach of the sorting device that is included in the adaptable sorter unit 722 the sample is sorted as instructed. In one example, the sorting instruction is received via the data port and stored in a memory included in the adaptable sorting unit 722. In another example, quality characteristic data is received via the data port and in response the adaptable sorter unit 722 generates the sorting instruction. In yet another example, the information received via the data port is a percentage of samples to be deflected. Communication with the adaptable sorter unit 722 may be performed via the data port (wired or wireless). The sorting device may be by a vacuum system, a mechanical pedal system, an air jet system, or a mechanical gate. The adaptable sorting unit 722 performs automated sorting so that high quality samples are automatically separated from low quality samples.

Adaptable sorter unit 722 provides improve sorting compared to unreliable sorting by human hands without the cost of replacing an entire processing line. Moreover, adaptable sorter unit 722 is able to sort many more samples per unit time than could be sorted by a human.

Figure 33:
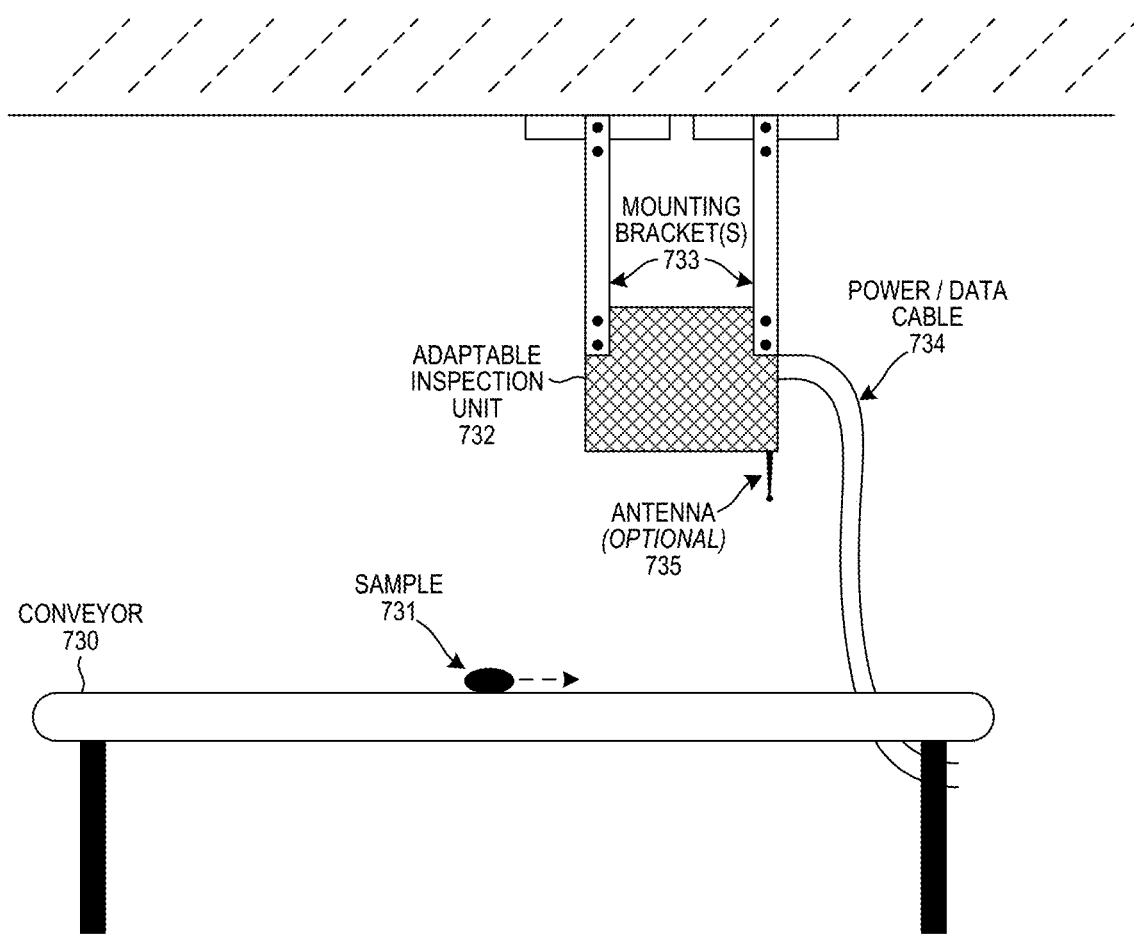
FIG. 33 is a diagram of a conveyor with an adaptable inspection unit attached to the ceiling above the conveyor.

FIG. 33 is a diagram of a conveyor with an adaptable inspection unit attached to the ceiling above the conveyor. Conveyor 730 is the same as conveyor 700, except in that adaptable inspection unit 732 has been physically mounted to the ceiling above conveyor 730. Similar to FIG. 30, in operation, sample 731 is caused to become in contact with conveyor 730. Upon contact, sample 731 is moved via a rotating conveyor belt of conveyor 730. The friction between the sample and the rotating conveyor belt causes the sample to be move along the direction of the conveyor belt movement.

The adaptable inspection unit 732 is attached to the ceiling above conveyor 730 via one or more mounting brackets 733. One skilled in the art will readily realize that a various number of brackets and various styles of brackets can be used to mount the adaptable inspection unit 732 to the ceiling above conveyor 730. Mounting Bracket 733 can attach to either the adaptable inspection unit 712 or the ceiling above conveyor 730 using various items, such as bolts, screws, pins, locks, clamps, welds (metals or thermoplastics), adhesive, slots, magnets, rails, gravity, or friction.

The adaptable inspection unit 732 includes an attachment mechanism, an inspection sensor device (optical receiver), a data port and a power port. The data port and the power port may be combined into a single physical port that connects to a single cable 734 that includes both power conductors and data conductors. Alternatively, the adaptable inspection unit 732 may include a data port that is separate from the power port. Further, the adaptable inspection unit 732 may include an antenna connectable data port that connects to an antenna 735 so to allow for wireless communication. FIG. 33 does not illustrate the inspection sensor device. FIG. 39 illustrates a block diagram of an adaptable inspection unit 790 that includes an attachment mechanism 791, an inspection sensor device 792, a data port 793, and a power port 794.

In operation, the conveyor 730 causes the sample 731 to travel under the adaptable inspection unit 732. While the sample is in view, or reach, of the inspection sensor device that is included in the adaptable inspection unit 732 one or more characteristics and/or images of the sample are captured and stored in a memory device. The memory device may be included in the adaptable inspection unit 732 or may be included in a device that communicates with the adaptable inspection unit 732 via the data port (wired or wireless). The captured characteristics and/or image(s) are then processed by a processor executing a quality inspection algorithm. In one example, the adaptable inspection unit 732 includes the 3D inspector described in detail above. In another example, a 3D image of the sample is generated based on the one or more images captured by the adaptable inspection unit 732. In yet another example, the captured 2D image is used to perform the inspection. The 3D and/or 2D image(s) are used to determine a quality characteristic of the sample. In one example, the quality characteristic is generated by the adaptable inspection unit 732 and output via the data port. In another example, the one or more captured images are output from the adaptable inspection unit 732 to another device that determines the quality characteristics of the sample. Adaptable inspection unit 732 provides improve quality inspection compared to unreliable inspection by human eyes without the cost of replacing an entire processing line. Moreover, adaptable inspection unit 732 is able to inspect many more samples per unit time than could be inspected by a human.

In the example of FIG. 33, all samples are directed toward the same location regardless of measured quality because there is no sorting functionality attached to the conveyor 730.

Figure 34:
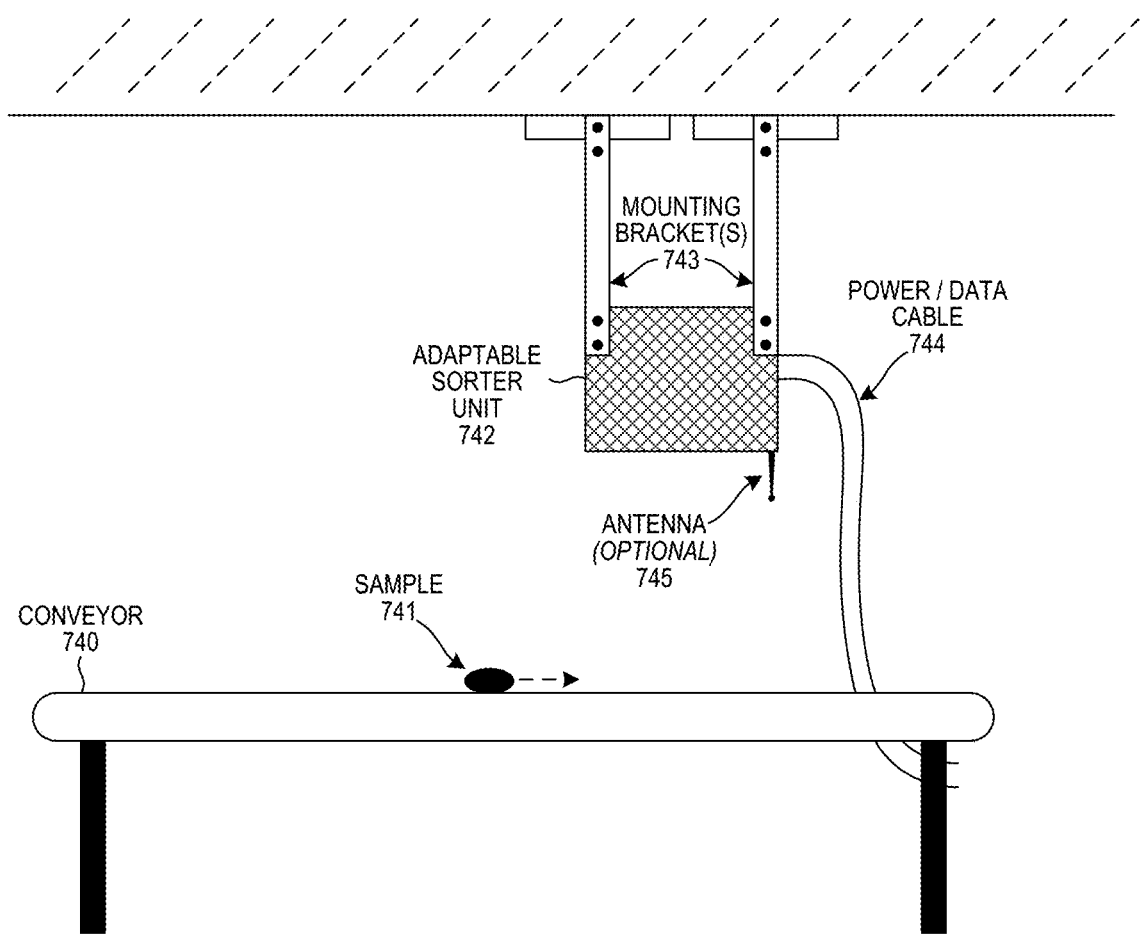
FIG. 34 is a diagram of a conveyor with an adaptable sorting unit attached to a ceiling above the conveyor.

FIG. 34 is a diagram of a conveyor with an adaptable sorting unit attached to a ceiling above the conveyor. Conveyor 740 is the same as conveyor 700, except in that adaptable sorter unit 742 has been physically mounted to the ceiling above conveyor 740. Similar to FIG. 30, in operation, sample 741 is caused to become in contact with conveyor 740. Upon contact, sample 741 is moved via a rotating conveyor belt of conveyor 740. The friction between the sample and the rotating conveyor belt causes the sample to be move along the direction of the conveyor belt movement.

The adaptable sorter unit 742 is attached to the ceiling above conveyor 740 via one or more mounting brackets 743. One skilled in the art will readily realize that a various number of brackets and various styles of brackets can be used to mount the adaptable sorter unit 742 to the ceiling above conveyor 740. Mounting Bracket 743 can attach to either the adaptable sorter unit 742 or the ceiling above conveyor 740 using various items, such as bolts, screws, pins, locks, clamps, welds (metals or thermoplastics), adhesive, slots, magnets, rails, gravity, or friction.

The adaptable sorter unit 742 includes an attachment mechanism, a sorting device capable of deflecting a sample, a data port, and a power port. The data port and the power port may be combined into a single physical port that connects to a single cable 744 that includes both power conductors and data conductors. Alternatively, the adaptable sorter unit 742 may include a data port that is separate from the power port. Further, the adaptable sorter unit 742 may include an antenna connectable data port that connects to an antenna 745 so to allow for wireless communication. FIG. 34 does not illustrate the sorting device. FIG. 40 illustrates a block diagram of an adaptable sorter unit 800 that includes an attachment mechanism 801, a sorting device 802, a data port 803, and a power port 804.

In operation, the conveyor 740 causes the sample 741 to travel under the adaptable sorter unit 742. While the sample is in reach of the sorting device that is included in the adaptable sorter unit 742 the sample is sorted as instructed. In one example, the sorting instruction is received via the data port and stored in a memory included in the adaptable sorting unit 742. In another example, quality characteristic data is received via the data port and in response the adaptable sorter unit 742 generates the sorting instruction. In yet another example, the information received via the data port is a percentage of samples to be deflected. Communication with the adaptable sorter unit 742 may be performed via the data port (wired or wireless). The sorting device may be a vacuum system, a mechanical pedal system, an air jet system, or a mechanical gate. The adaptable sorting unit 742 performs automated sorting so that high quality samples are automatically separated from low quality samples.

Adaptable sorter unit 742 provides improve sorting compared to unreliable sorting by human hands without the cost of replacing an entire processing line. Moreover, adaptable sorter unit 742 is able to sort many more samples per unit time than could be sorted by a human.

Figure 35:
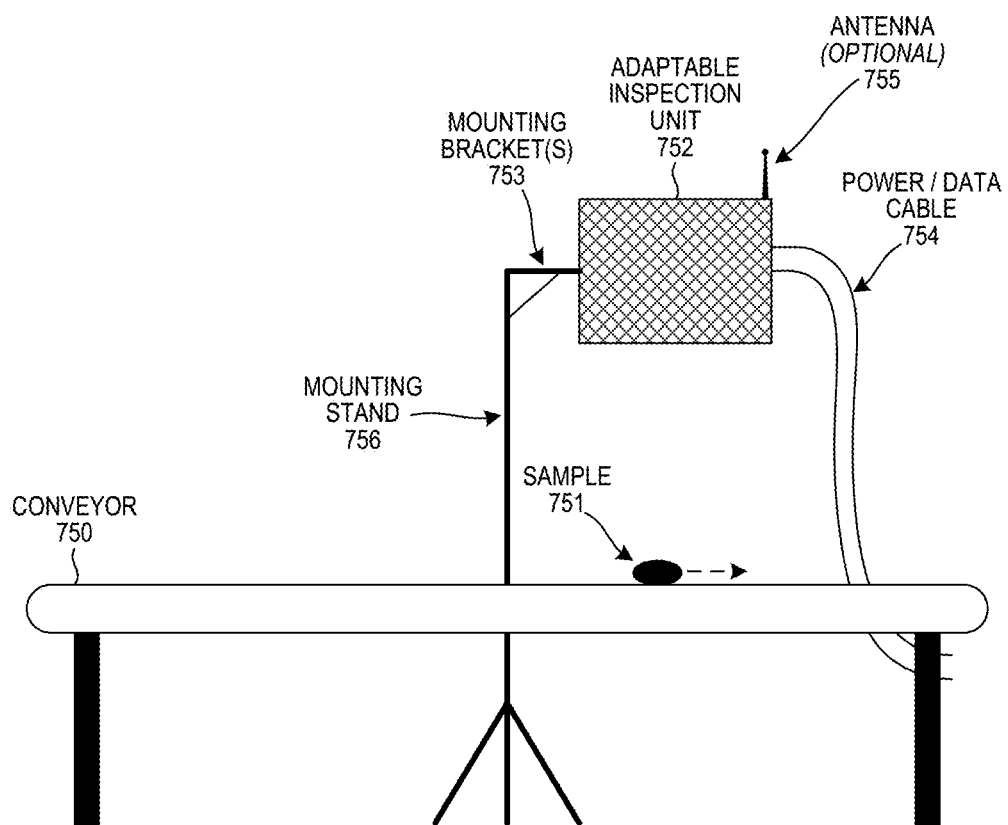
FIG. 35 is a diagram of a conveyor with an adaptable inspection unit attached to a mounting stand.

FIG. 35 is a diagram of a conveyor with an adaptable inspection unit attached to a mounting stand. Conveyor 750 is the same as conveyor 700, except in that adaptable inspection unit 752 has been physically mounted to a mounting stand 756 located next to conveyor 750. Similar to FIG. 30, in operation, sample 751 is caused to become in contact with conveyor 750. Upon contact, sample 751 is moved via a rotating conveyor belt of conveyor 750. The friction between the sample and the rotating conveyor belt causes the sample to be move along the direction of the conveyor belt movement.

The adaptable inspection unit 752 is attached to the mounting stand 756, located next to conveyor 750, via one or more mounting brackets 753. One skilled in the art will readily realize that a various number of brackets and various styles of brackets can be used to mount the adaptable inspection unit 752 to the mounting stand 756. Mounting Bracket 753 can attach to either the adaptable inspection unit 752 or the mounting stand 756 using various items, such as bolts, screws, pins, locks, clamps, welds (metals or thermoplastics), adhesive, slots, magnets, rails, gravity, or friction.

The adaptable inspection unit 752 includes an attachment mechanism, an inspection sensor device (e.g., optical receiver), a data port and a power port. The data port and the power port may be combined into a single physical port that connects to a single cable 754 that includes both power conductors and data conductors. Alternatively, the adaptable inspection unit 752 may include a data port that is separate from the power port. Further, the adaptable inspection unit 752 may include an antenna connectable data port that connects to an antenna 755 so to allow for wireless communication. FIG. 35 does not illustrate the inspection sensor device. FIG. 39 illustrates a block diagram of an adaptable inspection unit 790 that includes an attachment mechanism 791, an inspection sensor device 792, a data port 793, and a power port 794.

In operation, the conveyor 750 causes the sample 751 to travel under the adaptable inspection unit 752. While the sample is in view, or reach, of the inspection sensor device that is included in the adaptable inspection unit 752 one or more characteristics and/or images of the sample are captured and stored in a memory device. The memory device may be included in the adaptable inspection unit 752 or may be included in a device that communicates with the adaptable inspection unit 752 via the data port (wired or wireless). The captured characteristics and/or image(s) are then processed by a processor executing a quality inspection algorithm. In one example, the adaptable inspection unit 752 includes the 3D inspector described in detail above. In another example, a 3D image of the sample is generated based on the one or more images captured by the adaptable inspection unit 752. In yet another example, the captured 2D image is used to perform the inspection. The 3D and/or 2D image(s) are used to determine a quality characteristic of the sample. In one example, the quality characteristic is generated by the adaptable inspection unit 752 and output via the data port. In another example, the one or more captured images are output from the adaptable inspection unit 752 to another device that determines the quality characteristics of the sample. Adaptable inspection unit 752 provides improve quality inspection compared to unreliable inspection by human eyes without the cost of replacing an entire processing line. Moreover, adaptable inspection unit 752 is able to inspect many more samples per unit time than could be inspected by a human.

In the example of FIG. 35, all samples are directed toward the same location regardless of measured quality because there is no sorting functionality attached to the conveyor 750.

Figure 36:
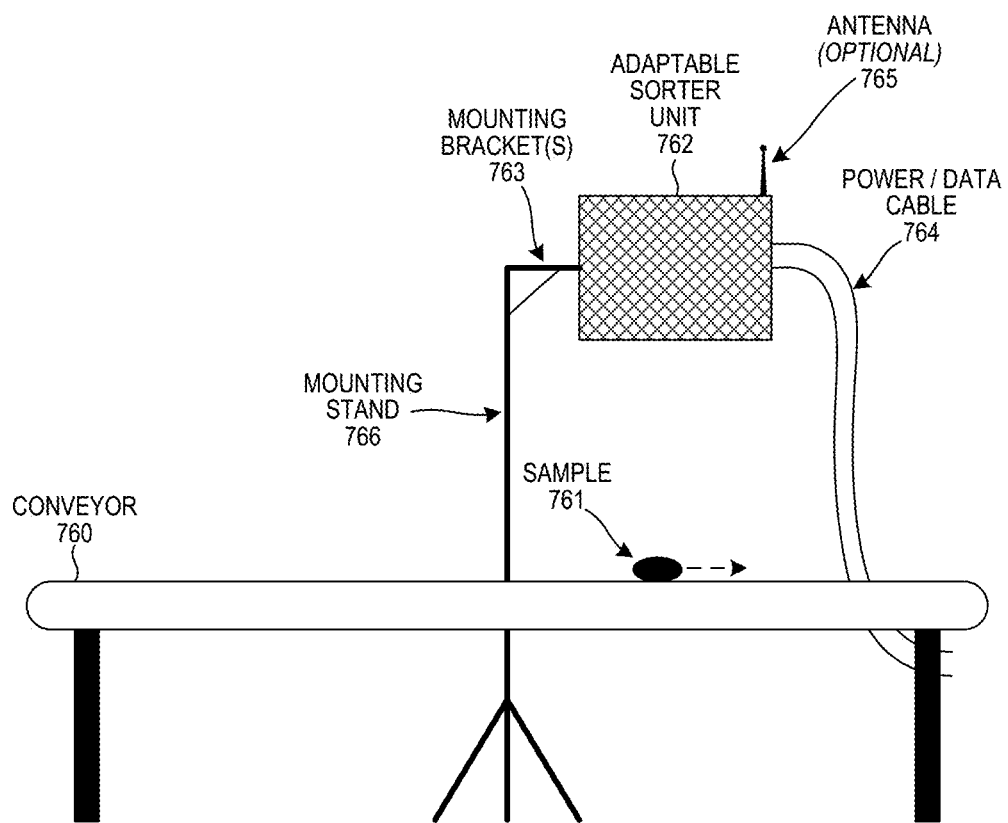
FIG. 36 is a diagram of a conveyor with an adaptable sorting unit attached to a mounting stand.

FIG. 36 is a diagram of a conveyor with an adaptable sorting unit attached to a mounting stand. Conveyor 760 is the same as conveyor 700, except in that adaptable sorter unit 762 has been physically mounted to a mounting stand 766 located next to conveyor 760. Similar to FIG. 30, in operation, sample 761 is caused to become in contact with conveyor 760. Upon contact, sample 761 is moved via a rotating conveyor belt of conveyor 760. The friction between the sample and the rotating conveyor belt causes the sample to be move along the direction of the conveyor belt movement.

The adaptable sorter unit 762 is attached to the mounting stand 766, located next to conveyor 760, via one or more mounting brackets 763. One skilled in the art will readily realize that a various number of brackets and various styles of brackets can be used to mount the adaptable sorter unit 762 to the mounting stand 766. Mounting Bracket 763 can attach to either the adaptable sorter unit 762 or the mounting stand 766 using various items, such as bolts, screws, pins, locks, clamps, welds (metals or thermoplastics), adhesive, slots, magnets, rails, gravity, or friction.

The adaptable sorter unit 762 includes an attachment mechanism, a sorting device capable of deflecting a sample, a data port, and a power port. The data port and the power port may be combined into a single physical port that connects to a single cable 764 that includes both power conductors and data conductors. Alternatively, the adaptable sorter unit 762 may include a data port that is separate from the power port. Further, the adaptable sorter unit 762 may include an antenna connectable data port that connects to an antenna 765 so to allow for wireless communication. FIG. 36 does not illustrate the sorting device. FIG. 40 illustrates a block diagram of an adaptable sorter unit 800 that includes an attachment mechanism 801, a sorting device 802, a data port 803, and a power port 804.

In operation, the conveyor 760 causes the sample 761 to travel under the adaptable sorter unit 762. While the sample is in reach of the sorting device that is included in the adaptable sorter unit 762 the sample is sorted as instructed. In one example, the sorting instruction is received via the data port and stored in a memory included in the adaptable sorting unit 762. In another example, quality characteristic data is received via the data port and in response the adaptable sorter unit 762 generates the sorting instruction. In yet another example, the information received via the data port is a percentage of samples to be deflected. Communication with the adaptable sorter unit 762 may be performed via the data port (wired or wireless). The sorting device may be a vacuum system, a mechanical pedal system, an air jet system, or a mechanical gate. The adaptable sorting unit 762 performs automated sorting so that high quality samples are automatically separated from low quality samples.

Adaptable sorter unit 762 provides improve sorting compared to unreliable sorting by human hands without the cost of replacing an entire processing line. Moreover, adaptable sorter unit 762 is able to sort many more samples per unit time than could be sorted by a human.

Figure 37:
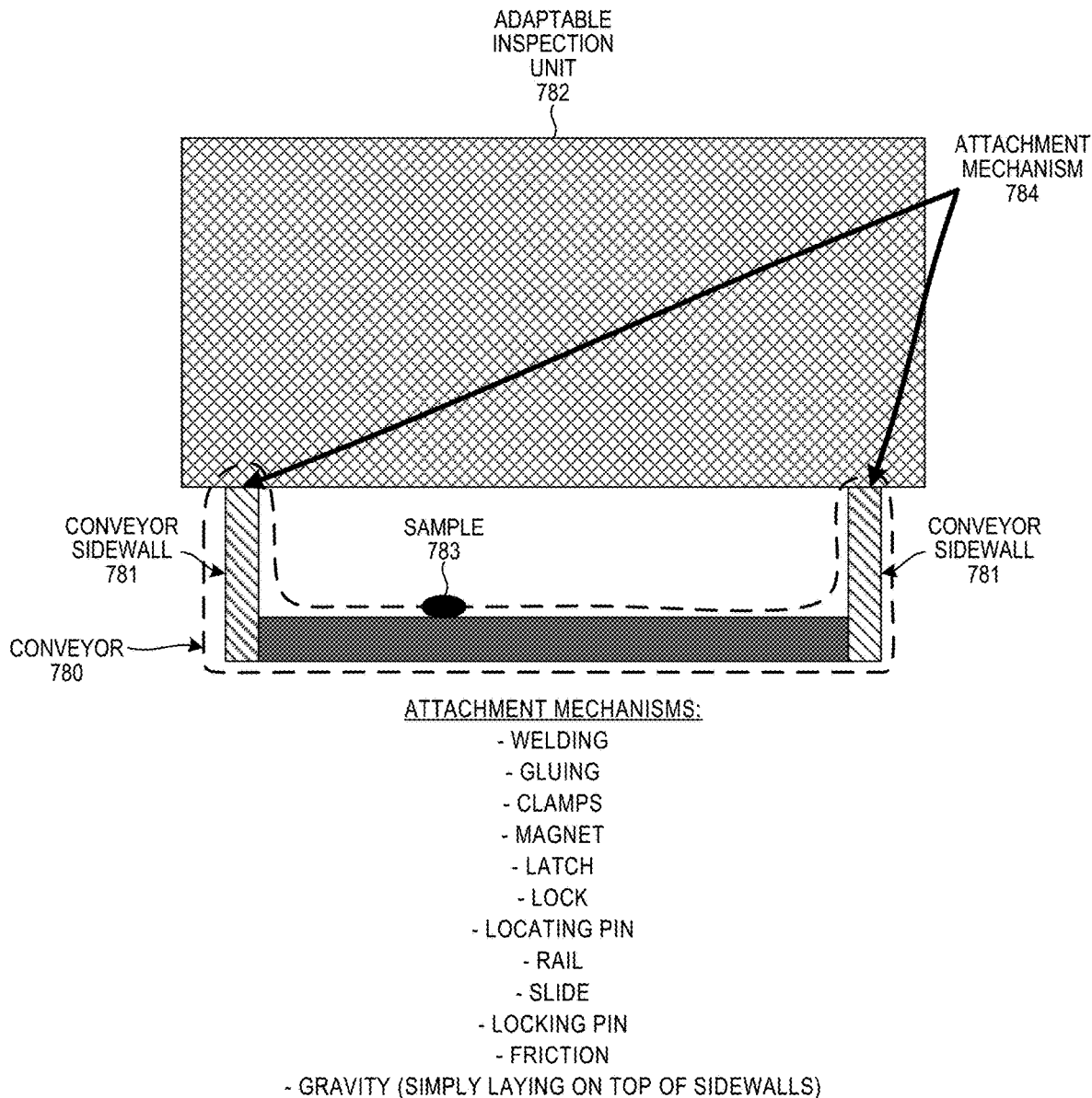
FIG. 37 is a diagram of a conveyor with an adaptable inspection unit attached to the conveyor sidewall. The adaptable inspection unit can be attached permanently or temporarily to the conveyor sidewall.

FIG. 37 is a diagram of a conveyor with an adaptable inspection unit attached to the conveyor sidewall. The adaptable inspection unit can be attached permanently or temporarily to the conveyor sidewall. Conveyor 780 includes one or more sidewalls 781 and a belt that rotates about two or more pulleys. The sidewall 781 is included in the conveyor 780 so to prevent samples from fall off the sides of the conveyor 780. The sidewall 781 of the conveyor 780 can be used to support the adaptable inspection unit 782. Although not shown in FIG. 37, the sidewall 781 can also be used to mount an adaptable sorter unit.

The adaptable inspection unit 782 (or an adaptable sorter unit) can be attached using many different mechanisms. Some of these mechanisms are listed on FIG. 37. These attachment mechanisms include welding the adaptable inspection unit 782 to the conveyor sidewall 781, gluing the adaptable inspection unit 782 to the conveyor sidewall 781, clamping the adaptable inspection unit 782 to the conveyor sidewall 781, magnetically attracting the adaptable inspection unit 782 to the conveyor sidewall 781, latching the adaptable inspection unit 782 to the conveyor sidewall 781, locking the adaptable inspection unit 782 to the conveyor sidewall 781, location pinning the adaptable inspection unit 782 to the conveyor sidewall 781, rail mating the adaptable inspection unit 782 to the conveyor sidewall 781, slide fitting the adaptable inspection unit 782 to the conveyor sidewall 781, lock pinning the adaptable inspection unit 782 to the conveyor sidewall 781, or using gravity and friction to "attach" the adaptable inspection unit 782 to the conveyor sidewall 781.

The adaptable inspection unit 782 includes an attachment mechanism, an inspection sensor device (e.g., an optical receiver), a data port and a power port. The data port and the power port may be combined into a single physical port that connects to a single cable 784 that includes both power conductors and data conductors. Alternatively, the adaptable inspection unit 782 may include a data port that is separate from the power port. Further, the adaptable inspection unit 782 may include an antenna connectable data port that connects to an antenna 785 so to allow for wireless communication. FIG. 37 does not illustrate the inspection sensor device. FIG. 39 illustrates a block diagram of an adaptable inspection unit 790 that includes an attachment mechanism 791, an inspection sensor device 792, a data port 793, and a power port 794.

In operation, the conveyor 780 causes the sample 781 to travel under the adaptable inspection unit 782. While the sample is in view, or reach, of the inspection sensor device that is included in the adaptable inspection unit 782 one or more characteristics and/or images of the sample are captured and stored in a memory device. The memory device may be included in the adaptable inspection unit 782 or may be included in a device that communicates with the adaptable inspection unit 782 via the data port (wired or wireless). The captured characteristics and/or image(s) are then processed by a processor executing a quality inspection algorithm. In one example, the adaptable inspection unit 782 includes the 3D inspector described in detail above. In another example, a 3D image of the sample is generated based on the one or more images captured by the adaptable inspection unit 782. In yet another example, the captured 2D image is used to perform the inspection. The 3D and/or 2D image(s) are used to determine a quality characteristic of the sample. In one example, the quality characteristic is generated by the adaptable inspection unit 782 and output via the data port. In another example, the one or more captured images are output from the adaptable inspection unit 782 to another device that determines the quality characteristics of the sample. Adaptable inspection unit 782 provides improve quality inspection compared to unreliable inspection by human eyes without the cost of replacing an entire processing line. Moreover, adaptable inspection unit 782 is able to inspect many more samples per unit time than could be inspected by a human.

In the example of FIG. 37, all samples are directed toward the same location regardless of measured quality because there is no sorting functionality attached to the conveyor 780. However, an adaptable sorer unit as described above could be placed further down the conveyor 780 to provide sorting functionality as well as inspection functionality.

Figure 38:
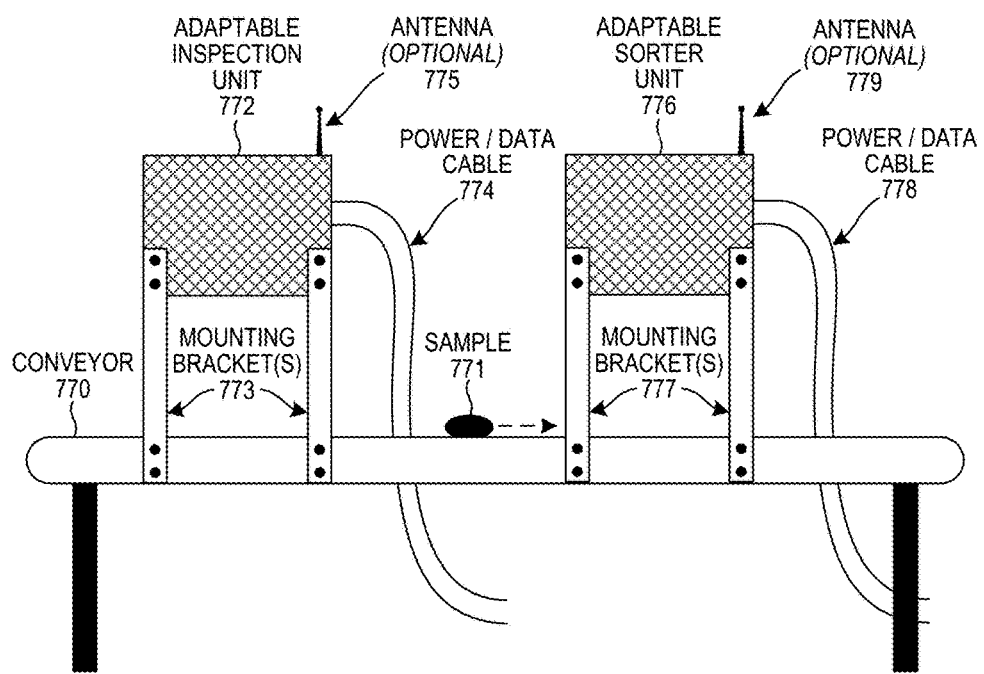
FIG. 38 is a diagram of a conveyor with an adaptable inspection unit attached to the conveyor and an adaptable sorting unit attached to the conveyor.

FIG. 38 is a diagram of a conveyor with an adaptable inspection unit attached to the conveyor and an adaptable sorting unit attached to the conveyor. As discussed above an adaptable inspection unit 772 and an adaptable sorter unit 776 can be mounted or positioned near an existing processing line. With these solutions, both an adaptable inspection unit 772 and an adaptable sorter unit 776 can be added to an existing processing line to allow for both automated quality inspection of samples as well as automated sorting of samples, without the cost of replacing the entire processing line. As discussed above, the adaptable inspection unit 772 and the adaptable sorter unit 776 can communicate with each other in various methods to achieve the desired inspection and sorting functions. Further, the adaptable inspection unit 772 and the adaptable sorter unit 776 can communicate with each in addition to a separate computing device, such as a network server to achieve the desired inspection and sorting functions. The drawings and related disclosure regarding FIGS. 14-27 illustrate and describe multiple methods in which the adaptable inspection unit 772 and the adaptable sorter unit 776 can communicate with each other in various methods to achieve the desired inspection and sorting functions (the adaptable inspection unit 772 performing the functions of the inspection device and the adaptable sorter unit 776 performing the functions of a slave device).

FIG. 39 is a block diagram of an adaptable inspection unit. The adaptable inspection unit 790 that includes an attachment mechanism 791, an inspection sensor device (optical receiver) 792, a data port 793, and a power port 794. The adaptable inspection unit 790 may also include a memory unit and a processor capable of controlling the inspection sensor device and writing information transmitted via the data port.

FIG. 40 is a block diagram of an adaptable sorter unit. The adaptable sorter unit 800 that includes an attachment mechanism 801, a sorting device 802, a data port 803, and a power port 804. The adaptable sorter unit 800 may also include a memory and a processor capable of reading information received via the data port and controlling the sorting device.

Figure 41:
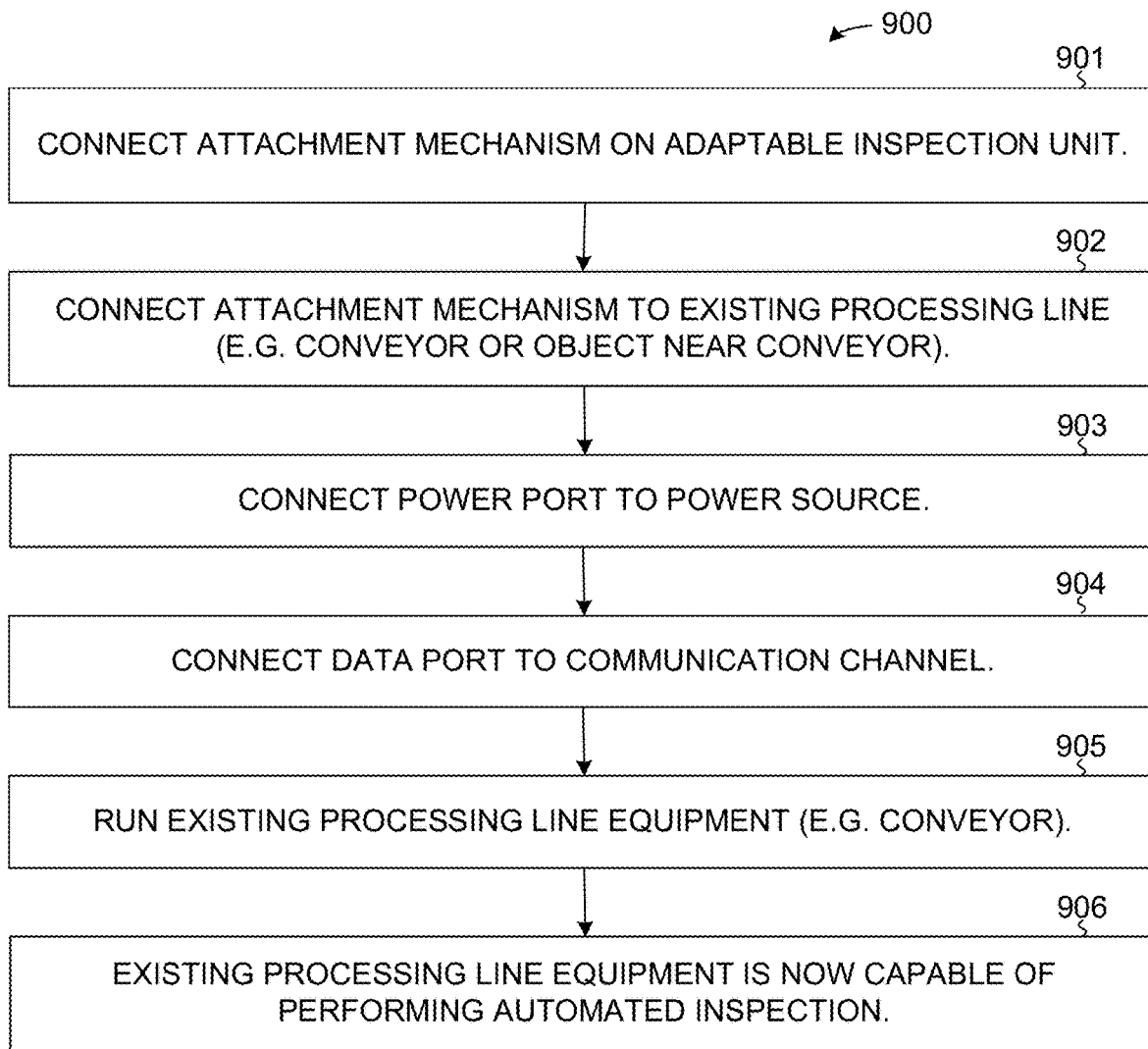
FIG. 41 is a flowchart illustrating the operations performed by an adaptable inspection unit.

FIG. 41 is a flowchart 900 illustrating the operations performed by an adaptable inspection unit. In step 901, an attachment mechanism is connected to the adaptable inspection unit. In step 902, the attachment mechanism is connected to the existing processing line. This can be a connection directly to the existing processing line or to an object near the existing processing line, such as a wall, ceiling, mounting stand, or conveyor sidewall. In step 903, a power port of the adaptable inspection unit is connected to a power source. In step 904, a data port of the adaptable inspection unit is connected to a data communication channel. The data communication channel can be a wired or wireless channel. In step 905, the existing processing line is run with the adaptable inspection unit in place and executing. In step 906, the existing processing line equipment is capable of performing automated inspection.

Figure 42:
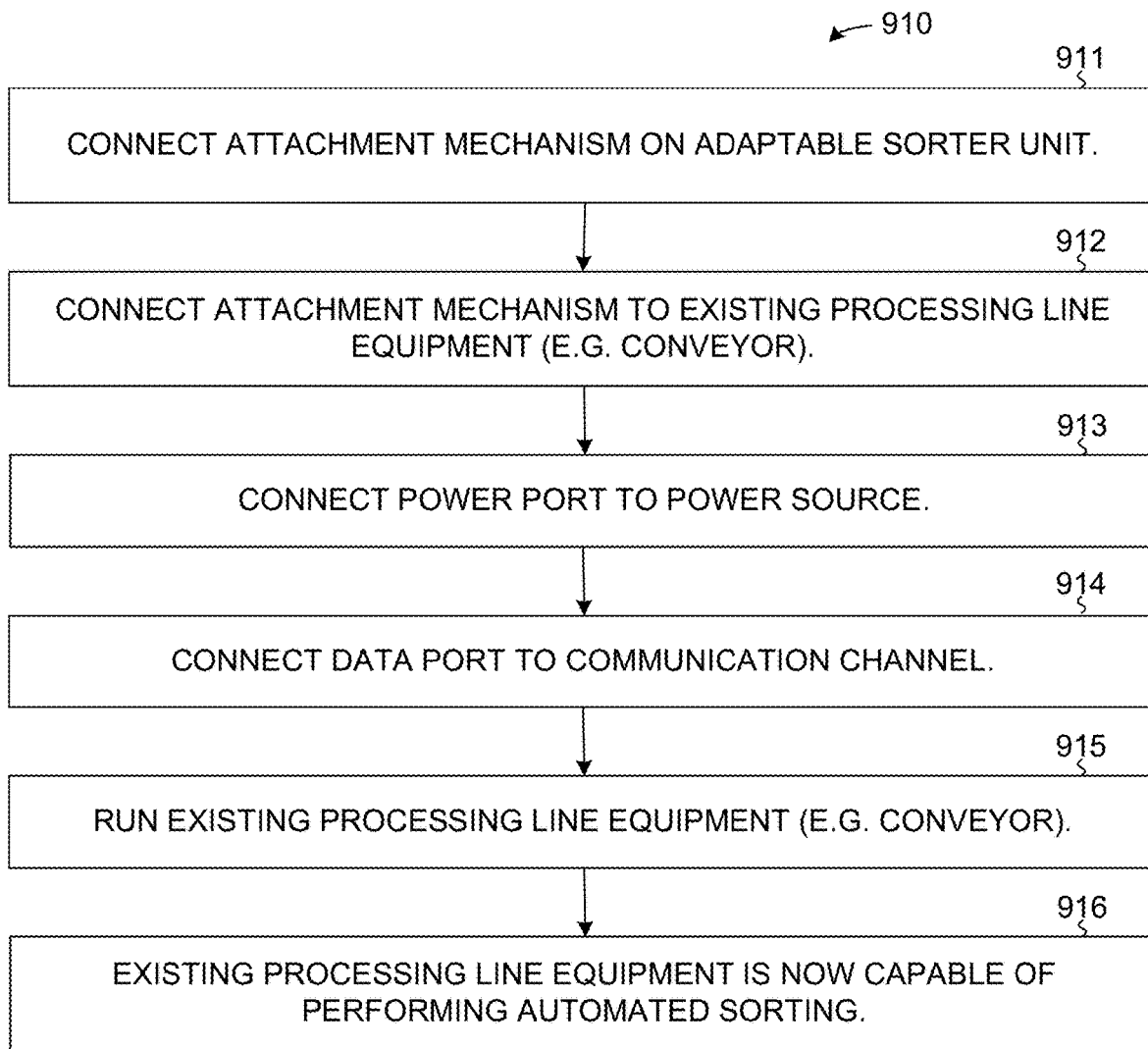
FIG. 42 is a flowchart illustrating the operations performed by an adaptable sorting unit.

FIG. 42 is a flowchart 910 illustrating the operations performed by an adaptable sorting unit. In step 911, an attachment mechanism is connected to the adaptable sorter unit. In step 912, the attachment mechanism is connected to the existing processing line. This can be a connection directly to the existing processing line or to an object near the existing processing line, such as a wall, ceiling, mounting stand, or conveyor sidewall. In step 913, a power port of the adaptable sorter unit is connected to a power source. In step 914, a data port of the adaptable sorter unit is connected to a data communication channel. The data communication channel can be a wired or wireless channel. In step 915, the existing processing line is run with the adaptable sorter unit in place and executing. In step 916, the existing processing line equipment is capable of performing automated sorting.

Given the new methods and apparatuses disclosed above, an existing processing line can be quickly and inexpensively retrofitted to perform automated inspection and automated sorting, which results in (i) improved inspection quality and reliability, (ii) improved sorting accuracy and reliability, (iii) improved throughput capability, and (iv) reduced operating costs.

The exemplary embodiments described above discuss adaptable inspection units and adaptable sorter units attached to a conveyor. However, one skilled in the art will readily appreciate that the adaptable inspection units and adaptable sorter units may also be attached to any other type of existing processing line, such as a chute in a similar manner to attain similar functionality and benefits.

Vacuum Adaptable Sorting Unit

As disclosed above, many different sorting methods may be implemented in an adaptable sorting unit. One of those sorting methods includes generating a vacuum that is applied to specific samples so to sort them out from a group of samples.

Vacuum sorting is desirable due to its high level of performance and controllability. However, the presence of a vacuum source in sorting facilities is rare. Moreover, installation of vacuum systems in sorting facilities is prohibitively expensive. Therefore, implementation of a vacuum sorting system has been economically infeasible.

While vacuum sources are rare in sorting facilities, pressurized air systems are often present in sorting facilities. If one we able to create a vacuum sorting unit utilizing a pressurized air system, then implementation of a vacuum sorting system would not be prohibitively expensive. A solution for implementing a vacuum sorting unit using a pressurized air system is disclosed herein.

Figure 43:
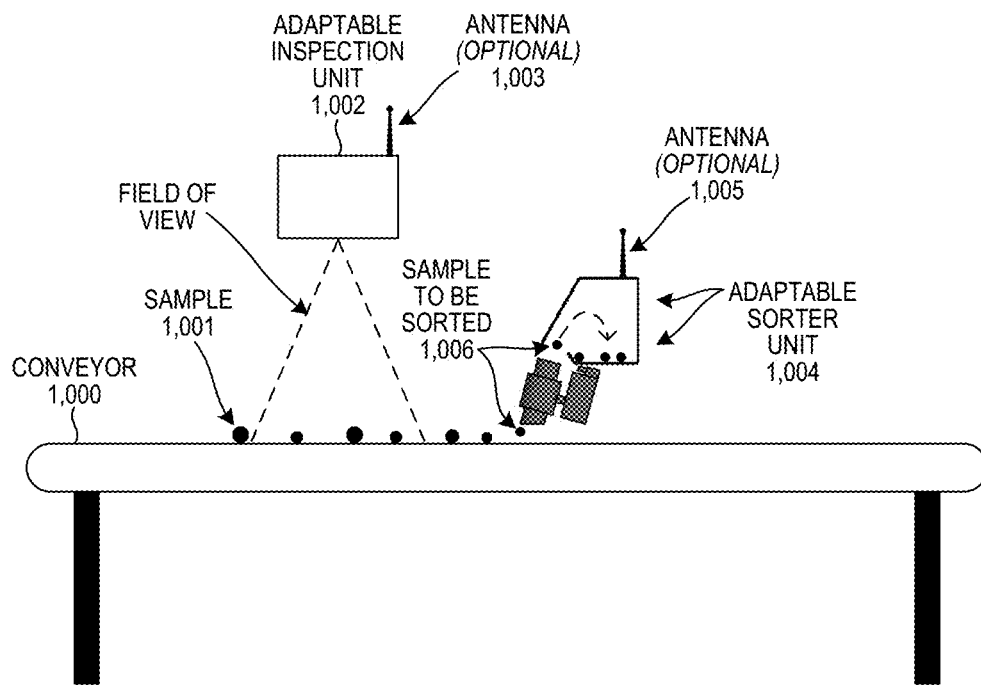
FIG. 43 is a diagram of an adaptable inspection unit and vacuum adaptable sorter unit that utilizes pressurized air.

An exemplary setup is illustrated in FIG. 43. A conveyor 1,000 is used to propel samples from left to right. An adaptable inspection unit 1,002 is used to capture one or more images of the samples as they within the field of view of the adaptable inspection unit 1,002. In one example, the adaptable inspection unit is an optical inspector. Each of the images is processed to determine the location of each sample on the conveyor and whether or not each sample should be sorted. If the decision is that a sample should be sorted, then the location and timing of the vacuum application to the sample is calculated. When the sample is located within the vacuum suction area of adaptable sorting unit 1,004, the vacuum is activated and the sample to be sorted 1,006 is sucked into the adaptable sorting unit 1,004.

The inspection of the one or more images acquired by the adaptable inspection unit 1,002 are stored in a memory and processed by a processor. The location and timing of the vacuum application to the sample is calculated by the processor. In one example, the memory and processor are included in adaptable inspection unit 1,002. In another example, the one or more images acquired by the adaptable inspection unit 1,002 are communicated to a memory and processor located outside of the adaptable inspection unit 1,002. The adaptable inspection unit 1,002 includes a communication modem. The communication modem can be any communication modem well known in the art. In one example, the modem is a wired technology such as Ethernet. In another example, the modem is a wireless technology, such as WiFi or cellular (4G/5G) that utilizes antenna 1,003.

Control of the adaptable sorter unit 1,004 is performed, at least in part, by a processor and a memory. In one example, the processor and memory may be included in the adaptable sorter unit 1,004. In another example, the processor and memory are located outside of the adaptable sorter unit 1,004. The adaptable sorter unit 1,004 includes a communication modem. The communication modem can be any communication modem well known in the art. In one example, the modem is a wired technology such as Ethernet. In another example, the modem is a wireless technology, such as WiFi or cellular (4G/5G) that utilizes antenna 1,005.

Figure 44:
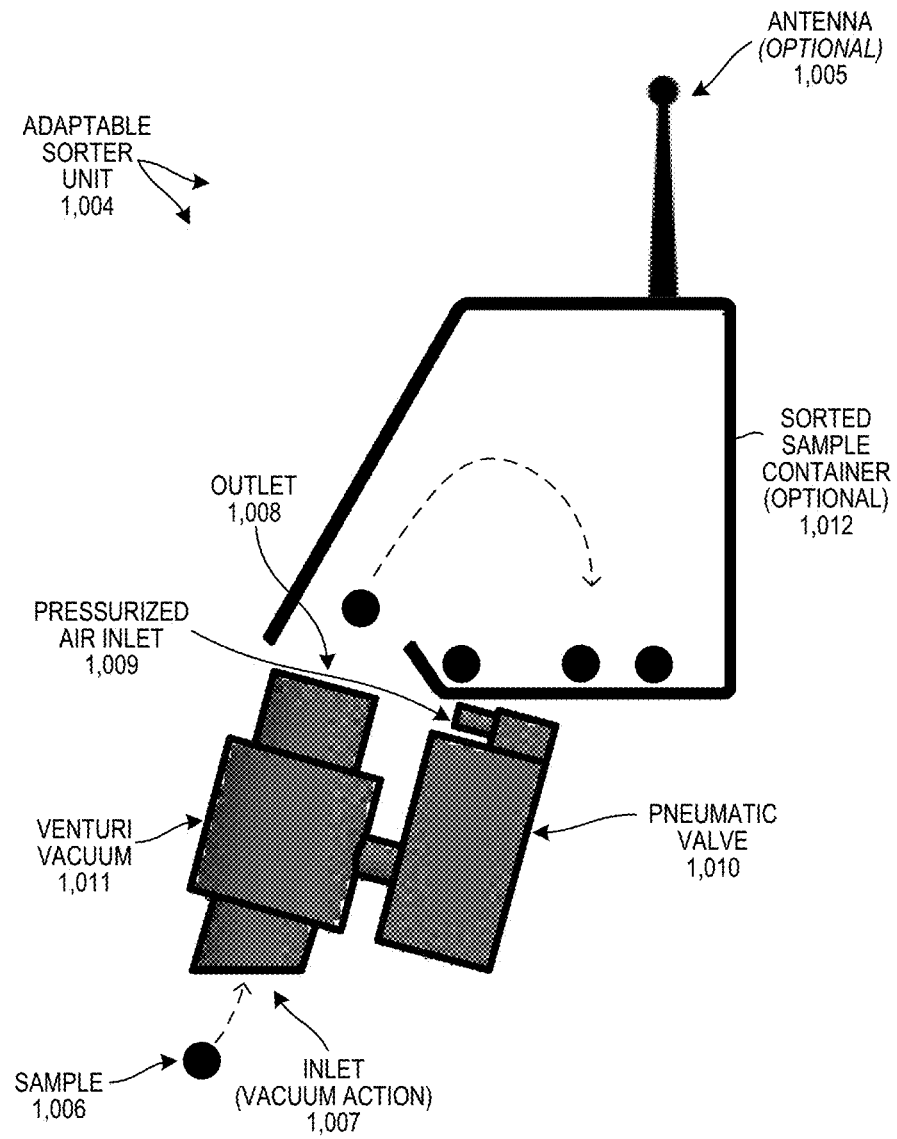
FIG. 44 is a side-view diagram of a vacuum adaptable sorter unit that utilizes pressurized air.

FIG. 44 is a more detailed diagram of the adaptable sorter unit 1,004. The adaptable sorter unit 1,004 includes a Venturi vacuum 1,001 and a pneumatic valve 1,010. Optionally, the adaptable sorter unit 1,004 may also include a sorted sample container 1,012 and an optional antenna 1,005 to allow wireless communication with the adaptable sorter unit. 1,004. The Venturi vacuum 1,011 includes an inlet 1,007 and an outlet 1,008. The pneumatic valve 1,010 includes a pressurized air inlet 1,009.

In operation, a pressurized air source is connected to the compressed air inlet 1,009 of pneumatic valve 1,010. The pneumatic valve 1,010 is controlled by an electrically controlled valve. When a first electric control signal is present on the pneumatic valve input terminal, the valve is closed. When a second electric control signal is present on the pneumatic valve input terminal, the valve is opened. In this fashion, the adaptable sorter unit 1,004 is engaged and disengaged.

In one example, the pneumatic valve includes a solenoid. The solenoid receives the electrical control signal which causes the solenoid to move inside the pneumatic valve so that the pneumatic air supplied through the compressed air inlet 1,010 can flow through the valve.

Figure 45:
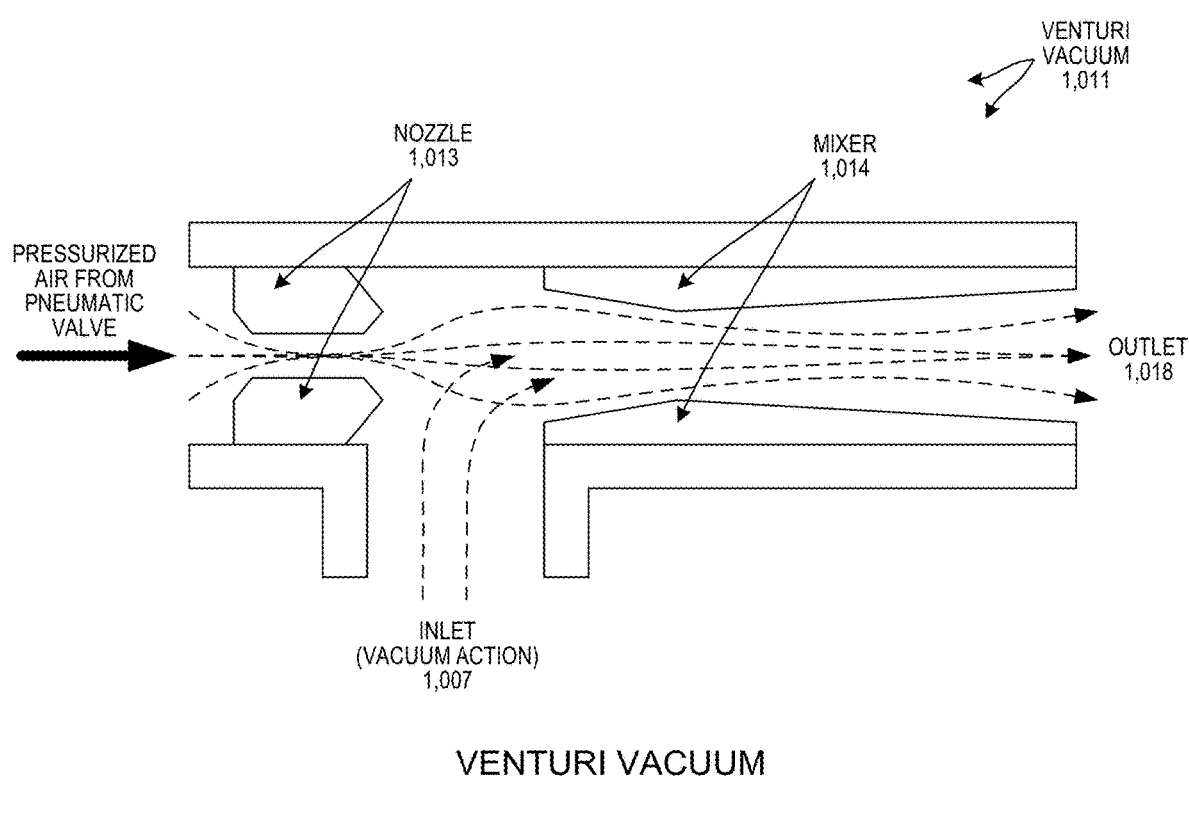
FIG. 45 is a diagram illustrating the operation of a Venturi vacuum. A

The output of the pneumatic valve 1,010 is connected to the pressurized air input of the Venturi vacuum 1,011. The Venturi vacuum 1,011 thereby creates a vacuum force at inlet 1,007 and an outward force at outlet 1,008. The operation of the Venturi vacuum 1,011 is illustrated in FIG. 45. It is noted that the illustration of FIG. 45 is only exemplary and is not required to implement the Venturi vacuum 1,011. Pressurize air is applied to the nozzle 1,013 where air stream carries along ambient air in its turbulence and then passes through the mixer 1,014 on its way out. This suction of ambient air creates a depression that generates the vacuum at inlet 1,007. The vacuum forces at inlet 1,007 can be set strong enough to suck up a sample of desired weight and size through the inlet 1,007 and out of the outlet 1,008.

Once the sample is output through the outlet 1,008, the sample may land in a sorted sample container 1,012 (optional). In this fashion, all the sorted samples can be stored and routed to desired bins of samples.

It is noted that the sorted sample container 1,012 can also be a bucket or container that is positioned on the side of the conveyor. In this case, they may be a chute or flex hose going from the outlet 1,008 into the bucket or container.

In another embodiment (not shown) a baseline vacuum control valve may be used in addition to the pneumatic valve disclosed above. Creating a vacuum, with the Venturi system in combination with the pneumatic valve, may take a large amount of time to generate the vacuum force necessary to sort a sample. In order to decrease that amount of time need to generate the necessary vacuum force, a baseline vacuum control valve can be added. The purpose of this baseline vacuum control valve is to prepare a baseline vacuum force that is not strong enough to move a sample but decreases the time necessary to increase the vacuum force to the level necessary to move a sample. In operation, as soon as the adaptable inspection unit captures an image of the sample, the baseline vacuum control valve will be actuated. As the baseline vacuum control valve will work on a lower incoming air pressure than the main pneumatic valve, it will create a baseline vacuum force. Samples will not be moved by this baseline vacuum force because of the low suction force.

Once the sample is within vacuum range, the main valve will open and the vacuum will build up for its maximum level and thereby move the sample. In this fashion, the baseline vacuum control valve is a preparation stage in which the vacuum is partially created (baseline vacuum force). The main valve is then only opened to quickly generate the full vacuum force necessary to move the sample.

In yet another embodiment, the pneumatic valve can be partially turned on by adjusting the frequency of the electrical control signal. In operation, when a sample to be sorted is detected, the frequency of the electrical control signal is sent to the pneumatic valve. The frequency is set so that over time the average amount of pressurized air let through the valve is less than the maximum amount of pressurized air that can pass through the valve when the valve is completely open over a long time period. The valve will switch on when the electrical control signal is high and off when the electrical control signal is low. If this occurs at fast enough rate, when seen over time, the effect is the same as if the valve were fixed at a partially open position. This would create a baseline vacuum force with a low air flow that is not strong enough to move a sample into the adaptable sorter unit. When the sample is within vacuum range, the electrical control signal changes towards a steady high (active) electrical control signal, thereby completely opening the valve and creating a full vacuum in the Venturi system necessary to the sample into the adaptable sorting unit.

Figure 46:
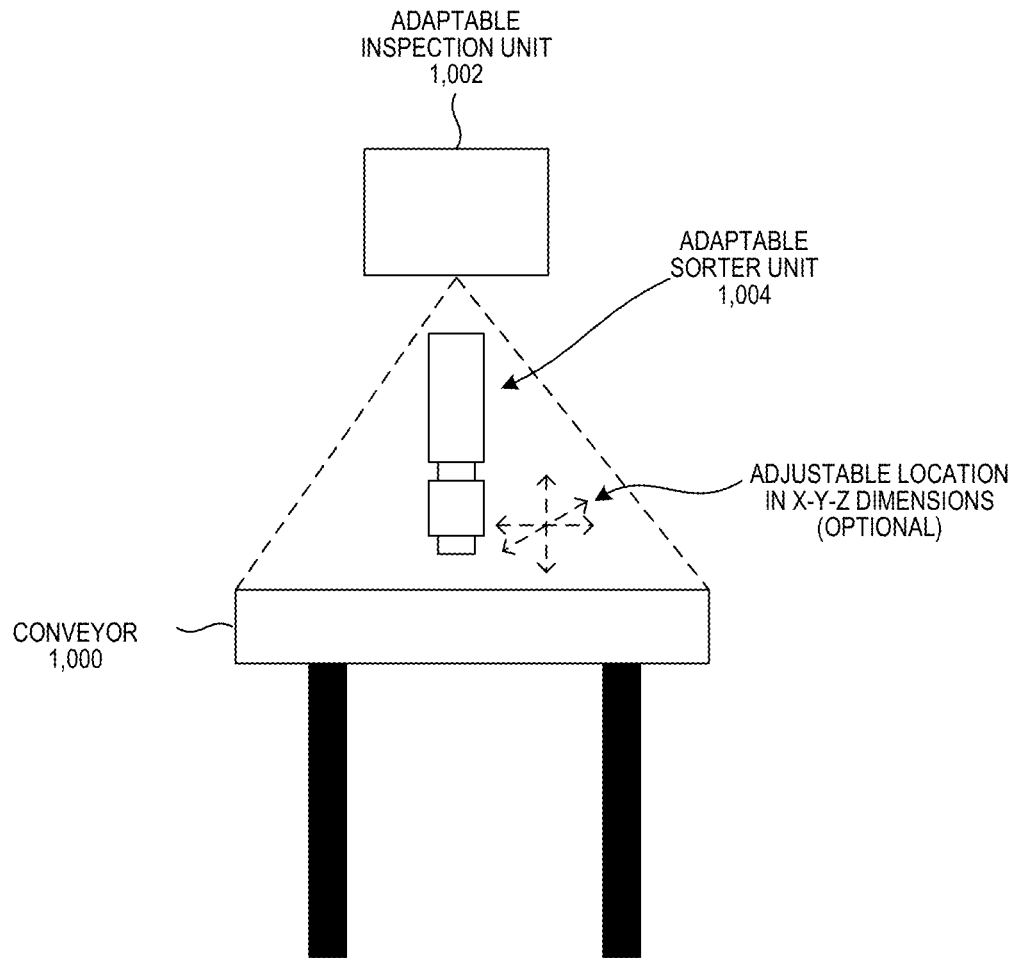
FIG. 46 is a front-view diagram of an adaptable inspection unit and vacuum adaptable sorter unit utilizing pressurized air with x-y-z location adjustment.

FIG. 46 is a front-view diagram of an adaptable inspection unit and vacuum adaptable sorter unit utilizing pressurized air with x-y-z location adjustment. The location of the adaptable sorter unit may be adjusted in all three dimensions (x,y,z).

The z-dimension may need to be adjusted to set the optimal height of the adaptable sorter unit so that the vacuum can be maximally applied to passing samples while ensuring that the sample do not come into direct contact with the adaptable sorter unit housing.

The x-y dimension can be adjusted so to properly position the adaptable sorter unit so it is able to apply a vacuum force to the desired sample on the conveyor. In this fashion, a single adaptable sorter unit can be used to sort all samples on a single conveyer. In operation, the adaptable inspection unit acquires images used to determine the location of all samples that require sorting, then the location information is used to position and trigger the adaptable sorter unit so that the desired sample is sorted. In one example, the adaptable inspection unit is attached to a movable arm that receives a location control signal. In one example, the location control signal includes coordinate information. Any automated movement technologies known in the art can be used to adjust the location of the adaptable inspection unit. Any location control technologies known in the art can be used to communicate the location information. The location information calculated by a processor, based at least in part, on an image captured by the adaptable inspection unit. The processor then causes location information to be sent to the adaptable sorter unit. The adaptable sorter unit then uses the location information to adjust the position of the adaptable sorter unit.

The triggering of the adaptable sorter unit is caused by a processor. In one example, the processor calculates the time when the adaptable sorter unit is to be turned on, based at least in part on an image captured by the adaptable inspection unit. In one example, the processor outputs a trigger signal that is communicated to the adaptable sorter unit. In response to receiving the trigger signal, the adaptable sorter unit applies the vacuum.

Figure 47:
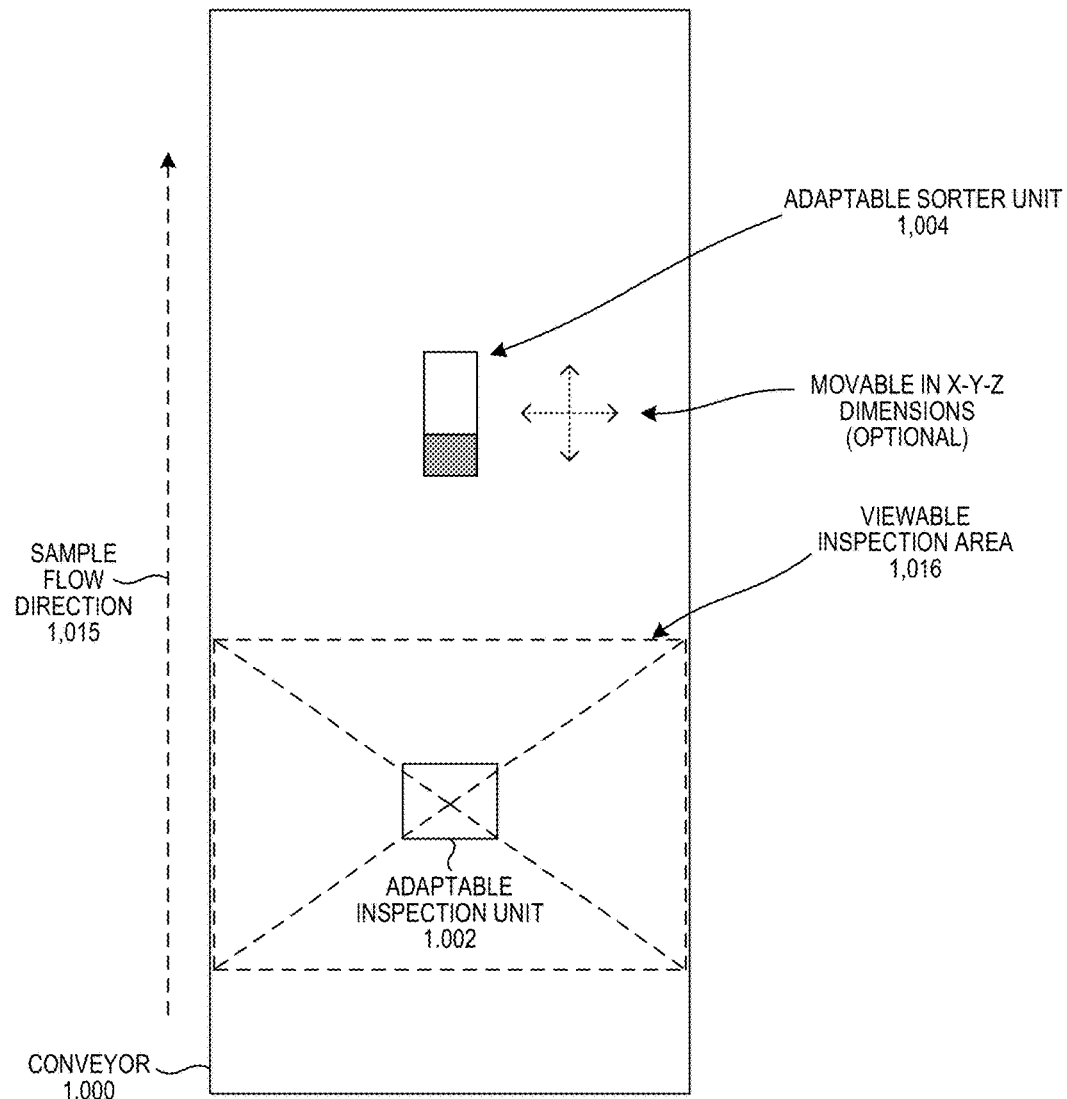
FIG. 47 is a top-down diagram of an adaptable inspection unit and vacuum adaptable sorter unit utilizing pressurized air with x-y-z location adjustment.

FIG. 47 is a top-down diagram of an adaptable inspection unit and vacuum adaptable sorter unit utilizing pressurized air with x-y-z location adjustment. This diagram further illustrates the operation of the adaptable sorter unit with x-y-z location adjustment. The samples on the conveyor move in the direction 1,015. In one example, the adaptable inspection unit 1,002 has a viewable inspection area 1,016. As sample pass through the viewable inspection area 1,016, one or more images of each sample are captured. The one or more images of each sample are used to determine if each sample is to be sorted. If a sample is to be sorted, then the adaptable sorter unit 1,004 is moved to location along the path of the sample moving along the conveyor. Then, once the sample is within the vacuum range of the adaptable sorter unit 1,004 the adaptable sorter unit 1,004 is activated by opening the pneumatic valve thereby causing the vacuum force and sucking the sample up from the conveyor and into the adaptable sorting unit 1,004. All unsorted samples continue along the conveyor.

Figure 48:
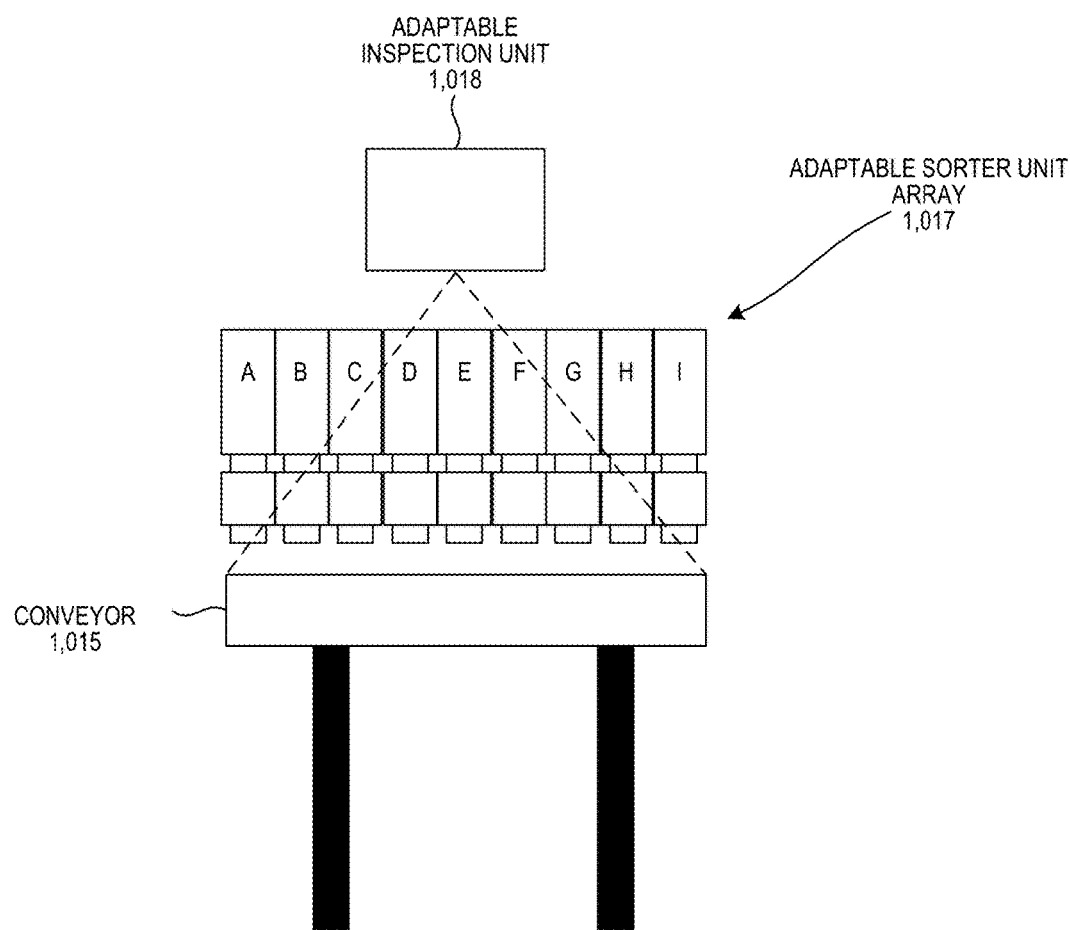
FIG. 48 is a front-view diagram of an adaptable inspection unit and array of fixed location vacuum adaptable sorter units utilizing pressurized air.

FIG. 48 is a front-view diagram of an adaptable inspection unit and array of fixed location vacuum adaptable sorter units utilizing pressurized air. The adaptable sorter unit array 1,017 includes nine adaptable sorter units (A-I). In one example, the number of adaptable sorter units is determined by the width of the conveyor and the width of the adaptable sorter unit so that the entire width of the conveyor is covered by at least one adaptable sorter unit.

Figure 49:
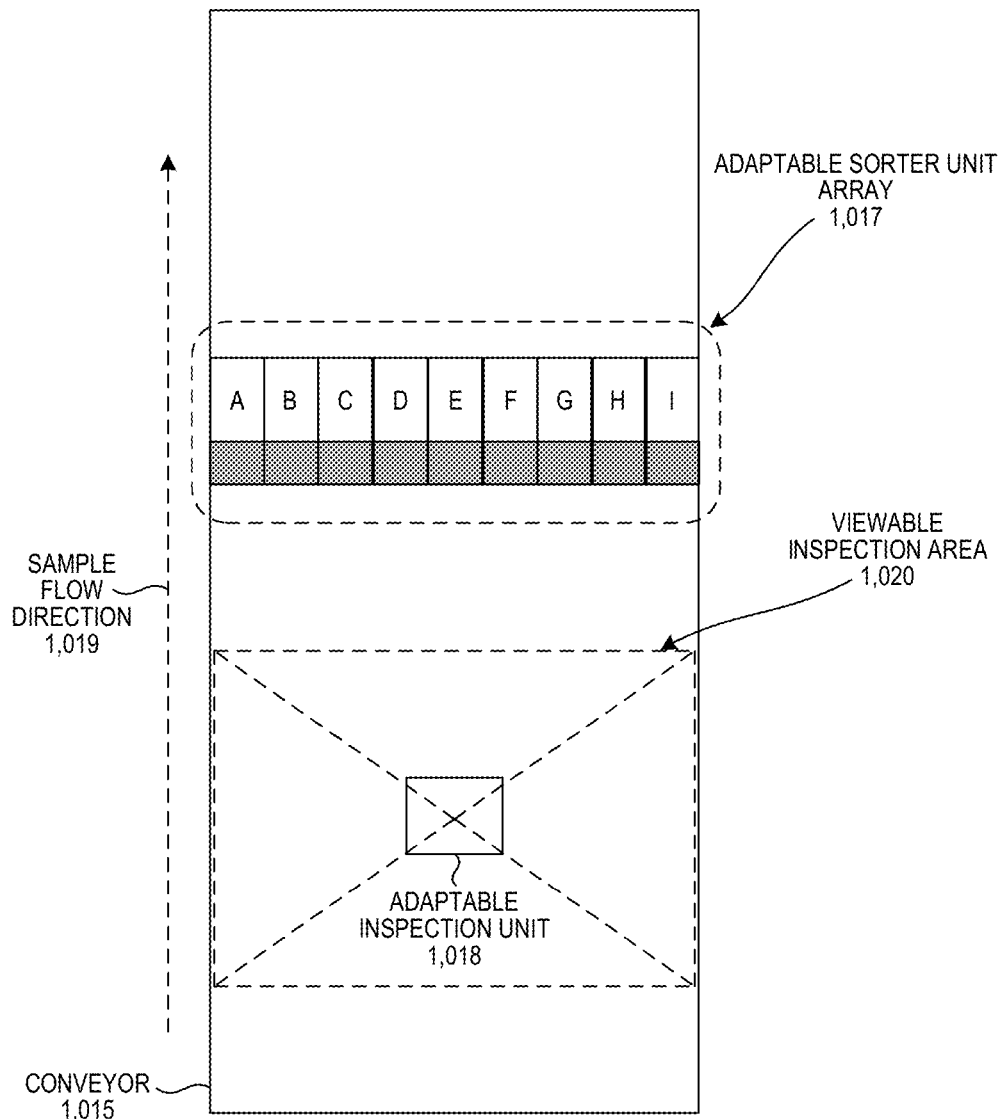
FIG. 49 is a top-down diagram of an adaptable inspection unit and array of fixed location vacuum adaptable sorter units utilizing pressurized air.

FIG. 49 is a top-down diagram of an adaptable inspection unit and array of fixed location vacuum adaptable sorter units utilizing pressurized air. In operation, samples flow in direction 1,019 along the conveyor. A sample first passes through the viewable inspection area 1,020 where one or more images of the sample are acquired. The one or more images are then used to determine if the sample is to be sorted. If the sample is to be sorted, then the location of the sample is used to control which adaptable sorter unit (A-I) of the adaptable sorter unit array 1,017 is to be used to sort the sample. The timing at which the selected adaptable sorter unit is triggered to enable the vacuum force is calculated based at least in part on the time and location when the image of the sample was captured and the speed at which the sample travels along the conveyor. The selected adaptable sorter unit is then triggered at the calculated time so to sort the sample. All unsorted samples continue along the conveyor.

Figure 50:
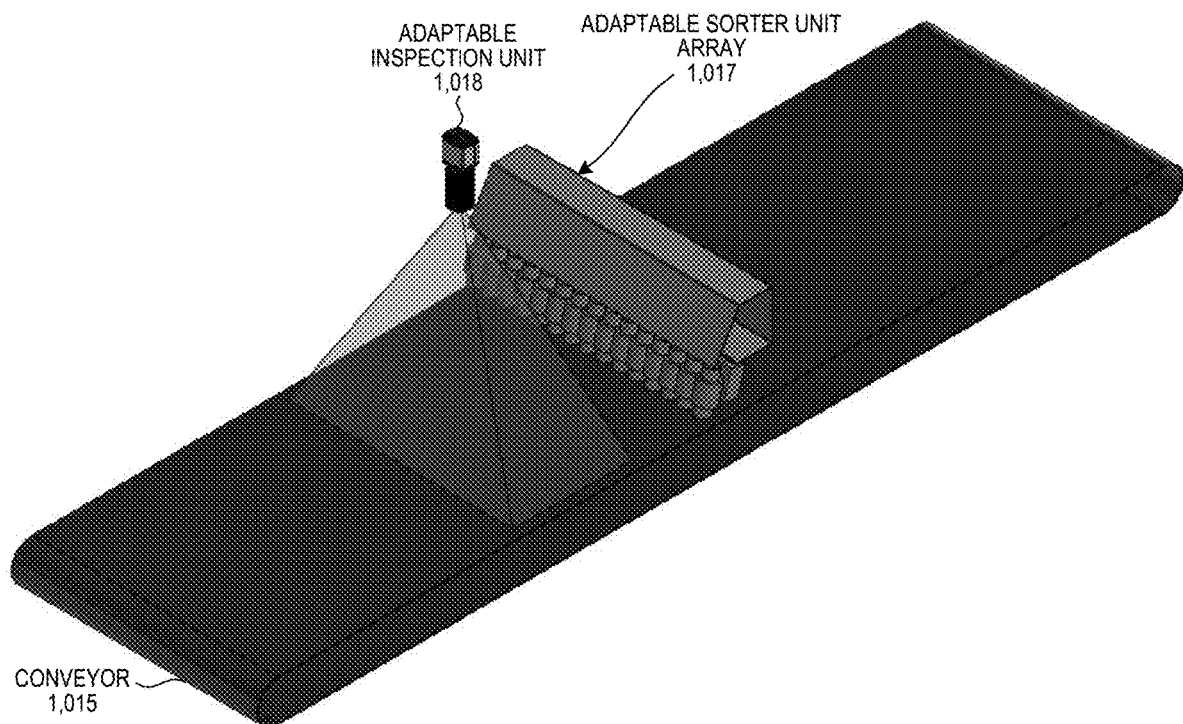
FIG. 50 is a perspective diagram of an adaptable inspection unit and array of fixed location vacuum adaptable sorter units utilizing pressurized air.

FIG. 50 is a perspective diagram of an adaptable inspection unit and array of fixed location vacuum adaptable sorter units utilizing pressurized air. As described regarding FIG. 49, the sample moves along the conveyor. First, one or more images of the sample are captured by the adaptable inspection unit 1,018. The one or more images of the sample are then used to select at least one of the adaptable sorter units in the adaptable sorter unit array 1,017. The selected one or more adaptable sorter units are then triggered (turned on) when the sample is within the vacuum force of the adaptable sorter unit.

FIG. 50 also illustrates an example where the sorted sample container of each adaptable sorter unit is connected together. This configuration allows all the sorted samples from each adaptable sorter unit to flow to the same sample sorting bin. It is noted that in other examples one or more adaptable sorter units may have individual sorted sample containers so that the sorted samples are not binned together.

It is noted that the sorted sample container can also be a bucket or container that is positioned on the side of the conveyor. In this case, they may be a chute or flex hose going from the outlet into the bucket or container.

It is also noted, that while the above examples discuss a conveyor, the same adaptable system can be implemented on any processing line, such as a chute.

Figure 51:
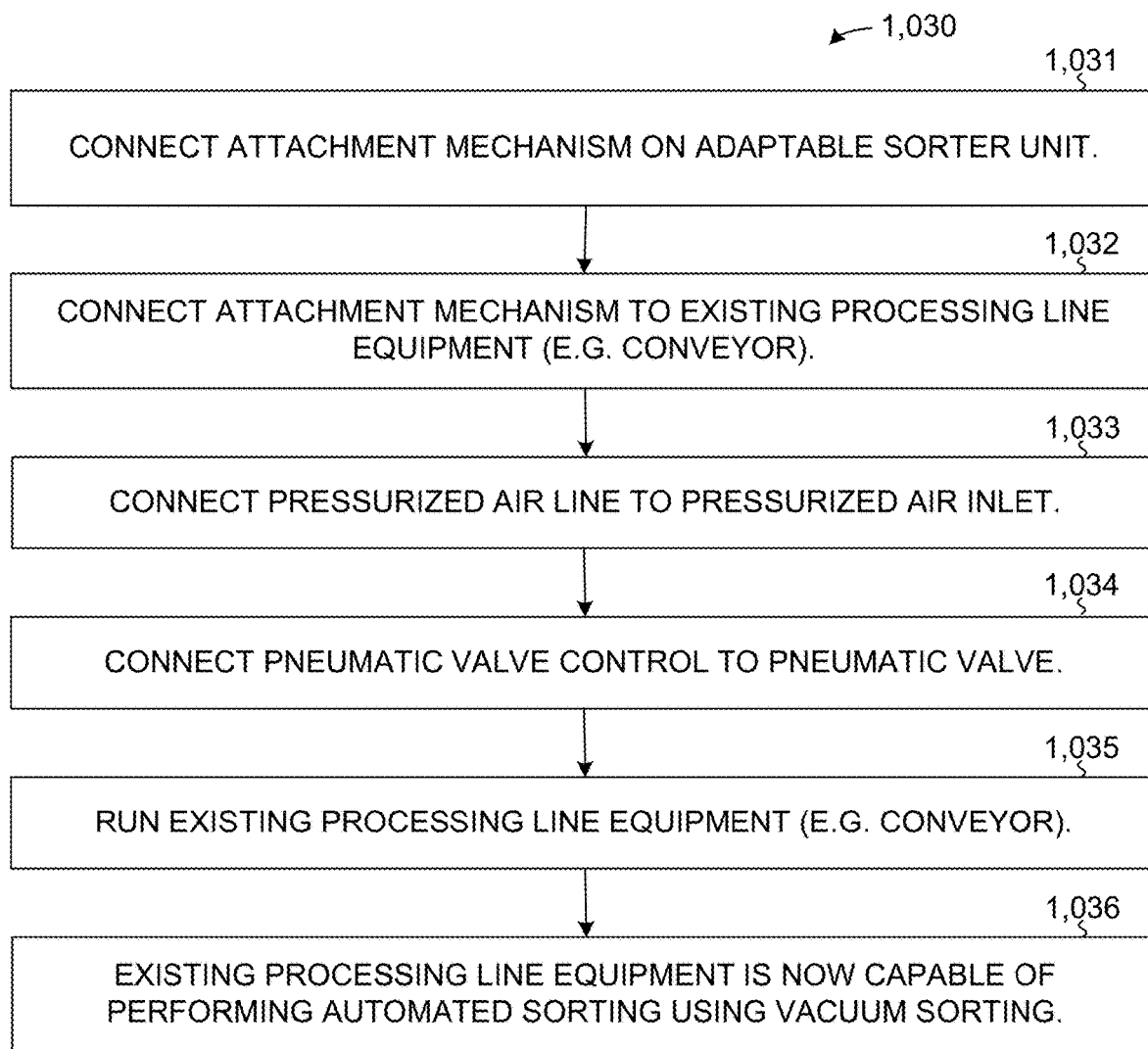
FIG. 51 is a flowchart describing the steps of enabling a vacuum adaptable sorter unit that utilizes pressurized air.

FIG. 51 is a flowchart 1,030 describing the steps of enabling a vacuum adaptable sorter unit that utilizes pressurized air. In step 1,031, the attachment mechanism is connected to the adaptable sorter unit. In step 1,032 the attachment mechanism is attached to the existing processing line. In step 1,033, a pressurized air line is connected to the pressurized air inlet. In step 1,034, pneumatic valve control is connected to the pneumatic valve. In step 1,035, the existing processing line is run as normal. In step 1,036, the processing line equipment is not able to perform sample sorting using vacuum sorting.

Sub Stream Auto Sampling

When processing a large number of samples, it may be desirable to inspect a portion of the total amount of samples being processed. This portion of the total samples being processed is referred to as a sub stream of samples. The total number of samples being processed is referred to as the main stream of samples.

The inspected sub stream of samples can be inspected for many different quality characteristics including, but not limited to: shape quality (based on matching a predetermined shape within a specified tolerance, then the sample is determined to be defective with respect to shape), surface contour quality (when a flat surface is greater than a specified area, then the sample is determined to be defective with respect to surface contour), hole quality (presence of holes in the sample), pest quality (presence of insects in/or on the sample), color quality (irregular color of the sample), size quality (irregular size of the sample), moisture level, oil content, fat content, and mycotoxin content. In one example, a group of quality characteristics are referred to as inspection data 415. FIG. 18, FIG. 19, and FIG. 20 illustrate various examples of inspection data.

Figure 52:
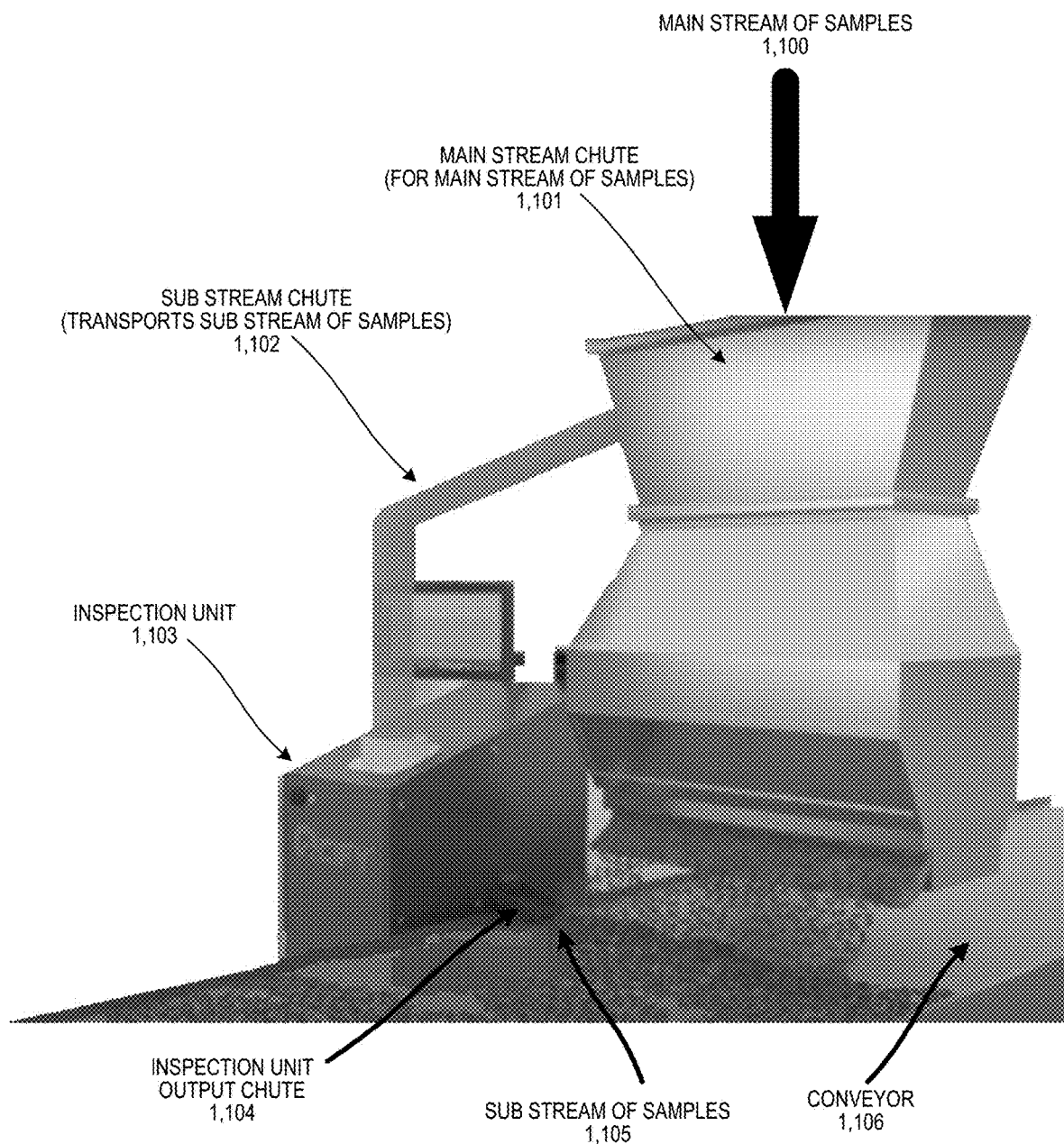
FIG. 52 is a perspective diagram of sub stream inspection system.

FIG. 52 is a diagram that illustrates a sub stream inspection system configured to inspect a sub stream of samples. The main stream of samples 1,100 are fed into the main stream chute 1,101. A portion of main stream of samples 1,100 fall into sub stream chute 1,102. The sub stream of samples 1,205 are then routed to inspection unit 1,102 by sub stream chute 1,102. Inspection unit 1,103 then performs inspection of one or more of the sub stream of samples. In one example, the inspector unit 1,103 is an in-flight 3D inspector described above herein. After the sub stream of samples 1,105 are then routed back to the main stream of samples via inspection unit output chute 1,104. The sub stream of samples 1,105 and the main stream of samples 1,100 are then dropped onto a conveyor 1,106. Conveyor 1,106 can be, but is not limited to, the conveyor types listed below.

Figure 53:
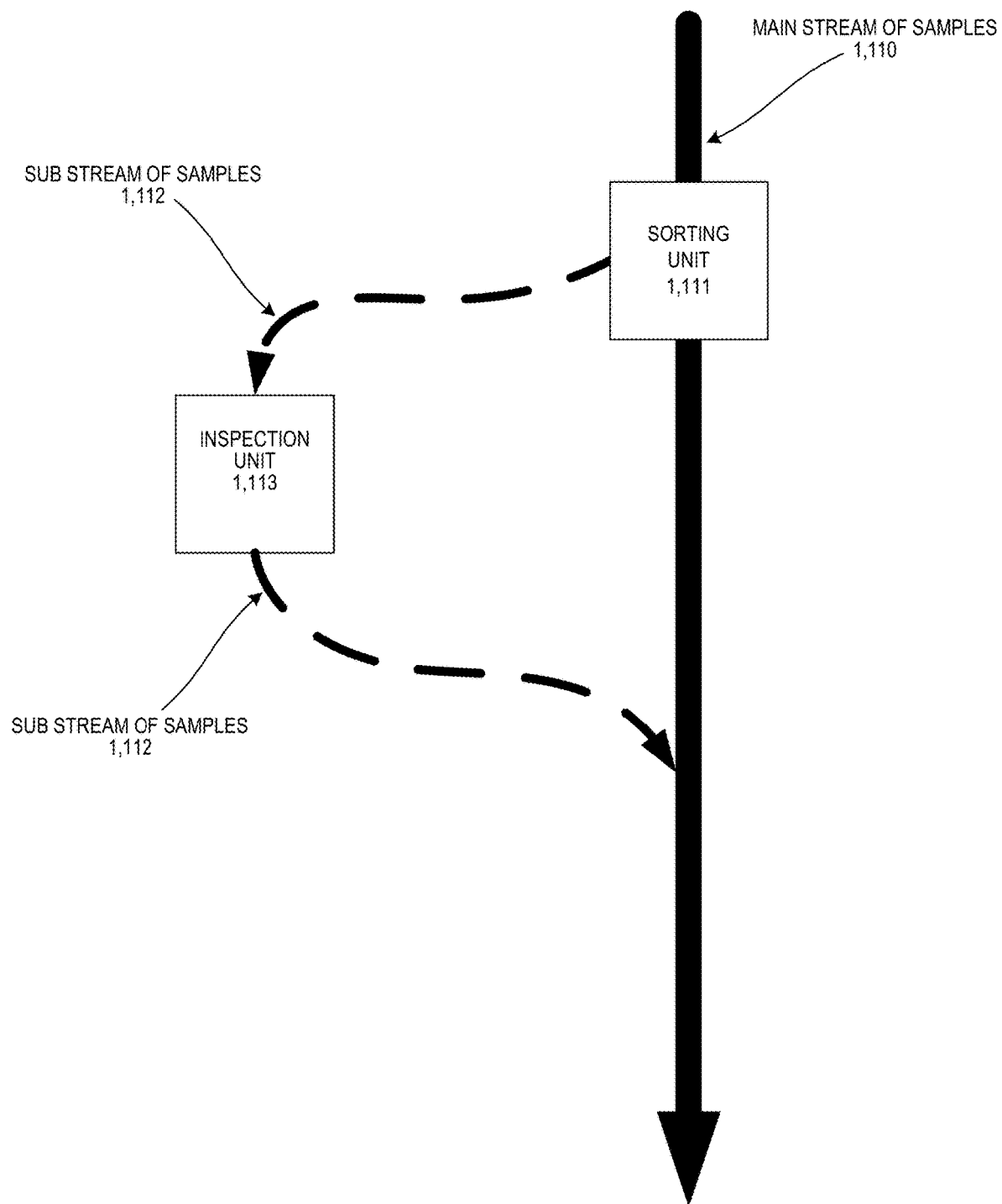
FIG. 53 is a diagram of a sub stream inspection system.
Figure 54:
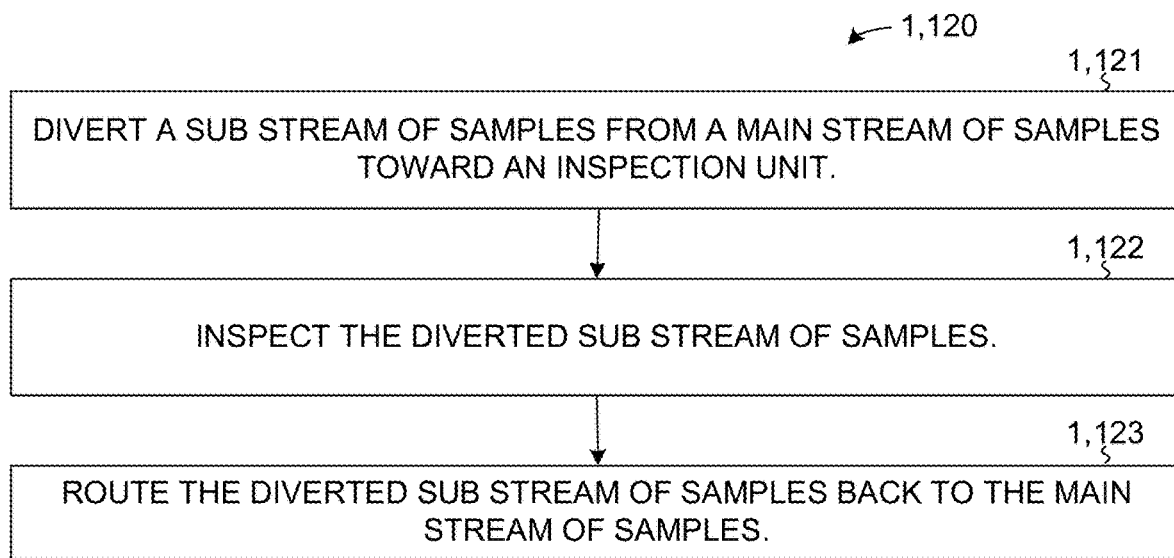
FIG. 54 is a flowchart of a sub stream inspection system.

Aero-mechanical conveyors
Automotive conveyors
Belt conveyor
Belt-driven live roller conveyors
Bucket conveyor
Chain conveyor
Chain-driven live roller conveyor
Drag conveyor
Dust-proof conveyors
Electric track vehicle systems
Flexible conveyors
Gravity conveyor
Gravity skate wheel conveyor
Lineshaft roller conveyor
Motorized-drive roller conveyor Overhead I-beam conveyors
Overland conveyor
Pharmaceutical conveyors
Plastic belt conveyors
Pneumatic conveyors
Screw or auger conveyor
Spiral conveyors
Vertical conveyors
Vibrating conveyors
Wire mesh conveyors FIG. 53 is a diagram of the system illustrated in FIG. 54. The main stream of samples 1,110 flows into a sorting unit 1,111. A sub stream of samples 1,112 are diverted by the sorting unit 1,111 toward inspection unit 1,113. The remainder of the main stream of samples flow through the sorting unit 1,111 without being diverted toward the inspection unit 1,113. Sorting unit 1,111 may be, but is not limited to, the following types of sorting unit: a vacuum sorter, a mechanical pedal sorter, or an air jet sorter. The sub stream of samples 1,112 are then inspected by inspection 1,113. The sub stream of samples 1,112 are then routed back to the main stream of samples 1,110.

FIG. 54 is a flowchart 1,120 of the sub stream inspection system illustrated in FIG. 53. In step 1,121 a sub stream of samples from the main stream of samples is diverted toward an inspection unit. In step 1,122, the diverted sub stream of samples is inspected. In step 1,123, the diverted sub stream of samples is routed back into the main stream of samples.

Figure 55:
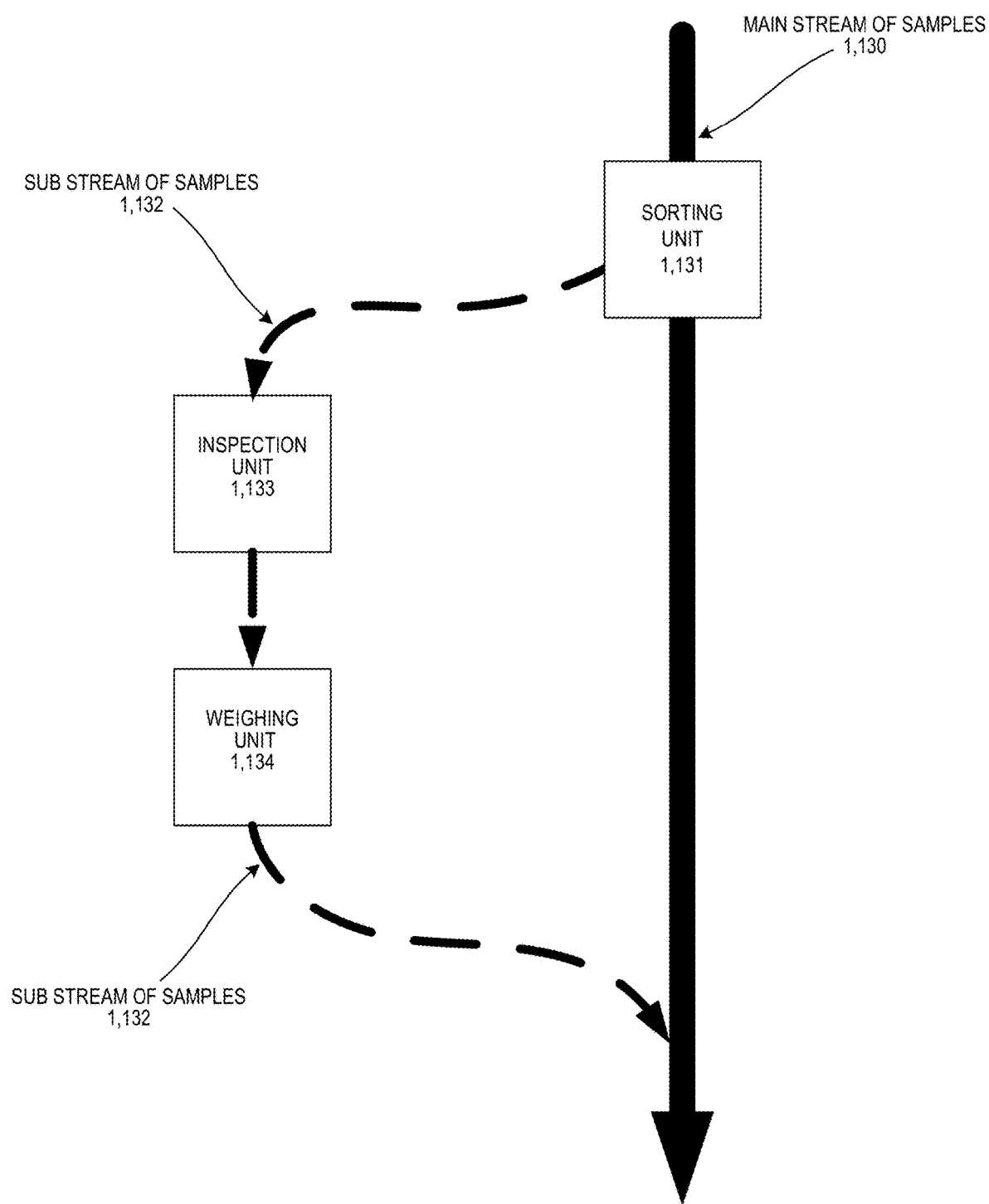
FIG. 55 is a diagram of a sub stream inspection and weighing system.

FIG. 55 is a diagram illustrating a sub stream inspection and weighing system. A main stream of samples 1,130 are sorted by sorting unit 1,131. Sorting unit 1,131 may be, but is not limited to, the following types of sorting unit: a vacuum sorter, a mechanical pedal sorter, or an air jet sorter. The sorting unit 1,131 diverts a sub stream of samples 1,132 toward inspection unit 1,133. The sub stream of samples is inspected by inspection unit 1,133. The sub stream of samples is then weighed by weighing unit 1,134. In one example, the weighing unit 1,134 is an electronic scale that utilizes a strain gauge to measure weight. In another example, the weighing unit 1,134 is an electronically scale that utilizes a force transducer. To aid in the routing of samples, the weighing unit may also include an output chute that directs samples leaving the weighing unit 1,134. The weighing unit 1,134 can weigh each sample of the sub stream of samples 1,132 individually or can weigh multiple samples from the sub stream of samples together and provide a calculated average weight per sample. The sub stream of samples is then combined back into the main stream of samples.

It is noted that the data collected by both the inspection unit 1,133 and the weighing unit 1,134 can be stored in various methods.

In one example, the data collected by the inspection unit 1,133 and the weighing unit 1,134 can be stored in a memory device included in the inspection unit 1,133. The memory device may be any type of memory known in the art, such as, but not limited to, a disk drive, a solid state drive, and a flash drive. The data collected by the weighing unit 1,134 may be communicated to the inspection device 1,133 by a wire or wireless communication protocol (RS-232, WiFi, Bluetooth, ZigBee, Ethernet, etc.)

In another example, the data collected by the inspection unit 1,133 and the weighing unit 1,134 can be stored in a memory device included in the weighing unit 1,134. The memory device may be any type of memory known in the art, such as, but not limited to, a disk drive, a solid state drive, and a flash drive. The data collected by the inspecting unit 1,133 may be communicated to the weighing unit 1,134 by a wire or wireless communication protocol (RS-232, WiFi, Bluetooth, ZigBee, Ethernet, etc.)

In yet another example, the data collected by the inspection unit 1,133 and the weighing unit 1,134 can be stored in a memory device located outside of the inspecting unit 1,133 and the weighing unit 1,134, such as a server or remote networked computing device. The memory device may be any type of memory known in the art, such as, but not limited to, a disk drive, a solid state drive, and a flash drive. The data collected by a wire or wireless communication protocol (RS-232, WiFi, Bluetooth, ZigBee, Ethernet, etc.)

Figure 56:
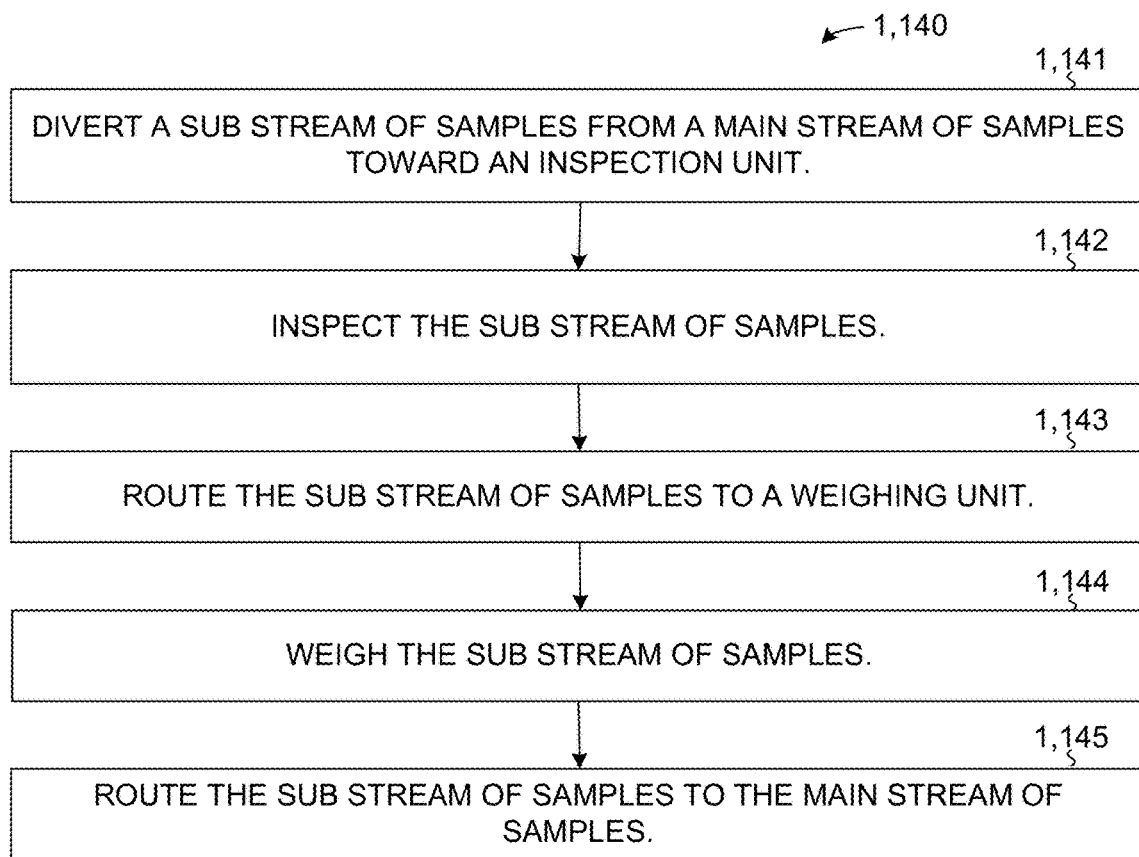
FIG. 56 is a flowchart of a sub stream inspection and weighing system.

FIG. 56 is a flowchart 1,140 of a sub stream inspection and weighing system. In step 1,141 a sub stream of samples from the main stream of samples is diverted toward an inspection unit. In step 1,142, the diverted sub stream of samples is inspected. In step 1,143, the sub stream of samples is routed to a weighing unit. In one example, the weighing unit 1,134 is an electronic scale that utilizes a strain gauge to measure weight. In another example, the weighing unit 1,134 is an electronically scale that utilizes a force transducer. To aid in the routing of samples, the weighing unit may also include an output chute that directs samples leaving the weighing unit 1,1342. In step 1,144, the sub stream of samples is weighed. Each sample of the sub stream of samples can be weighed individually or can be weighed with multiple samples from the sub stream of samples together and provide a calculated average weight per sample. In step 1,145, the sub stream of samples is routed to the main stream of samples.

Figure 57:
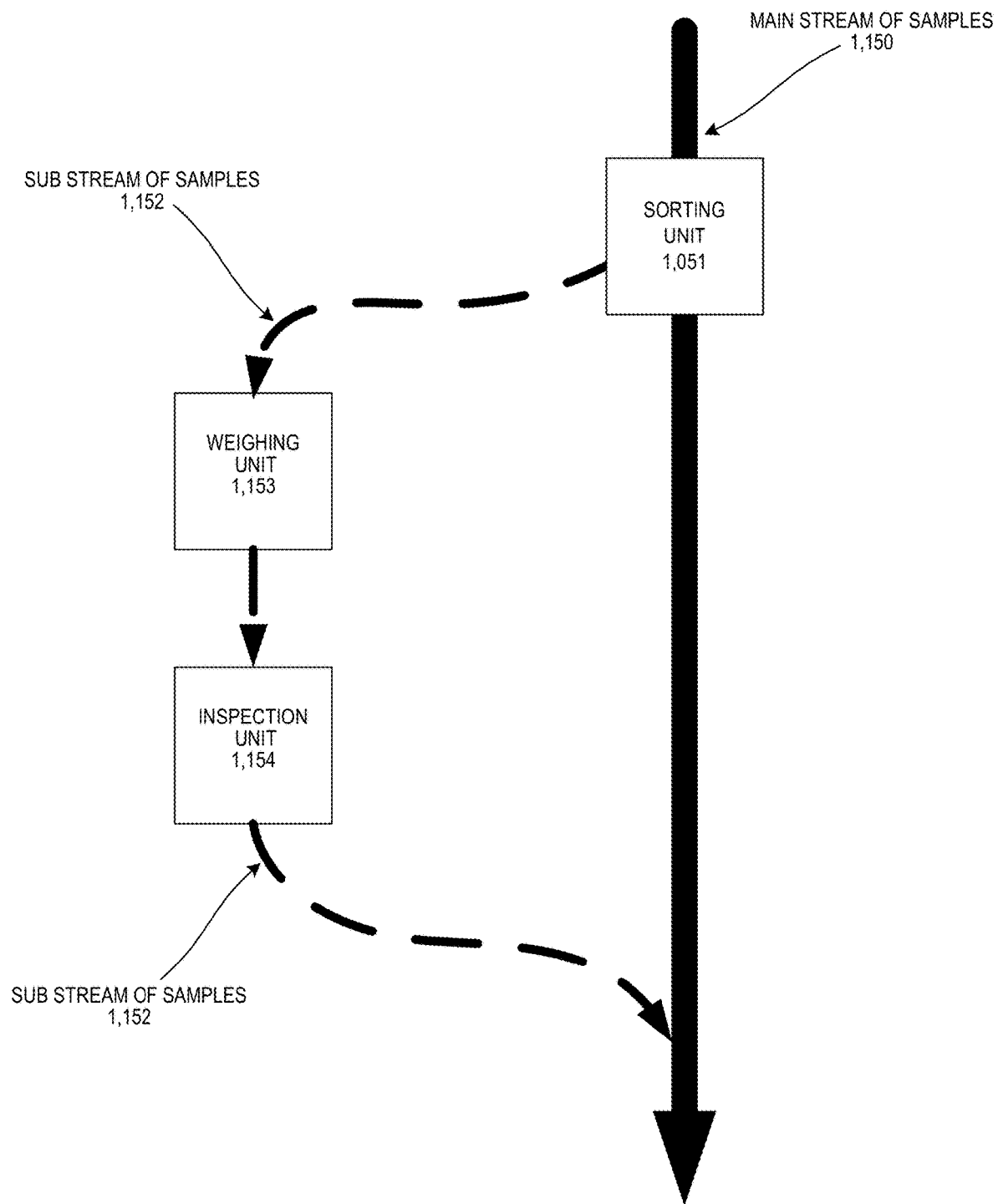
FIG. 57 is a diagram of a sub stream weighing and inspection system.

FIG. 57 is a diagram illustrating a sub stream weighing and inspection system. A main stream of samples 1,150 are sorted by sorting unit 1,151. Sorting unit 1,151 may be, but is not limited to, the following types of sorting unit: a vacuum sorter, a mechanical pedal sorter, or an air jet sorter. The sorting unit 1,151 diverts a sub stream of samples 1,152 toward weighing unit 1,153. The sub stream of samples is weighed by weighing unit 1,153. In one example, the weighing unit 1,153 is an electronic scale that utilizes a strain gauge to measure weight. In another example, the weighing unit 1,153 is an electronically scale that utilizes a force transducer. To aid in the routing of samples, the weighing unit may also include an output chute that directs samples leaving the weighing unit 1,153. The weighing unit 1,153 can weight each sample of the sub stream of samples 1,152 individually or can weigh multiple samples from the sub stream of samples together and provide a calculated average weight per sample. The sub stream of samples is then inspected by inspecting unit 1,154. The sub stream of samples is then combined back into the main stream of samples.

It is noted that the data collected by both the inspection unit 1,153 and the weighing unit 1,154 can be stored in various methods.

In one example, the data collected by the inspection unit 1,154 and the weighing unit 1,153 can be stored in a memory device included in the inspection unit 1,154. The memory device may be any type of memory known in the art, such as, but not limited to, a disk drive, a solid state drive, and a flash drive. The data collected by the weighing unit 1,153 may be communicated back to the inspection unit 1,154 by a wire or wireless communication protocol (RS-232, WiFi, Bluetooth, ZigBee, Ethernet, etc.)

In another example, the data collected by the inspection unit 1,154 and the weighing unit 1,153 can be stored in a memory device included in the weighing unit 1,153. The memory device may be any type of memory known in the art, such as, but not limited to, a disk drive, a solid state drive, and a flash drive. The data collected by the inspecting unit 1,154 may be communicated back to the weighing unit 1,153 by a wire or wireless communication protocol (RS-232, WiFi, Bluetooth, ZigBee, Ethernet, etc.)

In yet another example, the data collected by the inspection unit 1,154 and the weighing unit 1,153 can be stored in a memory device located outside of the inspecting unit 1,154 and the weighing unit 1,153, such as a server or remote networked computing device. The memory device may be any type of memory known in the art, such as, but not limited to, a disk drive, a solid state drive, and a flash drive. The data collected by a wire or wireless communication protocol (RS-232, WiFi, Bluetooth, ZigBee, Ethernet, etc.)

Figure 58:
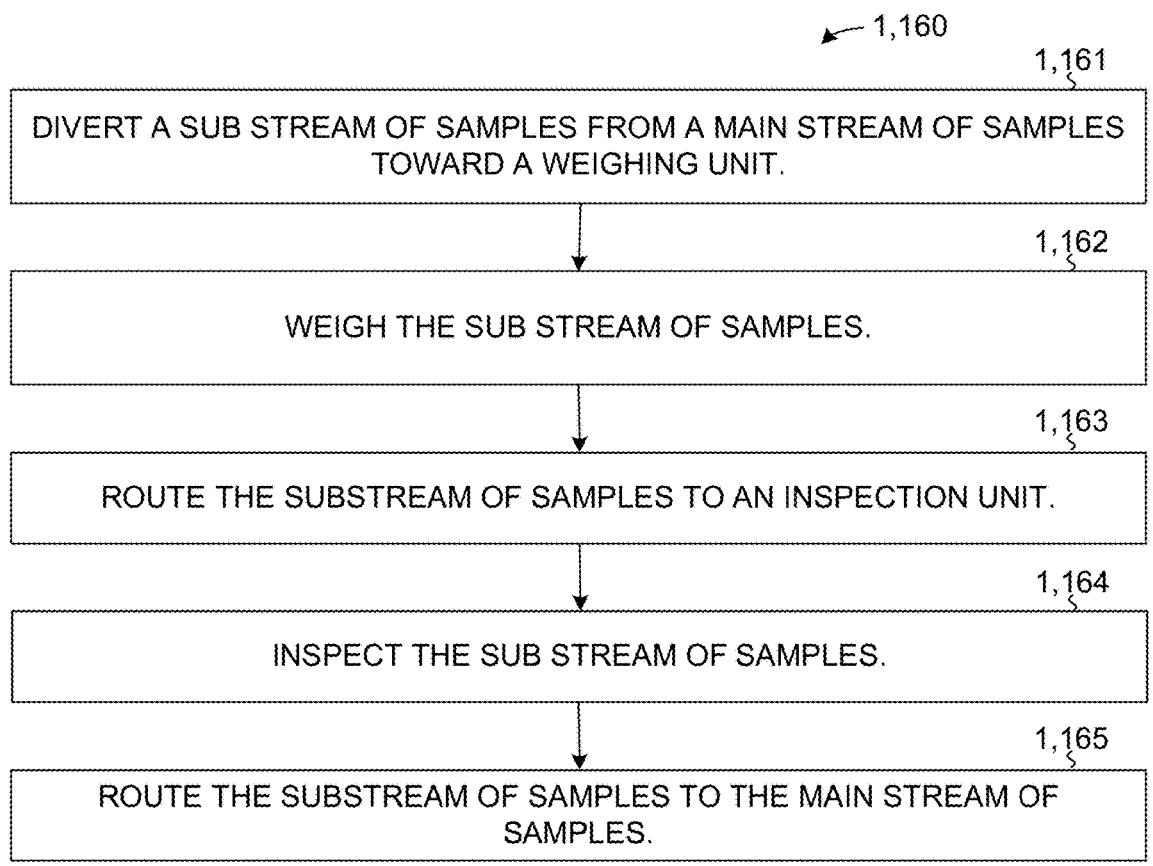
FIG. 58 is a flowchart of a sub stream weighing and inspection system.

FIG. 58 is a flowchart 1,160 of a sub stream weighing and inspection system. In step 1,161 a sub stream of samples from the main stream of samples is diverted toward a weighing unit. In step 1,162, the diverted sub stream of samples is weighed. Each sample of the sub stream of samples can be weighed individually or can be weighed with multiple samples from the sub stream of samples together and provide a calculated average weight per sample. In step 1,163, the sub stream of samples is routed to an inspection unit. In step 1,164, the sub stream of samples is inspected. In step 1,165, the sub stream of samples is routed to the main stream of samples.

Figure 59:
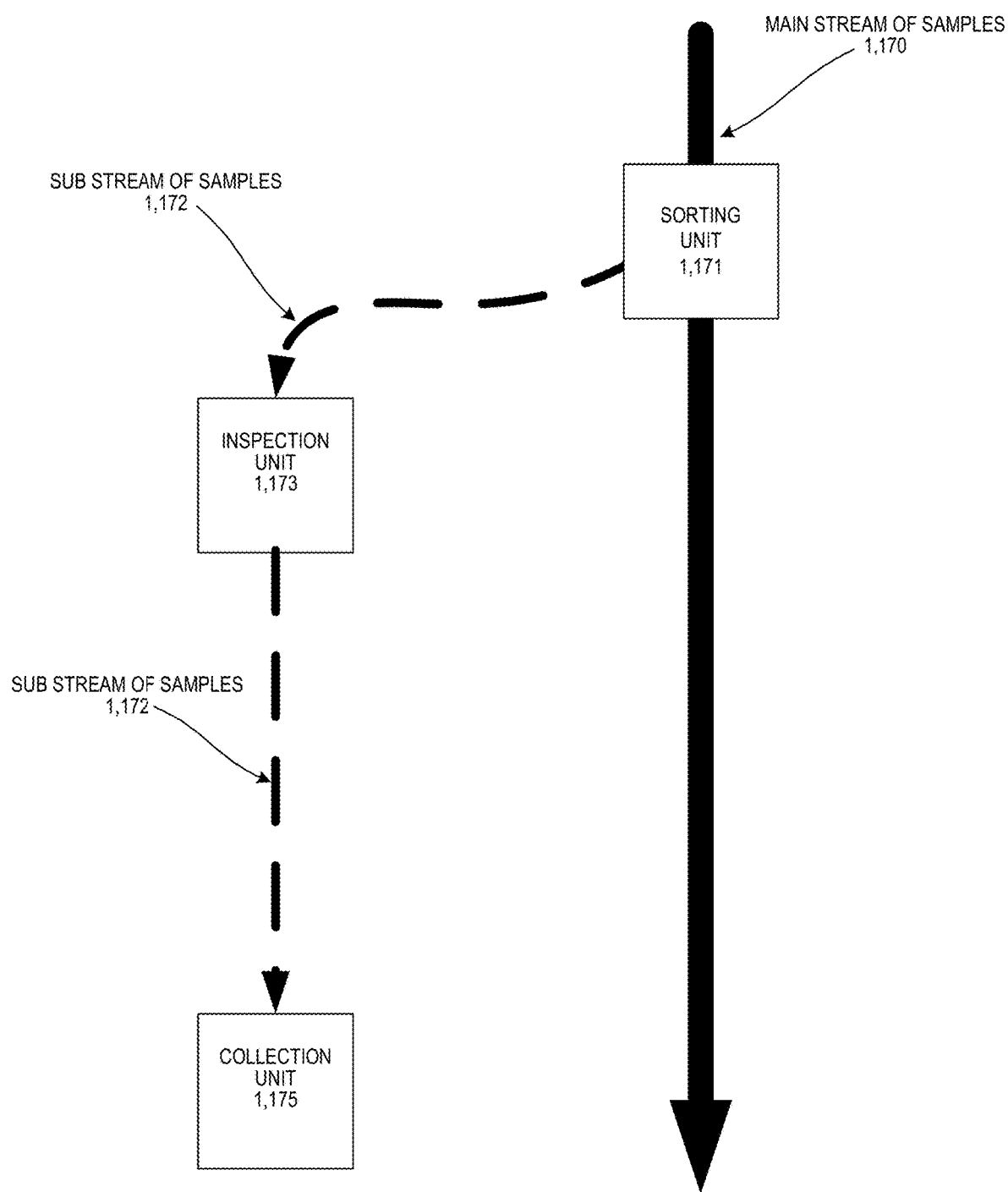
FIG. 59 is a diagram of a sub stream inspection and collection system.

FIG. 59 is a diagram illustrating a sub stream inspection and collection system. A main stream of samples 1,170 are sorted by sorting unit 1,171. Sorting unit 1,171 may be, but is not limited to, the following types of sorting unit: a vacuum sorter, a mechanical pedal sorter, or an air jet sorter. The sorting unit 1,171 diverts a sub stream of samples 1,172 toward inspection unit 1,173. The sub stream of samples is inspected by inspection unit 1,173. The sub stream of samples is then routed to a collection unit 1,175. The collection unit 1,175 serves to store the sub stream of samples after the inspection is completed. Collecting the inspected sub stream of samples, instead of recombing the sub stream of samples with the main stream of samples, is advantageous in that it allows for later examination of the sub stream of samples that were inspected. For example, it may be advantageous to manually inspect the sub stream of samples and compare the manual inspection results with the inspection data provide by the inspection unit 1,173.

It is noted that the data collected by inspection unit 1,173 can be stored in various methods.

In one example, the data collected by the inspection unit 1,174 can be stored in a memory device included in the inspection unit 1,174. The memory device may be any type of memory known in the art, such as, but not limited to, a disk drive, a solid state drive, and a flash drive.

In yet another example, the data collected by the inspection unit 1,174 can be stored in a memory device located outside of the inspecting unit 1,174 such as a server or remote networked computing device. The memory device may be any type of memory known in the art, such as, but not limited to, a disk drive, a solid state drive, and a flash drive. The data collected by a wire or wireless communication protocol (RS-232, WiFi, Bluetooth, ZigBee, Ethernet, etc.)

Figure 60:
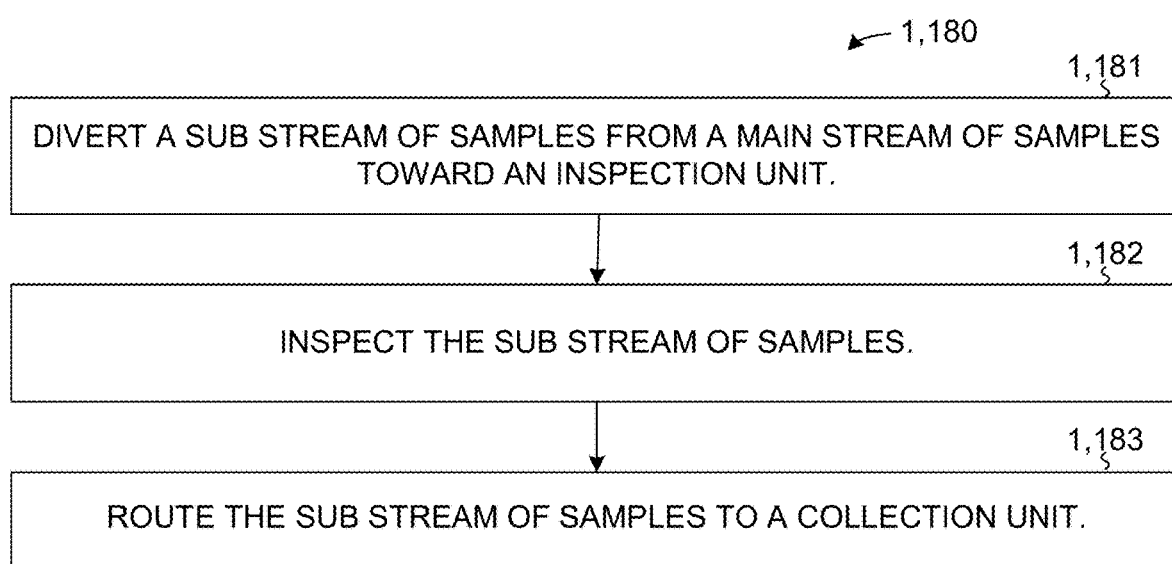
FIG. 60 is a flowchart of a sub stream inspection and collection system.

FIG. 60 is a flowchart 1,180 of a sub stream inspection and collection system. In step 1,181 a sub stream of samples from the main stream of samples is diverted toward an inspection unit. In step 1,182, the diverted sub stream of samples is inspected. In step 1,183, the sub stream of samples is routed to a collection unit.

Figure 61:
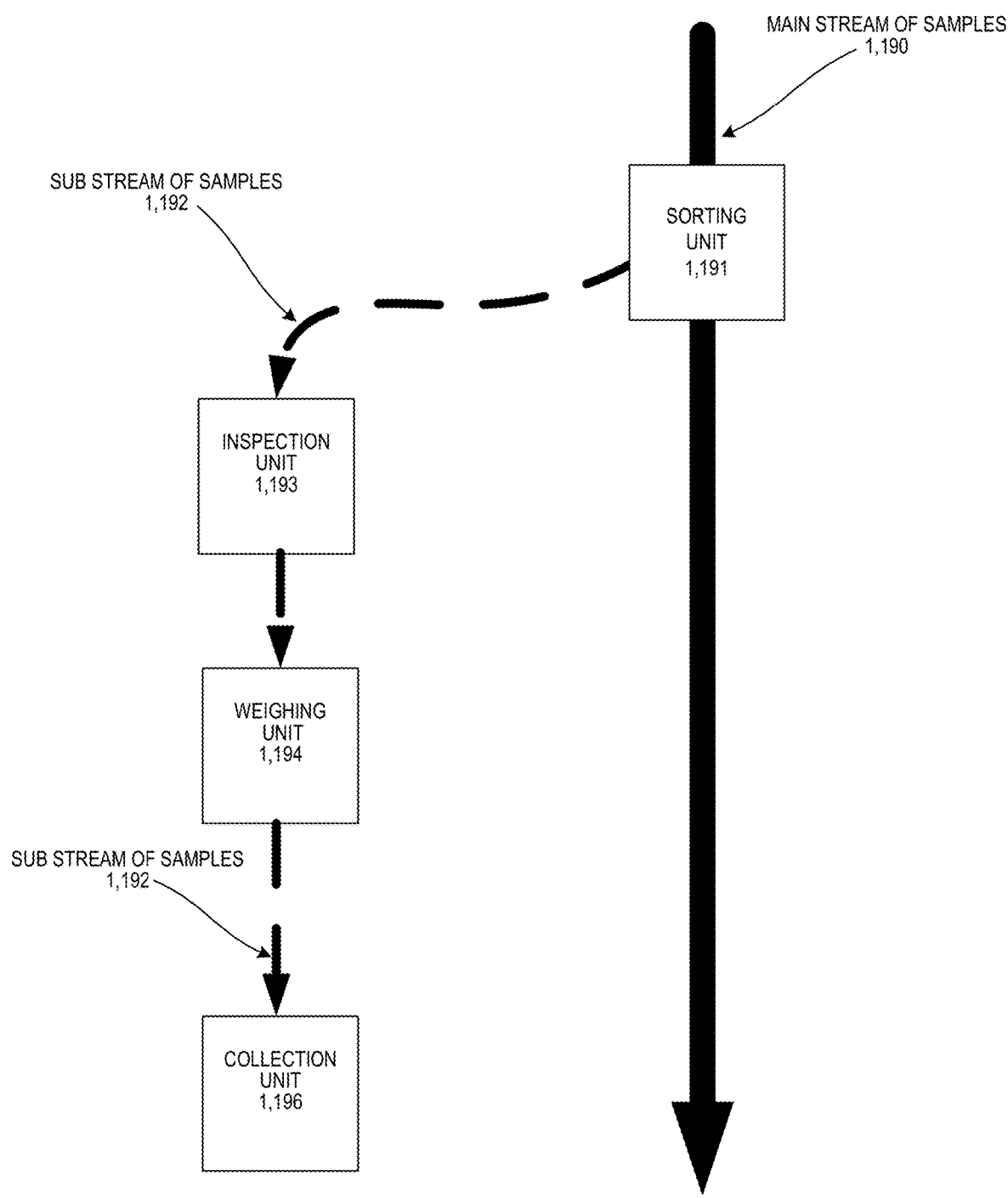
FIG. 61 is a diagram of a sub stream inspection, weighing and collection system.

FIG. 61 is a diagram illustrating a sub stream inspection, weighing and collection system. A main stream of samples 1,190 are sorted by sorting unit 1,191. Sorting unit 1,191 may be, but is not limited to, the following types of sorting unit: a vacuum sorter, a mechanical pedal sorter, or an air jet sorter. The sorting unit 1,191 diverts a sub stream of samples 1,192 toward inspection unit 1,193. The sub stream of samples is inspected by inspection unit 1,193. The sub stream of samples is then weighed by weighing unit 1,194. In one example, the weighing unit 1,194 is an electronic scale that utilizes a strain gauge to measure weight. In another example, the weighing unit 1,194 is an electronically scale that utilizes a force transducer. To aid in the routing of samples, the weighing unit may also include an output chute that directs samples leaving the weighing unit 1,194. The weighing unit 1,194 can weigh each sample of the sub stream of samples 1,192 individually or can weigh multiple samples from the sub stream of samples together and provide a calculated average weight per sample. The sub stream of samples is then routed to collection unit 1,196. The collection unit 1,196 serves to store the sub stream of samples after the inspection is completed. Collecting the inspected sub stream of samples, instead of recombing the sub stream of samples with the main stream of samples, is advantageous in that it allows for later examination of the sub stream of samples that were inspected. For example, it may be advantageous to manually inspect the sub stream of samples and compare the manual inspection results with the inspection data provide by the inspection unit 1,193 and weighing unit 1,194.

It is noted that the data collected by both the inspection unit 1,193 and the weighing unit 1,194 can be stored in various methods.

In one example, the data collected by the inspection unit 1,193 and the weighing unit 1,194 can be stored in a memory device included in the inspection unit 1,193. The memory device may be any type of memory known in the art, such as, but not limited to, a disk drive, a solid state drive, and a flash drive. The data collected by the weighing unit 1,194 may be communicated to the inspection device 1,193 by a wire or wireless communication protocol (RS-232, WiFi, Bluetooth, ZigBee, Ethernet, etc.)

In another example, the data collected by the inspection unit 1,193 and the weighing unit 1,194 can be stored in a memory device included in the weighing unit 1,194. The memory device may be any type of memory known in the art, such as, but not limited to, a disk drive, a solid state drive, and a flash drive. The data collected by the inspecting unit 1,193 may be communicated to the weighing unit 1,194 by a wire or wireless communication protocol (RS-232, WiFi, Bluetooth, ZigBee, Ethernet, etc.)

In yet another example, the data collected by the inspection unit 1,193 and the weighing unit 1,194 can be stored in a memory device located outside of the inspecting unit 1,193 and the weighing unit 1,194, such as a server or remote networked computing device. The memory device may be any type of memory known in the art, such as, but not limited to, a disk drive, a solid state drive, and a flash drive. The data collected by a wire or wireless communication protocol (RS-232, WiFi, Bluetooth, ZigBee, Ethernet, etc.)

Figure 62:
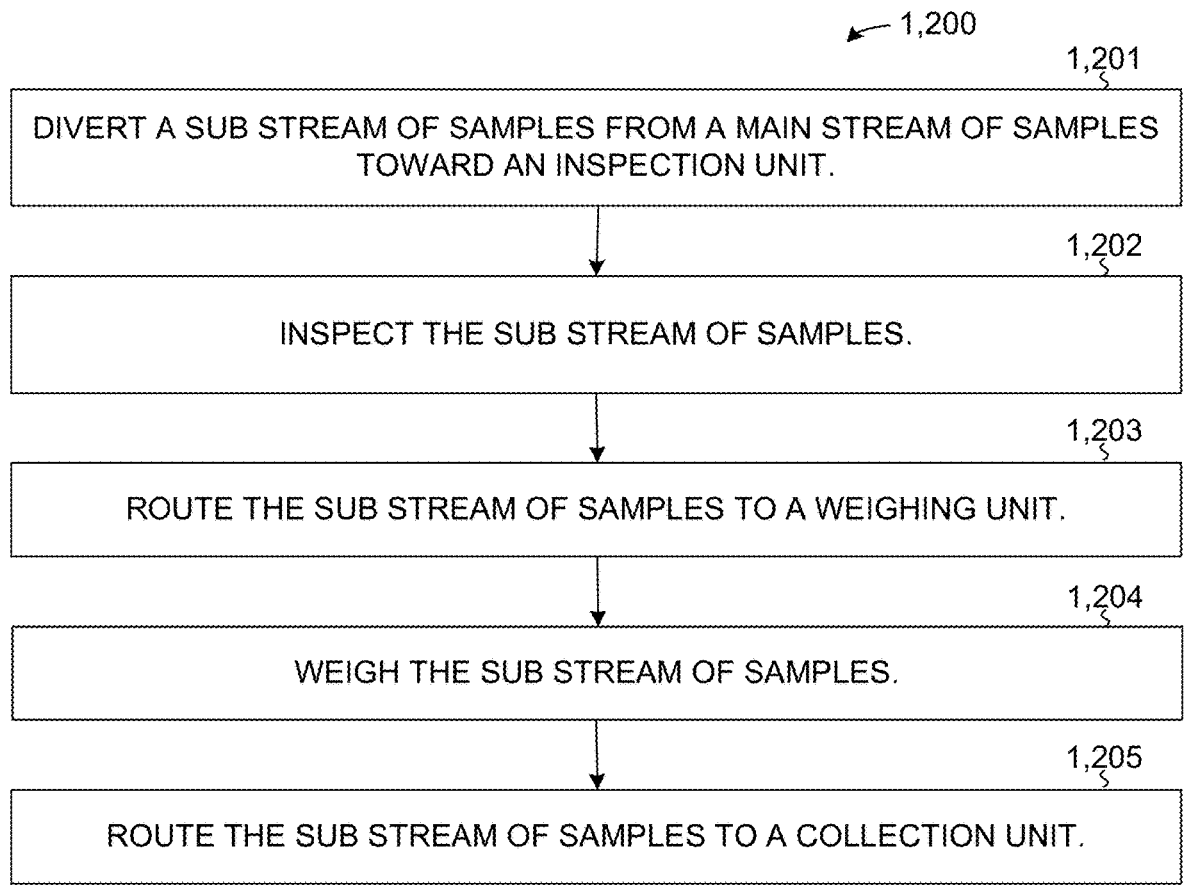
FIG. 62 is a flowchart of a sub stream inspection, weighing and collection system.

FIG. 62 is a flowchart 1,200 of a sub stream inspection, weighing and collection system. In step 1,201 a sub stream of samples from the main stream of samples is diverted toward an inspection unit. In step 1,202, the diverted sub stream of samples is inspected. In step 1,203, the sub stream of samples is routed to a weighing unit. In step 1,204, the sub stream of samples is weighed. Each sample of the sub stream of samples can be weighed individually or can be weighed with multiple samples from the sub stream of samples together and provide a calculated average weight per sample. In step 1,205, the sub stream of samples is routed to a collection unit.

Figure 63:
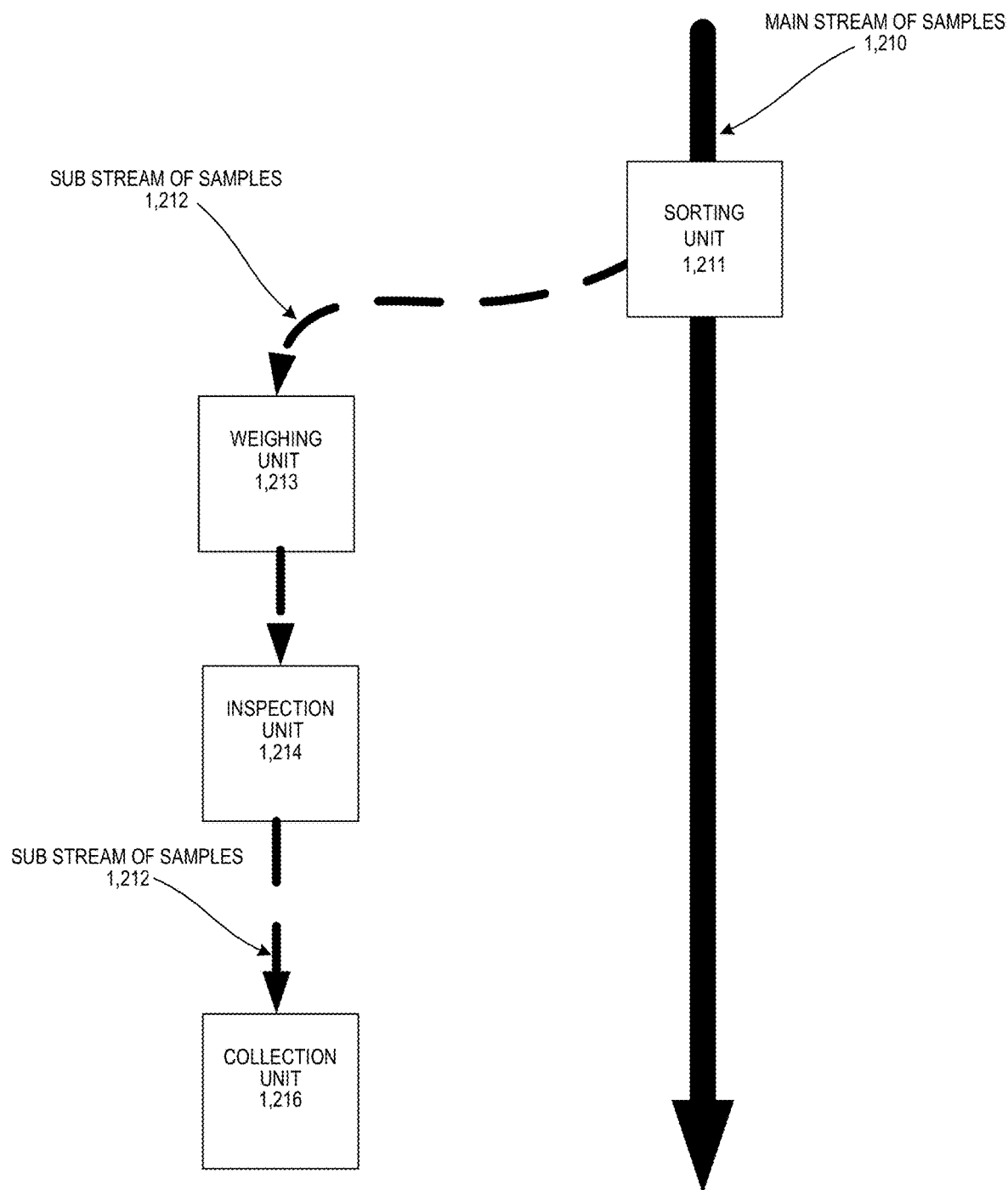
FIG. 63 is a diagram of a sub stream weighing, inspection, and collection system.

FIG. 63 is a diagram illustrating a sub stream weighing, inspection, and collection system. A main stream of samples 1,210 are sorted by sorting unit 1,211. Sorting unit 1,211 may be, but is not limited to, the following types of sorting unit: a vacuum sorter, a mechanical pedal sorter, or an air jet sorter. The sorting unit 1,211 diverts a sub stream of samples 1,212 toward weighing unit 1,213. In one example, the weighing unit 1,213 is an electronic scale that utilizes a strain gauge to measure weight. In another example, the weighing unit 1,213 is an electronically scale that utilizes a force transducer. To aid in the routing of samples, the weighing unit may also include an output chute that directs samples leaving the weighing unit 1,213. The weighing unit 1,213 can weigh each sample of the sub stream of samples 1,212 individually or can weigh multiple samples from the sub stream of samples together and provide a calculated average weight per sample. The sub stream of samples is weighed by weighing unit 1,213. The sub stream of samples is then inspected by inspecting unit 1,214. The sub stream of samples is then routed to collection unit 1,216. The collection unit 1,216 serves to store the sub stream of samples after the inspection is completed. Collecting the inspected sub stream of samples, instead of recombing the sub stream of samples with the main stream of samples, is advantageous in that it allows for later examination of the sub stream of samples that were inspected. For example, it may be advantageous to manually inspect the sub stream of samples and compare the manual inspection results with the inspection data provide by the inspection unit 1,214 and weighing unit 1,213.

It is noted that the data collected by both the inspection unit 1,214 and the weighing unit 1,213 can be stored in various methods.

In one example, the data collected by the inspection unit 1,214 and the weighing unit 1,213 can be stored in a memory device included in the inspection unit 1,214. The memory device may be any type of memory known in the art, such as, but not limited to, a disk drive, a solid state drive, and a flash drive. The data collected by the weighing unit 1,213 may be communicated to the inspection device 1,214 by a wire or wireless communication protocol (RS-232, WiFi, Bluetooth, ZigBee, Ethernet, etc.)

In another example, the data collected by the inspection unit 1,214 and the weighing unit 1,213 can be stored in a memory device included in the weighing unit 1,213. The memory device may be any type of memory known in the art, such as, but not limited to, a disk drive, a solid state drive, and a flash drive. The data collected by the inspecting unit 1,214 may be communicated to the weighing unit 1,213 by a wire or wireless communication protocol (RS-232, WiFi, Bluetooth, ZigBee, Ethernet, etc.)

In yet another example, the data collected by the inspection unit 1,214 and the weighing unit 1,213 can be stored in a memory device located outside of the inspecting unit 1,214 and the weighing unit 1,213, such as a server or remote networked computing device. The memory device may be any type of memory known in the art, such as, but not limited to, a disk drive, a solid state drive, and a flash drive. The data collected by a wire or wireless communication protocol (RS-232, WiFi, Bluetooth, ZigBee, Ethernet, etc.)

Figure 64:
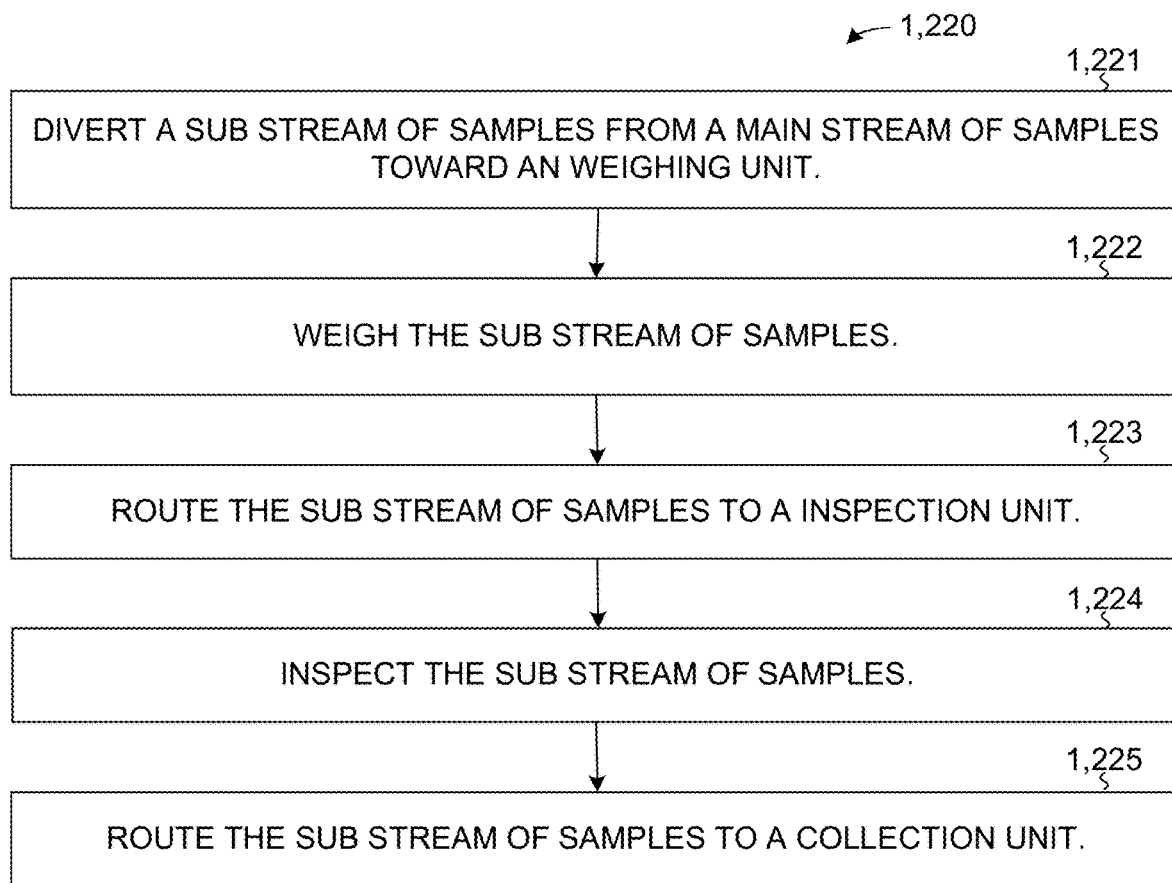
FIG. 64 is a flowchart of a sub stream weighing, inspection, and collection system.

FIG. 64 is a flowchart 1,220 of a sub stream weighing, inspection, and collection system. In step 1,221 a sub stream of samples from the main stream of samples is diverted toward a weighing unit. In step 1,222, the diverted sub stream of samples is weighed. Each sample of the sub stream of samples can be weighed individually or can be weighed with multiple samples from the sub stream of samples together and provide a calculated average weight per sample. In step 1,223, the sub stream of samples is routed to an inspection unit. In step 1,224, the sub stream of samples is inspected. In step 1,225, the sub stream of samples is routed to a collection unit.

Product Target Quality Control System with Intelligent Source Control

In most industries customers only want to pay a fee that is commensurate with the quality level necessary to successfully run their business. While businesses would prefer to always receive the highest grade product, the reality is that higher grade products come with an increased price that may not be practical or necessary. Similarly, product producers may have a required product quality they are required to provide to a specific customer. Even though the producer of the product knows that their Grade "A" is above and beyond the required quality level, if their Grade "B" does not meet the required quality level, the product producer is forced to sell product of a higher grade than required by the customer's specifications, thereby losing potential profits that could have been attained by selling the higher than required quality product for a higher price. The invention described herein provides various solutions to this problem.

Figure 65:
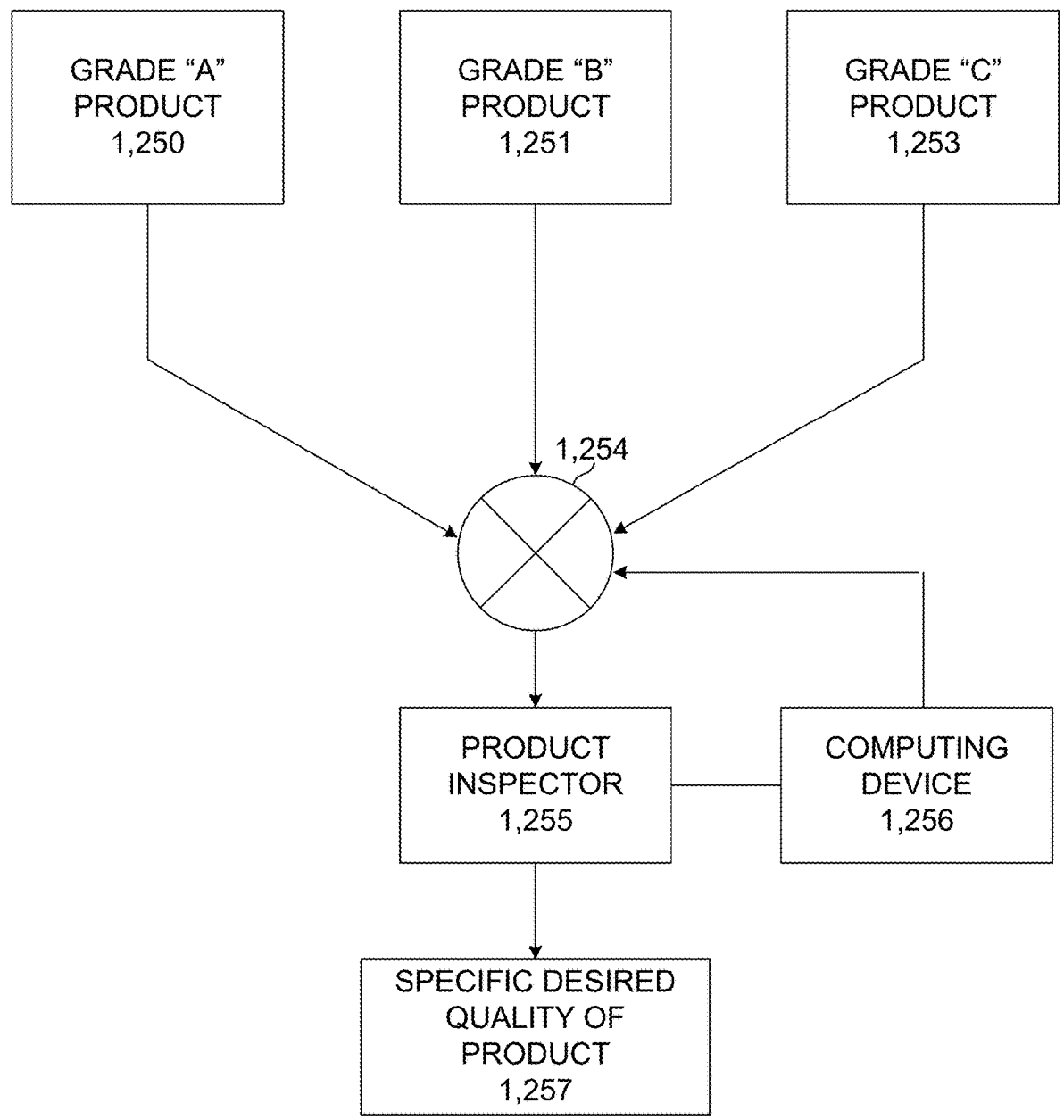
FIG. 65 is a flowchart diagram of a target quality control system with intelligent source control.

FIG. 65 is a flowchart diagram of a target quality control system. In one example, grade "A" product 1,250 contains product pieces, or samples, that are of a relatively high quality level, grade "B" product 1,251 contains product pieces, or samples, that are of a relatively medium quality level, and grade "C" 1,253 contains product pieces, or samples, that are of a relatively low quality level. The approximate range of quality for each grade is known. Given this setup, the system can output product at Grade "A", Grade "B" or Grade "C", however, as mentioned above, it may be desirable to output a more specific product quality grade. In this scenario, there is a need to provide a more specific desired quality level than is provided in the presorted product groups.

In one embodiment of the present invention, this goal is achieved by (i) providing a means for variable selecting product from each of the product grade groups, (ii) providing a means for inspecting the product selected from each product grade group, and (iii) providing a feedback means, wherein the measured quality values generated based on the product inspection are utilized to adjust the ratio of product selected from each of the product grade groups. The product inspector 1,255 provides the means for inspecting the selected product. The computing device 1,256 provides the means for controlling the product ratio based on the measured quality values. Selector 1,254 provides the means to variable select product form each product grade group. Specific desired quality of product 1,257 provides the means to collect or direct the specific mix of product with the desired specific quality.

It is noted herein that FIG. 65 is only a high-level system diagram and that various parts of the system may be arranged differently to attain the same solution. The different arrangements are clear to one skilled in the art after reviewing this description. Specific variations of this high-level system are provided below.

Figure 66:
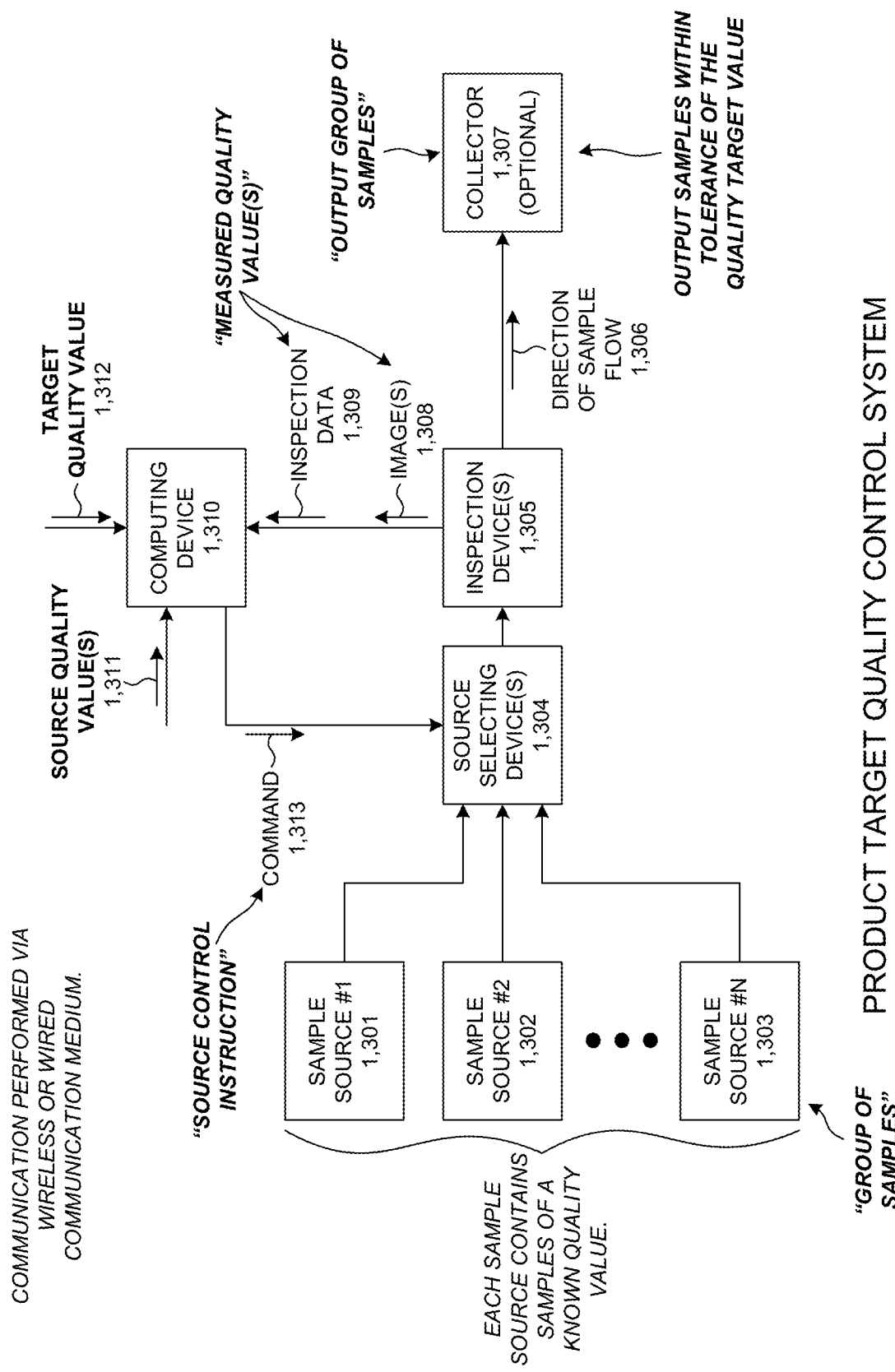
FIG. 66 is an operational diagram of a first target quality control system.

FIG. 66 is an operational diagram of a first target quality control system. The system includes a first sample source 1,301, a second sample source 1,302 and up to an Nth sample source 1,303. Each source contains product of a different predetermined quality level. In one example, the first sample source contains product of a quality grade "A", the second sample source contains product of quality grade "B, and the Nth sample source contains product of quality grade "N". In this example, quality grade "A" is greater than quality grade "B" and quality grade "B" is greater than quality grade "N". In one example, each sample source may be a product bin filled with product of a known quality level. The bin may be gravity fed and output product via an output chute.

Source selecting device(s) 1,304 includes a separate input that is coupled to the output of each sample source. In this manner, the source selecting device 1,304 is able to receive product (sample) from each sample source. Source selecting device 1,304 includes the means to pass product (sample) from any desired product input to a single product output port. The product input port is controlled by command 1,313. Command 1,313 can be received by either a wired or wireless communication. In the wired example, the source selecting device 1,304 includes a wired communication port, such as but not limited to, Ethernet, RS-232, RS-485, USB, SCADA, etc. In the wireless example, the source selecting device 1,304 includes a wireless communication port, such as but not limited to, WiFi, Bluetooth, ZigBee, cellular, etc. The product output port of source selecting device 1,304 is coupled to the input port of inspection device(s) 1,305. Selecting device 1,304 may be any sorter known in the art or any sorter described above in the present application, such as but not limited to, the use of a burst of air to redirect the trajectory of a sample as it travels along the processing line, a vacuum that causes the sample to be removed from the flow of samples through the processing line, or the use of a mechanically controlled flap to redirect the sample as it travels along the processing line.

The inspection devices 1,305 inspect the product (samples) output by source selecting device 1,304. The inspection devices 1,305 have the means to inspect the product (sample) output the source selecting device 1,304 and means to generate measured quality value(s) of the product (sample). In one example, the inspection means is a system of one or more cameras that capture one or more images of the product (sample). In another example, the means to generate measured quality value(s) is performed by conducting image analysis to determine characteristics of the product (sample). In one example, the measured quality value(s) include image(s) 1,308 and/or inspection data 1,309. The measured quality value(s) may be communicated via wired or wireless communication, as mentioned above. The product is then output from the inspection device(s) 1,305 along the direction of sample flow 1,306 to collector 1,307. In one embodiment, the inspection device 1,305 may be any of the inspectors described above, such as, an in-flight 3D inspector, a 2 dimensional inspectors, or any inspection device that is capable of detecting characteristics of a sample.

Collector 1,307 (optional) serves to collect all samples that pass through the system. In one example, the collector 1,307 is a stainless steel bin. It is noted herein, that collector 1,307 is an optional element and not necessary. In other embodiments, the samples are alternatively routed to the remaining processing line.

The target quality control system further includes a computing device 1,310. Computing device 1,310 receives the measured quality value(s) and outputs the command 1,313 sent to the source selecting device 1,304. The computing device 1,310 also receives a target quality value 1,312 and source quality values(s) 1,311.

In operation, the computing device 1,310 controls the product quality level of each product (sample) that is routed to collector 1,307. Each selected product passes through the source selecting device 1,304 and inspection device(s) 1,305 before arriving at collector 1,307. Inspection device(s) 1,305 generate measured quality value(s) of the product (sample) and communicate the measured quality value(s) to computing device 1,310. Accordingly, computing device 1,310 utilizes the measured quality value(s), the source quality value(s) 1,311 and the target quality value 1,312 to determine command 1,313 output by computing device 1,310. For example, computing device 1,310 may receive measured quality value(s) for a plurality of products (samples) that have been routed to collector 1,307. In response to analyzing all of the received measure quality values, computing device 1,310 may determine that average quality level of the products (samples) routed to collector 1,307 is below a desired quality level indicated by target quality value 1.312. In response to this determination, computing device 1,310 further determines that the next product (sample) passed to collector 1,307 should of grade "A" (highest quality) so to attempt to increase the average quality of the products (samples) routed to collector 1,307. Accordingly, computing device 1,310 outputs a command 1,313 that indicates that a product (sample) should be routed from sample source 1,301 (containing grade "A" product) to collector 1,307. As the grade "A" product (sample) passes through inspection device(s) 1,305 a new measured quality value(s) is generated and communicated to computing device 1,310. Computing device 1,310 can then determine if the average product quality level of all products (samples) in collector 1,307 are above the desired quality level indicated by target quality value 1,312.

In another example, the command 1,310 may cause product (samples) to be passed into the system from multiple sample sources contemporaneously. For example, if a target quality value is between grade "A" and grade "B" quality levels, then the command 1,310 may be set to output an even amount form both sample source 1,301 and sample source 1,302, thereby inputting a blend of the two sources into the system.

It is noted herein that computing device 1,310 can use the target quality values in various ways to control the output product quality. In one example, the target quality value 1,312 can be used a threshold value as described above. In another example, the target value 1,312 can be used to set an acceptable range of quality values for the output group of products (samples).

It is further noted herein that the target quality value 1,312 may vary over time as requirements change. For example, a customer quality requirement may increase or decrease due to customer demands. The present invention allows for rapid on demand updating of the target quality value 1,312, which in turn will allow the system to immediately change the product (sample) selection to bring the average quality of all products (samples) in collector 1,307 to the desired level. It is noted herein, that collector 1,307 is an optional element and not necessary. In other embodiments, the samples are alternatively routed to the remaining processing line.

In one example, the sample sources, the source selecting device(s), the inspection device(s) and the collector are all located at the same facility so that the product (sample) can travel to each of these parts of the system. However, computing device 1,310 may or may not be located at the same facility. In one example, the computing device 1,310 may be located in close proximity to inspection device(s) 1,305 and connected via an Ethernet connection. In another example, the computing device 1,310 may be located on the other side of the world from the inspection device(s) 1,305 and connected via a group of various communication technologies, both wired and wireless.

Another note is made with respect to the inspection data 1,309 output by inspection device(s) 1,305. In one example, the inspection device(s) may only output captured raw inspection data, such as but not limited to, image(s) 1,308. The captured raw data is then analyzed by computing device 1,310 to determine the quality of the product (sample) inspected. In another example, the inspection device(s) may also analyze the captured raw data, such as but not limited to, image(s) 1,308 and generate inspection data 1,309, which is output to computing device(s) 1,310. In this fashion, the present invention may utilize either advanced smart inspection devices or simple inspection devices that only capture raw data.

It is also noted herein that computing device 1,310 may be implemented by one or a plurality of computing devices. In one example, computing device 1,310 may be a single computer. In another example, computing device 1,310 may be an array of computers or servers that perform various computations of the system.

One or more source selecting device(s) may be utilized in the present invention. In one example, a single source selecting device has an input port connected to each sample source and a single output port. In another example, a plurality of source selecting devices have input ports connected to various sample sources, and each source selecting device has an output port that is coupled to the product (sample) flow that passes through the inspection device(s) 1,305 and collector 1,307. In this example, command 1,313 is communicated to each source selecting device and causes only one product (sample) to be output from one sample source.

One or more inspection device(s) may be utilized in the present invention. In one example, all products (samples) are passed through a single inspection device, which in turn outputs measured quality value(s) for each product (sample). In another example, a plurality of inspection device(s) may be utilized to inspect all products (samples). This second configuration may be utilized to increase the rate at which product can be processed. The use of a plurality of inspection devices, allows for the inspection of multiple products (samples) at the same moment in time. In this example, measured quality value(s) are communicated from each inspection device to computing device 1,310. In one embodiment, the inspection device is an in-flight 3D inspector as described above herein.

Figure 67:
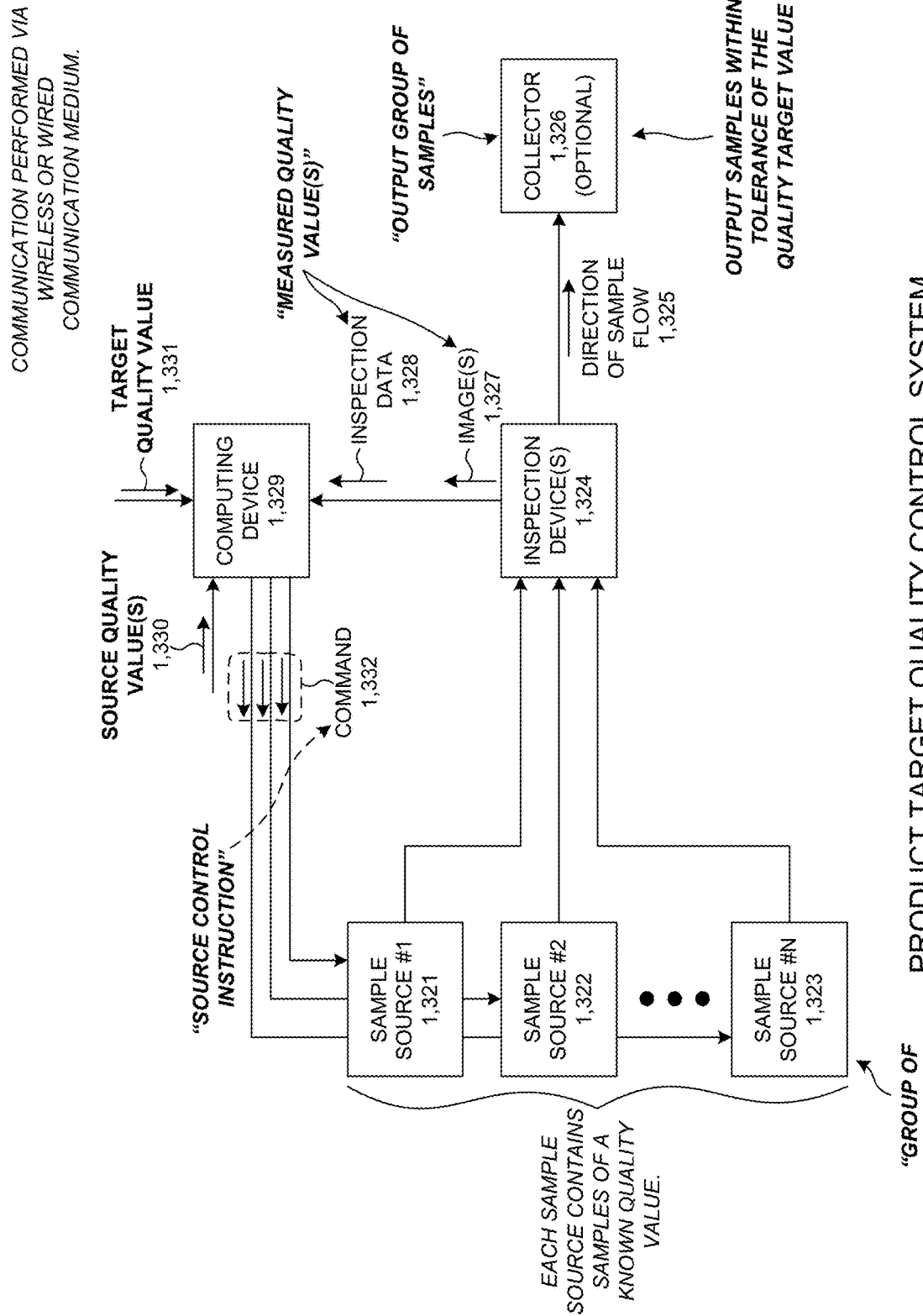
FIG. 67 is an operational diagram of a second target quality control system.

FIG. 67 is an operational diagram of a second target quality control system. The system includes a first sample source 1,321, a second sample source 1,322 and up to an Nth sample source 1,323. Each source contains product of a different predetermined quality level. In one example, the first sample source contains product of a quality grade "A", the second sample source contains product of quality grade "B, and the Nth sample source contains product of quality grade "N". In this example, quality grade "A" is greater than quality grade "B" and quality grade "B" is greater quality grade "N". In one example, each sample source may be a product bin filled with product of the known quality level. The bin may be gravity fed and output product via an output chute.

The system does not include a source selecting device, but rather each sample source includes a means to control the output of product (samples) from the sample source. In one example, the output control means is a vibration plate that vibrates to cause a sample to exit from the sample source. In another example, the output control means is a gate that is opened to cause a sample to exit from the sample source. The sample sources receive a source control instruction via command 1,332 and cause a sample to output when instructed to do so. The output of each sample source is coupled to inspection device(s) 1,324.

The inspection devices 1,324 inspect the product (samples) output by the sample sources. The inspection devices 1,324 have the means to inspect the product (sample) output the sample sources and means to generate measured quality value(s) of the product (sample). In one example, the inspection means is a system of one or more cameras that capture one or more images of the product (sample). In another example, the means to generate measured quality value(s) is performed by conducting image analysis to determine characteristics of the product (sample). In one example, the measured quality value(s) include image(s) 1,327 and/or inspection data 1,328. The measured quality value(s) may be communicated via wired or wireless communication, as mentioned above. The product is then output from the inspection device(s) 1,324 along the direction of sample flow 1,325 to collector 1,326.

Collector 1,326 (optional) serves to collect all samples that pass through the system. In one example, the collector 1,326 is a stainless steel bin. It is noted herein that collector 1,326 is an optional element and not necessary. In other embodiments, the samples are alternatively routed to the remaining processing line.

The target quality control system further includes a computing device 1,329. Computing device 1,329 receives the measured quality value(s) and outputs the command 1,332 sent to the sample sources. The computing device 1,329 also receives a target quality value 1,331 and source quality values(s) 1,330. The source quality value(s) 1,330 and target quality value 1,331 can be received from a human interface device, such as a computer terminal or touch screen device, or from another computer system.

In operation, the computing device 1,329 controls the product quality level of each product (sample) that is routed to collector 1,326. Each selected product passes through the inspection device(s) 1,324 before arriving at collector 1,326. Inspection device(s) 1,324 generate measured quality value (s) of the product (sample) and communicate the measured quality value(s) to computing device 1,329. Accordingly, computing device 1,329 utilizes the measured quality value (s), the source quality value(s) 1,330 and the target quality value 1,331 to determine command 1,332 output by computing device 1,329. For example, computing device 1,329 may receive measured quality value(s) for a plurality of products (samples) that have been routed to collector 1,326. In response to analyzing all of the received measure quality values, computing device 1,329 may determine that average quality level of the products (samples) routed to collector 1,326 is below a desired quality level indicated by target quality value 1.331. In response to this determination, computing device 1,329 further determines that the next product (sample) passed to collector 1,326 should of grade "A" (highest quality) so to attempt to increase the average quality of the products (samples) routed to collector 1,326. Accordingly, computing device 1,329 outputs a command 1,332 that indicates that a product (sample) should be routed from sample source 1,321 (containing grade "A" product) to collector 1,326. As the grade "A" product (sample) passes through inspection device(s) 1,324 a new measured quality value(s) is generated and communicated to computing device 1,329. Computing device 1,329 can then determine if the average product quality level of all products (samples) in collector 1,326 are above the desired quality level indicated by target quality value 1,331.

In another example, the command 1,332 may cause product (samples) to be passed into the system from multiple sample sources contemporaneously. For example, if a target quality value is between grade "A" and grade "B" quality levels, then the command 1,332 may be set to output an even amount form both sample source 1,321 and sample source 1,322, thereby inputting a blend of the two sources into the system.

It is noted herein that computing device 1,329 can use the target quality values in various ways to control the output product quality. In one example, the target quality value 1,331 can be used a threshold value as described above. In another example, the target value 1,331 can be used to set an acceptable range of quality values for the output group of products (samples).

It is further noted herein that the target quality value 1,331 may vary over time as requirements change. For example, a customer quality requirement may increase or decrease due to customer demands. The present invention allows for rapid on demand updating of the target quality value 1,331, which in turn will allow the system to immediately change the product (sample) selection to bring the average quality of all products (samples) in collector 1,326 to the desired level. It is noted herein that collector 1,326 is an optional element and not necessary. In other embodiments, the samples are alternatively routed to the remaining processing line.

In one example, the sample sources, the source selecting device(s), the inspection device(s) and the collector are all located at the same facility so that the product (sample) can travel to each of these parts of the system. However, computing device 1,329 may or may not be located at the same facility. In one example, the computing device 1,329 may be located in close proximity to inspection device(s) 1,324 and connected via an Ethernet connection. In another example, the computing device 1,329 may be located on the other side of the world from the inspection device(s) 1,324 and connected via a group of various communication technologies, both wired and wireless.

Another note is made with respect to the inspection data 1,328 output by inspection device(s) 1,324. In one example, the inspection device(s) may only output captured raw inspection data, such as but not limited to, image(s) 1,327. The captured raw data is then analyzed by computing device 1,329 to determine the quality of the product (sample) inspected. In another example, the inspection device(s) may also analyze the captured raw data, such as but not limited to, image(s) 1,327 and generate inspection data 1,328, which is output to computing device(s) 1,329. In this fashion, the present invention may utilize either advanced smart inspection devices or simple inspection devices that only capture raw data.

It is also noted herein that computing device 1,329 may be implemented by one or a plurality of computing devices. In one example, computing device 1,329 may be a single computer. In another example, computing device 1,329 may be implemented utilizing an array of computers or servers that perform various computations of the system.

One or more inspection device(s) may be utilized in the present invention. In one example, all products (samples) are passed through a single inspection device, which in turn outputs measured quality value(s) for each product (sample). In another example, a plurality of inspection device(s) may be utilized to inspect all products (samples). This second configuration may be utilized to increase the rate at which product can be processed. The use of a plurality of inspection devices, allows for the inspection of multiple products (samples) at the same moment in time. In this example, measured quality value(s) are communicated from each inspection device to computing device 1,329.

Figure 68:
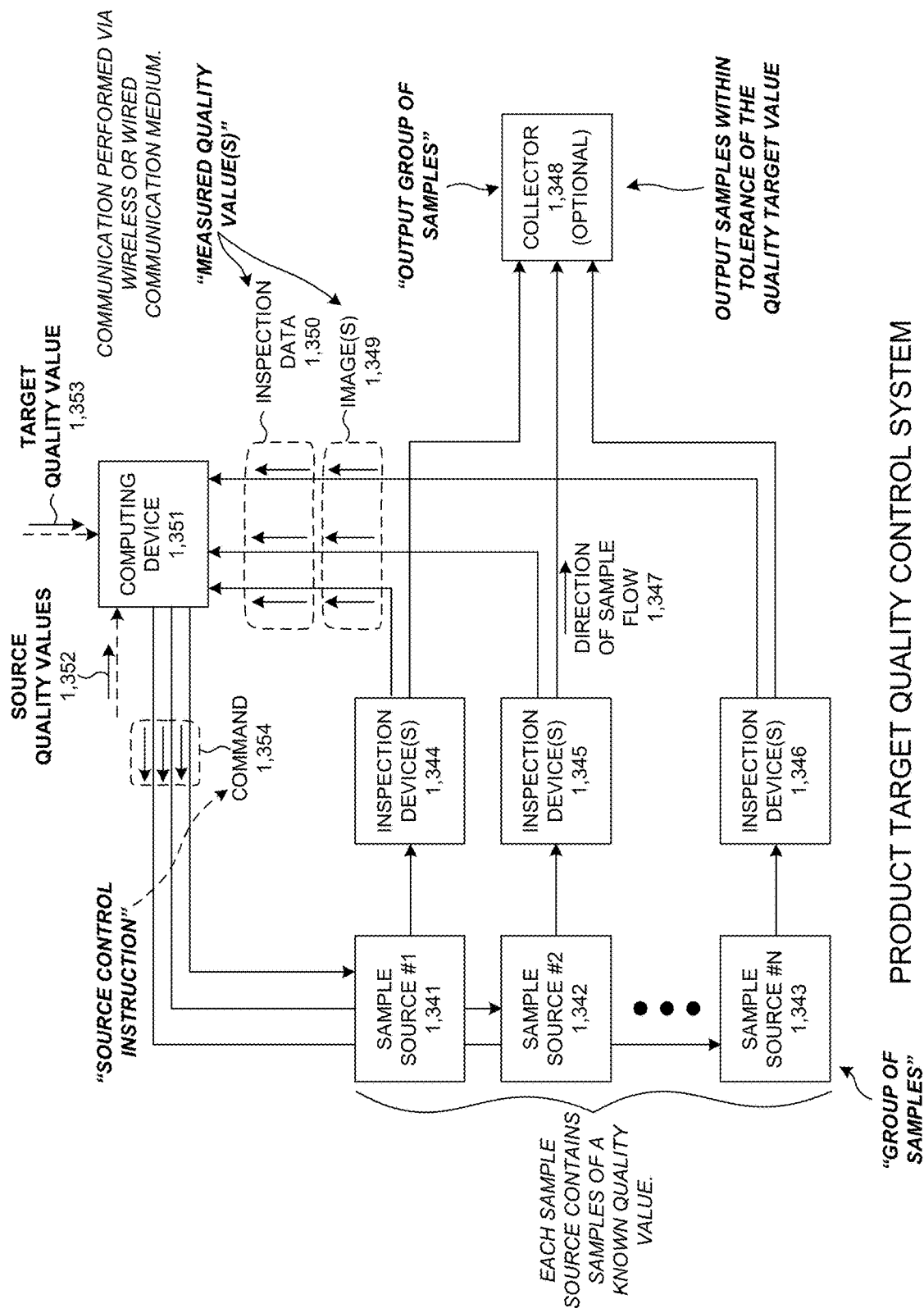
FIG. 68 is an operational diagram of a third target quality control system.

FIG. 68 is an operational diagram of a third target quality control system. The system includes a first sample source 1,341, a second sample source 1,342 and up to an Nth sample source 1,343. Each source may contain product of a different or similar predetermined quality level. In one example, the first sample source contains product of a quality grade "A", the second sample source contains product of quality grade "B, and the Nth sample source contains product of quality grade "N". In this example, quality grade "A" is greater than quality grade "B" and quality grade "B" is greater quality grade "N". In one example, each sample source may be a product bin filled with product of the known quality level. The bin may be gravity fed and output product via an output chute.

The system does not include a source selecting device, but rather each sample source includes a means to control the output of product (samples) from the sample source. In one example, the output control means is a vibration plate that vibrates to cause a sample to exit from the sample source. In another example, the output control means is a gate that is opened to cause a sample to exit from the sample source. The sample sources receive a source control instruction via command 1,354 and cause a sample to output when instructed to do so. The output of each sample source is coupled to a dedicated inspection device that receives output product (samples) only from one sample source. The one-to-one relationship between sample sources and inspection devices provide multiple benefits.

First, the one-to-one relationship between sample source and inspection device allows the system to pinpoint the actual quality level of each sample source. This system benefit is extremely useful, in that, the source quality values are often human generated and based on a variety of assumptions and estimates. The system described in the present invention allows for the exact measurement of the quality level and type of defects present for each sample source. For example, a sample source may be designated grade "A", however, after inspection of large quantity of product (samples) from the source, the system may determine that the grade of the sample source is in fact not grade "A", but rather a lower grade of product. This information is extremely important when trying to control the exactly quality level of the output product.

Second, the one-to-one relationship between sample source and inspection device provides increased system throughput. Inspecting multiple samples at the same moment in time allows for more product (samples) to move through the system over a fixed period of time.

The inspection devices inspect the product (samples) output by the sample sources. The inspection devices have the means to inspect the product (sample) output the sample sources and means to generate measured quality value(s) of the product (sample). In one example, the inspection means is a system of one or more cameras that capture one or more images of the product (sample). In another example, the means to generate measured quality value(s) is performed by conducting image analysis to determine characteristics of the product (sample). In one example, the measured quality value(s) include image(s) 1,349 and/or inspection data 1,350. The measured quality value(s) may be communicated via wired or wireless communication, as mentioned above. The product is then output from the inspection device(s) along the direction of sample flow 1,347 to collector 1,348.

Collector 1,348 serves to collect all samples that pass through the system. In one example, the collector 1,348 is a stainless steel bin. It is noted herein that collector 1,348 is an optional element and not necessary. In other embodiments, the samples are alternatively routed to the remaining processing line.

The target quality control system further includes a computing device 1,341. Computing device 1,351 receives the measured quality value(s) and outputs the command 1,354 sent to the sample sources. The computing device 1,351 also receives a target quality value 1,353 and source quality values(s) 1,352. The source quality value(s) 1,352 and target quality value 1,353 can be received from a human interface device, such as a computer terminal or touch screen device, or from another computer system.

In operation, the computing device 1,351 controls the product quality level of each product (sample) that is routed to collector 1,348. Each selected product passes through the inspection devices 1,344, 1,345, 1,346 before arriving at collector 1,348. Inspection devices generate measured quality value(s) of the product (sample) and communicate the measured quality value(s) to computing device 1,351. Accordingly, computing device 1,351 utilizes the measured quality value(s), the source quality value(s) 1,352 and the target quality value 1,353 to determine command 1,354 output by computing device 1,351. For example, computing device 1,351 may receive measured quality value(s) for a plurality of products (samples) that have been routed to collector 1,348. In response to analyzing all of the received measure quality values, computing device 1,351 may determine that average quality level of the products (samples) routed to collector 1,348 is below a desired quality level indicated by target quality value 1.353. In response to this determination, computing device 1,351 further determines that the next product (sample) passed to collector 1,348 should be of grade "A" (highest quality) so to attempt to increase the average quality of the products (samples) routed to collector 1,348. Accordingly, computing device 1,351 outputs a command 1,354 that indicates that a product (sample) should be routed from sample source 1,341 (containing grade "A" product) to collector 1,348. As the grade "A" product (sample) passes through inspection device 1,344 a new measured quality value(s) is generated and communicated to computing device 1,351. Computing device 1,351 can then determine if the average product quality level of all products (samples) in collector 1,348 is above the desired quality level indicated by target quality value 1,353.

In another example, the command 1,354 may cause product (samples) to be passed into the system from multiple sample sources contemporaneously. For example, if a target quality value is between grade "A" and grade "B" quality levels, then the command 1,354 may be set to output an even amount form both sample source 1,341 and sample source 1,342, thereby inputting a blend of the two sources into the system.

It is noted herein that computing device 1,351 can use the target quality values in various ways to control the output product quality. In one example, the target quality value 1,353 can be used a threshold value as described above. In another example, the target value 1,353 can be used to set an acceptable range of quality values for the output group of products (samples).

It is further noted herein that the target quality value 1,353 may vary over time as requirements change. For example, a customer quality requirement may increase or decrease due to customer demands. The present invention allows for rapid on demand updating of the target quality value 1,353, which in turn will allow the system to immediately change the product (sample) selection to bring the average quality of all products (samples) in collector 1,348 to the desired level. It is noted herein that collector 1,348 is an optional element and not necessary. In other embodiments, the samples are alternatively routed to the remaining processing line.

In one example, the sample sources, the source selecting device(s), the inspection device(s) and the collector are all located at the same facility so that the product (sample) can travel to each of these parts of the system. However, computing device 1,351 may or may not be located at the same facility. In one example, the computing device 1,351 may be located in close proximity to inspection devices 1,344, 1,345, 1,346 and connected via an Ethernet connection. In another example, the computing device 1,351 may be located on the other side of the world from the inspection devices 1,344, 1,345, 1,346 and connected via a group of various communication technologies, both wired and wireless.

Another note is made with respect to the inspection data 1,340 output by inspection devices. In one example, the inspection devices may only output captured raw inspection data, such as but not limited to, image(s) 1,349. The captured raw data is then analyzed by computing device 1,351 to determine the quality of the product (sample) inspected. In another example, the inspection devices may also analyze the captured raw data, such as but not limited to, image(s) 1,349 and generate inspection data 1,350, which is output to computing device 1,351. In this fashion, the present invention may utilize either advanced smart inspection devices or simple inspection devices that only capture raw data.

It is also noted herein that computing device 1,351 may be implemented by one or a plurality of computing devices. In one example, computing device 1,351 may be a single computer. In another example, computing device 1,351 may be implemented utilizing an array of computers or servers that perform various computations of the system.

With respect to all embodiments discussed above, an inspection device may be any of the following: an optical sensor, a moisture sensor, a microtoxin sensor, a thermometer sensor, an acidity sensor, a microwave sensor, a pressure sensor, a level sensor, an ultrasonic sensor, a flow sensor, a viscosity sensor, a conductance/impedance sensor, an electronic nose (sniffing) sensor, an X-ray sensor, a multi spectral (visual/non visual) sensor, a weight sensor, a refractometer sensor, a tenderometer sensor, a firmness sensor, or a hardness sensor.

With respect to all embodiments discussed above, the target quality value may be a single value or more than a single value. For example, the target quality value may be any combination of the following: a shape quality, surface contour quality, hole quality, pest quality, size quality, moisture level, oil content, fat content, mycotoxin content, broken objects (parts missing), foreign material (such as rocks, plastic, metal, wood, glass, . . . ), discolored objects (partially or complete), misshapen objects (not matching a predefined shape), objects that do not match certain dimensions (too long, too short, too wide, too narrow, too thick, to thin, etc.), visual damage (discolored spots or areas, insect damage, shriveled/dried, surface skin damage, mold, decay, or rancid.

With respect to all embodiments discussed above, the computing device comprises a processing circuit, a memory unit, and a communication port. The target quality value, the measured quality value, the source quality value, and the source control instruction are communicated via the communication port.

With respect to all embodiments discussed above, the system may further be configured to output an alert message when the target quality value is not achieved. The message may be sent via wired or wireless network. The message may also be sent via an audible message broadcast at the processing facility. The message may alternatively be communicated via a local visual indiator, such as but not limited to, a blinking red light.

With respect to all embodiments discussed above, machine learning may be used to generate the source control instruction. The incoming inspection data is fed into a machine learning algorithm on the computing device. Over time the machine learning algorithm builds a model to predict the make up of the product flow. This enables the computing device to take machine learning driven decisions for the source control instructions. Over time the machine learning model improves and will be capable to predict the future expected quality data more accurately. For example, if the sample sources are fed through bins the bottom of the bin might contain more broken product leading to a cyclical pattern in the product stream of increased amounts of broken product at the end of every input bin. The machine learning approach enables the computing device to learn and take into account these cyclical patterns.

Figure 69:
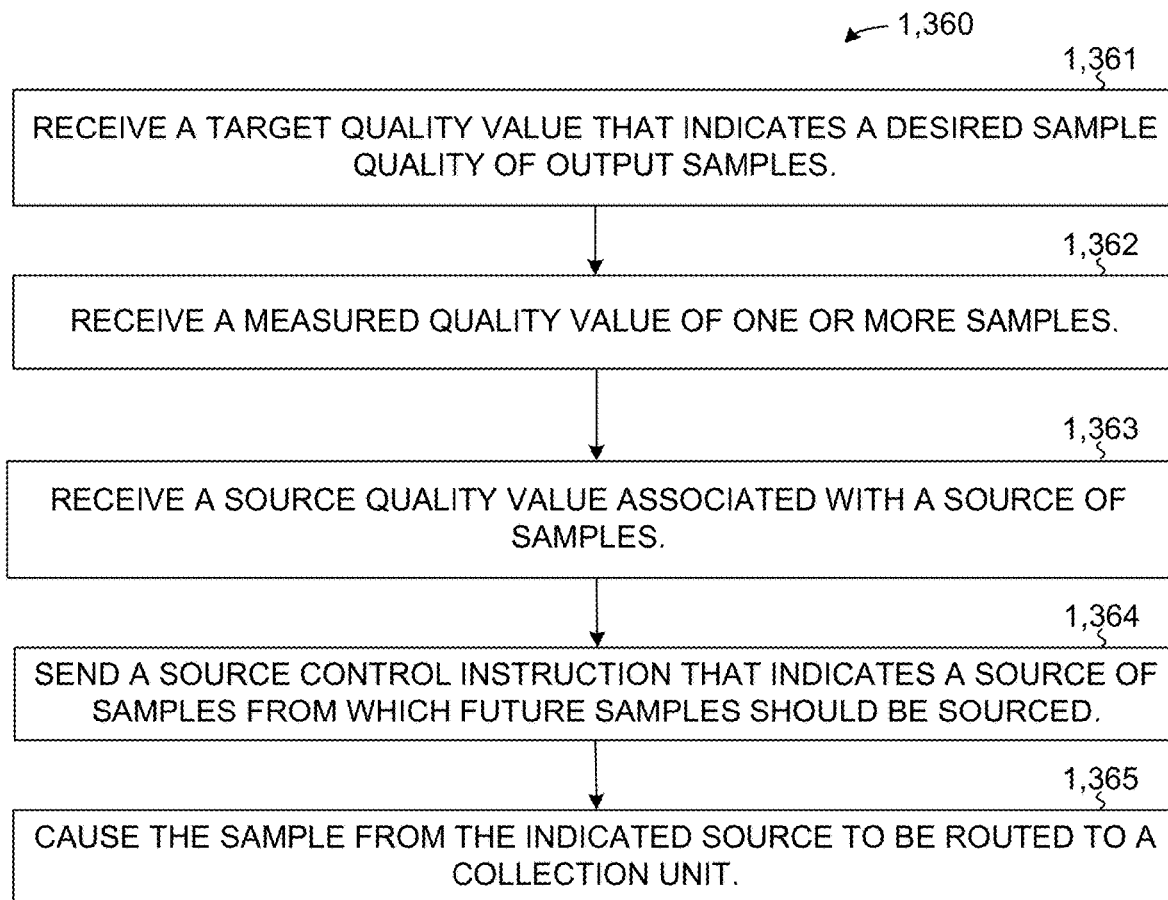
FIG. 69 is a flowchart of a target quality control system.

FIG. 69 is a flowchart 1,360 of a target quality control system. In step 1,361 a target quality value that indicates a desired sample quality of output samples is received. In step 1,362 a measured quality value of one or more samples is received. In step 1,363 a source quality value associated with a source of samples is received. In step 1,364 a source control instruction that indicates a source of samples from which future samples should be sourced is sent. In step 1,365, the sample from the indicated source is caused to be routed to a collection unit.

Figure 70:
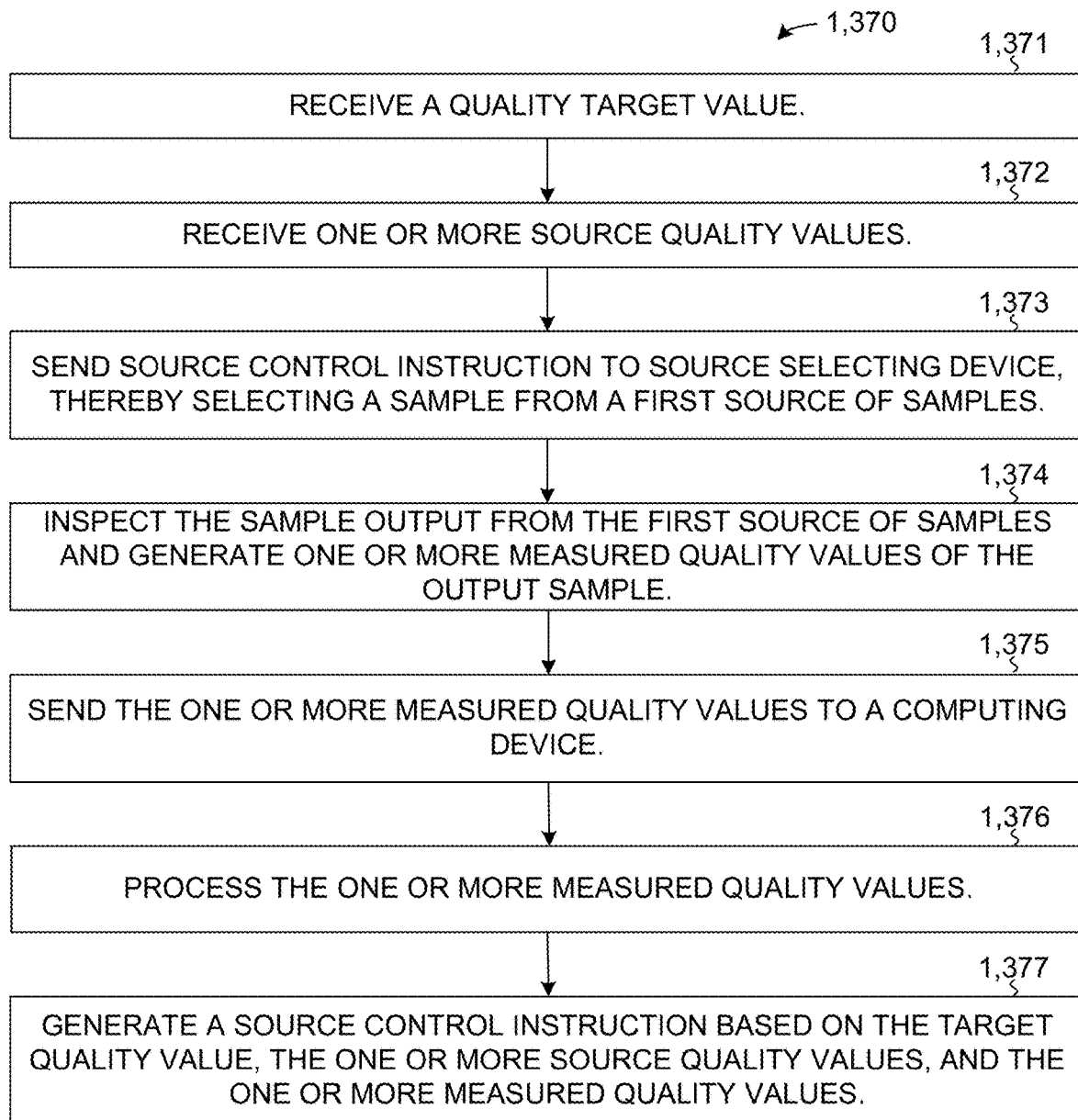
FIG. 70 is a flowchart of a target quality control system.

FIG. 70 is a flowchart 1,370 of a target quality control system. In step 1,371 a quality target value is received. In step 1,372, one or more source quality values are received. In step 1,373, a source control instruction is sent to source selecting device, thereby selecting a sample from the first sample source. In step 1,374, the sample from the first source of samples is inspected and one or more measured quality values are generated. In step 1,375, the one or more measured quality values are sent to a computing device. In step 1,376, the one or more measure quality values are processed. In step 1, 377, a source control instruction is generated based on the target quality value, the one or more source quality values, and the one or more measured quality values.

Product Target Quality Control System with Intelligent Sorting

Figure 71:
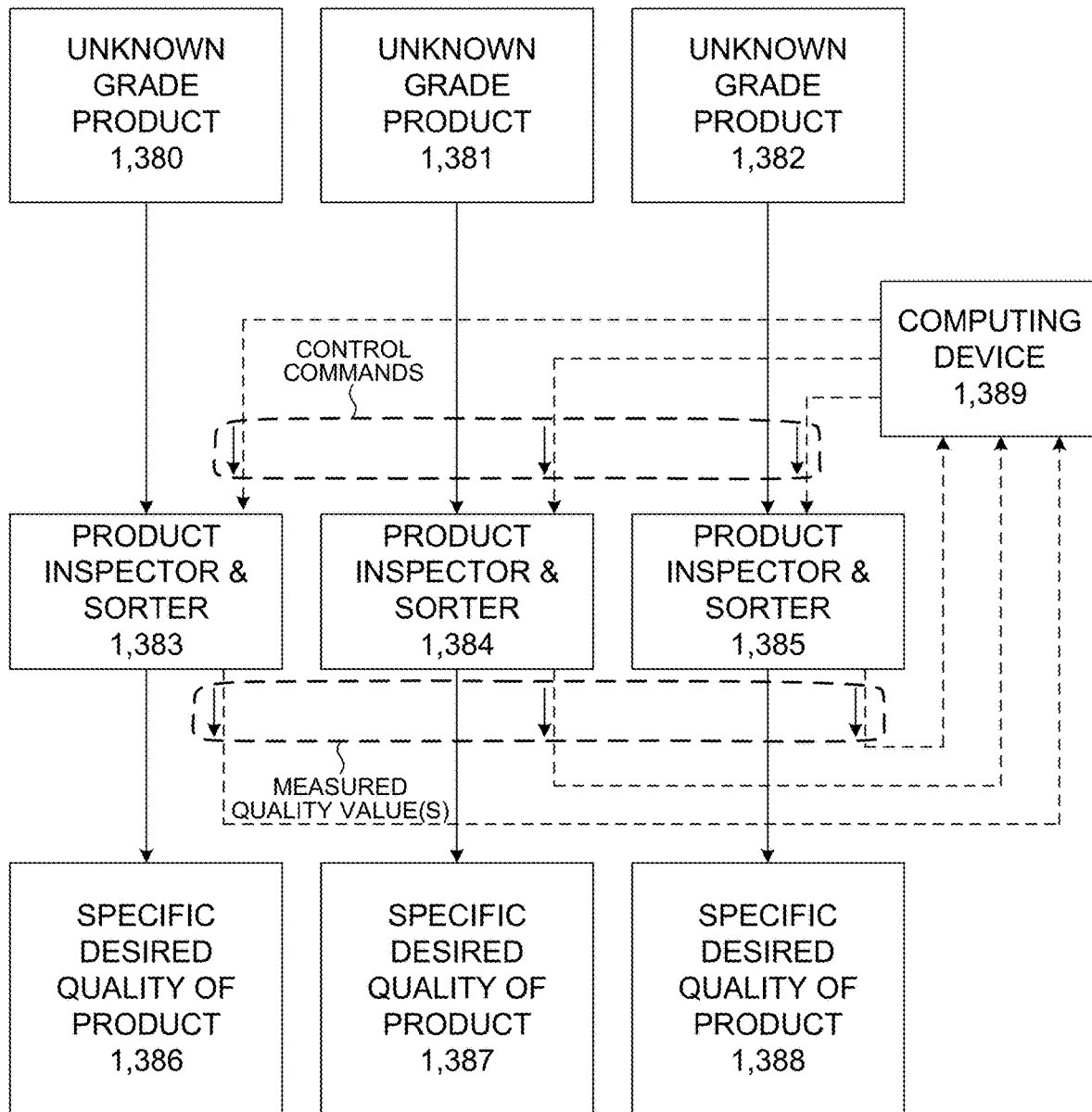
FIG. 71 is a flowchart diagram of a target quality control system with intelligent inspection and sorting.

FIG. 71 is a flowchart diagram of a target quality control system with intelligent inspection and sorting. The system includes one or more product (sample) sources. In one example, the system includes three sources of unknown grade product 1,380, 1,381, and 1,382. The label of "unknown" indicates that the quality, or "grade", of the product (samples) included in each source are not previously known by the system. The quality of the product in each source may also not be uniform; therefore, each source may include wide range of product quality. The system also includes three product inspection and sorters 1,383, 1384, and 1,385. Each product inspector and sorter first perform an inspection of a product (sample), then sorts the product (sample) depending on the inspection results. For example, if the inspection indicates that there is a defect in the product, then the product may be sorted to a garbage bin. In another example, the product can be sorted for a different use where a lower quality level product is suitable. The system also includes computing device 1,389. Computing device 1,389 may be a single computer or an array of computers. The computing device 1,389 is configured to send a control command to the product inspector, thereby controlling the method of inspection to be performed by the product inspector and sorter. In one example, the control command also controls how the product (sample) is sorted. In another example, the inspection portion of the product inspection and sorter generates a command controlling how the product (sample) is sorted. After the inspection is complete, the product inspector and sorters send measure quality value(s) to the computing device. The computing device then processes the measured quality value(s) and determines if a new control command is necessary to adjust the quality level of the product (samples) output by the system. In one example, the product output by each product inspector and sorter is output to separate bins, each having a specific desired quality of product 1,386, 1,387 and 1,388. It is noted that FIG. 71 is a high-level flowchart provided to give an overview of the system. Many details and permutations are omitted for simplicity. A more detailed description of the various embodiments is provided below.

Figure 72:
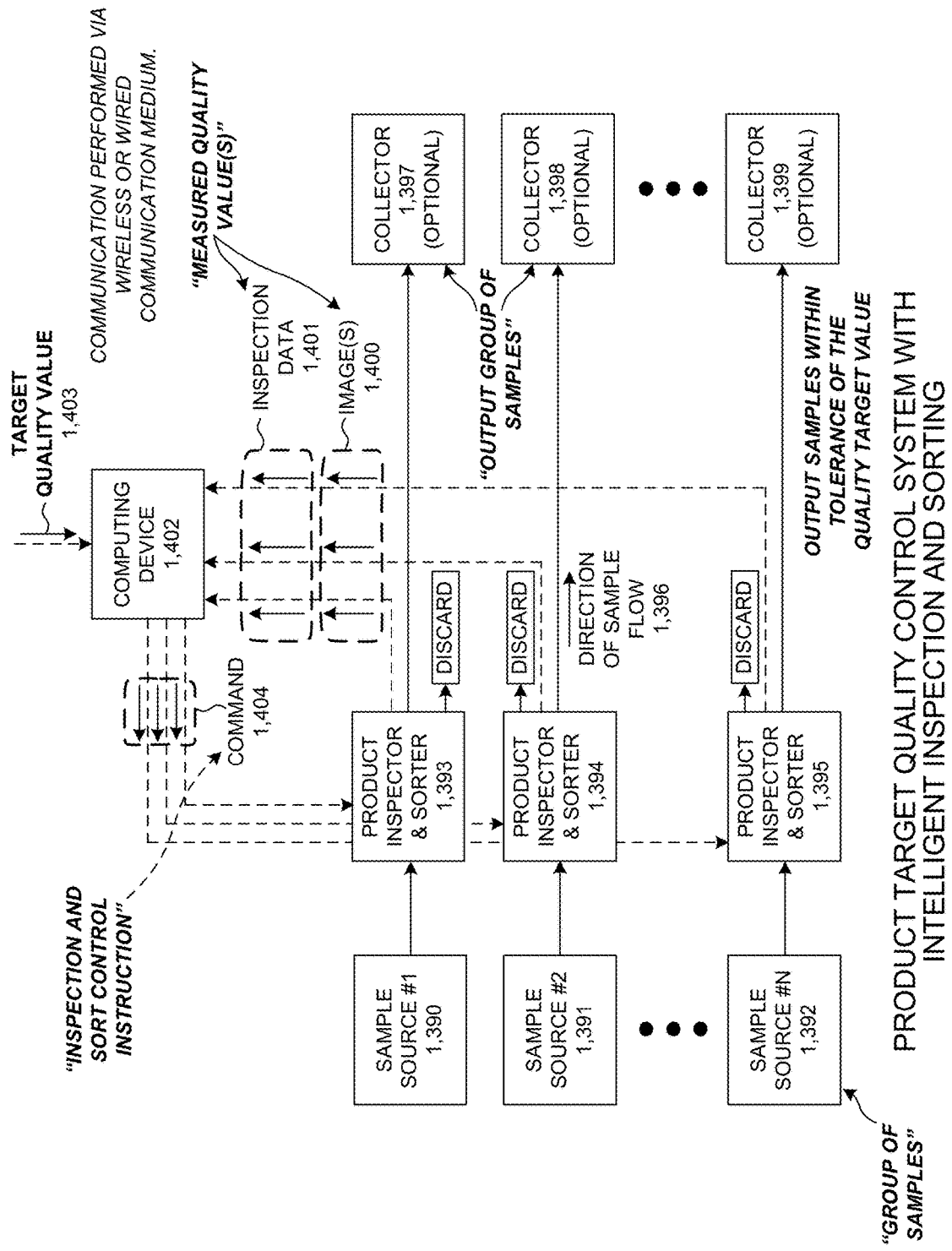
FIG. 72 is an operation diagram of a first target quality control system using intelligent inspection and sorting.

FIG. 72 is an operation diagram of a first target quality control system using intelligent inspection and sorting. The system includes multiple sample sources 1,390, 1,391 and 1,392. Each sample source is configured to output samples (product) to a different product inspector and sorter 1,393, 1,394, and 1,395. The product inspectors and sorters are configured to output samples to either a discard bin or to a unique quality pass collector or processing line 1,397, 1,398, or 1,399. They system also includes a computing device 1,402 that receives a target quality value 1,403 and measured quality values output from each product inspector and sorter. The measured quality value(s) may include inspection data 1,401 and may also include images 1,400. In operation, computing device 1,402 outputs command(s) 1,404 to each product inspector and sorter, thereby controlling the manner the method of inspection and sorting performed by each product inspector and sorter. For example, the command 1,404 may cause a product inspector and sorter to inspect a passing product (sample) and determine if a specific defect or characteristic is present in the product. The command 1,404 may cause the product inspector and sorter to direct the outputting of the sample based upon the inspection results. For example, the inspection may indicate that a product (sample) has a defect and then accordingly route the product to a discard bin. Alternatively, the inspection may indicate that the product has no defects and then accordingly route the product to the passing product collection bin or processing line. It is noted herein that control of the sorting can be performed by either the computing device 1,402 (based on the measured quality data) or by the product inspector and sorter itself. In the latter scenario, the product inspector and sorter can process the inspection data collected about the product and determine the sorting action to be performed on the product. The product inspector may be implemented using any of the inspector devices described above. For example, the use of one or more cameras may be used to capture one or more images of the product and then those images may be processed to perform the inspection.

Figure 73:
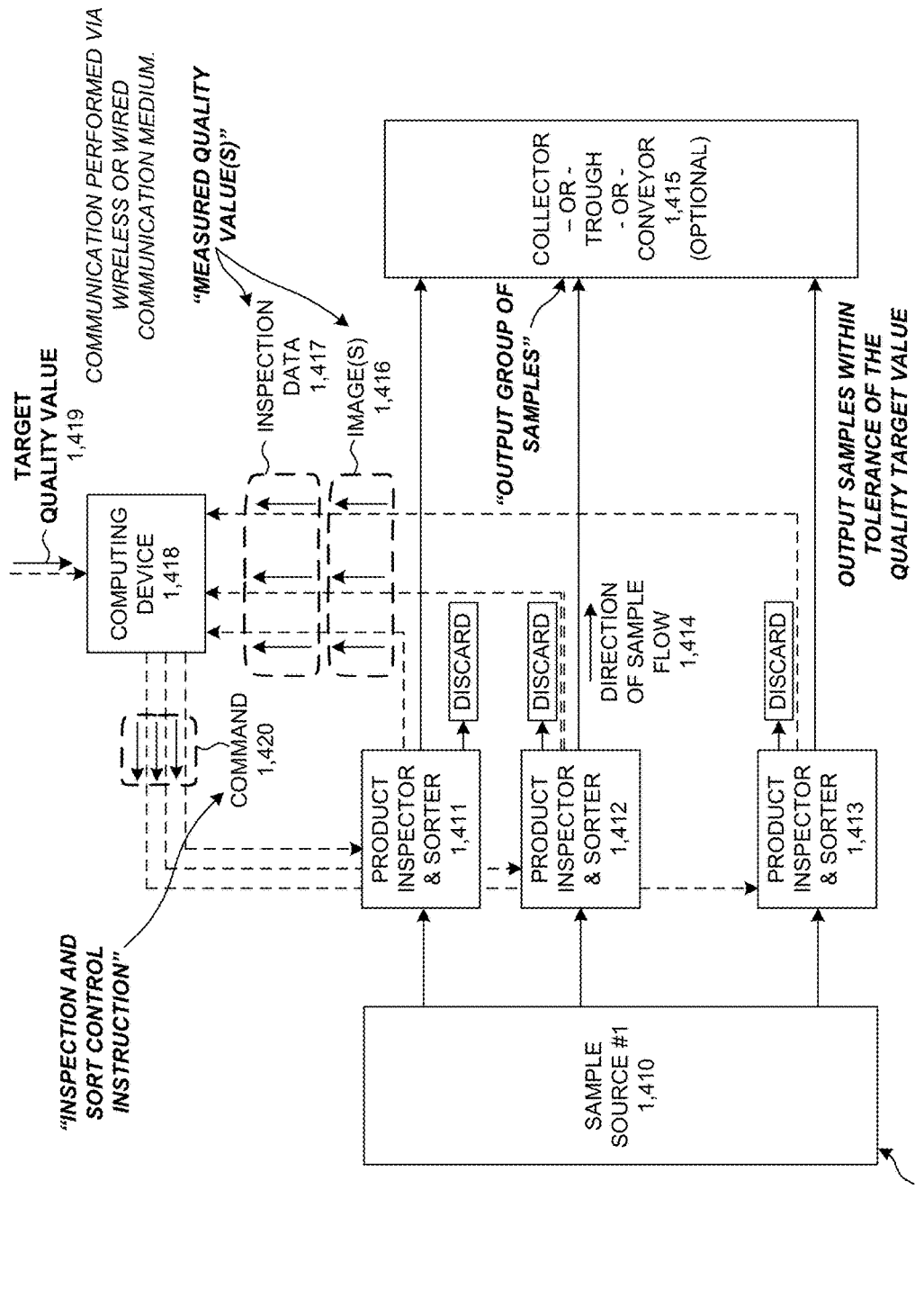
FIG. 73 is an operation diagram of a second target quality control system using intelligent inspection and sorting.

FIG. 73 is an operation diagram of a second target quality control system using intelligent inspection and sorting. The system includes a single sample source 1,410 which is configured to output samples to multiple product inspector and sorters 1,411, 1,412 and 1,413. The product inspectors and sorters are configured to output samples to either a discard bin or to a quality pass collector or processing line 1,415. They system also includes a computing device 1,418 that receives a target quality value 1,419 and measured quality values output from each product inspector and sorter. The measured quality value(s) may include inspection data 1,417 and may also include images 1,416. In operation, computing device 1,418 outputs command(s) 1,420 to each product inspector and sorter, thereby controlling the manner the method of inspection and sorting performed by each product inspector and sorter. For example, the command 1,420 may cause a product inspector and sorter to inspect a passing product (sample) and determine if a specific defect or characteristic is present in the product. The command 1,404 may cause the product inspector and sorter to direct the outputting of the sample based upon the inspection results. For example, the inspection may indicate that a product (sample) has a defect and then accordingly route the product to a discard bin. Alternatively, the inspection may indicate that the product has no defects and then accordingly route the product to the passing product collection bin or processing line. It is noted herein that control of the sorting can be performed by either the computing device 1,402 (based on the measured quality data) or by the product inspector and sorter itself. In the latter scenario, the product inspector and sorter can process the inspection data collected about the product and determine the sorting action to be performed on the product. The product inspector may be implemented using any of the inspector devices described above. For example, the use of one or more cameras may be used to capture one or more images of the product and then those images may be processed to perform the inspection.

A benefit of the product target quality control system with intelligent inspection and sorting system is illuminated in the comparison of FIG. 72 with FIG. 73. The system is capable of outputting product at the desired target quality level regardless of any preprocessing of the source samples (product). In other systems, the average quality level of a sample source is necessary to adjust the output product to a desired target quality level. However, in the present invention the system can provide a very specific target quality level without any preprocessing of product and without any previous knowledge of each product (sample) source quality levels. This provides a large temporal and financial benefit to food processors. Preprocessing product requires time and costs. Removal of preprocessing eliminates this time and costs.

Figure 74:
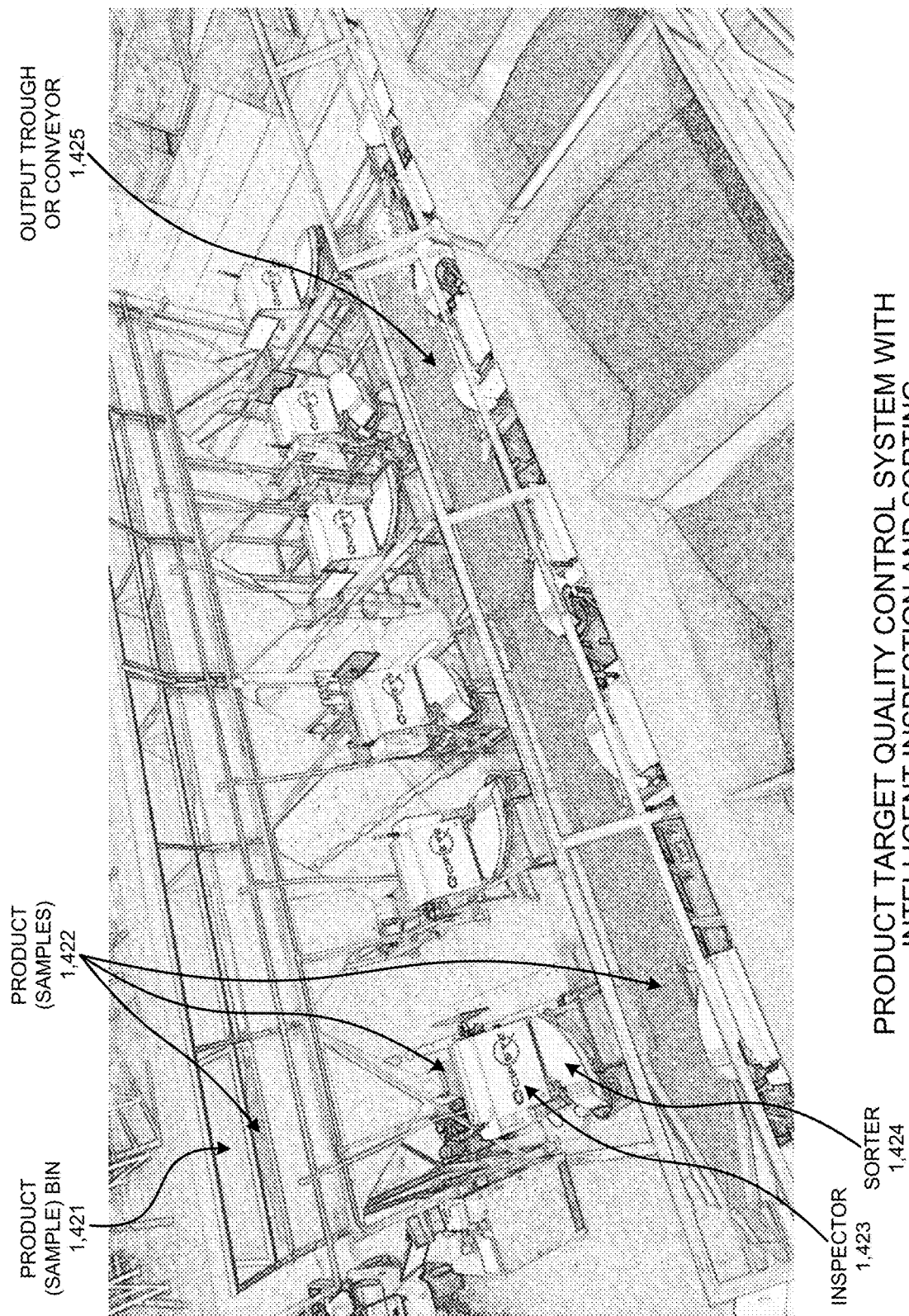
FIG. 74 is a perspective view of an inspection and sorting production line.

FIG. 74 is a perspective view of an inspection and sorting production line. The system includes a product sample bin 1,421 that is filled with product (samples) 1,422. They system also includes an inspector 1,423 and sorter 1,424. An output trough, conveyor, or collection bin 1,425 is also included in the system. In the present invention, the inspector 1,423 and sorter 1,424 are operate together as a single product inspector and sorter. Via a wireless or wired communication medium, the product inspector and sorter is in communication with a computing device. The computing device can receive a target quality value(s) and output a command to the product inspector and sorter, thereby changing the operation of the product inspector and sorter so that product satisfying the target quality value(s) is output to the trough, conveyor, collection bin 1,425.

FIG. 74 illustrates multiple inspector-sorter pairs, each of which can be configured to operate as a product inspection and sorter. Similarly, each of the product inspector and sorter units can be controlled by a computer device. This configuration allows real-time control of the product quality that is output from the system. Further, this system allows a computing device to record the data for each product (sample) that is inspected. Moreover, the computing device is able to record the sorting operations performed on each product (sample) that passes through the system. This data can be of tremendous value. In one example, this data is used to determine if the quality of one source of product is significantly better or worse than another source. In another example, this data can be used to determine if they are specific types of defects in different sample sources. Those benefits are highly desired in addition to the primary goal of output product at a desired target quality level.

Figure 75:
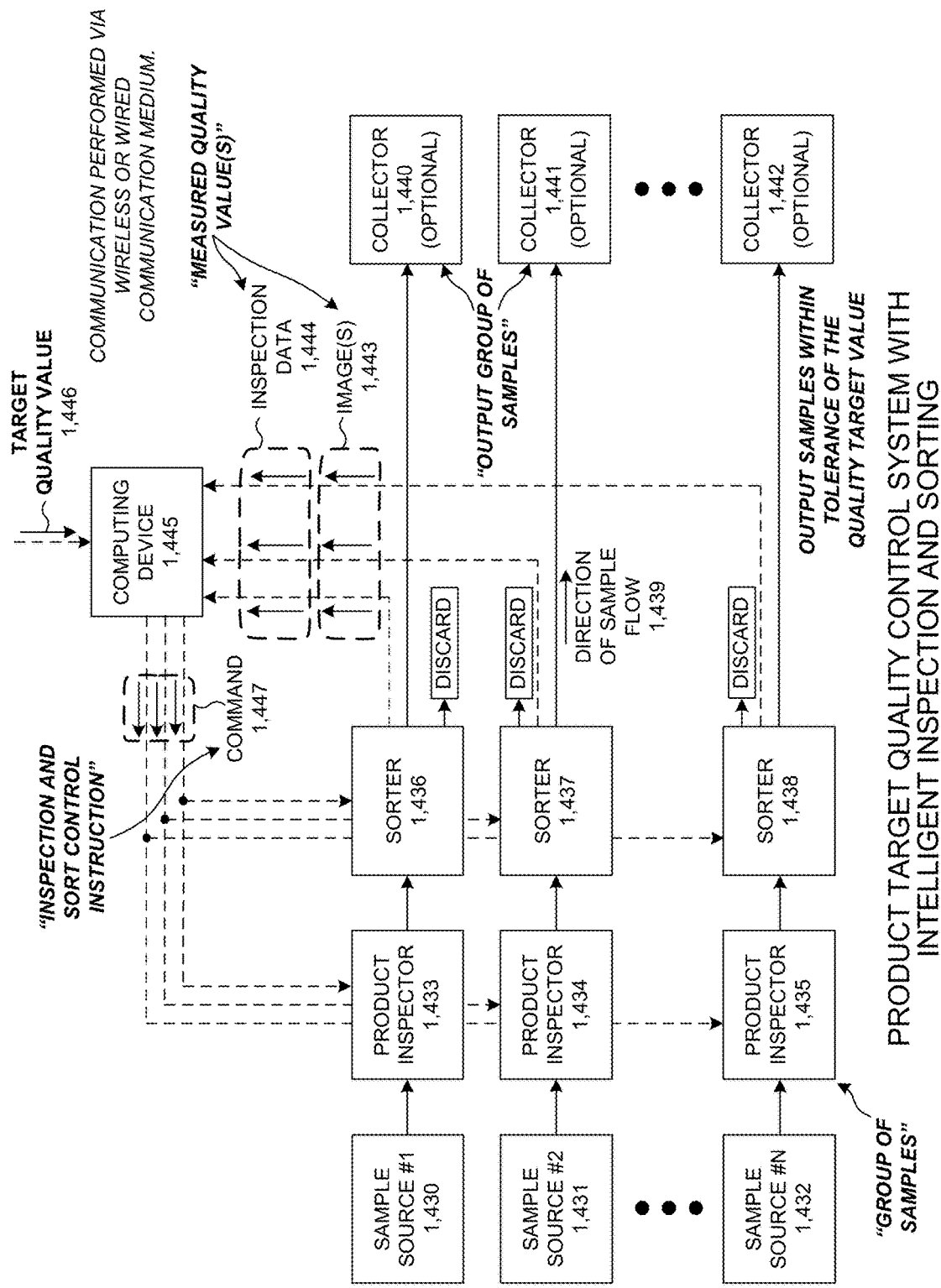
FIG. 75 is an operation diagram of a third target quality control system using intelligent inspection and sorting.

FIG. 75 is an operation diagram of a third target quality control system using intelligent inspection and sorting. The system includes multiple sample sources 1,430, 1,431 and 1,432. Each sample source is configured to output samples (product) to a different product inspectors 1,433, 1,434, and 1,435. The product inspectors are configured to output the inspected samples to different sorters 1,436, 1,437, and 1,438. The sorters are configured to output samples to either a discard bin or to a different quality pass collector or processing line 1,440, 1,441, or 1,442. They system also includes a computing device 1,445 that receives a target quality value 1,446 and measured quality values output from each product inspector. The measured quality value(s) may include inspection data 1,444 and may also include images 1,443. In operation, computing device 1,445 outputs command(s) 1,447 to each product inspector and sorter, thereby controlling the manner the method of inspection and sorting performed by each product inspector and sorter. For example, the command 1,447 may cause a product inspector and sorter to inspect a passing product (sample) and determine if a specific defect or characteristic is present in the product. The command 1,447 may cause the product inspector and sorter to direct the outputting of the sample based upon the inspection results. For example, the inspection may indicate that a product (sample) has a defect and then accordingly route the product to a discard bin. Alternatively, the inspection may indicate that the product has no defects and then accordingly route the product to the passing product collection bin or processing line. It is noted herein that control of the sorting can be performed by either the computing device 1,445 (based on the measured quality data) or by the product inspector. FIG. 75 illustrates the former. In the latter scenario, the product inspector and sorter can process the inspection data collected about the product and determine the sorting action to be performed on the product. The product inspector may be implemented using any of the inspector devices described above. For example, the use of one or more cameras may be used to capture one or more images of the product and then those images may be processed to perform the inspection.

Figure 76:
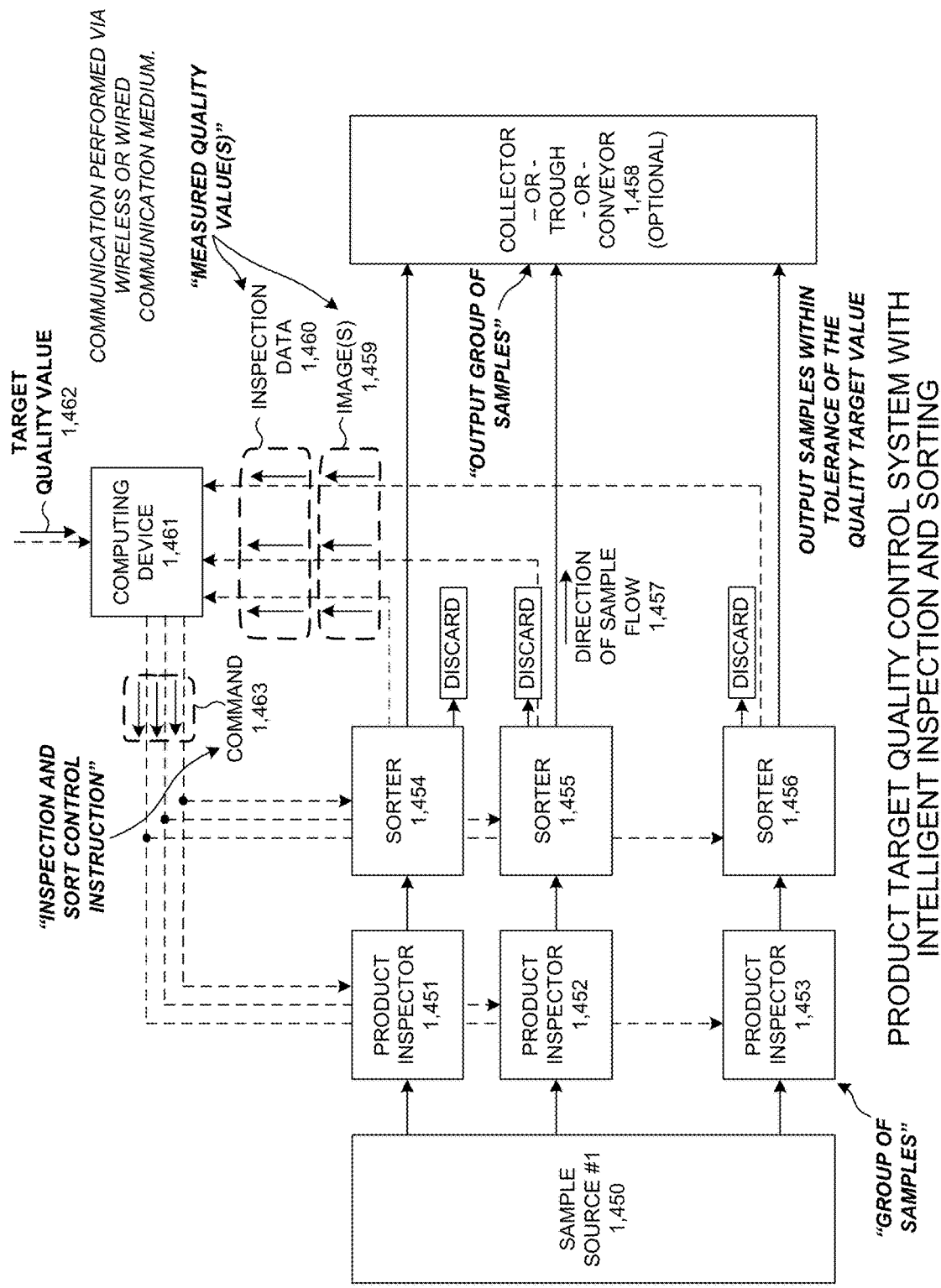
FIG. 76 is an operation diagram of a fourth target quality control system using intelligent inspection and sorting.

FIG. 76 is an operation diagram of a fourth target quality control system using intelligent inspection and sorting. The system includes a single sample source 1,450. Each sample source is configured to output samples (product) to a different product inspectors 1,451, 1,452, and 1,453. The product inspectors are configured to output the inspected samples to different sorters 1,454, 1,455, and 1,456. The sorters are configured to output samples to either a discard bin or to a quality pass collector or processing line 1,458. They system also includes a computing device 1,461 that receives a target quality value 1,462 and measured quality values output from each product inspector. The measured quality value(s) may include inspection data 1,460 and may also include images 1,459. In operation, computing device 1,461 outputs command(s) 1,463 to each product inspector and sorter, thereby controlling the manner the method of inspection and sorting performed by each product inspector and sorter. For example, the command 1,463 may cause a product inspector and sorter to inspect a passing product (sample) and determine if a specific defect or characteristic is present in the product. The command 1,463 may cause the product inspector and sorter to direct the outputting of the sample based upon the inspection results. For example, the inspection may indicate that a product (sample) has a defect and then accordingly route the product to a discard bin. Alternatively, the inspection may indicate that the product has no defects and then accordingly route the product to the passing product collection bin or processing line. It is noted herein that control of the sorting can be performed by either the computing device 1,461 (based on the measured quality data) or by the product inspector. FIG. 76 illustrates the former. In the latter scenario, the product inspector and sorter can process the inspection data collected about the product and determine the sorting action to be performed on the product. The product inspector may be implemented using any of the inspector devices described above. For example, the use of one or more cameras may be used to capture one or more images of the product and then those images may be processed to perform the inspection.

Figure 77:
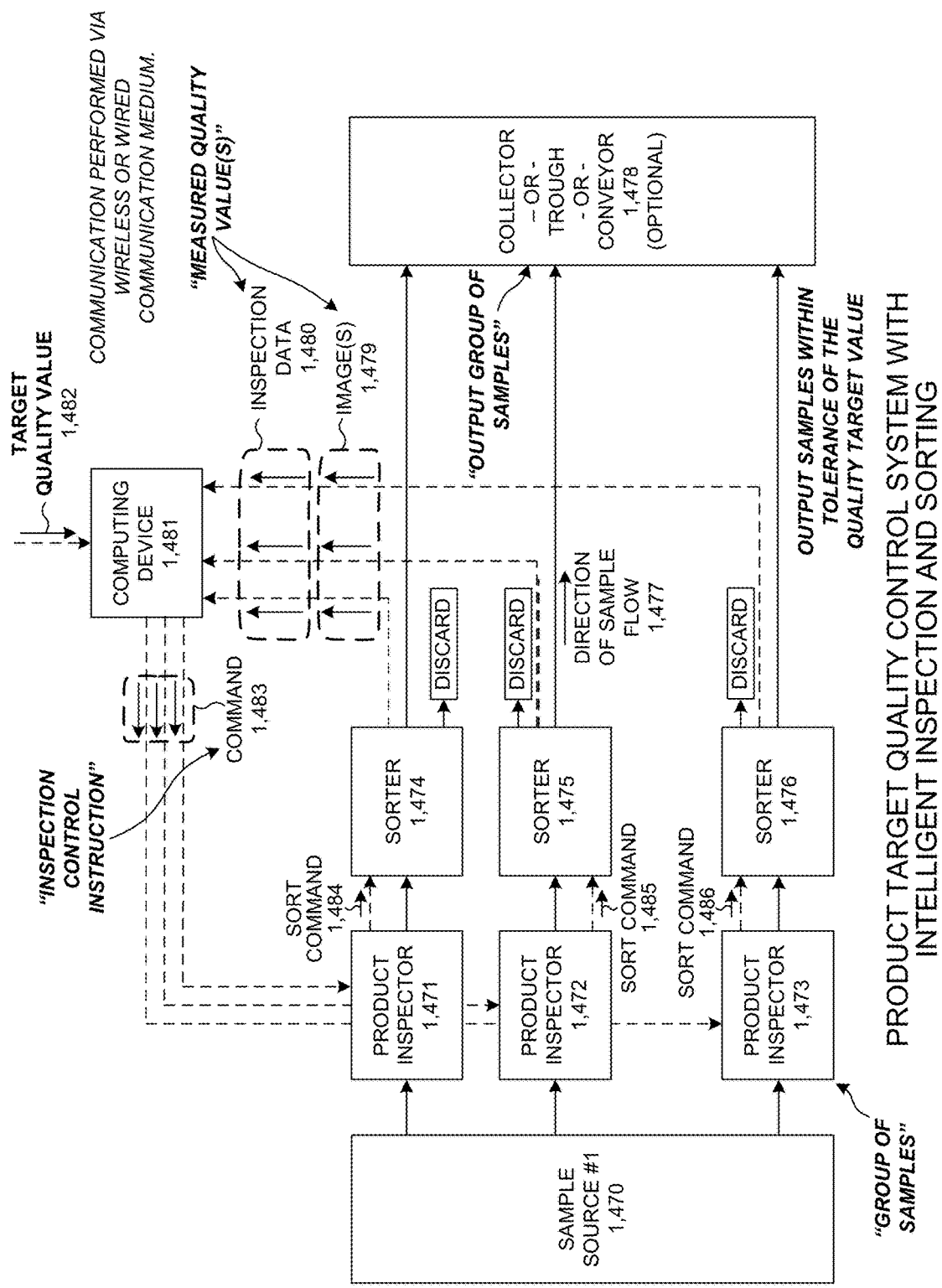
FIG. 77 is an operation diagram of a fifth target quality control system using intelligent inspection and sorting.

FIG. 77 is an operation diagram of a fifth target quality control system using intelligent inspection and sorting. The system includes a single sample source 1,470. Each sample source is configured to output samples (product) to a different product inspectors 1,471, 1,472, and 1,473. The product inspectors are configured to output the inspected samples to different sorters 1,474, 1,475, and 1,476. The sorters are configured to output samples to either a discard bin or to a quality pass collector or processing line 1,478. They system also includes a computing device 1,481 that receives a target quality value 1,482 and measured quality values output from each product inspector. The measured quality value(s) may include inspection data 1,480 and may also include images 1,479. In operation, computing device 1,481 outputs command(s) 1,483 to each product inspector and sorter, thereby controlling the manner the method of inspection and sorting performed by each product inspector and sorter. For example, the command 1,483 may cause a product inspector and sorter to inspect a passing product (sample) and determine if a specific defect or characteristic is present in the product. The command 1,483 may cause the product inspector and sorter to direct the outputting of the sample based upon the inspection results. For example, the inspection may indicate that a product (sample) has a defect and then accordingly route the product to a discard bin. Alternatively, the inspection may indicate that the product has no defects and then accordingly route the product to the passing product collection bin or processing line. It is noted herein that control of the sorting can be performed by either the computing device 1,481 (based on the measured quality data) or by the product inspector. FIG. 77 illustrates the latter. In the latter scenario, the product inspector and sorter can process the inspection data collected about the product and determine the sorting action to be performed on the product. The product inspector may be implemented using any of the inspector devices described above. For example, the use of one or more cameras may be used to capture one or more images of the product and then those images may be processed to perform the inspection.

Figure 78:
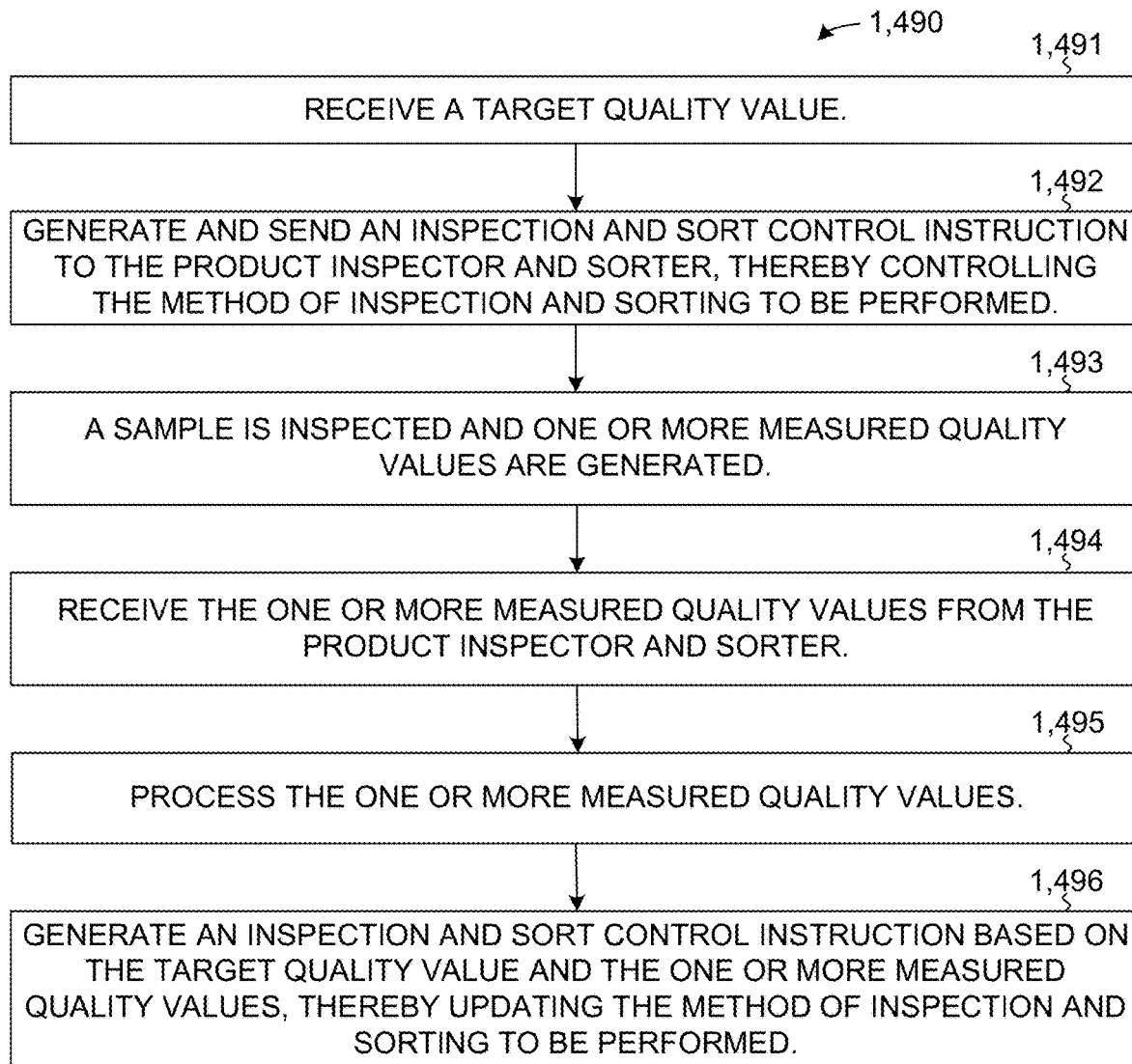
FIG. 78 is a flowchart of a target quality control system using intelligent inspection and sorting.

FIG. 78 is a flowchart 1,490 of a target quality control system using intelligent inspection and sorting. In step 1,491, a target quality value is received. In step 1,492, an inspection and sort control command are generated and sent to a product inspector and sorter, thereby controlling the method of inspection and sorting to be performed on product (samples). In step 1,493, a sample is inspected and one or more measured quality values are generated. In step 1,494, one or more measured quality values from the product inspector and sorter are received. In step 1,495, the one or more measured quality values are processed. In step 1,496, an inspection and sort control instruction are generated based on the target quality value and the one or more measured quality values, thereby updating the method of inspection and sorting to be performed.

Figure 79:
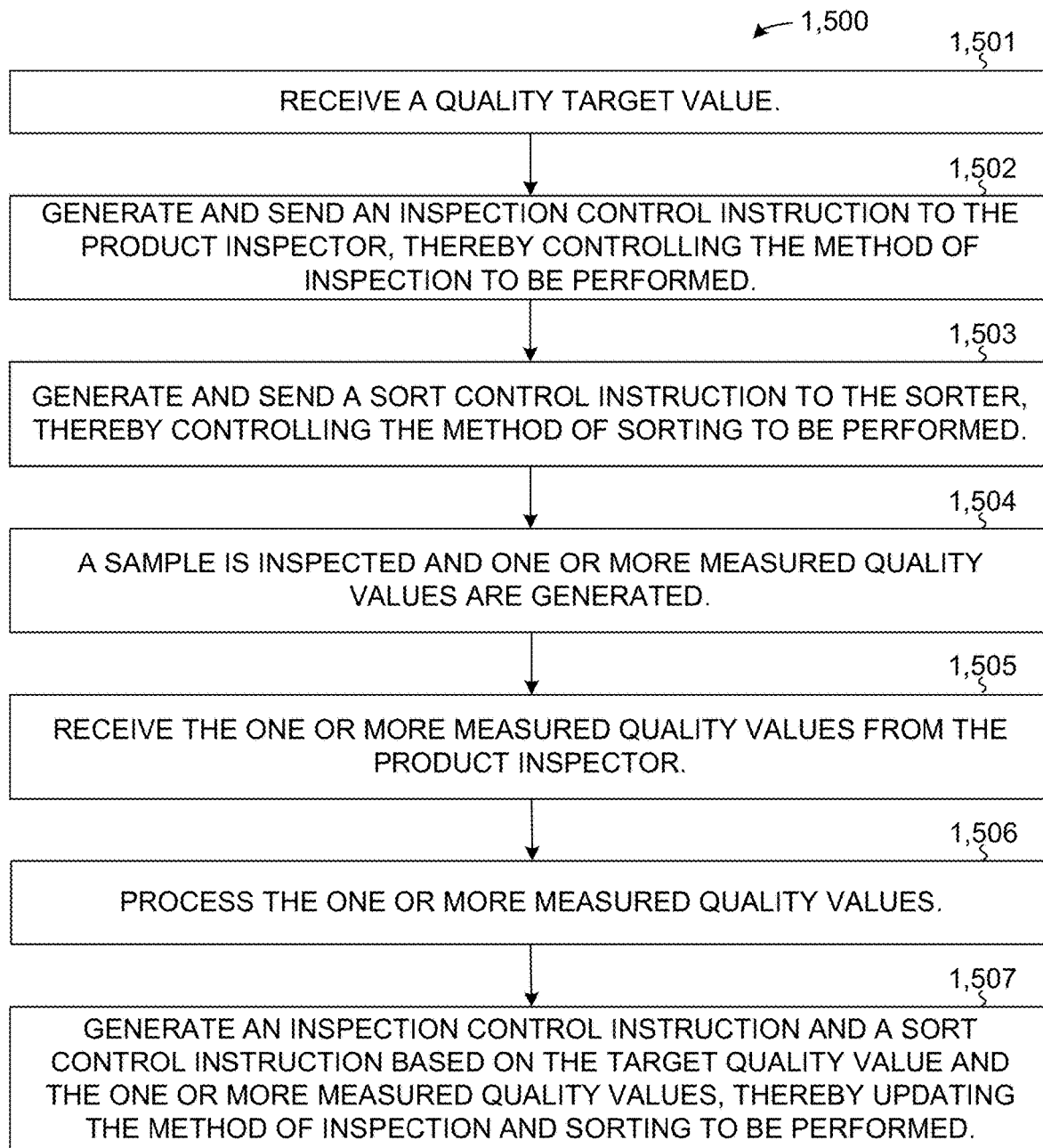
FIG. 79 is a flowchart of a target quality control system using intelligent inspection and sorting.

FIG. 79 is a flowchart 1,500 of a target quality control system using intelligent inspection and sorting. In step 1,501, a target quality value is received. In step 1,502, an inspection control command is generated and sent to a product inspector and sorter, thereby controlling the method of inspection to be performed on product (samples). In step 1,503, a sort control command is generated and sent to a sorter, thereby controlling the method of sorting to be performed on product (samples). In step 1,504, a sample is inspected and one or more measured quality values are generated. In step 1,505, one or more measured quality values from the product inspector are received. In step 1,506, the one or more measured quality values are processed. In step 1,507, an inspection control instruction and a sort control instruction are generated based on the target quality value and the one or more measured quality values, thereby updating the method of inspection and sorting to be performed.

Figure 80:
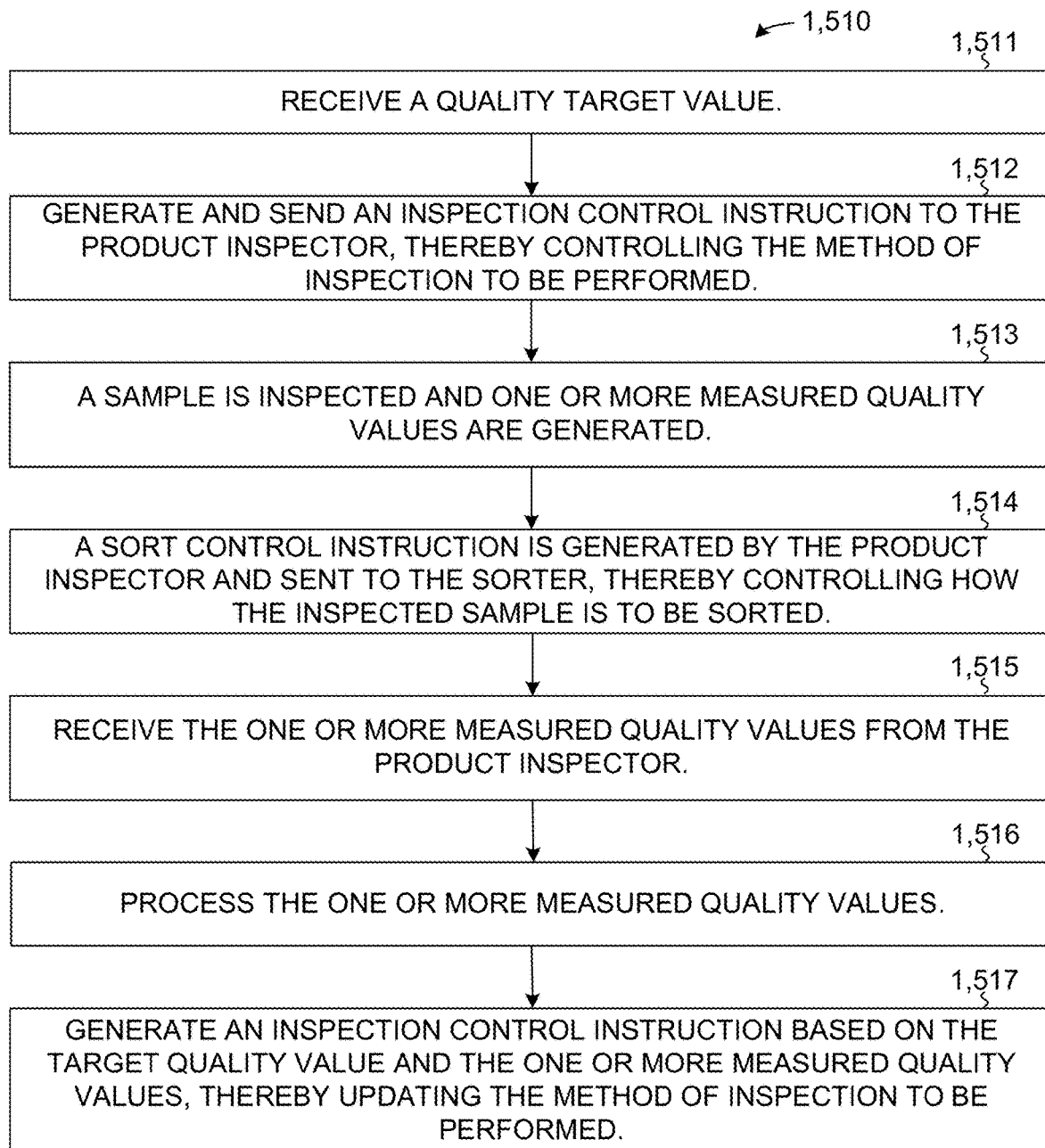
FIG. 80 is a flowchart of a target quality control system using intelligent inspection and sorting.

FIG. 80 is a flowchart 1,510 of a target quality control system using intelligent inspection and sorting. In step 1,511, a target quality value is received. In step 1,512, an inspection control command is generated and sent to a product inspector and sorter, thereby controlling the method of inspection to be performed on product (samples). In step 1,513, a sample is inspected and one or more measured quality values are generated. In step 1,514, sort control instruction is generated by the product inspector based on the one or more measured quality values, thereby controlling the method of sorting to be performed. In step 1,515 the one or more measured quality values are received form the product inspector. In step 1, 516, the one or more measured quality values are processed. In step 1,517, an inspection control command is generated based on the target quality value and the one or more measured quality values, thereby updating the method of inspection to be performed.

Figure 81:
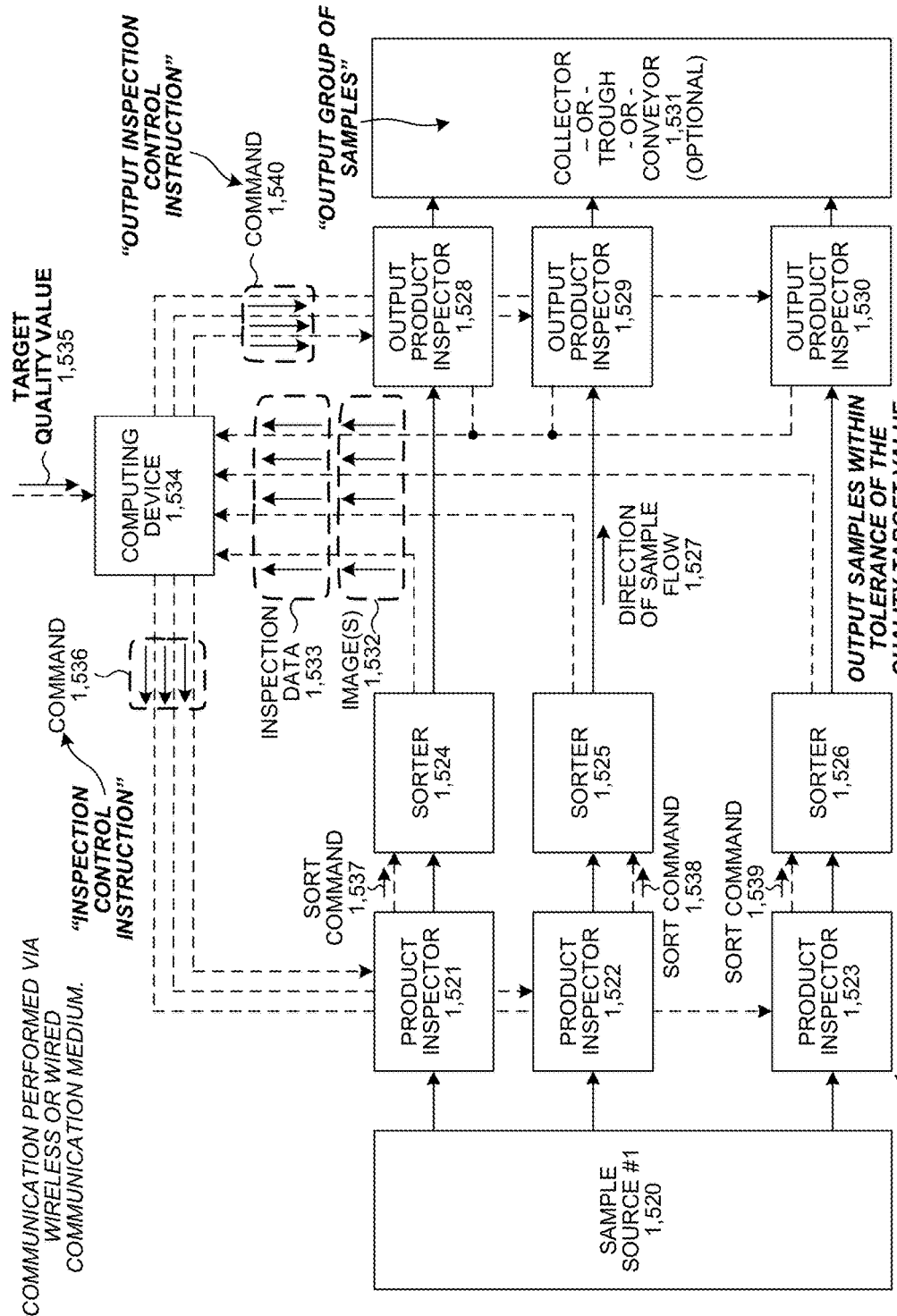
FIG. 81 is an operation diagram of a first target quality control system using intelligent inspection and sorting as well as output product inspection.

FIG. 81 is an operation diagram of a first target quality control system using intelligent inspection and sorting as well as output product inspection. The system includes a single sample source 1,520. Each sample source is configured to output samples (product) to a different product inspectors 1,521, 1,522, and 1,523. The product inspectors are configured to output the inspected samples to different sorters 1,524, 1,525, and 1,526. The sorters are configured to output the samples to different output product inspectors 1,528, 1,529 and 1,530. The output product inspectors are configured to output samples to a quality pass collector or processing line 1,531. They system also includes a computing device 1,534 that receives a target quality value 1,5352 and measured quality values output from each product inspector. The measured quality value(s) may include inspection data 1,533 and may also include images 1,532. Each output product inspector is also configured to communicate with the computing device 1,534. The communication may be wired or wireless as described above. The computing device 1,534 is configured to output commands 1,540 to control the method of inspection performed by each output product inspector. Output product inspectors are used to measure the passing product (samples) and verify that the desired target quality level is achieved. In operation, computing device 1,534 outputs command(s) 1,536 to each product inspector, thereby controlling the manner the method of inspection performed by each product inspector and sorter. For example, the command 1,536 may cause a product inspector to inspect a passing product (sample) and determine if a specific defect or characteristic is present in the product. The command 1,536 may cause the product inspector and sorter to direct the outputting of the sample based upon the inspection results. For example, the inspection may indicate that a product (sample) has a defect and then accordingly route the product to a discard bin. Alternatively, the inspection may indicate that the product has no defects and then accordingly route the product to the passing product collection bin or processing line. It is noted herein that control of the sorting can be performed by either the computing device 1,534 (based on the measured quality data) or by the product inspector. FIG. 81 illustrates the latter. In the latter scenario, the product inspector and sorter can process the inspection data collected about the product and determine the sorting action to be performed on the product. The product inspector may be implemented using any of the inspector devices described above. For example, the use of one or more cameras may be used to capture one or more images of the product and then those images may be processed to perform the inspection.

Figure 82:
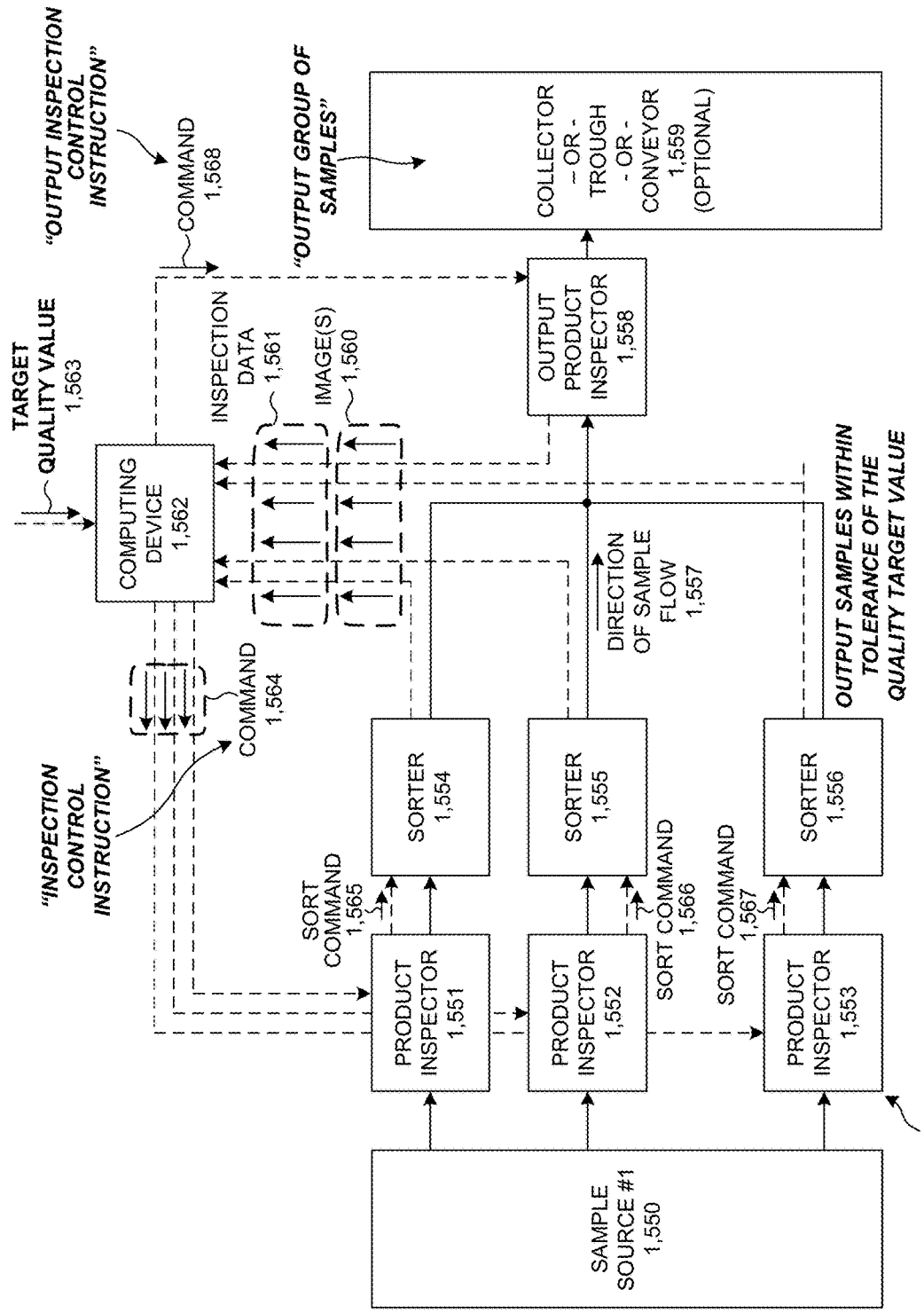
FIG. 82 is an operation diagram of a second target quality control system using intelligent inspection and sorting as well as output product inspection.

FIG. 82 is an operation diagram of a second target quality control system using intelligent inspection and sorting as well as output product inspection. The system includes a single sample source 1,550. Each sample source is configured to output samples (product) to a different product inspectors 1,551, 1,552, and 1,553. The product inspectors are configured to output the inspected samples to different sorters 1,554, 1,555, and 1,556. The sorters are configured to output the samples to a single output product inspector 1,558. The output product inspector is configured to output samples to a quality pass collector or processing line 1,559. They system also includes a computing device 1,562 that receives a target quality value 1,563 and measured quality values output from each product inspector. The measured quality value(s) may include inspection data 1,561 and may also include images 1,560. The output product inspector is also configured to communicate with the computing device 1,562. The communication may be wired or wireless as described above. The computing device 1,562 is configured to output commands 1,568 to control the method of inspection performed by each output product inspector. Output product inspectors are used to measure the passing product (samples) and verify that the desired target quality level is achieved. In operation, computing device 1,562 outputs command(s) 1,564 to each product inspector, thereby controlling the manner the method of inspection performed by each product inspector and sorter. For example, the command 1,564 may cause a product inspector to inspect a passing product (sample) and determine if a specific defect or characteristic is present in the product. The command 1,564 may cause the product inspector and sorter to direct the outputting of the sample based upon the inspection results. For example, the inspection may indicate that a product (sample) has a defect and then accordingly route the product to a discard bin. Alternatively, the inspection may indicate that the product has no defects and then accordingly route the product to the passing product collection bin or processing line. It is noted herein that control of the sorting can be performed by either the computing device 1,562 (based on the measured quality data) or by the product inspector. FIG. 82 illustrates the latter. In the latter scenario, the product inspector and sorter can process the inspection data collected about the product and determine the sorting action to be performed on the product. The product inspector may be implemented using any of the inspector devices described above. For example, the use of one or more cameras may be used to capture one or more images of the product and then those images may be processed to perform the inspection.

Figure 83:
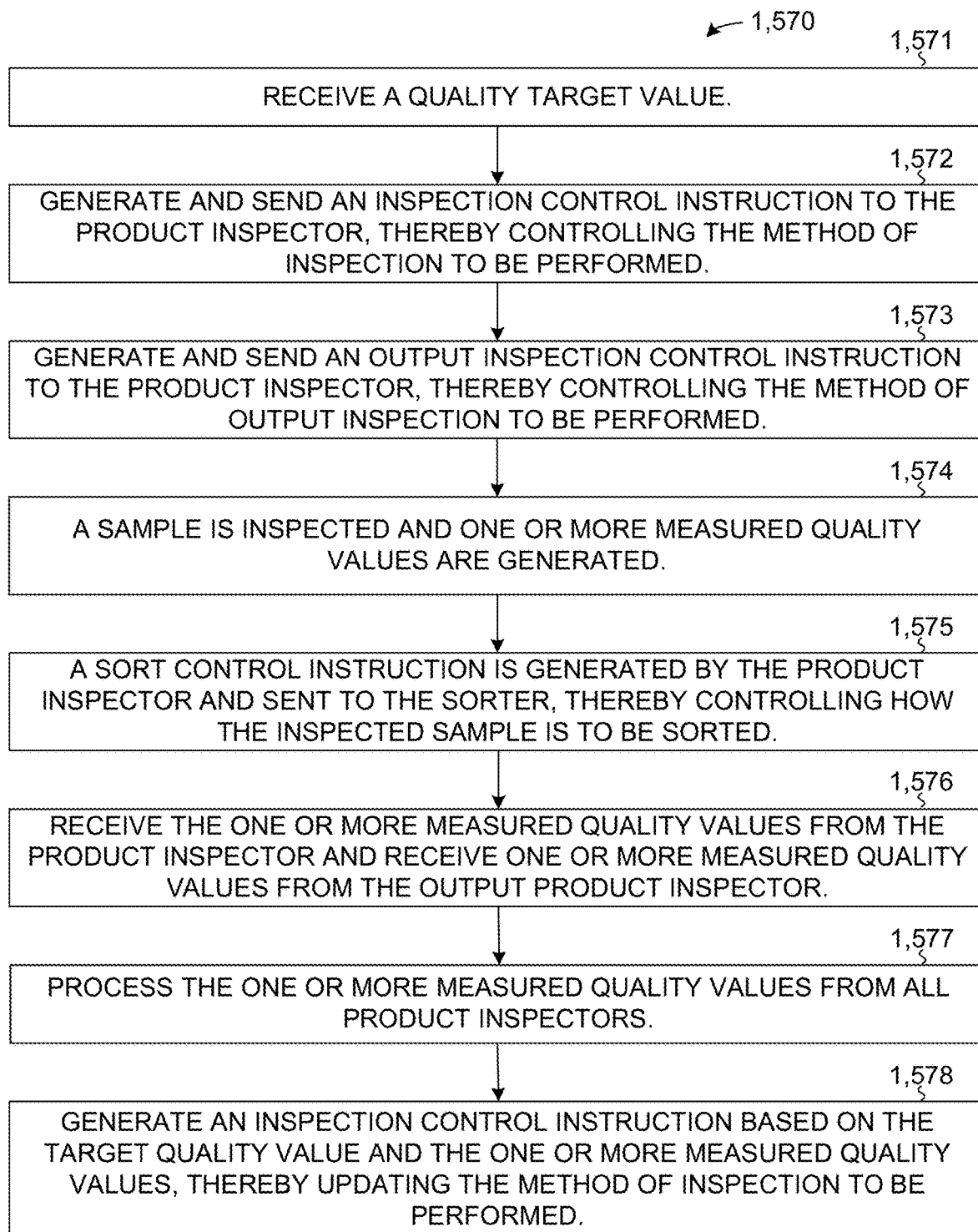
FIG. 83 is a flowchart of a target quality control system using intelligent inspection and sorting as well as output product inspection.

FIG. 83 is a flowchart 1,570 of a target quality control system using intelligent inspection and sorting as well as output product inspection. In step 1,571, a quality target value is received. In step 1,572, an inspection control command is generated and sent to a product inspector, thereby controlling the method of inspection to be performed. In step 1,573, an output inspection control instruction is generated and sent an output product inspector, thereby controlling the method of output inspection to be performed. In step 1,574 a sample is inspected and one or more measured quality values are generated. In step 1,575, a sort control command is generated by the product inspector and sent to the sorter, thereby controlling how the inspected sample is to be sorted. In step 1,576, one or more measured quality values are received from the product inspector and on or more measured quality values are received from the output product inspector. In step 1,577, the one or more measured quality values received from all product inspectors are processed. In step 1,578, an inspection control command is generated based on the target quality value and the one or more measured quality values received, thereby updating the method of inspection to be performed.

It is also noted herein that computing device may be implemented by one or a plurality of computing devices. In one example, the recited computing device may be a single computer. In another example, the recited computing device may be implemented utilizing an array of computers or servers that perform various computations of the system.

With respect to all embodiments discussed above, an inspection device may utilize any of the following: an optical sensor, a moisture sensor, a microtoxin sensor, a thermometer sensor, an acidity sensor, a microwave sensor, a pressure sensor, a level sensor, an ultrasonic sensor, a flow sensor, a viscosity sensor, a conductance/impedance sensor, an electronic nose (sniffing) sensor, an X-ray sensor, a multi spectral (visual/non visual) sensor, a weight sensor, a refractometer sensor, a tenderometer sensor, a firmness sensor, or a hardness sensor.

With respect to all embodiments discussed above, the target quality value may be a single value or more than a single value. For example, the target quality value may be any combination of the following: a shape quality, surface contour quality, hole quality, pest quality, size quality, moisture level, oil content, fat content, mycotoxin content, broken objects (parts missing), foreign material (such as rocks, plastic, metal, wood, glass, . . . ), discolored objects (partially or complete), misshapen objects (not matching a predefined shape), objects that do not match certain dimensions (too long, too short, too wide, too narrow, too thick, to thin, etc.), visual damage (discolored spots or areas, insect damage, shriveled/dried, surface skin damage, mold, decay, or rancid.

With respect to all embodiments discussed above, the computing device comprises a processing circuit, a memory unit, and a communication port. The target quality value, the measured quality value, and the inspection control instruction are communicated via the communication port.

With respect to all embodiments discussed above, the system may further be configured to output an alert message when the target quality value is not achieved. The message may be sent via wired or wireless network. The message may also be sent via an audible message broadcast at the processing facility. The message may alternatively be communicated via a local visual indiator, such as but not limited to, a blinking red light.

With respect to all embodiments discussed above, machine learning may be used to generate the inspection control instruction. The incoming inspection data is fed into a machine learning algorithm on the computing device. Over time the machine learning algorithm builds a model to predict the make up of the product flow. This enables the computing device to take machine learning driven decisions for the inspection control instructions. Over time the machine learning model improves and will be capable to predict the future expected quality data more accurately. For example, if the sample sources are fed through bins the bottom of the bin might contain more broken product leading to a cyclical pattern in the product stream of increased amounts of broken product at the end of every input bin. The machine learning approach enables the computing device to learn and take into account these cyclical patterns.

The above mentioned sorters may be any sorter known in the art or any sorter described above in the present application, such as but not limited to, the use of a burst of air to redirect the trajectory of a sample as it travels along the processing line, a vacuum that causes the sample to be removed from the flow of samples through the processing line, or the use of a mechanically controlled flap to redirect the sample as it travels along the processing line.

Integrated Adaptable Inspector and Sorting Unit

Figure 84:
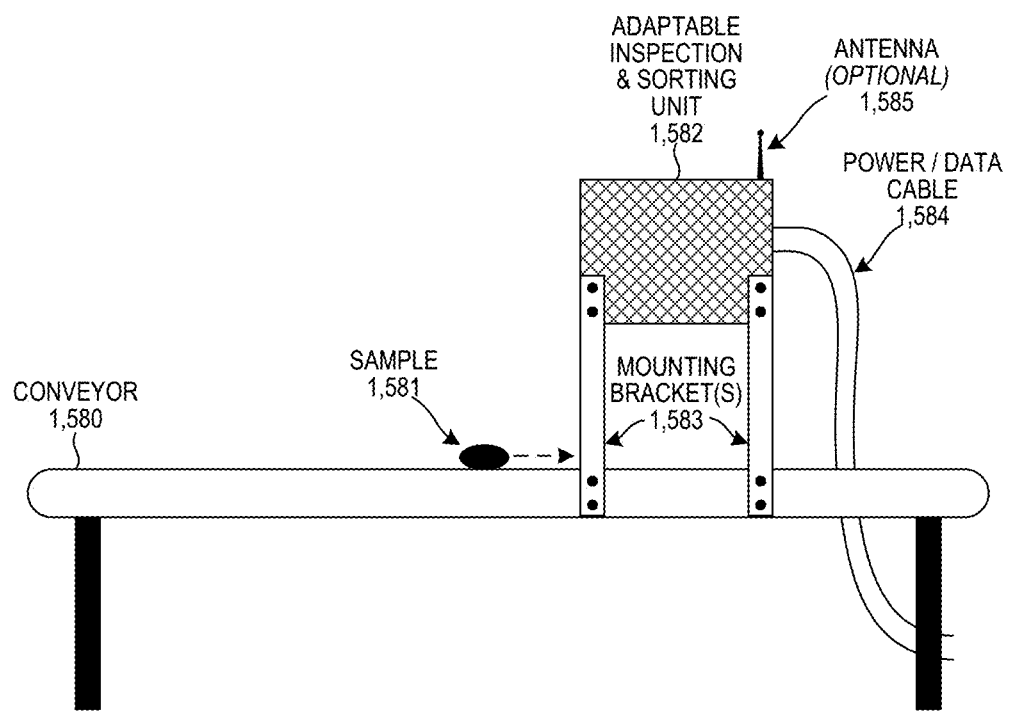
FIG. 84 is a diagram of a conveyor with an adaptable inspection and sorting unit attached to the conveyor.

FIG. 84 is a diagram of a conveyor with an adaptable inspection and sorting unit attached to the conveyor. Adaptable inspection and sorting unit 1,582 is physically mounted to conveyor 1,580. Sample 1,583 is caused to become in contact with conveyor 1,580. Upon contact, sample 1,583 is moved via a rotating conveyor belt of conveyor 1,580. The friction between the sample and the rotating conveyor belt causes the sample to be move along the direction of the conveyor belt movement.

Figure 87:
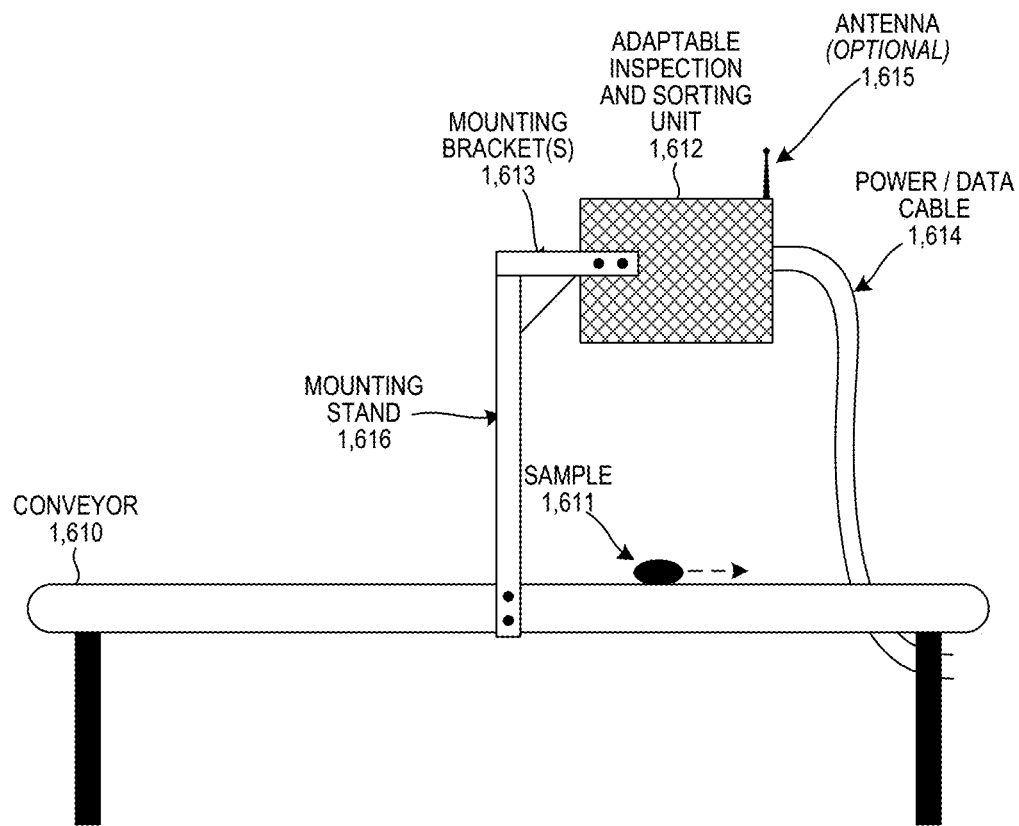
FIG. 87 illustrates another bracket geometry that can be utilized to mount the adaptable inspection and sorting unit to a conveyor.

The adaptable inspection and sorting unit 1,582 is attached to the conveyor 1,580 via one or more mounting brackets 1,583. One skilled in the art will readily realize that a various number of brackets and various styles of brackets can be used to mount the adaptable inspection and sorting unit 1,582 to conveyor 1,580. For example, FIG. 87 illustrates another bracket geometry that can be utilized to mount the adaptable inspection and sorting unit 1,582 to conveyor 1,580. Mounting Bracket 1,583 can attach to either the adaptable inspection and sorting unit 1,582 or the conveyor 1,580 using various items, such as bolts, screws, pins, locks, clamps, welds (metals or thermoplastics), adhesive, slots, magnets, rails, gravity, or friction.

Figure 90:
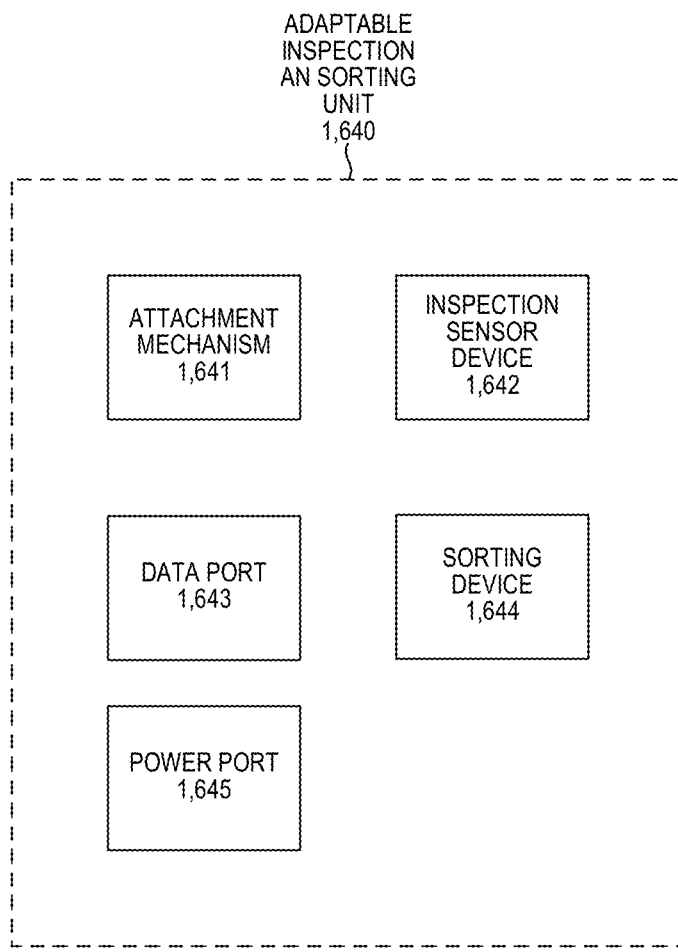
FIG. 90 illustrates a block diagram of an adaptable inspection unit that includes an attachment mechanism, an inspection sensor device, a data port, a sorting device, and a power port.

The adaptable inspection and sorting unit 1,582 includes an attachment mechanism, an inspection sensor device (optical receiver), a data port and a power port. The data port and the power port may be combined into a single physical port that connects to a single cable 1,584 that includes both power conductors and data conductors. Alternatively, the adaptable inspection unit 1,582 may include a data port that is separate from the power port. Further, the adaptable inspection and sorting unit 1,582 may include an antenna connectable data port that connects to an antenna 1,585 so to allow for wireless communication. FIG. 84 does not illustrate the inspection sensor device. FIG. 90 illustrates a block diagram of an adaptable inspection unit 1,640 that includes an attachment mechanism 1,641, an inspection sensor device 1,642, a data port 1,643, a sorting device 1,644, and a power port 1,645.

In operation, the conveyor 1,580 causes the sample 1,581 to travel under the adaptable inspection and sorting unit 1,582. While the sample is in view of the inspection sensor device that is included in the adaptable inspection and sorting unit 1,582 one or more images of the sample are captured and stored in a memory device. The memory device may be included in the adaptable inspection and sorting unit 1,582 or may be included in a device that communicates with the adaptable inspection and sorting unit 1,582 via the data port (wired or wireless). The captured sensor data (e.g., images) are then processed by a processor executing a quality inspection algorithm. In one example, the adaptable inspection unit 1,5582 includes the 3D inspector described in detail above. In another example, a 3D image of the sample is generated based on the one or more images captured by the adaptable inspection and sorting unit 1,582. In yet another example, the captured 2D image is used to perform the inspection. The 3D or 2D image(s) are used to determine a quality characteristic of the sample. In one example, the quality characteristic is generated by the adaptable inspection and sorting unit 1,582 and output via the data port. In another example, the one or more captured images are output from the adaptable inspection and sorting unit 1,582 to another device that determines the quality characteristics of the sample. Adaptable inspection and sorting unit 1,582 provides improve quality inspection compared to unreliable inspection by human eyes without the cost of replacing an entire processing line. Moreover, adaptable inspection and sorting unit 1,582 is able to inspect many more samples per unit time than could be inspected by a human.

Absent any sorting mechanism, all samples would be directed toward the same location regardless of measured quality due to the absence of sorting functionality. The directing of a sample based upon the measured quality of the sample is achieved by the adaptable inspection and sorting device 1,582 because the device is capable of sorting samples in addition to inspecting samples.

In operation, the conveyor 1,580 causes the sample 1,581 to travel under the adaptable inspection and sorting unit 1,582. While the sample is in reach of the sorting device that is included in the adaptable inspection and sorting unit 1,582 the sample is sorted as instructed. In one example, the sorting instruction is received via the data port and stored in a memory included in the adaptable inspection and sorting unit 1,582. In another example, quality characteristic data is received via the data port and in response the adaptable inspection and sorting unit 1,582 generates the sorting instruction. In yet another example, the information received via the data port is a percentage of samples to be deflected. Communication with the adaptable inspection and sorting unit 1,582 may be performed via the data port (wired or wireless). The sorting device may be by a vacuum system, a mechanical pedal system, an air jet system, or a mechanical gate. The adaptable inspection and sorting unit 1,582 performs automated sorting so that high quality samples are automatically separated from low quality samples.

Adaptable inspection and sorting unit 1,582 provides improve sorting compared to unreliable sorting by human hands without the cost of replacing an entire processing line. Moreover, adaptable inspection and sorting unit 1,582 is able to sort many more samples per unit time than could be sorted by a human.

Figure 85:
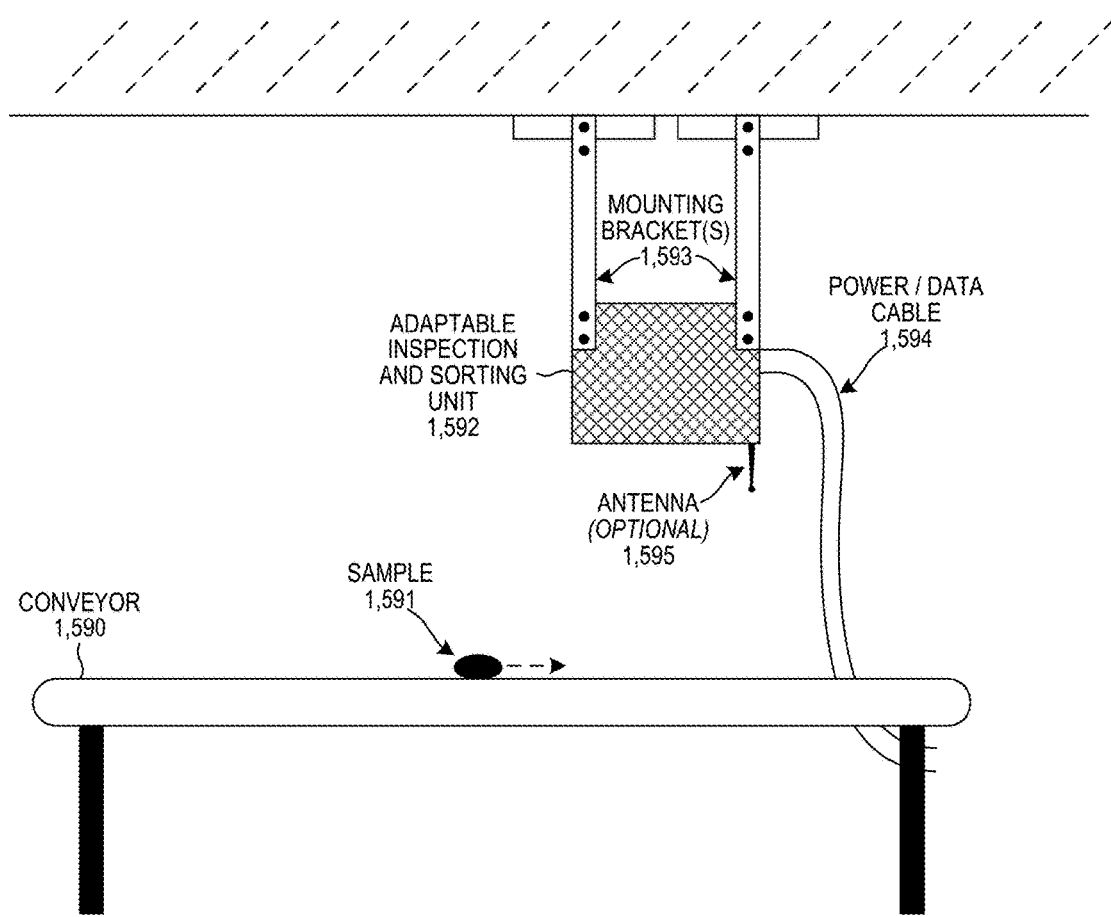
FIG. 85 is a diagram of a conveyor with an adaptable inspection and sorting unit attached to the ceiling above the conveyor.

FIG. 85 is a diagram of a conveyor with an adaptable inspection and sorting unit attached to the ceiling above the conveyor. Adaptable inspection and sorting unit 1,592 is physically mounted to the ceiling above conveyor 1,590. Similar to FIG. 84, in operation, sample 1,591 is caused to become in contact with conveyor 1,590. Upon contact, sample 1,591 is moved via a rotating conveyor belt of conveyor 1,590. The friction between the sample and the rotating conveyor belt causes the sample to be move along the direction of the conveyor belt movement.

The adaptable inspection and sorting unit 1,592 is attached to the ceiling above conveyor 1,590 via one or more mounting brackets 1,593. One skilled in the art will readily realize that a various number of brackets and various styles of brackets can be used to mount the adaptable inspection and sorting unit 1,592 to the ceiling above conveyor 1,590. Mounting Bracket 1,593 can attach to either the adaptable inspection and sorting unit 1,592 or the ceiling above conveyor 1,590 using various items, such as bolts, screws, pins, locks, clamps, welds (metals or thermoplastics), adhesive, slots, magnets, rails, gravity, or friction.

The adaptable inspection and sorting unit 1,592 includes an attachment mechanism, an inspection sensor device (optical receiver), a data port and a power port. The data port and the power port may be combined into a single physical port that connects to a single cable 1,594 that includes both power conductors and data conductors. Alternatively, the adaptable inspection and sorting unit 1,592 may include a data port that is separate from the power port. Further, the adaptable inspection and sorting unit 1,592 may include an antenna connectable data port that connects to an antenna 1,595 so to allow for wireless communication. FIG. 85 does not illustrate the inspection sensor device. FIG. 90 illustrates a block diagram of an adaptable inspection and sorting unit 1,640 that includes an attachment mechanism 1,641, an inspection sensor device 1,642, a data port 1,643, a sorting device 1,644, and a power port 1,645

In operation, the conveyor 1,590 causes the sample 1,591 to travel under the adaptable inspection and sorting unit 1,592. While the sample is in view, or reach, of the inspection sensor device that is included in the adaptable inspection and sorting unit 1,592 one or more characteristics and/or images of the sample are captured and stored in a memory device. The memory device may be included in the adaptable inspection and sorting unit 1,592 or may be included in a device that communicates with the adaptable inspection and sorting unit 1,592 via the data port (wired or wireless). The captured characteristics and/or image(s) are then processed by a processor executing a quality inspection algorithm. In one example, the adaptable inspection and sorting unit 1,592 includes the 3D inspector described in detail above. In another example, a 3D image of the sample is generated based on the one or more images captured by the adaptable inspection and sorting unit 1,592. In yet another example, the captured 2D image is used to perform the inspection. The 3D and/or 2D image(s) are used to determine a quality characteristic of the sample. In one example, the quality characteristic is generated by the adaptable inspection and sorting unit 1,592 and output via the data port. In another example, the one or more captured images are output from the adaptable inspection and sorting unit 1,592 to another device that determines the quality characteristics of the sample. Adaptable inspection and sorting unit 1,592 provides improve quality inspection compared to unreliable inspection by human eyes without the cost of replacing an entire processing line. Moreover, adaptable inspection and sorting unit 1,592 is able to inspect many more samples per unit time than could be inspected by a human.

Absent any sorting mechanism, all samples would be directed toward the same location regardless of measured quality due to the absence of sorting functionality. The directing of a sample based upon the measured quality of the sample is achieved by the adaptable inspection and sorting device 1,592 because the device is capable of sorting samples in addition to inspecting samples.

In operation, the conveyor 1,590 causes the sample 1,591 to travel under the adaptable inspection and sorting unit 1,592. While the sample is in reach of the sorting device that is included in the adaptable inspection and sorting unit 1,592 the sample is sorted as instructed. In one example, the sorting instruction is received via the data port and stored in a memory included in the adaptable inspection and sorting unit 1,592. In another example, quality characteristic data is received via the data port and in response the adaptable inspection and sorter unit 1,592 generates the sorting instruction. In yet another example, the information received via the data port is a percentage of samples to be deflected. Communication with the adaptable inspection and sorting unit 1,592 may be performed via the data port (wired or wireless). The sorting device may be a vacuum system, a mechanical pedal system, an air jet system, or a mechanical gate. The adaptable inspection and sorting unit 1,592 performs automated sorting so that high quality samples are automatically separated from low quality samples.

Adaptable inspection and sorting unit 1,592 provides improve sorting compared to unreliable sorting by human hands without the cost of replacing an entire processing line. Moreover, adaptable inspection and sorting unit 1,592 is able to sort many more samples per unit time than could be sorted by a human.

Figure 86:
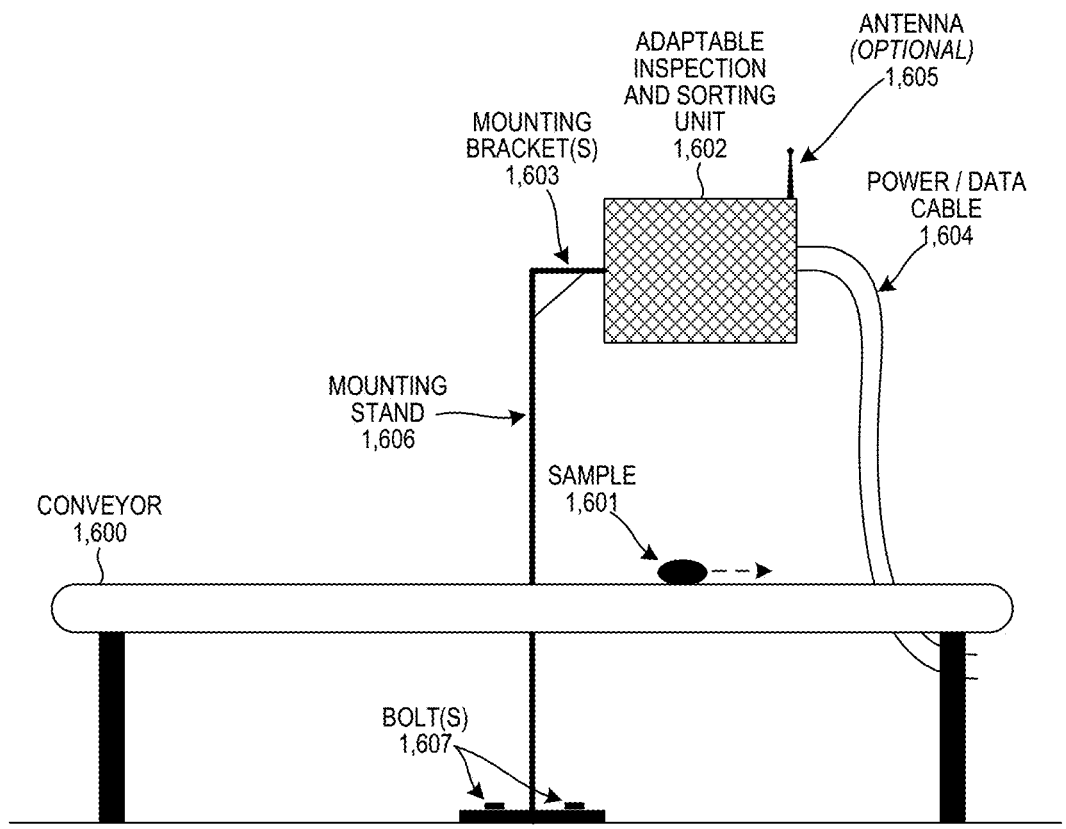
FIG. 86 is a diagram of a conveyor with an adaptable inspection and sorting unit attached to the floor below the conveyor.

FIG. 86 is a diagram of a conveyor with an adaptable inspection and sorting unit attached to the floor below the conveyor. Adaptable inspection and sorting unit 1,602 is physically mounted to the floor below conveyor 1,600. Similar to FIG. 85, in operation, sample 1,601 is caused to become in contact with conveyor 1,600. Upon contact, sample 1,601 is moved via a rotating conveyor belt of conveyor 1,600. The friction between the sample and the rotating conveyor belt causes the sample to be move along the direction of the conveyor belt movement.

The adaptable inspection and sorting unit 1,602 is attached to the floor below conveyor 1,600 via one or more mounting bracket 1,603 and mounting stand 1,606. One skilled in the art will readily realize that a various number of brackets and various styles of brackets can be used to mount the adaptable inspection and sorting unit 1,602 to the floor below conveyor 1,600. Mounting Bracket 1,603 can attach to either the adaptable inspection and sorting unit 1,602 or the floor below conveyor 1,600 using various items, such as bolts, screws, pins, locks, clamps, welds (metals or thermoplastics), adhesive, slots, magnets, rails, gravity, or friction.

The adaptable inspection and sorting unit 1,600 includes an attachment mechanism, an inspection sensor device (optical receiver), a data port and a power port. The data port and the power port may be combined into a single physical port that connects to a single cable 1,604 that includes both power conductors and data conductors. Alternatively, the adaptable inspection and sorting unit 1,602 may include a data port that is separate from the power port. Further, the adaptable inspection and sorting unit 1,602 may include an antenna connectable data port that connects to an antenna 1,605 so to allow for wireless communication. FIG. 86 does not illustrate the inspection sensor device. FIG. 90 illustrates a block diagram of an adaptable inspection and sorting unit 1,640 that includes an attachment mechanism 1,641, an inspection sensor device 1,642, a data port 1,643, a sorting device 1,644, and a power port 1,645.

In operation, the conveyor 1,600 causes the sample 1,601 to travel under the adaptable inspection and sorting unit 1,602. While the sample is in view, or reach, of the inspection sensor device that is included in the adaptable inspection and sorting unit 1,602 one or more characteristics and/or images of the sample are captured and stored in a memory device. The memory device may be included in the adaptable inspection and sorting unit 1,602 or may be included in a device that communicates with the adaptable inspection and sorting unit 1,602 via the data port (wired or wireless). The captured characteristics and/or image(s) are then processed by a processor executing a quality inspection algorithm. In one example, the adaptable inspection and sorting unit 1,602 includes the 3D inspector described in detail above. In another example, a 3D image of the sample is generated based on the one or more images captured by the adaptable inspection and sorting unit 1,602. In yet another example, the captured 2D image is used to perform the inspection. The 3D and/or 2D image(s) are used to determine a quality characteristic of the sample. In one example, the quality characteristic is generated by the adaptable inspection and sorting unit 1,602 and output via the data port. In another example, the one or more captured images are output from the adaptable inspection and sorting unit 1,602 to another device that determines the quality characteristics of the sample.

Adaptable inspection and sorting unit 1,602 provides improve quality inspection compared to unreliable inspection by human eyes without the cost of replacing an entire processing line. Moreover, adaptable inspection and sorting unit 1,602 is able to inspect many more samples per unit time than could be inspected by a human.

Absent any sorting mechanism, all samples would be directed toward the same location regardless of measured quality due to the absence of sorting functionality. The directing of a sample based upon the measured quality of the sample is achieved by the adaptable inspection and sorting device 1,602 because the device is capable of sorting samples in addition to inspecting samples.

In operation, the conveyor 1,600 causes the sample 1,601 to travel under the adaptable inspection and sorting unit 1,602. While the sample is in reach of the sorting device that is included in the adaptable inspection and sorting unit 1,602 the sample is sorted as instructed. In one example, the sorting instruction is received via the data port and stored in a memory included in the adaptable inspection and sorting unit 1,602. In another example, quality characteristic data is received via the data port and in response the adaptable inspection and sorter unit 1,602 generates the sorting instruction. In yet another example, the information received via the data port is a percentage of samples to be deflected. Communication with the adaptable inspection and sorting unit 1,602 may be performed via the data port (wired or wireless). The sorting device may be a vacuum system, a mechanical pedal system, an air jet system, or a mechanical gate. The adaptable inspection and sorting unit 1,602 performs automated sorting so that high quality samples are automatically separated from low quality samples.

Adaptable inspection and sorting unit 1,602 provides improve sorting compared to unreliable sorting by human hands without the cost of replacing an entire processing line. Moreover, adaptable inspection and sorting unit 1,602 is able to sort many more samples per unit time than could be sorted by a human.

Figure 88:
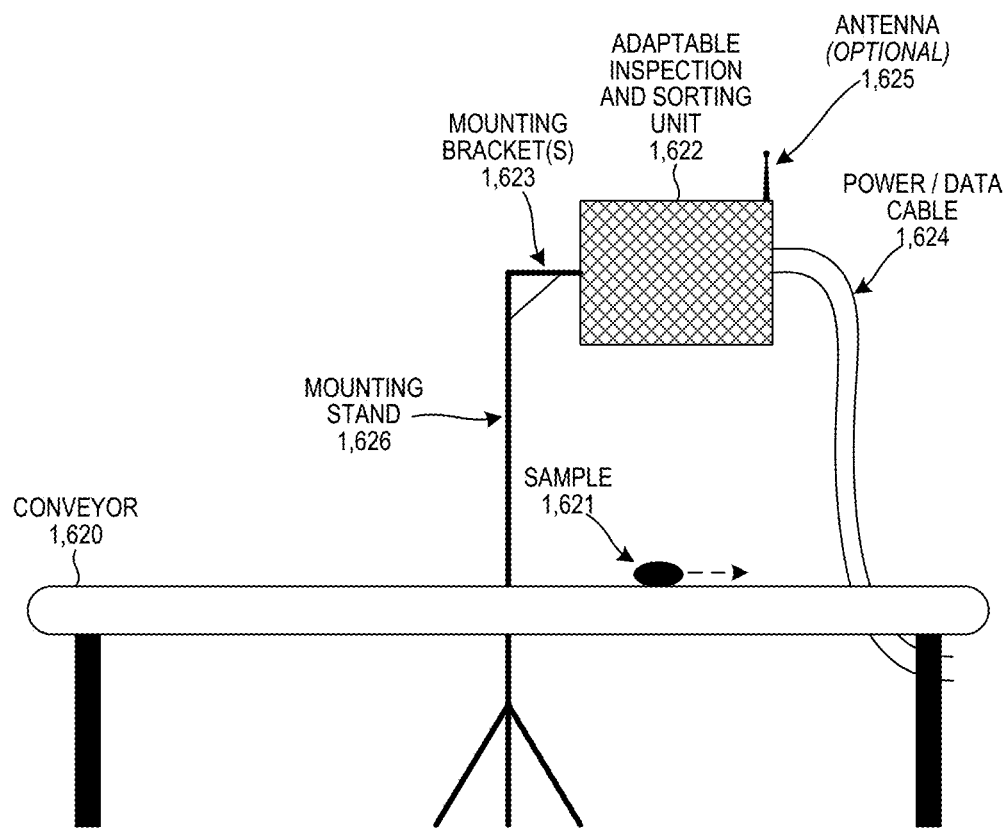
FIG. 88 is a diagram of a conveyor with an adaptable inspection and sorting unit attached to a mounting stand.

FIG. 88 is a diagram of a conveyor with an adaptable inspection and sorting unit attached to a mounting stand. Adaptable inspection and sorting unit 1,622 has been physically mounted to a mounting stand 1,626 located next to conveyor 1,620. Similar to FIG. 87, in operation, sample 1,621 is caused to become in contact with conveyor 1,620. Upon contact, sample 1,621 is moved via a rotating conveyor belt of conveyor 1,620. The friction between the sample and the rotating conveyor belt causes the sample to be move along the direction of the conveyor belt movement.

The adaptable inspection and sorting unit 1,622 is attached to the mounting stand 1,626, located next to conveyor 1,620, via one or more mounting brackets 1,623. One skilled in the art will readily realize that a various number of brackets and various styles of brackets can be used to mount the adaptable inspection and sorting unit 1,622 to the mounting stand 1,626. Mounting Bracket 1,623 can attach to either the adaptable inspection and sorting unit 1,622 or the mounting stand 1,626 using various items, such as bolts, screws, pins, locks, clamps, welds (metals or thermoplastics), adhesive, slots, magnets, rails, gravity, or friction.

The adaptable inspection and sorting unit 1,622 includes an attachment mechanism, an inspection sensor device (e.g., optical receiver), a data port and a power port. The data port and the power port may be combined into a single physical port that connects to a single cable 1,624 that includes both power conductors and data conductors. Alternatively, the adaptable inspection and sorting unit 1,622 may include a data port that is separate from the power port. Further, the adaptable inspection and sorting unit 1,622 may include an antenna connectable data port that connects to an antenna 1,625 so to allow for wireless communication. FIG. 88 does not illustrate the inspection sensor device. FIG. 90 illustrates a block diagram of an adaptable inspection and sorting unit 1,640 that includes an attachment mechanism 1,641, an inspection sensor device 1,642, a data port 1,643, a sorting device 1,644, and a power port 1,645.

In operation, the conveyor 1,620 causes the sample 1,621 to travel under the adaptable inspection and sorting unit 1,622. While the sample is in view, or reach, of the inspection sensor device that is included in the adaptable inspection and sorting unit 1,622 one or more characteristics and/or images of the sample are captured and stored in a memory device. The memory device may be included in the adaptable inspection and sorting unit 1,622 or may be included in a device that communicates with the adaptable inspection and sorting unit 1,622 via the data port (wired or wireless). The captured characteristics and/or image(s) are then processed by a processor executing a quality inspection algorithm. In one example, the adaptable inspection and sorting unit 1,622 includes the 3D inspector described in detail above. In another example, a 3D image of the sample is generated based on the one or more images captured by the adaptable inspection and sorting unit 1,622. In yet another example, the captured 2D image is used to perform the inspection. The 3D and/or 2D image(s) are used to determine a quality characteristic of the sample. In one example, the quality characteristic is generated by the adaptable inspection and sorting unit 1,622 and output via the data port. In another example, the one or more captured images are output from the adaptable inspection and sorting unit 1,622 to another device that determines the quality characteristics of the sample.

Adaptable inspection and sorting unit 1,622 provides improve quality inspection compared to unreliable inspection by human eyes without the cost of replacing an entire processing line. Moreover, adaptable inspection and sorting unit 1,622 is able to inspect many more samples per unit time than could be inspected by a human.

Absent any sorting mechanism, all samples would be directed toward the same location regardless of measured quality due to the absence of sorting functionality. The directing of a sample based upon the measured quality of the sample is achieved by the adaptable inspection and sorting device 1,622 because the device is capable of sorting samples in addition to inspecting samples.

In operation, the conveyor 1,630 causes the sample 1,621 to travel under the adaptable inspection and sorting unit 1,622. While the sample is in reach of the sorting device that is included in the adaptable inspection and sorting unit 1,622 the sample is sorted as instructed. In one example, the sorting instruction is received via the data port and stored in a memory included in the adaptable inspection and sorting unit 1,622. In another example, quality characteristic data is received via the data port and in response the adaptable inspection and sorter unit 1,622 generates the sorting instruction. In yet another example, the information received via the data port is a percentage of samples to be deflected. Communication with the adaptable inspection and sorting unit 1,622 may be performed via the data port (wired or wireless). The sorting device may be a vacuum system, a mechanical pedal system, an air jet system, or a mechanical gate. The adaptable inspection and sorting unit 1,622 performs automated sorting so that high quality samples are automatically separated from low quality samples.

Adaptable inspection and sorting unit 1,622 provides improve sorting compared to unreliable sorting by human hands without the cost of replacing an entire processing line. Moreover, adaptable inspection and sorting unit 1,622 is able to sort many more samples per unit time than could be sorted by a human.

Figure 89:
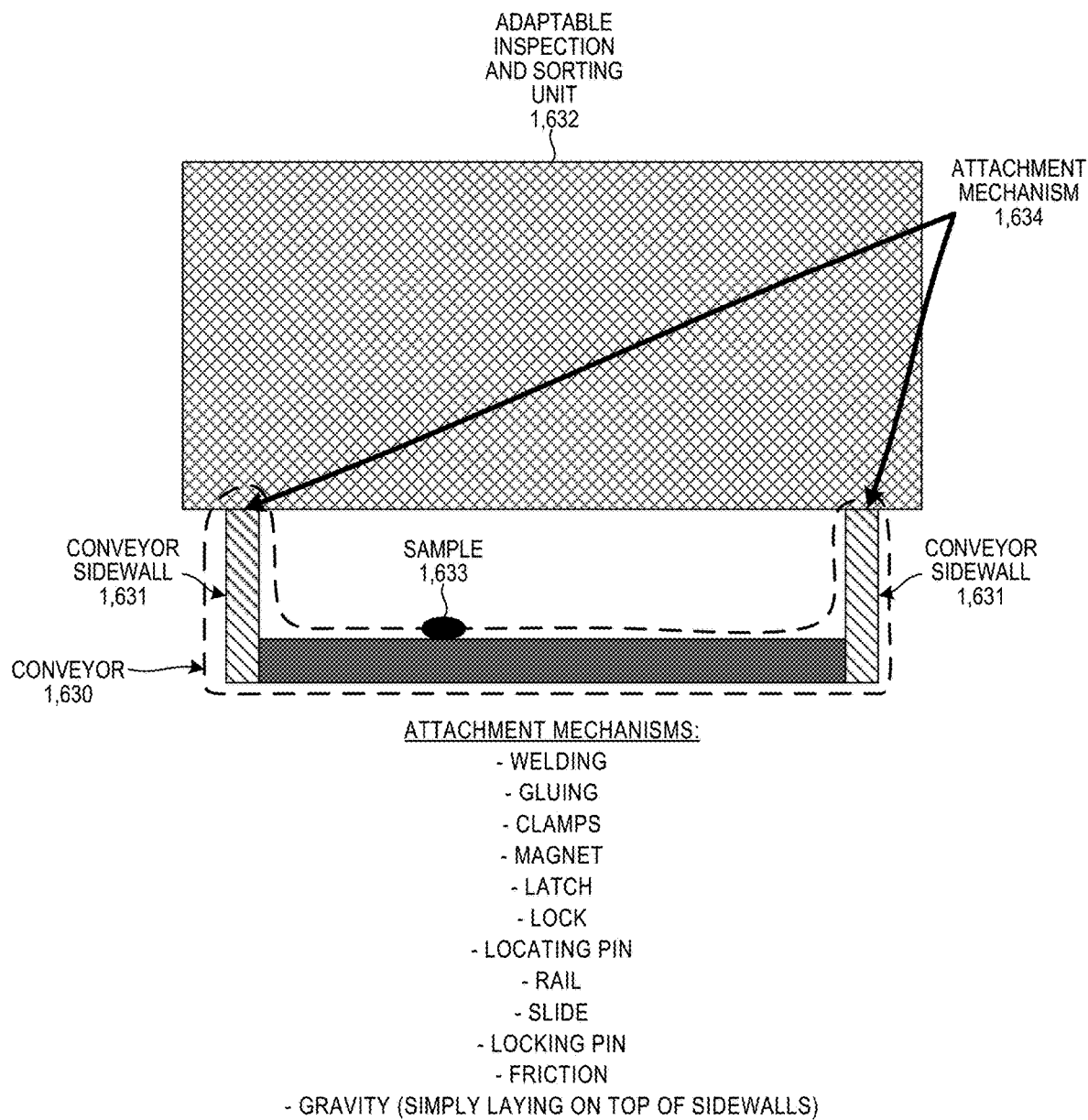
FIG. 89 is a diagram of a conveyor with an adaptable inspection and sorting unit attached to the conveyor sidewall.

FIG. 89 is a diagram of a conveyor with an adaptable inspection and sorting unit attached to the conveyor sidewall. The adaptable inspection and sorting unit can be attached permanently or temporarily to the conveyor sidewall. Conveyor 1,630 includes one or more sidewalls 1,631 and a belt that rotates about two or more pulleys. The sidewall 1,631 is included in the conveyor 1,630 so to prevent samples from falling off the sides of the conveyor 1,630. The sidewall 1,631 of the conveyor 1,630 can be used to support the adaptable inspection and sorting unit 1,632.

The adaptable inspection and sorting unit 1,632 can be attached using many different mechanisms. Some of these mechanisms are listed on FIG. 89. These attachment mechanisms include welding the adaptable inspection and sorting unit 1,632 to the conveyor sidewall 1,631, gluing the adaptable inspection and sorting unit 1,632 to the conveyor sidewall 1,631, clamping the adaptable inspection and sorting unit 1,632 to the conveyor sidewall 1,631, magnetically attracting the adaptable inspection unit 782 to the conveyor sidewall 1,631, latching the adaptable inspection and sorting unit 1,632 to the conveyor sidewall 1,631, locking the adaptable inspection and sorting unit 1,632 to the conveyor sidewall 1,631, location pinning the adaptable inspection unit 782 to the conveyor sidewall 1,631, rail mating the adaptable inspection and sorting unit 1,632 to the conveyor sidewall 1,631, slide fitting the adaptable inspection and sorting unit 1,632 to the conveyor sidewall 1,631, lock pinning the adaptable inspection and sorting unit 1,632 to the conveyor sidewall 1,631, or using gravity and friction to "attach" the adaptable inspection and sorting unit 1,632 to the conveyor sidewall 1,631.

The adaptable inspection and sorting unit 1,632 includes an attachment mechanism, an inspection sensor device (e.g., an optical receiver), a data port and a power port. The data port and the power port may be combined into a single physical port that connects to a single cable that includes both power conductors and data conductors. Alternatively, the adaptable inspection and sorting unit 1,632 may include a data port that is separate from the power port. Further, the adaptable inspection and sorting unit 1,632 may include an antenna connectable data port that connects to an antenna so to allow for wireless communication. FIG. 89 does not illustrate the inspection sensor device. FIG. 90 illustrates a block diagram of an adaptable inspection and sorting unit 1,640 that includes an attachment mechanism 1,641, an inspection sensor device 1,642, a data port 1,643, a sorting device 1,644, and a power port 1,645.

In operation, the conveyor 1,630 causes the sample 1,631 to travel under the adaptable inspection and sorting unit 1,632. While the sample is in view, or reach, of the inspection sensor device that is included in the adaptable inspection and sorting unit 1,632 one or more characteristics and/or images of the sample are captured and stored in a memory device. The memory device may be included in the adaptable inspection and sorting unit 1,632 or may be included in a device that communicates with the adaptable inspection and sorting unit 1,632 via the data port (wired or wireless). The captured characteristics and/or image(s) are then processed by a processor executing a quality inspection algorithm. In one example, the adaptable inspection and sorting unit 1,632 includes the 3D inspector described in detail above. In another example, a 3D image of the sample is generated based on the one or more images captured by the adaptable inspection and sorting unit 1,632. In yet another example, the captured 2D image is used to perform the inspection. The 3D and/or 2D image(s) are used to determine a quality characteristic of the sample. In one example, the quality characteristic is generated by the adaptable inspection and sorting unit 1,632 and output via the data port. In another example, the one or more captured images are output from the adaptable inspection and sorting unit 1,632 to another device that determines the quality characteristics of the sample. Adaptable inspection and sorting unit 1,632 provides improve quality inspection compared to unreliable inspection by human eyes without the cost of replacing an entire processing line. Moreover, adaptable inspection and sorting unit 1,632 is able to inspect many more samples per unit time than could be inspected by a human.

Absent any sorting mechanism, all samples would be directed toward the same location regardless of measured quality due to the absence of sorting functionality. The directing of a sample based upon the measured quality of the sample is achieved by the adaptable inspection and sorting device 1,632 because the device is capable of sorting samples in addition to inspecting samples.

In operation, the conveyor 1,630 causes the sample 1,631 to travel under the adaptable inspection and sorting unit 1,632. While the sample is in reach of the sorting device that is included in the adaptable inspection and sorting unit 1,632 the sample is sorted as instructed. In one example, the sorting instruction is received via the data port and stored in a memory included in the adaptable inspection and sorting unit 1,632. In another example, quality characteristic data is received via the data port and in response the adaptable inspection and sorter unit 1,632 generates the sorting instruction. In yet another example, the information received via the data port is a percentage of samples to be deflected. Communication with the adaptable inspection and sorting unit 1,632 may be performed via the data port (wired or wireless). The sorting device may be a vacuum system, a mechanical pedal system, an air jet system, or a mechanical gate. The adaptable inspection and sorting unit 1,632 performs automated sorting so that high quality samples are automatically separated from low quality samples.

Adaptable inspection and sorting unit 1,632 provides improve sorting compared to unreliable sorting by human hands without the cost of replacing an entire processing line. Moreover, adaptable inspection and sorting unit 1,632 is able to sort many more samples per unit time than could be sorted by a human.

Figure 91:
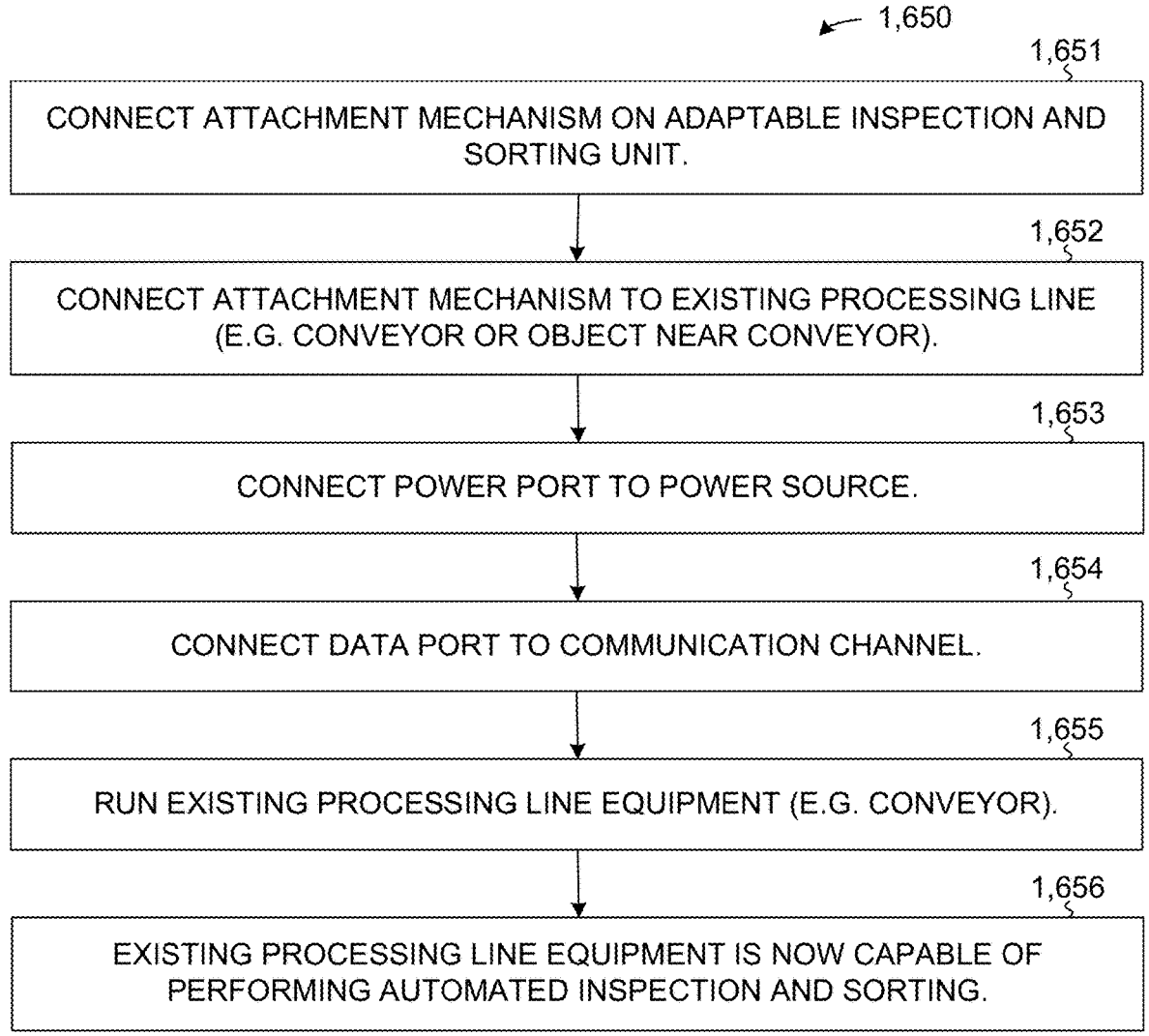
FIG. 91 is a flowchart illustrating the operations performed by an adaptable inspection and sorting unit.

FIG. 91 is a flowchart 1,650 illustrating the operations performed by an adaptable inspection and sorting unit. In step 1,651, an attachment mechanism is connected to the adaptable inspection and sorting unit. In step 1,652, the attachment mechanism is connected to the existing processing line. This can be a connection directly to the existing processing line or to an object near the existing processing line, such as a wall, ceiling, mounting stand, or conveyor sidewall. In step 1,653, a power port of the adaptable inspection and sorting unit is connected to a power source. In step 1,654, a data port of the adaptable inspection and sorting unit is connected to a data communication channel. The data communication channel can be a wired or wireless channel. In step 1,655, the existing processing line is run with the adaptable inspection and sorting unit in place and executing. In step 1,656, the existing processing line equipment is capable of performing automated inspection and sorting.

Proper alignment between the adaptable inspection and sorting unit and the conveyor is necessary to ensure proper operation. If the position of the adaptable inspection and sorting unit moved relative to the position of the conveyor belt, the adaptable inspection and sorting unit may no longer be able to properly inspect or sort the samples traveling along the conveyor. Accordingly, the mechanisms described above are very important and useful to ensure proper operation.

As discussed above regarding inspecting and sorting operations, machine learning algorithms may be used to conduct inspection and sorting operations. For example, a machine learning neural network may be used to train a computer system to analyze inspection data and create sorting instructions based on learned data.

Another import aspect required for proper operation of the adaptable inspection and sorter unit is measuring the speed of the sample moving along the conveyor. The speed at which the sample is traveling is needed to ensure actions made by the adaptable inspection and sorting device are conducted at the correct time. Conveyor speeds may vary across time and across different conveyors. For example, if one or more images are taken of a sample at time T0 and analysis of the image(s) determine that the sample is to be sorted to a garbage bin, the adaptable inspection and sorting unit needs to know when the sorting operation should be conducted. This can be calculated by adaptable inspection and sorting unit once the speed at which the sample is moving is known. For example, if the sample moves between the inspection location and the sorting location in T1 seconds, then the adaptable inspection and sorting unit will conduct the sorting operation at T1 seconds after the inspection operation was conducted (T0). Sample speed can be measured using various methods. One such method includes capturing two consecutive images of the sample as it moves along the conveyor. Then the movement of the sample is measured by measuring the difference in pixel locations where the sample is present. The distance per pixel of the image is known by the system. Therefore, the system can calculate the speed of the sample by multiplying (i) the number of pixels the sample moved between the two sequential images by the known distance per pixel, and (ii) then dividing the calculated distance the sample moved by the time duration between the first and second sequential images. Once the sample speed along the conveyor is known, the adaptable inspection and sorting unit can properly set the delay, or time duration, between conducting the inspection operation and conducting the sorting operation.

An integrated adaptable inspection and sorting unit provides a solution for an important market need. First, there is a market need to add an inspection unit or a sorting unit to an existing processing line so to allow current processing operations to continue the use of the existing processing line system while adding the clear benefits of automated inspection and sorting with minimal cost (new machinery and installation labor). Second, there is a market need to add an inspection unit and a sorting unit in an efficient and reliable manner. The alignment of an inspection unit and a sorting unit relative to the processing line (e.g. conveyor belt) is very important to attain optimum operation. Additionally, the alignment between the inspection unit and the sorting unit is very important as well to ensure that proper sorting can be achieved. When a standalone inspection unit is installed next to a stand alone sorting unit, effort and time needs to be consumed to ensure the proper alignment of both the inspection unit and the sorting unit, relative to the processing line as well as to each other. The integration of the inspection unit and the sorting unit into a single adaptable unit not only greatly reduces the installation time and cost, the integration into a single unit provides consistent high quality alignment between the inspector unit and the sorting unit for every installation. This is the case because the integrated adaptable inspection and sorting unit has fixed processing line where each unit is consistently aligned, checked, and fixed into place before shipping out to various installation locations. This high quality consistent alignment provides improved consistent performance as well as lower installation and maintenance costs.

Automated Inspection Data Collection for Machine Learning Applications

In the ever growing field of artificial intelligence and machine learning there is a growing need for data, however, not all data is the same. Data can be of different quality values, judged on an infinite variety of dimensions. In the space of optical inspection there is a need for high quality inspection data to aid machine learning ("Training Data") for improved artificial intelligence systems that optimize the operation of optical inspectors. One type of training data that is highly valuable to a machine learning optical inspector system is data including images of samples that result in a low confidence determination by the machine learning system. The data resulting in low confidence determinations are the areas where the machine learning systems have the greatest room for improvement. How to gather, store, and utilize this low confidence data is a problem that currently needs a solution. Multiple solutions to this problem are provided below.

Figure 92:
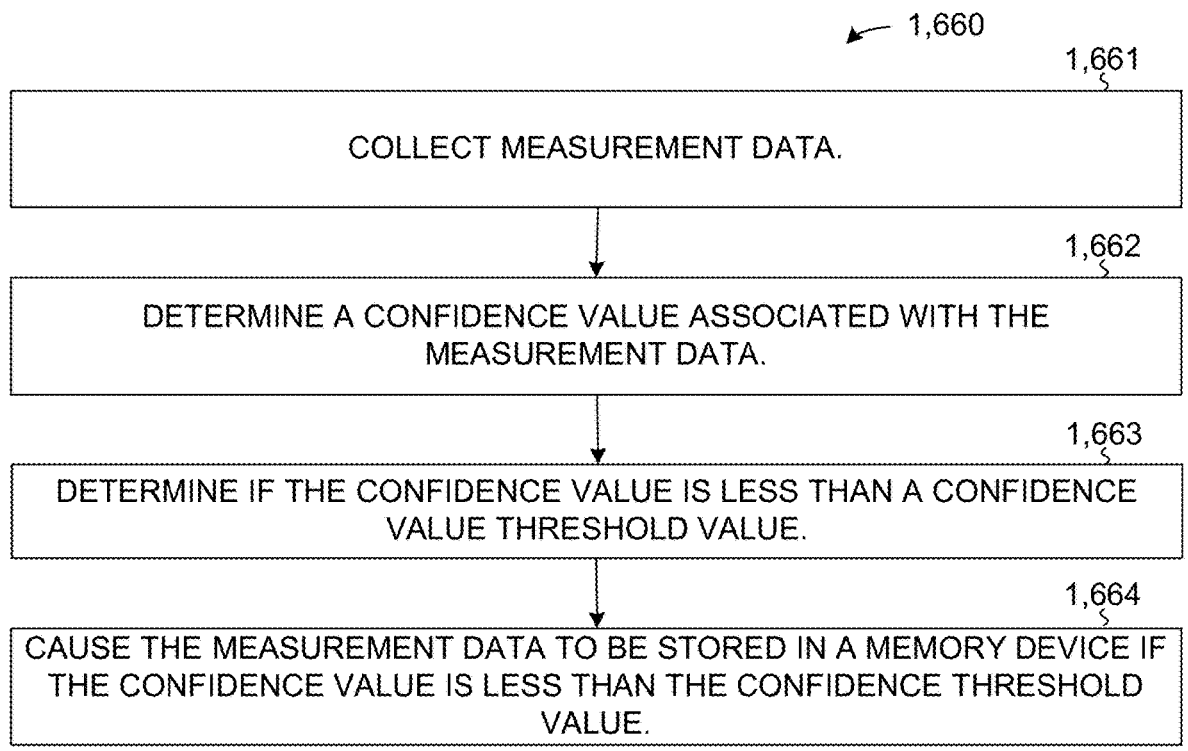
FIG. 92 is a flowchart illustrating a first method of automated inspection data collection for machine learning applications.

FIG. 92 is a flowchart 1,660 illustrating a first method of automated inspection data collection for machine learning applications. In step 1,661, measurement data is collected. Measurement data may include a captured image or any output provides by any type of sensor. Any exemplary list of sensors include: an optical sensor, a moisture sensor, a microtoxin sensor, a thermometer sensor, an acidity (pH) sensor, a microwave sensor, a pressure sensor, a level sensor, an ultrasonic sensor, a flow sensor, a viscosity sensor, a conductance/impedance sensor, an electronic nose (sniffing) sensor, an x-ray sensor, a multi Spectral (visual/non visual) sensor, a weight sensor, a refractometer sensor, a tenderometer sensor, a firmness sensor, a hardness sensors, or a proximity sensor. In step, 1,662, a confidence value associated with the measurement data is determined. In step, 1,663, a determination is made as to whether the confidence value is less than a confidence threshold value. In step, 1,664, the measurement data is caused to be stored in a memory device if the confidence value is less than the confidence threshold value.

Figure 93:
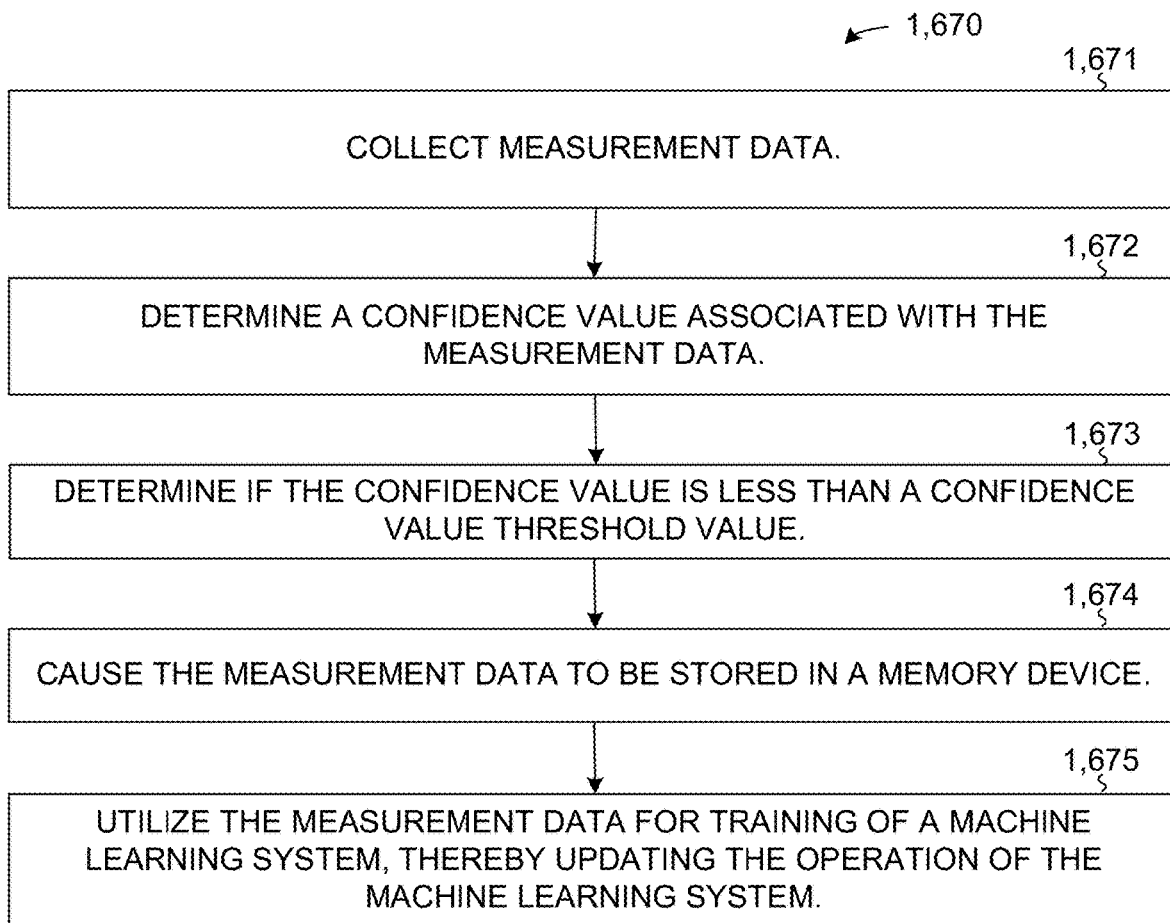
FIG. 93 is a flowchart illustrating a second method of automated inspection data collection for machine learning applications.

FIG. 93 is a flowchart 1,670 illustrating a second method of automated inspection data collection for machine learning applications. In step 1,671, measurement data is collected. In step, 1,672, a confidence value associated with the measurement data is determined. In step, 1,673, a determination is made as to whether the confidence value is less than a confidence threshold value. In step, 1,674, the measurement data is caused to be stored in a memory device if the confidence value is less than the confidence threshold value. In step, 1,675, the measurement data is utilized for training of a machine learning system, thereby updating the operation of the machine learning system.

A confidence value is a measure of how confident the machine learning system is that the observed characteristic of the sample is in fact present on the sample. For example, the machine learning system may determine that a first sample has a specific type of defect, however, the machine learning system may only be fifty percent certain that the detected defect is present on the first sample. Alternatively, upon inspection of a second sample, the machine learning system maybe ninety percent certain that the detected defect is present on the second sample. In one embodiment, the confidence value threshold maybe sixty percent and therefore the measurement data of the first sample would be deemed a low confidence measurement data, while the measurement data of the second sample would not be deemed a low confidence measurement data.

In one example, the steps illustrated in FIG. 93 may be used to update inspector operating instructions. The machine learning system utilizes the measurement data to train the machine learning system how to identify and determine the characteristics included in the measurement data. After the training of the machine learning system is completed, updated inspector operating instructions are generated. The updated inspector operating instructions will provide improved determination of inspected samples, such that, other samples with similar characteristics will not longer result in a low confidence value, but rather a high confidence value because the system is now trained to detect and identify the characteristics observed in the measurement data.

Figure 94:
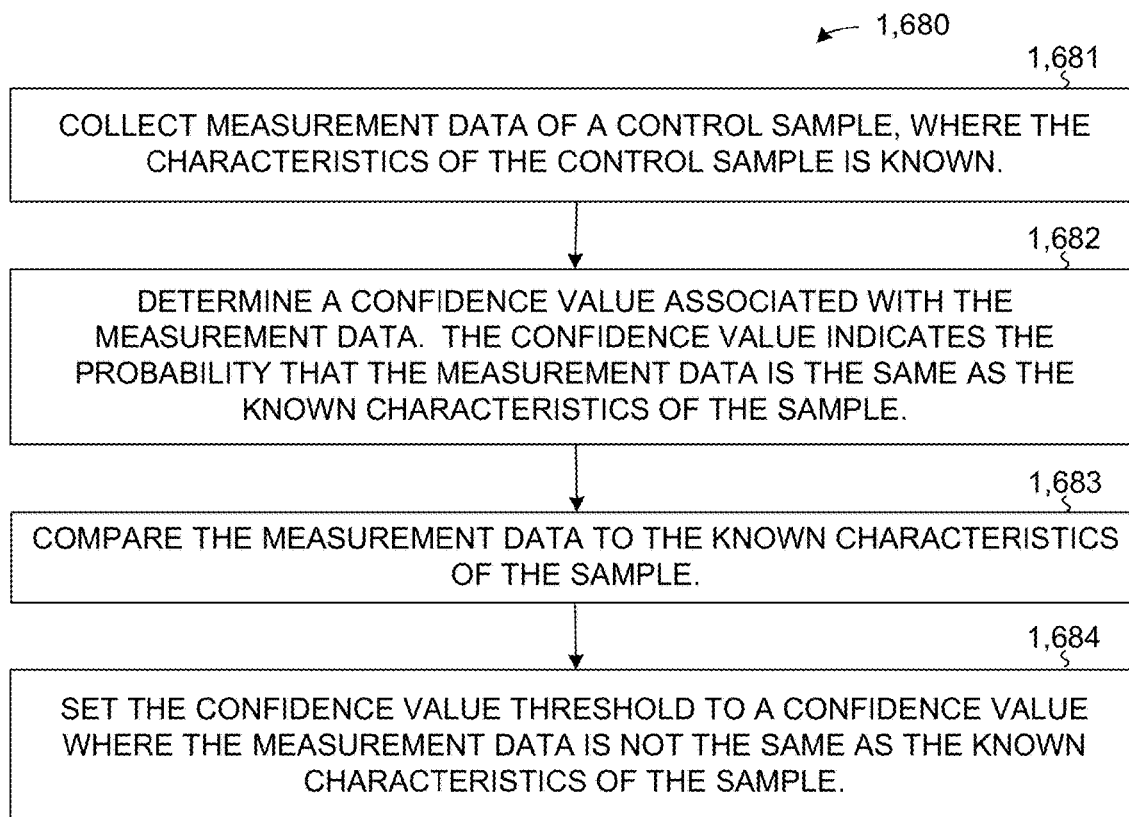
FIG. 94 is a flowchart illustrating a first method of determining a confidence value threshold for automated inspection data collection for machine learning applications.

FIG. 94 is a flowchart 1,680, illustrating a first method of determining a confidence value threshold for automated inspection data collection for machine learning applications. In step 1,681, measurement data of a control sample is collected. The characteristics of the control sample is known. In step 1,682, a confidence value associated with the measurement data is determined. The confidence value indicates the probability that the measurement data is the same as the known characteristics of the sample. In step 1,683, the measurement data is compared to the known characteristics of the sample. In step 1,684, a confidence value threshold is set to a confidence value where the measurement data is not the same as the known characteristics of the sample. In one example, the control sample may be a type of nut, such as an almond.

Figure 95:
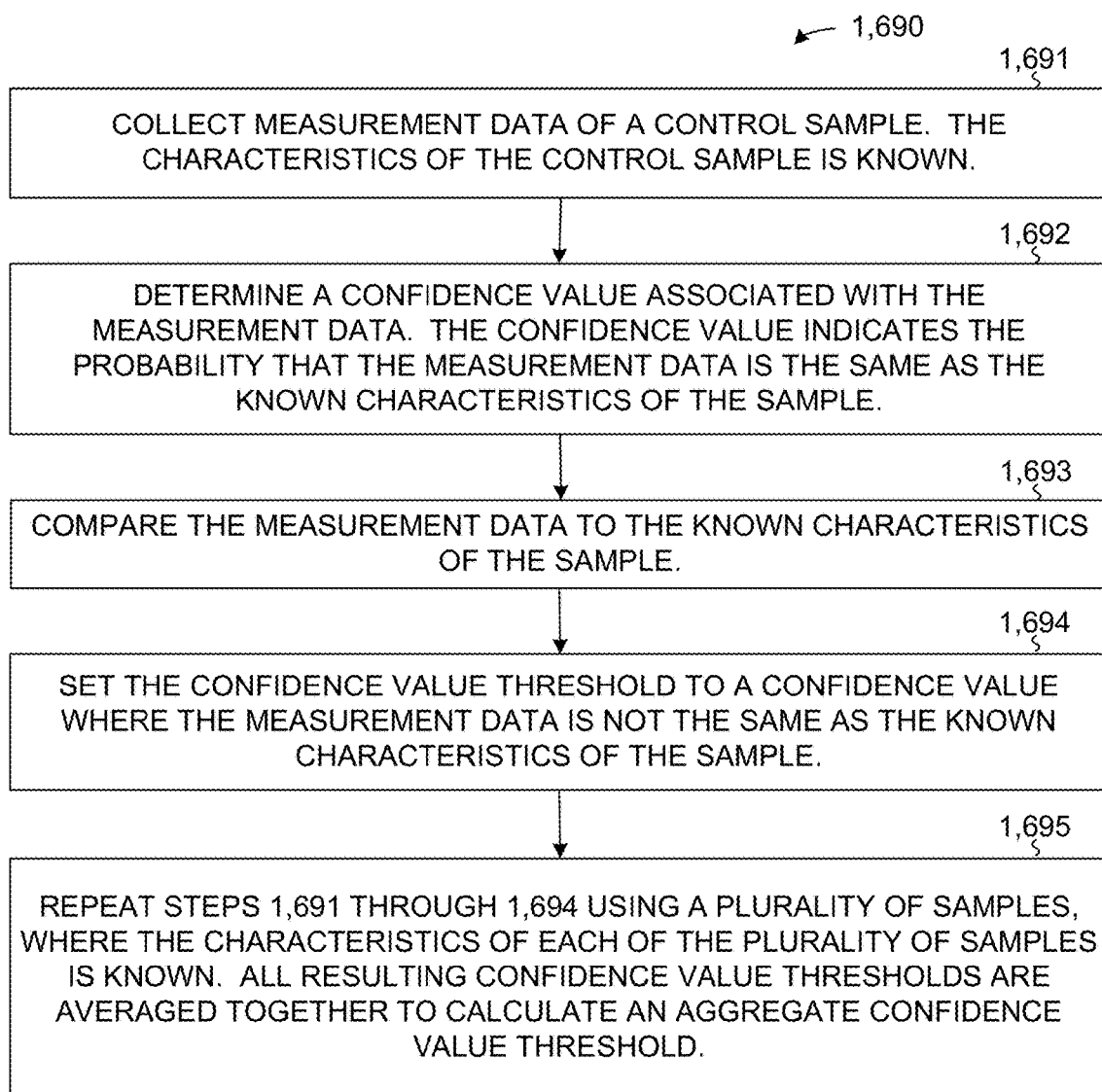
FIG. 95 is a flowchart illustrating a second method of determining a confidence value threshold for automated inspection data collection for machine learning applications.

FIG. 95 is a flowchart 1,690 illustrating a second method of determining a confidence value threshold for automated inspection data collection for machine learning applications. In step 1,691, measurement data of a control sample is collected. The characteristics of the control sample is known. In step 1,692, a confidence value associated with the measurement data is determined. The confidence value indicates the probability that the measurement data is the same as the known characteristics of the sample. In step 1,693, the measurement data is compared to the known characteristics of the sample. In step 1,694, a confidence value threshold is set to a confidence value where the measurement data is not the same as the known characteristics of the sample. In step 1,695, steps 1,691 through step 1,694 are repeated using a plurality of samples, where the characteristics of each of the plurality of samples is known. Thereafter, an average of all resulting confidence value thresholds is calculated to determine an aggregate confidence value threshold.

Figure 96:
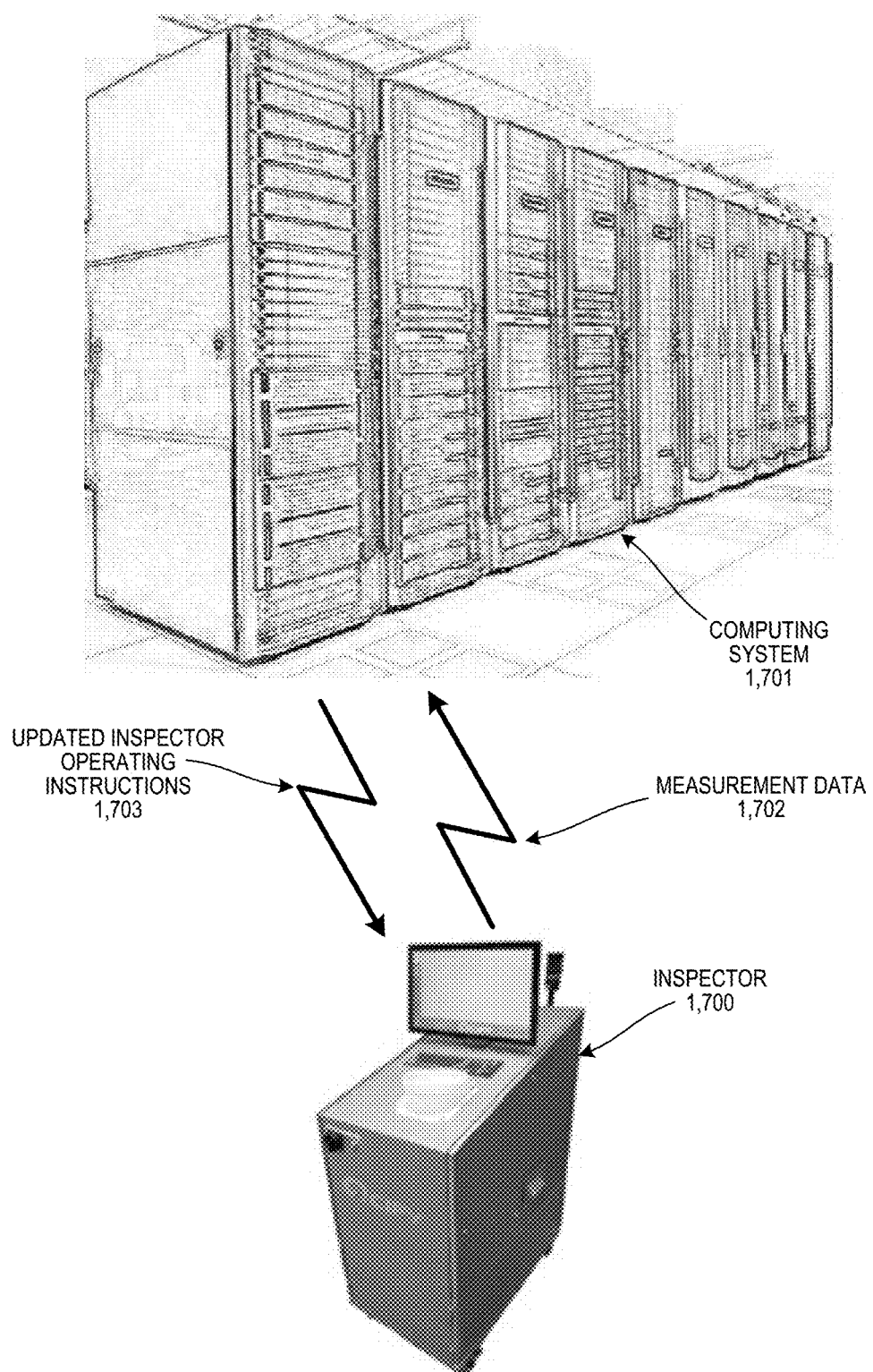
FIG. 96 is a system diagram of a first system configured to perform automated inspection data collection for machine learning applications.

FIG. 96 is a system diagram of a first system configured to perform automated inspection data collection for machine learning applications. Inspector 1,700 collects measurement data of a sample and communicates the measurement data to a computing system 1,701. In one example, the inspector 1,700 sends all measurement data to the computing system 1,701. In another example, the inspector 1,700 only sends measurement data determined to be low confidence measurement data to the computing system 1,701. The computing system 1,701 then utilized the received measurement data 1,702 to perform machine learning, thereby updating the inspector operating instructions 1,703. The updated inspector operating instructions 1,703 are then communicated to the inspector 1,700. The inspector 1,700 then begins operation utilizing the updated inspector operating instructions 1,703. The communications between the inspector 1,700 and the computing system 1,701 may performed via a wired or wireless medium. An example of a wired medium is an ethernet connection. An example of a wireless medium is a WiFi connection. The inspector may be any type of inspector configured to inspect samples. In one embodiment, the inspector is an in-flight 3D inspector. In another embodiment, the inspector is an adaptable inspection unit.

The system illustrated in FIG. 96 has the advantage of using large amounts of server processing power to conduct the machine learning operation on the low confidence measurement data 1,702. Due to cost, size, and power consumption restraints, the amount of processing power available in a single inspector 1,700 is not as great as the processing power that is available in a computing system 1,701 including one or more servers.

Local determination of low confidence measurement data by the inspector 1,700 has the advantage of reducing the amount of data communicated between the inspector 1,700 and the computing system 1,701. Reduced data communication allows for a lower data bandwidth connection requirement between the inspector 1,700 and the computing system 1,701. Not only are lower data bandwidth connections less expensive, in many inspection locations a high data bandwidth connection is not available.

Figure 97:
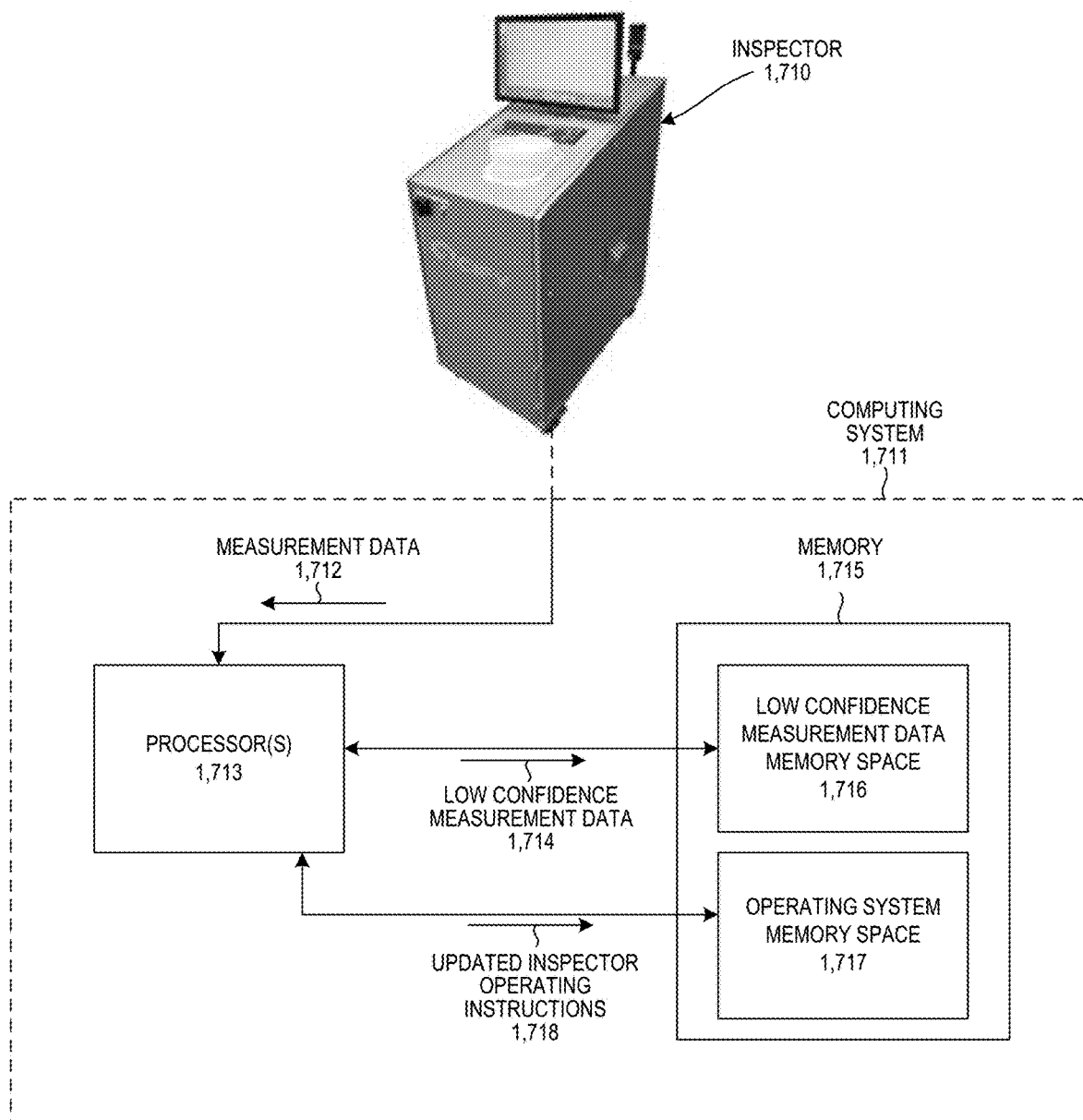
FIG. 97 is a system diagram of a second system configured to perform automated inspection data collection for machine learning applications

FIG. 97 is a system diagram of a second system configured to perform automated inspection data collection for machine learning applications. Inspector 1,710 collects measurement data of a sample and processes the measurement data locally. Measurement data 1,712 is processed by one or more processors 1,713. The one or more processors 1,713 determine if the measurement data is low confidence measurement data. Low confidence measurement data 1,714 is written to memory space 1,716 located in memory 1,715. The one or more processors 1,713 read the low confidence measurement data 1,714 from memory 1,711 and perform machine learning to generate updated inspector operating instructions 1,718. The updated inspector operating instructions 1,718 are written to the operating system memory space 1,717, thereby updating the operation of the inspector 1,710. In one example, the low confidence measurement data memory space 1,716 and the operating system memory space 1,717 are both located within memory 1,715. In another example, the low confidence measurement data memory space 1,716 and the operating system memory space 1,717 are located in separate memory devices.

One advantage of the stand alone inspector is that external data communication is not necessary. The inspector can operate in solitude and continually learn and update its operating instructions independently, without the need for communication or remote computer system services.

It is also noted herein, the that the updated operating instructions can be communicated with more than a single inspector. For example, measurement data from a first inspector may be used to for machine learning to generate an updated inspector operating instructions which are then communicated to one or more other inspector units that did not generate the measurement data. In this fashion, an array of inspector units could benefit from the machine learning resulting from measurement data collected from a single inspector unit. One skilled in the art, will readily understand the magnitude of this novel aspect when considering a system including many different inspector units, each generating high quality low confidence measurement data to the machine learning application.

The multiple solutions described above provide structures and processes for efficiently generating high quality data for machine learning applications. More specifically, these structures and processes can be used to improve machine learning application within the field of inspection devices.

Automated Sample Weight Measurement Via Optical Inspection

In the field of product inspection, measuring the quality and quantity of the product is very valuable. In addition to measuring the quantity in sheer numbers of units, it is also valuable to measure the quantity in terms of weight, both per unit and overall total weight of all the product. For example, in the field of almond inspection, it is valuable to measure the maximum, minimum, average weight of a group of almonds, and the total sum weight of all almonds in the group. This type of data coupled with the quality data provides great insight into the final value of the group of inspected almonds. This holds true with respect to inspection of other food and products. A method for automatically measuring sample weight via optical inspection is provided below.

Figure 98:
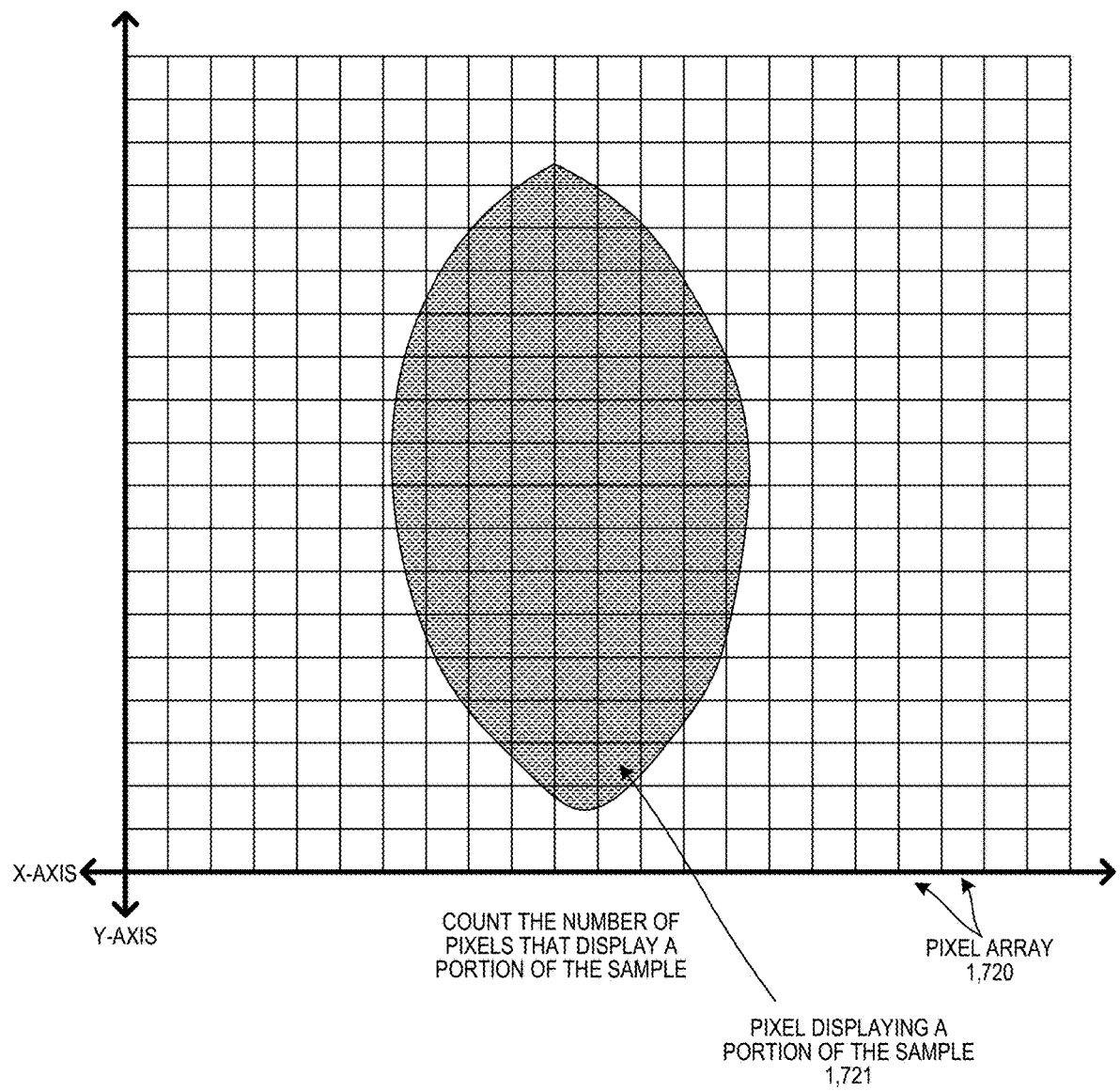
FIG. 98 is a diagram illustrating sample size measurement along a first plane by pixel counting.

FIG. 98 is a diagram illustrating sample size measurement along a first plane by pixel counting. The grid is pixel array 1,720 of a captured image. The pixels are part of an image captured in the x-y dimension. The shaded squares are pixels displaying a portion of the sample. The unshaded squares are pixels that are not displaying a portion of the sample. This figure illustrates a method of determining the area of the sample in the x-y plane by counting the shaded pixels that display a portion of the sample. The counted number of shaded pixels multiplied by the area displayed in each pixel is the approximate area of the sample in the x-y plane.

Figure 99:
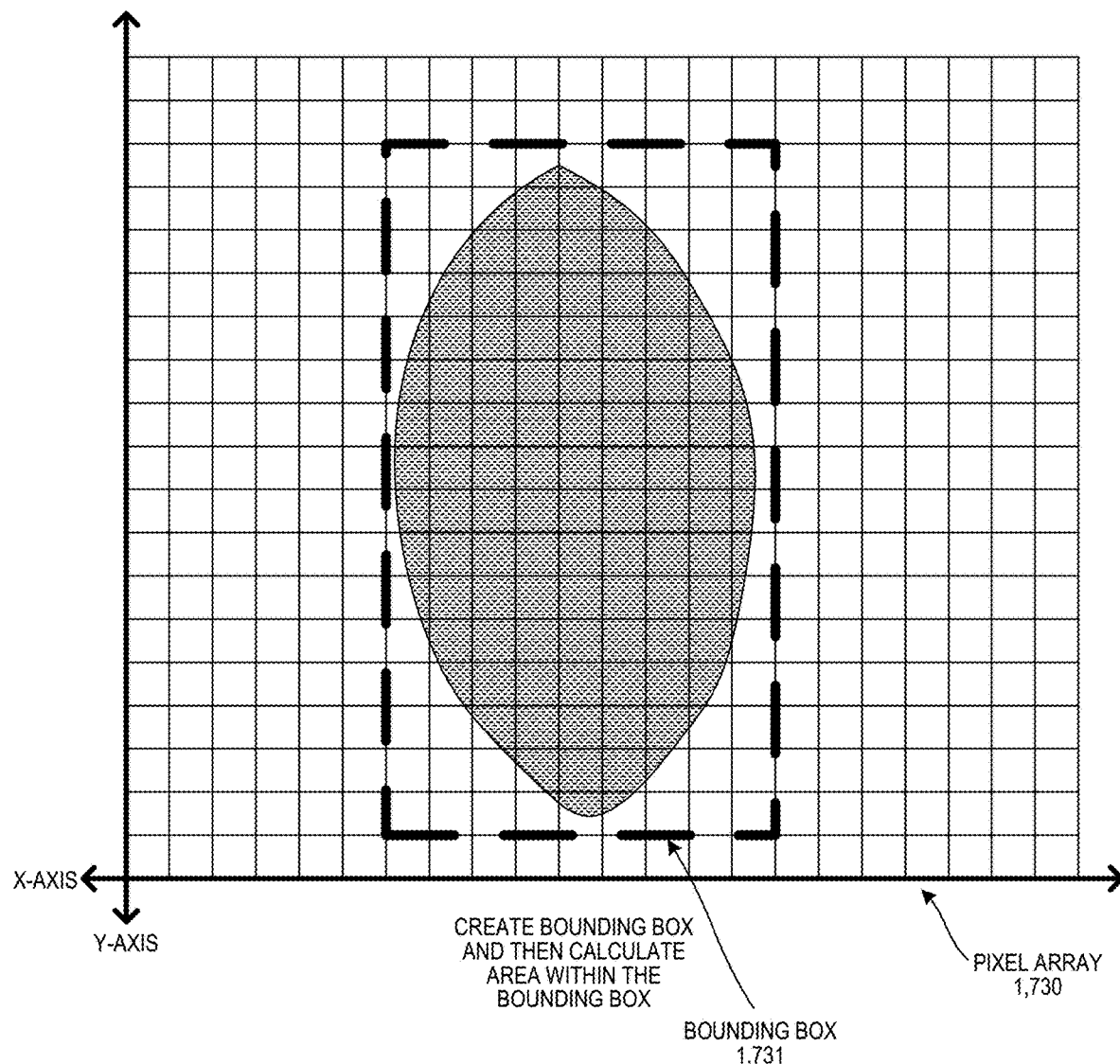
FIG. 99 is a diagram illustrating sample size measurement along a first plane by pixel bounding box calculation.

FIG. 99 is a diagram illustrating sample size measurement along a first plane by pixel bounding box calculation. The grid is pixel array 1,730 of a captured image. The pixels are part of an image captured in the x-y dimension. The shaded squares are pixels displaying a portion of the sample. The unshaded squares are pixels that are not displaying a portion of the sample. This figure illustrates a method of determining the area of the sample in the x-y plane by creating a bounding box 1,731 around the shaded pixels that display a portion of the sample. The number of pixels inside the bounding box multiplied by the area displayed in each pixel is the approximate area of the sample in the x-y plane. One skilled in the art will realize that use of a bounding box, in certain scenarios, can be less accurate than counting pixels to determine sample area.

Figure 100:
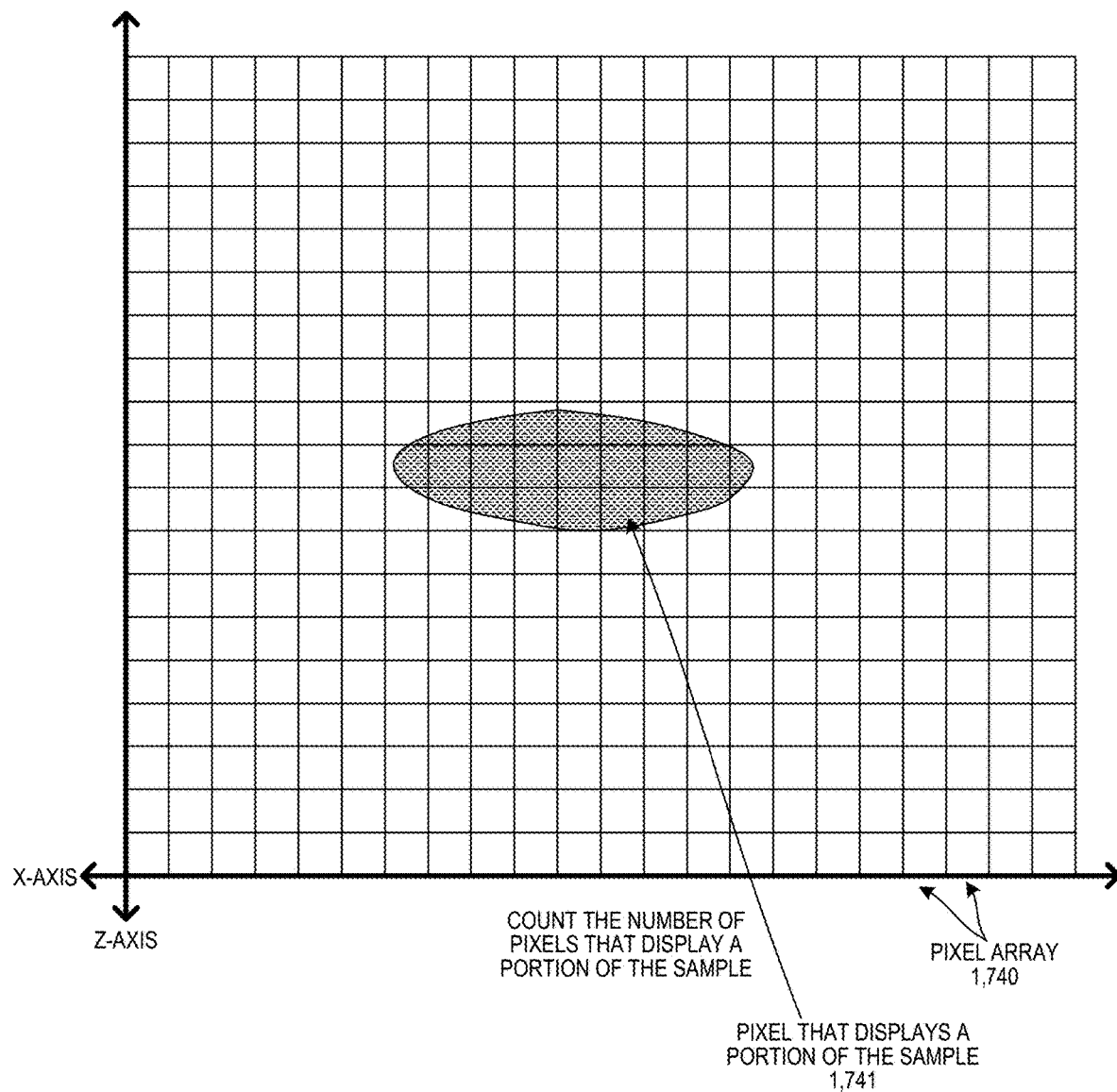
FIG. 100 is a diagram illustrating sample size measurement along a second plane by pixel counting.

FIG. 100 is a diagram illustrating sample size measurement along a second plane by pixel counting. The grid is pixel array 1,740 of a captured image. The pixels are part of an image captured in the x-z dimension. The shaded squares are pixels displaying a portion of the sample. The unshaded squares are pixels that are not displaying a portion of the sample. This figure illustrates a method of determining the area of the sample in the x-z plane by counting the shaded pixels that display a portion of the sample. The counted number of shaded pixels multiplied by the area displayed in each pixel is the approximate area of the sample in the x-z plane.

Figure 101:
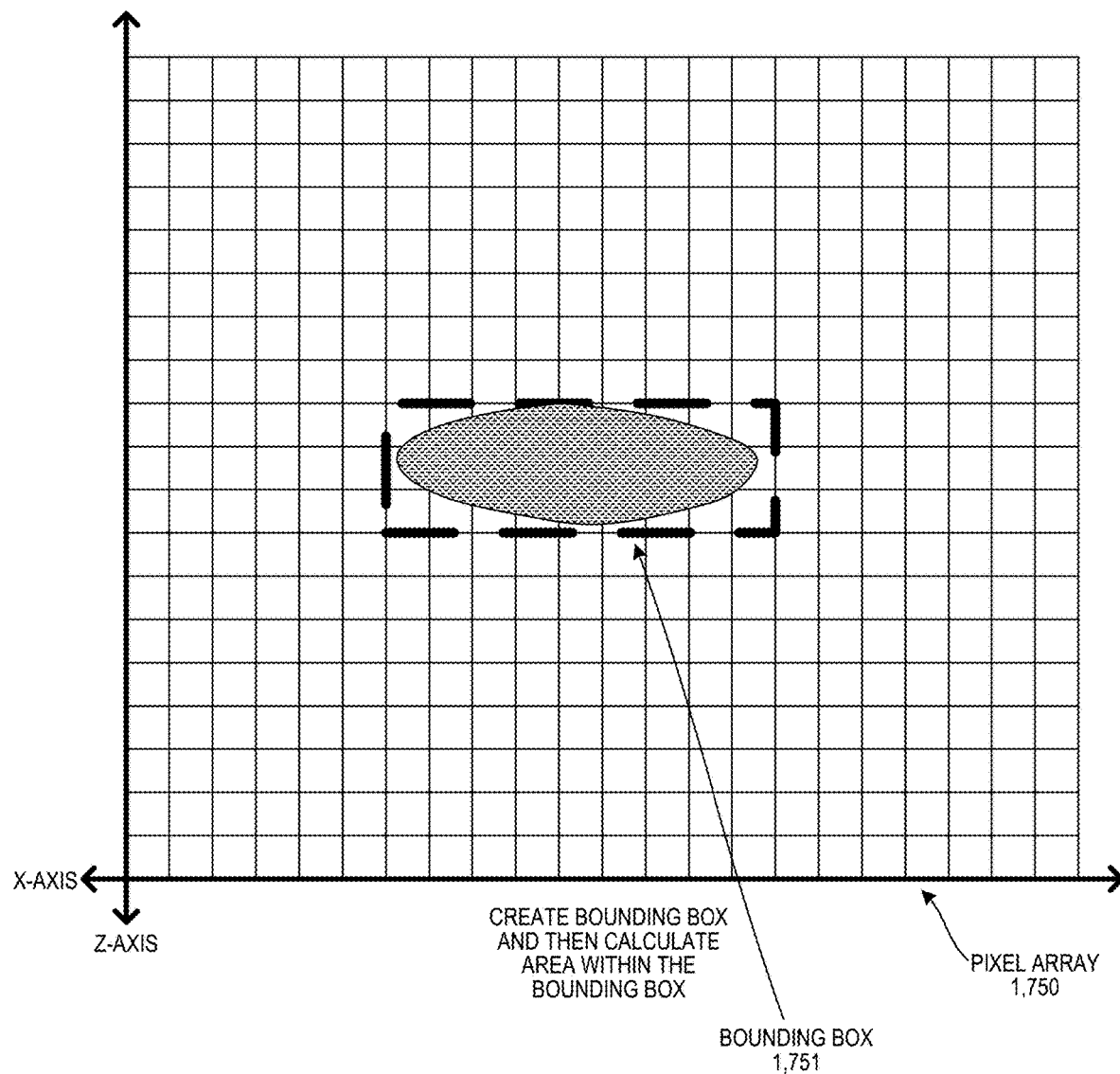
FIG. 101 is a diagram illustrating sample area measurement along a second plane by pixel bounding box calculation.

FIG. 101 is a diagram illustrating sample area measurement along a second plane by pixel bounding box calculation. The grid is pixel array 1,750 of a captured image. The pixels are part of an image captured in the x-z dimension. The shaded squares are pixels displaying a portion of the sample. The unshaded squares are pixels that are not displaying a portion of the sample. This figure illustrates a method of determining the area of the sample in the x-z plane by creating a bounding box 1,751 around the shaded pixels that display a portion of the sample. The number of pixels inside the bounding box multiplied by the area displayed in each pixel is the approximate area of the sample in the x-z plane. One skilled in the art will realize that use of a bounding box, in certain scenarios, can be less accurate than counting pixels to determine sample area.

Figure 102:
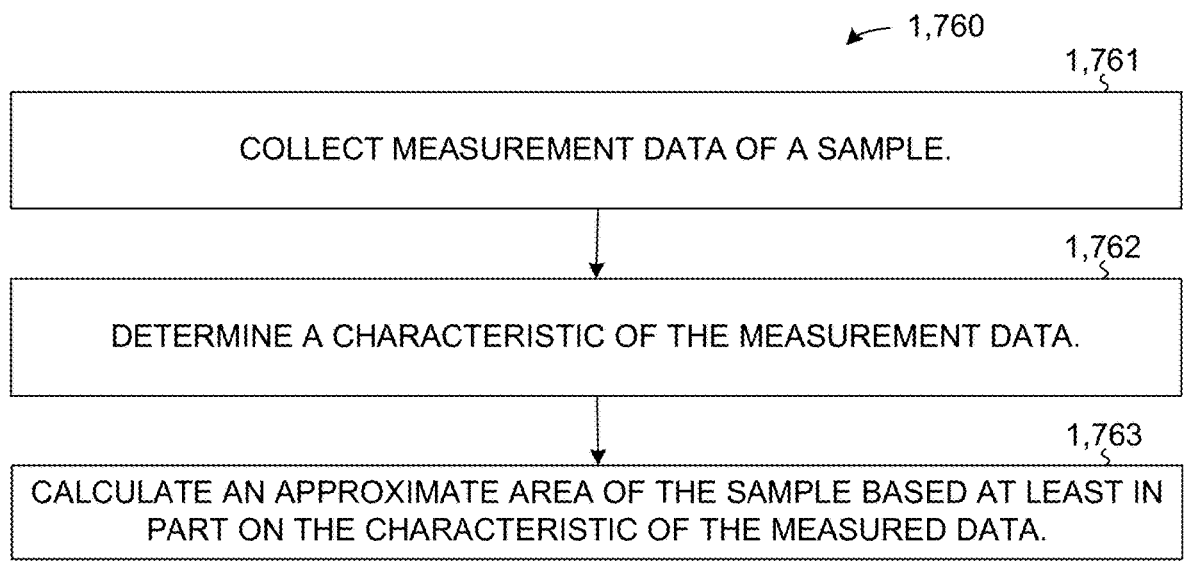
FIG. 102 is a flowchart illustrating the steps of automated sample area measurement.

FIG. 102 is a flowchart 1,760 illustrating the steps of automated sample area measurement. In step 1,761, measurement data of the sample is collected. In step 1,762, a characteristic of the measurement data is determined. In step 1,763, an approximate area of the sample is calculated based at least in part on the characteristic of the measured data. In one example, the measured data includes a captured image. In another example, the characteristic of the measured data is one or more dimensions of the sample displayed in the captured image. In one embodiment, the measurement data is collected while the sample is in-flight utilizing an in-flight 3D inspector. In another embodiment, the measurement data is collected by an adaptable inspection unit.

Figure 103:
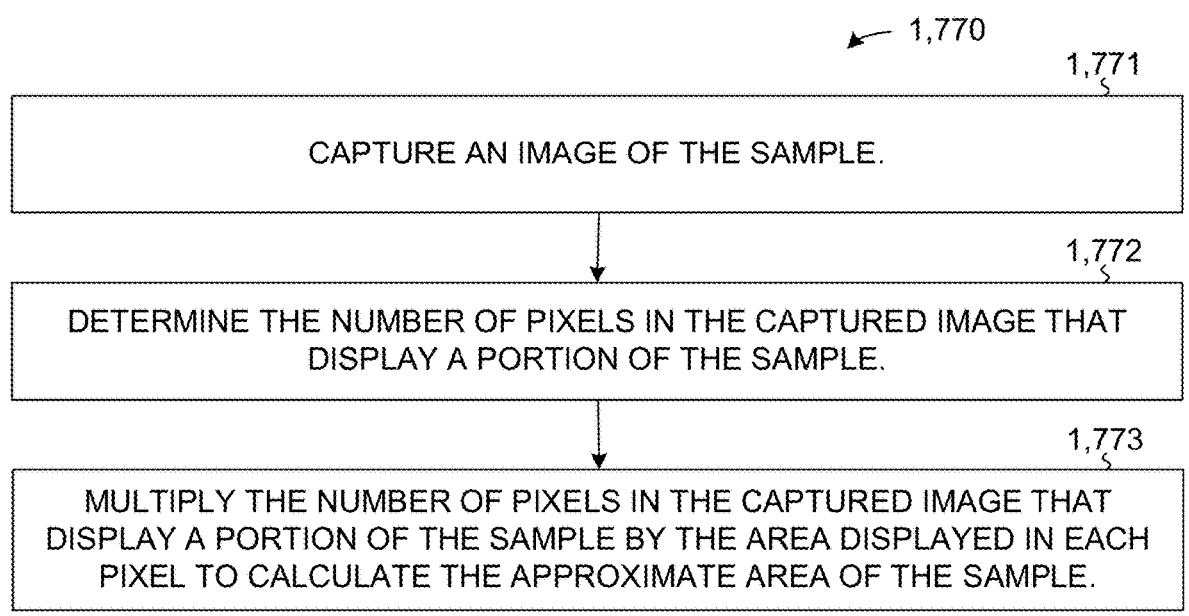
FIG. 103 is a flowchart illustrating the steps of automated sample area measurement.

FIG. 103 is a flowchart 1,770 illustrating the steps of automated sample area measurement. In step 1,771, an image of the sample is captured. In step 1,772, the number of pixels in the captured image that display a portion of the sample is determined. In step 1,773, the number of pixels in the captured image that display a portion of the sample are multiplied by the area displayed in each pixel to calculate the approximate area of the sample.

Figure 104:
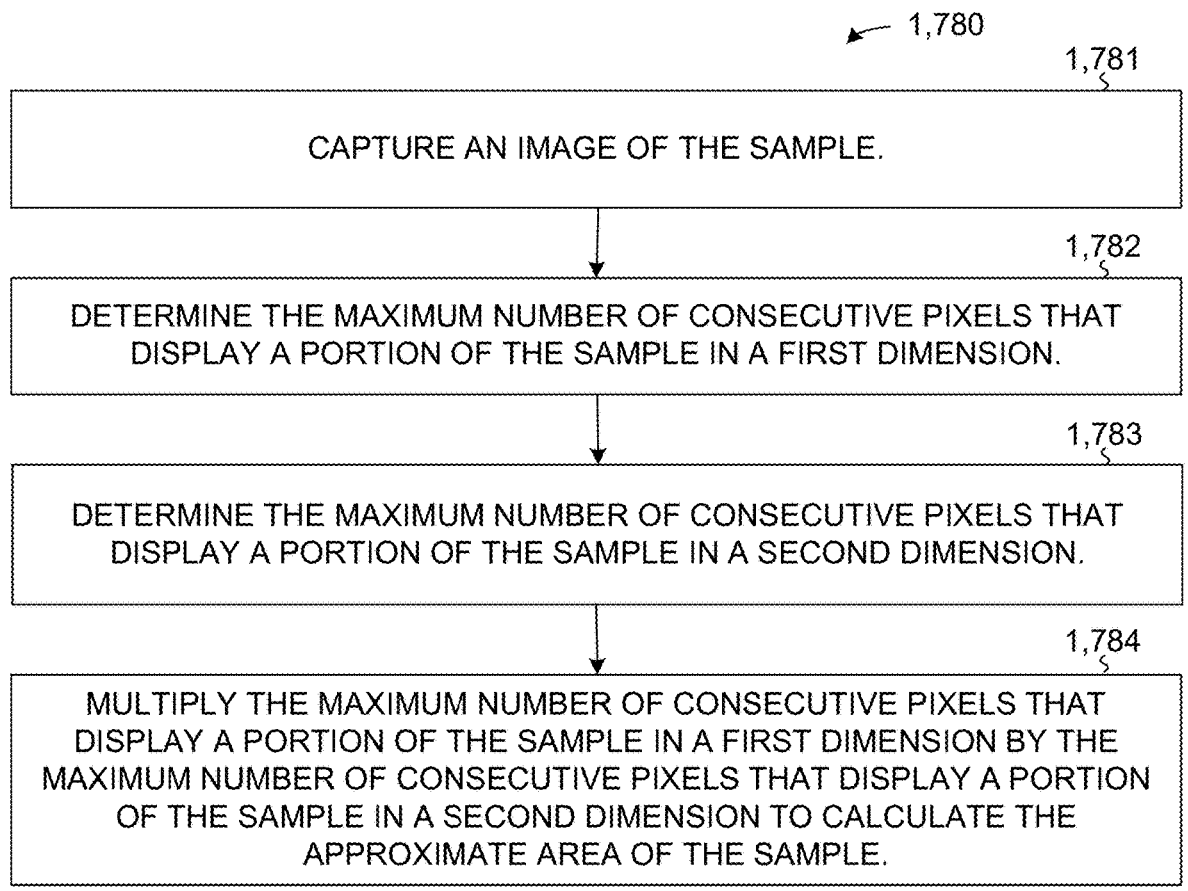
FIG. 104 is a flowchart illustrating the steps of automated sample area measurement.

FIG. 104 is a flowchart 1,780, illustrating the steps of automated sample area measurement. In step 1,781, an image of the sample is captured. In step 1,782, the maximum number of consecutive pixels that display a portion of the sample in a first dimension are determined. In step 1,783, the maximum number of consecutive pixels that display a portion of the sample in a second dimension is determined. In step 1,784, the maximum number of consecutive pixels that display a portion of the sample in a first dimension is multiplied by the maximum number of consecutive pixels that display a portion of the sample in the second dimension to calculate the approximate area of the sample.

Figure 105:
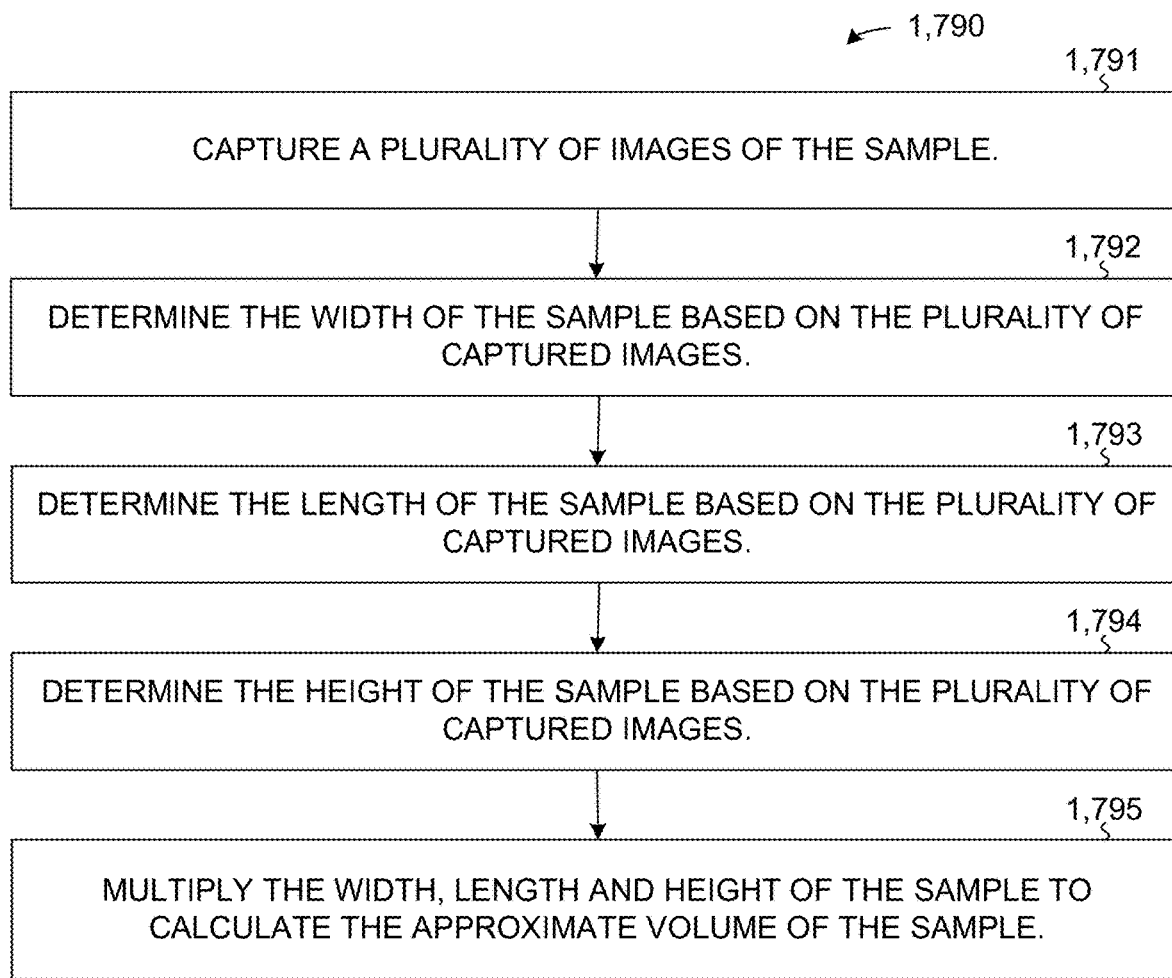
FIG. 105 is a flowchart illustrating the steps of automated sample volume measurement.

FIG. 105 is a flowchart 1,790 illustrating the steps of automated sample volume measurement. In step 1,791, a plurality of images of a sample are captured. In step 1,792, the width of the sample is determined based at least in part on one of the plurality of captured images. In step 1,793, the length of the sample is determined based at least in part on one of the plurality of captured images. In step 1,794, the height of the sample is determined based at least in part on one of the plurality of captured images. In step 1,795, the width, length, and height of the sample are multiplied together to calculate the approximate volume of the sample.

Figure 106:
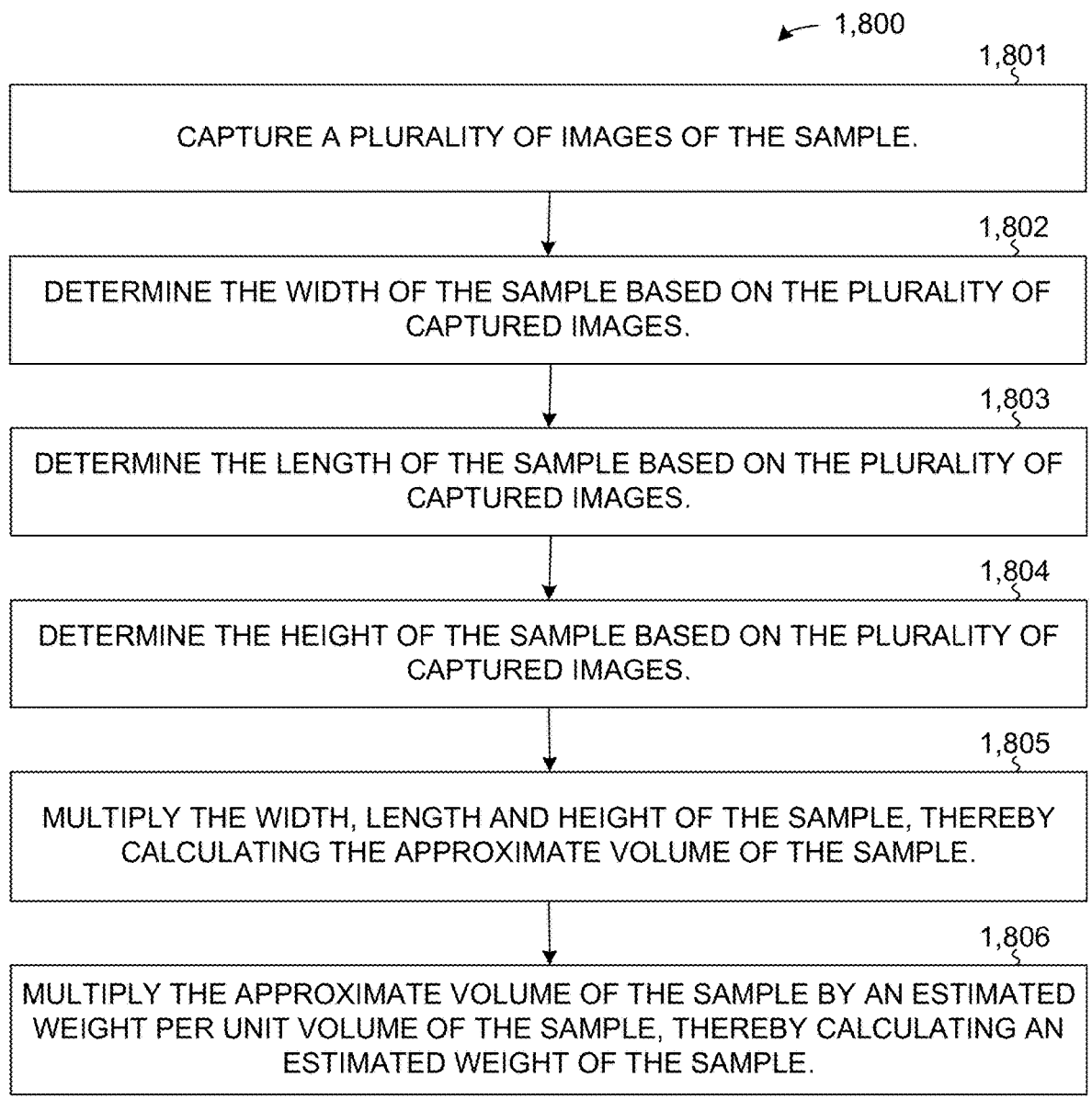
FIG. 106 is a flowchart illustrating the steps of automated sample weight measurement.

FIG. 106 is a flowchart 1,800 illustrating the steps of automated sample weight measurement. In step 1,801, a plurality of images of a sample are captured. In step 1,802, the width of the sample is determined based at least in part on one of the plurality of captured images. In step 1,803, the length of the sample is determined based at least in part on one of the plurality of captured images. In step 1,804, the height of the sample is determined based at least in part on one of the plurality of captured images. In step 1,805, the width, length, and height of the sample are multiplied together to calculate the approximate volume of the sample. In step 1,806, the approximate volume of the sample is multiplied by an estimated weight per unit volume of the sample, thereby calculating an estimated weight of the sample.

In another embodiment, where a third dimension, such as height, is not measured, the weight can be measured by multiplying the approximate area of the sample by an estimated weight per unit area of the sample. In this fashion, the measured area of the sample can be used to calculate an approximate weight of the sample. While calculating approximate weight based on area, and not the volume, of the sample is less accurate, in many situations this level of estimation is sufficient to yield useful data.

The estimated weight per unit area may be generated by measuring the area of multiple control samples for which the weight is already known and then processing the average or median ratio of the measured area and known weight data pairs to generate an average or median weight per unit area based on the control samples.

The estimated weight per unit volume may be generated by measuring the volume of multiple control samples for which the weight is already known and then processing the average or median ratio of the measured volume and known weight data pairs to generate an average or median weight per unit volume based on the control samples.

The above methods of measuring area, volume and weight of samples using an optical inspector provide valuable information. The above methods may be performed using an in-flight 3D inspector or an adaptable inspection unit as disclosed herein. Moreover, these methods of measurement may be used by other optical inspectors as well.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An adaptable inspection unit, comprising:
   an attachment mechanism;
   an inspection device;
   a data port that is capable of communicating information; and
   a power port that is connectable to a power source, wherein the attachment mechanism, the inspection device, the data port, and the power port are configured to physically connect together such that the adaptable inspection unit is capable of measuring a characteristic of a sample traveling along a processing line when the adaptable inspection unit is affixed to a first position proximate to the processing line, and wherein the adaptable inspection unit is not attached to the processing line.

2. The adaptable inspection unit of claim 1, wherein the first position is within a line-of-sight of the sample traveling along the processing line.

3. The adaptable inspection unit of claim 1, wherein the inspection device includes an optical sensor, a moisture sensor, a microtoxin sensor, a thermometer sensor, an acidity sensor, a microwave sensor, a pressure sensor, a level sensor, an ultrasonic sensor, a flow sensor, a viscosity sensor, a conductance/impedance sensor, an electronic nose sensor, an X-ray sensor, a multi spectral sensor, a weight sensor, a refractometer sensor, a tenderometer sensor, a firmness sensor, a hardness sensor, or a proximity sensor.

4. The adaptable inspection unit of claim 1, wherein the attachment mechanism includes a mounting bracket, a mounting bracket receptacle, a weldable material, a clamp, an adhesive, a magnet, a latch, a lock, a locating pin, a rail, a slide, a locking pin, a bolt, or a screw.

5. The adaptable inspection unit of claim 1, further comprising:
   a memory circuit; and
   a processor circuit adapted to:
      control the inspection sensor device; and
      cause information to be communicated via the data port.

6. The adaptable inspection unit of claim 1, wherein the adaptable inspection unit is configured to communicate with a sorting device via the data port.

7. The adaptable inspection unit of claim 1, wherein the data port is a wired communication port or a wireless communication port.

8. The adaptable inspection unit of claim 1, wherein the adaptable inspection unit is configured to output sample characterization data via the data port.

9. The adaptable inspection unit of claim 1, wherein the information communicated by the adaptable inspection unit causes the sorting device to perform a sorting operation.

10. The adaptable inspection unit of claim 1, wherein the information communicated via the data port is a sorting command.

11. The adaptable inspection unit of claim 1, further comprising:
a trigger configured to determine when the sample is ready to be inspected.

12. An adaptable inspection unit, comprising:
an attachment mechanism;
an inspection device;
a data port that is capable of communicating information; and
a power port that is connectable to a power source, wherein the attachment mechanism, the inspection device, the data port, and the power port are configured to physically connect together such that the adaptable inspection unit is capable of measuring a characteristic of a sample traveling along a processing line when the adaptable inspection unit is affixed to a first position proximate to the processing line, and wherein the adaptable inspection unit is attached to the processing line.

13. An adaptable inspection unit, comprising:
an attachment mechanism;
an inspection device;
a data port that is capable of communicating information; and
a power port that is connectable to a power source, wherein the attachment mechanism, the inspection device, the data port, and the power port are configured to physically connect together such that the adaptable inspection unit is capable of measuring a characteristic of a sample traveling along a processing line when the adaptable inspection unit is affixed to a first position, and wherein the information communicated via the data port is a percentage of samples to be deflected.

14. An adaptable inspection unit, comprising:
an attachment mechanism;
an inspection device;
a data port that is capable of communicating information; and
a power port that is connectable to a power source, wherein the attachment mechanism, the inspection device, the data port, and the power port are configured to physically connect together such that the adaptable inspection unit is capable of measuring a characteristic of a sample traveling along a processing path when the adaptable inspection unit is affixed to a first position proximate to the processing path, and wherein the adaptable inspection unit is not attached to a processing line.

15. The adaptable inspection unit of claim 14, wherein the first position is within a line-of-sight of the sample traveling along the processing path, wherein the attachment mechanism is a mounting bracket, a mounting bracket receptacle, a weldable material, a clamp, an adhesive, a magnet, a latch, a lock, a locating pin, a rail, a slide, a locking pin, a bolt, or a screw, and wherein the inspection device includes an optical sensor, a moisture sensor, a microtoxin sensor, a thermometer sensor, an acidity sensor, a microwave sensor, a pressure sensor, a level sensor, an ultrasonic sensor, a flow sensor, a viscosity sensor, a conductance/impedance sensor, an electronic nose sensor, an X-ray sensor, a multi spectral sensor, a weight sensor, a refractometer sensor, a tenderometer sensor, a firmness sensor, a hardness sensor, or a proximity sensor.

16. An adaptable inspection unit, comprising:
an attachment mechanism;
an inspection device;
a data port that is capable of communicating information; and
a power port that is connectable to a power source, wherein the attachment mechanism, the inspection device, the data port, and the power port are configured to physically connect together such that the adaptable inspection unit is capable of measuring a characteristic of a sample traveling along a processing path when the adaptable inspection unit is affixed to a first position proximate to the processing path, and wherein the adaptable inspection unit is attached to a processing line.

17. An adaptable inspection unit, comprising:
a means for attaching;
a means for inspecting;
a data port that is capable of communicating information; and
a power port that is connectable to a power source, wherein the means for attaching, the means for inspecting, the data port, and the power port are configured to physically connect together such that the adaptable inspection unit is capable of measuring a characteristic of a sample traveling along a processing path, wherein the means for attaching is configured to attach the adaptable inspection unit to a first position proximate to the processing path, and wherein the adaptable inspection unit is not attached to a processing line.

18. An adaptable inspection unit, comprising:
a means for attaching;
a means for inspecting;
a data port that is capable of communicating information; and
a power port that is connectable to a power source, wherein the means for attaching, the means for inspecting, the data port, and the power port are configured to physically connect together such that the adaptable inspection unit is capable of measuring a characteristic of a sample traveling along a processing path, wherein the means for attaching is configured to attach the adaptable inspection unit to a first position proximate to the processing path, and wherein the adaptable inspection unit is attached to a processing line.

* * * * *